US009949497B2

(12) United States Patent
Davidson

(10) Patent No.: US 9,949,497 B2
(45) Date of Patent: *Apr. 24, 2018

(54) METHODS OF PASTEURIZATION ENABLING THE TOTAL INACTIVATION OF VIRAL AND BACTERIAL CONTAMINATION OF IN-SHELL CHICKEN EGGS

(71) Applicant: L. John Davidson, Atkinson, NH (US)

(72) Inventor: L. John Davidson, Atkinson, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/452,797

(22) Filed: Mar. 8, 2017

(65) Prior Publication Data

US 2017/0238567 A1  Aug. 24, 2017

Related U.S. Application Data

(63) Continuation of application No. 14/997,067, filed on Jan. 15, 2016, now Pat. No. 9,648,888.

(60) Provisional application No. 62/104,374, filed on Jan. 16, 2015.

(51) Int. Cl.
| | | |
|---|---|---|
| *A23B 5/005* | (2006.01) | |
| *A23B 5/14* | (2006.01) | |
| *A23B 5/06* | (2006.01) | |
| *A23B 5/08* | (2006.01) | |

(52) U.S. Cl.
CPC ............ *A23B 5/0052* (2013.01); *A23B 5/06* (2013.01); *A23B 5/08* (2013.01); *A23B 5/14* (2013.01); *A23V 2002/00* (2013.01)

(58) Field of Classification Search
CPC .......... A23B 5/0052; A23B 5/06; A23B 5/08; A23B 5/14; A23V 2002/00
See application file for complete search history.

(56) References Cited

U.S. PATENT DOCUMENTS

| | | | | |
|---|---|---|---|---|
| 2,093,786 | A * | 9/1937 | Swarthout | A23B 5/0057 426/325 |
| 5,589,211 | A * | 12/1996 | Cox | A01K 41/00 426/298 |
| 5,843,505 | A * | 12/1998 | Davidson | A23B 5/005 426/298 |
| 5,939,118 | A * | 8/1999 | Cox | A01K 41/00 426/298 |
| 5,993,886 | A * | 11/1999 | Polster | A23B 5/00 426/521 |
| 6,004,603 | A * | 12/1999 | Vandepopuliere | A23B 5/005 426/298 |
| 6,103,284 | A * | 8/2000 | Polster | A23B 5/06 426/298 |

(Continued)

*Primary Examiner* — Anthony Weier
(74) *Attorney, Agent, or Firm* — Catherine Napjus; Michael Persson; Lawson, Persson & Chisholm, PC

(57) ABSTRACT

There is a process which can pasteurize in-shell chicken eggs to inactivate pathogens when present which includes all strains of *salmonella* and all strains of viruses that historically have been known to exist within chicken eggs and currently are known to be evolving into new and separate strains which may cause large quantities of human illnesses unless countermeasures are developed and employed. One such countermeasure is provided through pasteurization of the subject in-shell eggs through pasteurization involving concurrently a secured environment together with a protocol which enables total inactivation of the targeted pathogens whether bacterial or viral without risk of recontamination.

46 Claims, 1 Drawing Sheet

(56) References Cited

U.S. PATENT DOCUMENTS

| | | | | |
|---|---|---|---|---|
| 6,113,961 | A * | 9/2000 | Polster | A23B 5/0052 211/126.1 |
| 6,165,538 | A * | 12/2000 | Davidson | A23B 5/005 426/298 |
| 6,322,833 | B1 * | 11/2001 | Davidson | A23B 5/005 426/298 |
| 6,632,464 | B2 * | 10/2003 | Davidson | A23B 5/005 426/231 |
| 6,692,784 | B2 * | 2/2004 | Davidson | A23B 5/0052 426/298 |
| 9,314,039 | B2 * | 4/2016 | Lara | A23B 5/0052 |
| 2002/0041921 | A1 * | 4/2002 | Davidson | A23B 5/0052 426/298 |
| 2002/0090429 | A1 * | 7/2002 | Davidson | A23B 5/0052 426/298 |
| 2003/0143310 | A1 * | 7/2003 | Davidson | A23B 5/005 426/521 |
| 2004/0058040 | A1 * | 3/2004 | Park | A23B 5/0052 426/298 |
| 2007/0202224 | A1 * | 8/2007 | Erasmus | A23B 5/005 426/298 |
| 2011/0300023 | A1 * | 12/2011 | Cox | A23B 5/0052 422/109 |
| 2012/0258218 | A1 * | 10/2012 | Koyun | A23B 5/0052 426/298 |
| 2013/0186303 | A1 * | 7/2013 | Budina | C08L 5/12 106/135.1 |

* cited by examiner

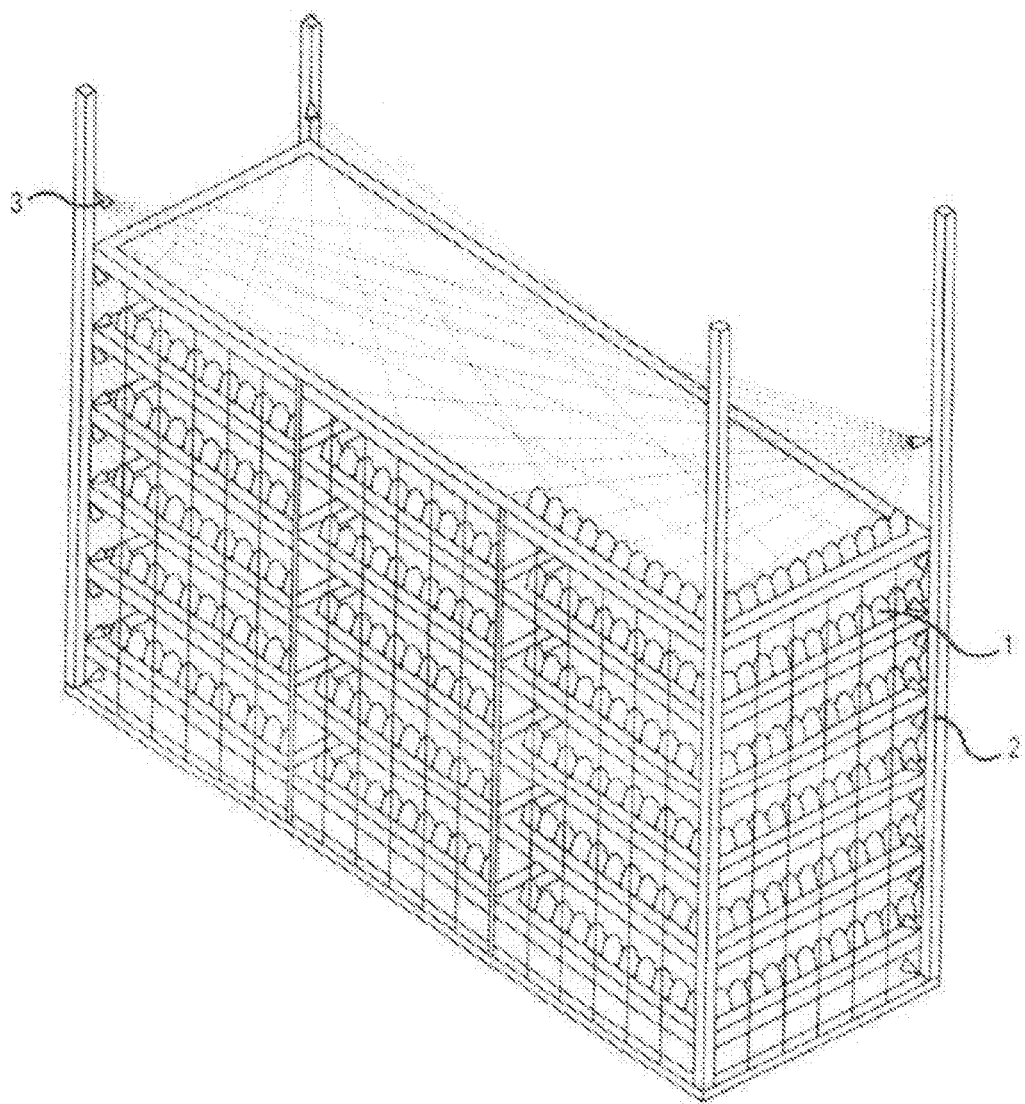

METHODS OF PASTEURIZATION ENABLING THE TOTAL INACTIVATION OF VIRAL AND BACTERIAL CONTAMINATION OF IN-SHELL CHICKEN EGGS

RELATED APPLICATIONS

This application is a continuation of and claims priority to U.S. patent application Ser. No. 14/997,067, filed Jan. 16, 2016, now U.S. Pat. No. 9,648,888, which claims priority of U.S. Provisional Patent Application Ser. No. 62/104,374, filed Jan. 16, 2015.

BACKGROUND TO THE INVENTION

Introduction

US Government official statistics confirm that chicken eggs for decades have been the leading cause of foodborne illnesses within the United States and consistently have referenced the frequency of *salmonella* contamination as found within chicken eggs to be 1 egg in 20,000 eggs.

In the late 1990's production of in-shell chicken eggs for consumer use approximated 3.0 billion dozen-table eggs and separately 1.0 billion dozen eggs were converted into various forms of liquid egg products.

In a report produced by the United Egg Producers a statistic for the production of chicken eggs for the prior year was provided. That report stated that the combination of chicken eggs dedicated to liquid egg products together with chicken eggs dedicated for customary table egg uses in year 2014 totaled 7.260 billion dozen.

In the late 1990's the Government reported that approximately 1.1 million illnesses stemmed from *salmonella*-contaminated chicken eggs. Concurrently the Government also reported that chicken eggs were the single most cause of foodborne illnesses in the United States and the average cost per illness was estimated to be $20,000.

In or around 1990 the Government established that liquid egg product would require a 10-log level of inactivation of *salmonella*.

In 1997 the author of this patent approached the US-FDA to establish a *salmonella* inactivation level for in-shell chicken eggs. A senior official at the US-FDA advised that a 5-log level of inactivation of *salmonella* as commonly found within chicken eggs would qualify the table eggs so pasteurized to display the term 'PASTEURIZED' and to eliminate the required display of the recitation on each egg carton entitled 'Safe Handling Instructions'.

As indicated approximately one-quarter of egg production in the late 1990's estimated to be 1.0 billion dozen was converted into liquid egg product and allowed to be pasteurized to a 4-log level of inactivation of *salmonella*. That 4-log level of inactivation continued to 2009 at which time it was changed from 4 logs to 5 logs as required under the US-FDA sponsored Egg Safety Final Rule.

Notably, the above-referenced US-FDA sponsored Rule specifically allowed known to be highly *salmonella*-contaminated eggs so marked to be included within co-mingled liquid egg product.

The above-referenced 5-log level of inactivation of liquid egg product as set by the US-FDA under the Rule of 2009 allows for co-mingling of so-identified to be highly *salmonella*-contaminated eggs which equated to the level of inactivation required for liquid product to be the same as that required of in-shell eggs as previously provided and referenced hereinabove.

Notably consumption of chicken eggs from 1990 through to the hereinbefore-referenced report from the United Egg Producers reciting production of chicken eggs for public consumption to be 7.260 billion dozen continues to be not only the single most cause of foodborne illnesses but also continues to use the source of illnesses to stem from 1 egg in 20,000 eggs as being *salmonella*-contaminated as was reconfirmed in a report authored by the United States Department of Agriculture Office of Inspector General dated November 2012.

Separate and apart from the reports for each year spanning over two decades that 1 egg in 20,000 eggs is *salmonella* contaminated the separate and long-standing practice of co-mingling two or slightly more Grade B chicken eggs into each dozen so-marked as being Grade A or Grade AA in-shell chicken eggs without public disclosure continues to be practiced but was recommended to be discontinued in a 2001 report authored by the National Egg Regulatory Officials (NERO) for reasons among other reasons that existing bacterial multiplications to high levels already were present giving cause for high health risks to the consuming public which not only have been magnified by extensive age of the subject eggs but also by manure on shells as confirmed by frequency of reports concerning stains on eggshells as well as cracks and dents which provide for the spread of contamination through the unclean rinse water employed. Notably, no available record exists as to the US-FDA altering the referenced Rule of 2009 to conform to the NERO recommendation that the practice of co-mingling Grade B eggs with Grade A and Grade AA eggs has been discontinued. Significantly, the per capita egg consumption in the United States roughly equates to 20 dozen eggs per person per annum. The current population of the United States contains roughly 45% or 150.0 million persons as having compromised immune systems who carry high risk of illnesses at significantly higher costs per illness which in part are caused by *salmonella*-contaminated eggs that official publications of record confirm to be the leading cause of foodborne illnesses within the United States.

Notably and significantly were only one of the two plus Grade B eggs allowed to be contained in each dozen so marked as Grade A or Grade AA of the statistical average of 20 dozen eggs consumed annually per person to cause an illness to each person in the United States consisting of 320.0 million persons at an average cost of $20,000. per illness as confirmed by Government reports on costs per illness for persons of ordinary health the resulting annual public costs would project to be in excess of $100.0 trillion separate and apart from the eggs otherwise actually of Grade A quality within the same dozens but otherwise containing *salmonella* contamination at the published ratio of 1 egg in 20,000 eggs being so contaminated. If avoidable whether in part or whole the projected annual cost savings well exceeds the current National Debt.

Separate and apart from the statistics provided above regarding the undisclosed co-mingling of Grade B in-shell eggs with Grade A and Grade AA eggs this section addresses the use of a 5-log level of inactivation of *salmonella* as measured by the Se strain as employed within co-mingled eggs converted into liquid egg product. Specific reference is made to liquid egg product containing co-mingled inferior eggs which include but are not limited to Grade B eggs. Such eggs frequently include older eggs, shell manure stains which indicate internal transfer, known to be *salmonella* contaminated eggs, eggs containing checks and dents, returns of unsold eggs or returns of repackaged unsold eggs all of which when co-mingled into liquid egg product and pasteurized to a 5-log level of Se inactivation as enabled by the 2009 Egg Safety Rule sponsored by the US-FDA remain to give cause for a major and continuing public health risk of significant consequence for reason that the public will rely upon pasteurization as providing safety when in fact it is being mislead into consuming a notoriously unsafe product which never has lost its annual ranking as the leading food source of illness for a minimum of three decades. That described end product consisting of co-mingled eggs pasteurized to a 5-log level of inactivation using Se as the measure of the *salmonella* targeted when separately provided to 150.0 million members of the high risk group consuming only six one-egg servings annually from an average consumption of 20 dozen eggs consumed annually per person the annual cost of illness for that group only calculated at the average cost per illness provided by the Government for healthy persons at a rate of $20,000. per illness equates to an avoidable annual public cost of $18.0 trillion.

Were the above-described potential savings to occur such would enable the funding of free health care for the total public. Since the National Debt and unfunded obligations would be retired within the equivalency of one year funding would be available not only to provide free healthcare to the total population but also public education programs, infrastructure of the country together with improvements and its maintenance, military preparedness together with improved veterans pensions and health programs along with research and development of other avoidable sources of contamination causing both human and wildlife health risks would become affordable at great benefits to all elements involved.

In summary, the new art enables the total inactivation of contaminated chicken eggs containing either or both *salmonella* and viruses in all strains and in all projected quantities together with the more heat-resistant strains of viruses as they may occur without consequential alteration to either the aesthetic, functional or nutritional values of the subject chicken eggs. All of the recited significant benefits to the public well-being are made available through a new art form of pasteurization of chicken eggs which not only provides for the total elimination of illnesses from chicken eggs but also provides for national savings from debt causing illnesses to be substituted by surpluses which enable the funding of an improved national environment.

The background to the areas of new inventiveness claimed herein for the first time provides for the effective statistical inactivation of both viral strains and *salmonella* strains as commonly found or may come to be found within chicken eggs. The mentioned inactivation results from new inventiveness which in all of its components succeeds in the total inactivation of current and future derivatives of viruses whose presence within chicken eggs presents a public health risk as forecasted by the scientific community to mature into a public health threat of pandemic proportions. Notably, viral inactivation includes the automatic inactivation of *salmonella* bacteria as found within in-shell chicken eggs as well as its presence within liquid egg product. Both pathogens are considered to be continuing public health risks causing both illnesses and deaths stemming from their separate or combined contamination of chicken eggs.

With regard to the current problems caused by *salmonella* in the form of deviations from separate strains commonly occurring within in-shell chicken eggs and liquid egg product it has been determined that the scope of the problem impacting upon public health is greater than that which the public at large is aware. Certain illustrations of the scope of the problem are recited below but in part separately result from unclear and overlapping jurisdictions by agencies charged with oversight.

For introduction purposes certain persistent issues involving failures in the oversight of chicken eggs produced which in the end can be traced back to having their root cause to be from overlapping jurisdictions between sub-agencies together with actual failures in the oversight performed by those agencies regarding their responsibilities to provide an end quality of safety of the subject in-shell chicken eggs together with an end quality of safety of liquid egg product which protects the public from avoidable illnesses. Separately, outside influences which include lobbyists contribute to the confusion already present between sub-agencies as to the authority each may have together with the results of overlapping jurisdictions and lack of clear and definitive identifications of areas of responsibility. As one illustration, in or around 1990 it was reported that approximately 1.1 million cases of illnesses caused by *salmonella*-contaminated chicken eggs had occurred in each of the recent prior years. The associated cost per illness was reported to be $20,000. The USDA as the agency of jurisdiction over liquid egg products reported that not one illness had been traced back during that timeframe to liquid egg products which unlike in-shell chicken eggs were pasteurized. The chronic unsaid was that the original level of pasteurization established in the early 1990's was 10 logs for *salmonella* as applied to liquid egg products for which products all eggs being utilized were pasteurized. When that level of inactivation could not be achieved without damage to the raw characteristics of the subject egg product the log level of inactivation for liquid egg products was lowered to 4 logs as measured by *salmonella*. Notably, from that time forward i.e. for some 20 years the public received materially under pasteurized liquid egg products which by implication performed in various ways by the agency of jurisdiction has mislead the public into believing that the liquid egg products were safe when statistically during that same timeframe millions of avoidable illnesses occurred. Notably, during that same timeframe Government agencies continued to report 1 chicken egg in 20,000 chicken eggs was *salmonella*-contaminated. Also reports continued to confirm that illnesses had not been reduced in a ratio representing the ratio existing between liquid egg product and in-shell chicken eggs i.e. more or less 3 in-shell to 1 liquid. Hence, the 5-log inactivation of liquid egg product provided no improvement to the quantity of illnesses and in fact the quantity since has kept pace with the rate of increase in consumption i.e. 1 contamination in 20,000 eggs has nearly doubled through increased production and consumption just as if no pasteurization had occurred.

For clarity of understanding, the areas of responsibilities for oversight in 1997 the US-FDA had assumed jurisdiction of in-shell chicken egg pasteurization by virtue of the eggs through pasteurization becoming qualified to be a processed food. At that time the inventor of the claims provided herein approached the US-FDA with a request to establish a level of pasteurization of in-shell chicken eggs which he believed could be accomplished through new methods invented by him. The US-FDA promptly advised that were *salmonella* within an in-shell chicken egg to be inactivated to a 5-log level, the end product could be labeled as 'PASTEURIZED,' and in the end the requirement to display the language on each in-shell egg carton entitled 'Safe Handling Instructions' would no longer be required due to the eggs being pasteurized.

That led to the filing of a patent by the inventor through counsel which was issued as the U.S. Pat. No. 5,843,505 on Dec. 1, 1998.

The above-referenced 5-log level of inactivation of *salmonella*, as found within in-shell chicken eggs as set by the US-FDA at the request of this inventor in 1997, was taken at face value. What was undisclosed by the US-FDA to the inventor at that time and also unknown to the public at large was that the original 10 logs set in the 1990's to inactive *salmonella* as found within liquid egg products had been reduced from 10 logs to 4 logs, as measured by *salmonella*, to accommodate the failure of processors to perform the inactivation level required without causing the liquid egg end product to coagulate.

More recently two separate senior Government agencies commented upon both various questionable practices and misrepresentations publicized by subsidiary agencies of jurisdiction over in-shell chicken eggs and liquid egg products. Those agencies identified both misrepresentations in raw egg safety and misrepresentations in the quality of the end product provided by a 5-log level of pasteurization of both liquid egg products and in-shell eggs when such employed a 5-log inactivation protocol of Se. For clarity of understanding the scope of questionable activities by agencies of jurisdiction certain examples are recited.

1. In a report authored by the USDA Office of Inspector General reference is made to the US-FSIS Risk Assessment dated October 2005 within which the US-FSIS reported victory over *salmonella* as found within in-shell chicken eggs through a claim that the mentioned 1 egg in 20,000 being *salmonella*-contaminated had been improved to being 1 egg in 277,000.

Notably: The USDA Office of Inspector General in its report dated November 2012 discredited the mentioned statistic of the US-FSIS and reconfirmed the statistic of 1 egg in 20,000 in-shell chicken eggs as being *salmonella* contaminated. In that same report it was further confirmed that *salmonella* was present at a frequency of 1 egg in 20,000 eggs which could become as frequent as 1 egg in 3,600 eggs depending upon the level of contamination being checked. Those levels of *salmonella* contamination would impact upon the otherwise published statistic that 45% of the population representing 150.0 million persons consists of high risk groups which in the event of an illness could well exceed $20,000 cost per illness and achieve as much as $100,000. cost per illness or even greater under certain circumstances. Although no exact figure has been published it reasonably would be assumed that that specific high risk group of 150.0 million persons consuming under pasteurized liquid egg product at an equivalency of six one-egg servings annually taken from an annual per person average of 20 dozen eggs consumed would create an avoidable cost of illness per annum for the 150.0 million persons in that group equating to $18.0 trillion. Notably, all liquid egg products pasteurized to a 5-log level of *salmonella* inactivation likely are causes of illnesses.

The US-FSIS is an agency within the USDA. The USDA Office of Inspector General, subsequent to the US-FSIS report, discredited that report and ruled that 1 contaminated egg in 20,000 eggs remained to be the accurate determination of *salmonella* contamination within in-shell chicken eggs. Not only did the mentioned report discredit the US-FSIS report, where it reconfirmed both the frequency of *salmonella* contamination of chicken eggs, but it also reported the following: "Reports by FDA and CDC cite SE as a leading bacterial cause of food-borne illness in the United States and further cite shell eggs the primary source of human SE infections."

As one illustration, the USDA recites claims by liquid egg product producers that not one illness had been traced back to *salmonella*-contaminated liquid egg product.

The inactivation of viruses automatically inactivates all bacteria that may be present. Under the new protocol contained within the new art for pasteurization of in-shell chicken eggs, the achievement of 10 or more logs as measured by viruses is made available without damage to the raw characteristics of the subject in-shell chicken eggs.

The new science contains protocols that are employed in a novel manner which when employed in the specific sequence as prescribed creates a unique art form for pasteurization resulting from the conversion of those original findings into protocols which preserve the raw characteristics of the subject chicken eggs while at the same time providing for the inactivation of the targeted pathogens which eliminate their risks to public health and allows for safe consumption even when the subject eggs are contained within all forms of preparation including less than hard-cooked or even raw. Notably, the new art substantially eliminates the threats to public health as found under all prior art on the subject of chicken egg pasteurization as currently employed in the United States. The current protocols employed for pasteurization of either in-shell chicken eggs or liquid products rely upon materially less than a 10-log level of inactivation of *salmonella* in all strains as found within chicken eggs. Since total inactivation relies upon logs approaching 10 unless the subject eggs are pasteurized within four days of lay all current arts for pasteurization of chicken eggs present a public health risk for reason that it is infrequent that in-shell chicken eggs are consumed within a four-day period from date of lay and are not exposed to ambient temperatures between the date of lay and the time of consumption. Protocols requiring prompt and deep chilling to avoid potentially lethal multiplication of *salmonella* within a chicken egg do not eliminate risk but only delay the point in time within which *salmonella* when present succeeds in multiplying to an extent that causes illness. Recent 'Best buy' dates employing 30 days have become common. Those 'Best buy' dates represent 30 days post packing which may be materially different from the date of lay. During that period from date of lay through the end of the "Best buy' date unless continuously deeply chilled a *salmonella*-contaminated chicken egg containing one cell of *salmonella* will multiply into lethal quantities by the time the "Best buy" date of 30 days expires. As discussed herein before the need for total inactivation of the targeted *salmonella* pathogen together with the potential addition of viruses is compounded by the blending allowed by current regulations of highly-contaminated chicken eggs into liquid egg product which has no hope of becoming safe for consumption when less than a 10-log level of inactivation through pasteurization has been performed. That problem is compounded when stale eggs are allowed to be repackaged with new dates or when known-to-be Grade B eggs are allowed to be co-mingled into Grade A or Grade AA dozens so-marked.

The protocol employed under the new art replaces a reliance upon less than clinically proven protocols claiming safety of chicken eggs pasteurized to levels as measured in logs which demonstratably are inadequate to provide permanent levels of *salmonella* inactivation. Those protocols fail to provide public safety against levels of *salmonella* contamination as commonly found within chicken eggs known to require inactivation well in excess of 5 logs, the current threat posed by viruses and the mistaken reliance upon the improbability of providing for preservation of existing count levels of *salmonella* contamination through flawless uninterrupted deep refrigeration to avoid lethal multiplication of contaminants present as has been employed under prior practice through to the present which likely results from a flawed substitution of avoidance of multiplication of the pathogen as a replacement for the inability to provide true inactivation. No prior art of pasteurization has successfully achieved total inactivation of highly pathogenically contaminated chicken eggs containing contamination of either or both *salmonella* or virus strains as is now found to be available through the described new art which uniquely provides for a result of total inactivation of either or both viral and bacterial contaminants regardless of the level of contamination contained within the subject eggs whether found within both in-shell or co-mingled liquid product.

As a separate area of new inventiveness contained herein, a secured environment is provided for the subject in-shell chicken eggs to receive pasteurization which enables their statistically total inactivation of targeted pathogens. The mentioned secured environment is provided by a medium whose unique features eliminate risk from residual contamination caused by the presence of contaminants residing within the pasteurization medium or within or upon the subject eggs surviving the pasteurization protocol employed as was and continues to be experienced under prior arts for pasteurization of in-shell chicken eggs. The new art eliminates the potential for residual contamination as well as recontamination through multiple features described in greater detail elsewhere herein under the section entitled 'Detailed Description of the Invention'.

The new art as reported and described herein consists of two primary areas of inventiveness, which when employed in tandem, provide for new and unique levels of pasteurization of targeted pathogens, which include either or both viruses and *salmonella* bacteria as are found or may come to be found within in-shell chicken eggs.

The first of the primary areas of inventiveness consists of a unique application of heat and its denial, which provides for an ability to apply heat through a predetermined formula customized to accommodate the specific egg characteristics of the targeted eggs to achieve total inactivation of pathogens, which may be present whether bacterial or viral without risk of consequential loss of aesthetics, functionality or the nutritional benefits characteristic to a raw chicken egg. This portion of the new protocol may be referred to from time to time within this document as 'cyclical' in its nature.

The described first primary area of inventiveness referenced above consists of a unique method for the application and denial of heat adjusted to accommodate the specific characteristics of the in-shell chicken eggs subjected to pasteurization which is accomplished through novel uses of heat and induced chilling to provide pasteurization to in-shell chicken eggs at levels as measured in logs never before achievable without consequential loss of the raw characteristics of the subject eggs.

For clarity of understanding, the protocol employed is preprogrammed to accommodate specific timeframes and temperatures to which the subject eggs are exposed. Those steps enable pasteurization to occur at log levels never previously achievable without damage to the subject eggs. All of which is performed within a uniquely secured environment within which pasteurization occurs from inception through conclusion according to the referenced preprogrammed protocol which is performed within an environment that uniquely is secured against contamination or recontamination throughout the duration of the pasteurization protocol being employed. Here follows a description of the pasteurization medium employed together with its purpose and features.

The second of the primary areas of inventiveness consists of a unique pasteurization medium, hereinafter referred to as the 'medium', within which total inactivation of targeted pathogens is performed without loss of or damage to the aesthetic, functional or nutritional characteristics as found within a raw chicken egg.

The described second primary area of inventiveness as referenced above consists of novel features contained within a new and unique medium within which pasteurization achieving the targeted and programmed inactivation of pathogens is performed to predetermined levels as measured in log levels peculiar to the inactivation level required for the pathogen to be inactivated without risk of recontamination as has plagued all prior art. The unique features of the pasteurization medium provide for pasteurization to occur free from risk of recontamination which is made available through added elements to the medium as detailed herein below which become both incorporated and included as integral elements to a formula which provides for an automated program for pasteurization resulting from a customized formula created from a base formula which arranges for the use of the mentioned elements within the medium to be continuously employed through adjustments which accommodate the flexibilities containing time and temperature requirements of the intermittent application of heat and its denial which in the end enables a new and unique ability to pasteurize chicken eggs containing different characteristics and different pathogens to higher levels that achieve total inactivation of the targeted pathogens as measured in logs while retaining characteristics found within a raw chicken egg which include aesthetics and functionality but contains the notable absence of targeted pathogens.

In summary, the above-described protocol containing a new method of pasteurization performed within a unique medium when employed together represent a unique protocol for reliable and total inactivation of pathogens targeted whether bacterial or viral without the loss of either functional or nutritional benefits as commonly found within chicken eggs.

The background for the need to provide the public with safety from contaminated chicken eggs includes their use in foods which contain by preference and usefulness raw or undercooked chicken eggs. The history of the efforts to eliminate *salmonella* from chicken eggs as a public health risk in a formal sense likely began with the need to protect the public from food poisoning caused by *salmonella* as may be contained within liquid egg product through the initiation of pasteurization stemming from the USDA requirements set at a 10-log inactivation of *salmonella* in the 1970's through the Egg Products Inspection Act under the sponsorship of the USDA The following represents a more complete history regarding pasteurization of chicken eggs than was provided at the beginning of this section under the title of "Introduction":

1. An original log level of inactivation of *salmonella* was established to be 10 logs.
2. The log level established as 10 logs was to be applied to liquid egg product including co-mingled whole eggs.
3. Liquid egg processors in significant part processed the liquid egg product taken from co-mingled in-shell eggs and passed that product through heated tubes to achieve the targeted log reduction of *salmonella* originally set at 10 logs.

A problem occurred for the processing in the above-described manner in that the heated tubes were cooking i.e. causing coagulation of the liquid egg product within the tubes during the process of achieving the targeted 10-log level of inactivation of *salmonella* when present.

4. Without current availability of public records confirming such, no notice on record has been available to confirm that the USDA, as the Agency of jurisdiction, relaxed the log level from the needed 10 logs for inactivation of *salmonella* as found within liquid egg product to 4 logs, which enabled the elimination of coagulation occurring at a 10-log inactivation protocol to eliminate *salmonella* to one which required only a 4-log level. That protocol consisted of converting the subject eggs to be pasteurized into liquid egg product by allowing that product to flow through tubes which were heated to transfer heat for pasteurization to be performed on the liquid egg product as it flowed through the heated tube. The reduction from 10 logs to 4 logs enabled the liquid egg product to benefit from a reduced exposure to heat by more than 50% which enabled the protocol of employing a heated tube to continue with the new benefit of having eliminated coagulation of the end product which resulted from the reduced exposure of the subject eggs to heat which in turn reduced the level of pasteurization and its inactivation of the targeted *salmonella* bacteria. That reduction solved the problem of coagulation but created the problem of inadequate pasteurization.

5. Notably and mistakenly, the H3N1 virus as found within chicken eggs stemming back to the beginning of pasteurization of liquid egg product was treated as having the same level of heat inactivation as that of *salmonella*. In both cases i.e. the mentioned virus and *salmonella* the 4-log inactivation of *salmonella* was employed to the eggs potentially contaminated with either or both bacteria and viruses, and the flocks from which the eggs came were destroyed. Hence the inactivation of the virus and *salmonella* shared the same levels of inactivation. The above enabled two errors to occur. First, the *salmonella* strain was identified to be *Salmonella enteriditis* (Se) which as it turns out was not the most heat-resistant strain of *salmonella* as found within chicken eggs. Secondly, the H3N1 virus is part of a family of viruses which science since has identified as requiring at least a 2-log level of inactivation over that of *salmonella*. The practice of inactivating both *salmonella* and the H3N1 virus at a 4-log level as measured by Se continued through the enactment of the Egg Safety Rule of 2009.

The above-mentioned practice of employing a 4-log inactivation level for all strains of *salmonella* for pasteurization of liquid egg product together with the H3N1 virus, when present, continued through the effective date of the Egg Safety Rule of 2009, within which the mentioned 4-log inactivation of Se used as the prior measure for all strains of *salmonella* was altered to become 5 logs. That level of inactivation of Se paralleled the level of inactivation set for in-shell egg pasteurization protocol being developed for in-shell chicken eggs by this inventor, Davidson, as set by the US-FDA at his request in 1997.

6. The continuation of the disposition of chickens and their eggs afflicted by the H3N1 virus continued to be provided with the same level of heat inactivation as *salmonella* through to the enactment of the Egg Safety Rule of 2009, at which time all references to the H3N1 virus were dropped.

Notably, shortly thereafter a contract was provided to an independent firm i.e. a subsidiary of Sanofi Pasteur for $150 million to produce a vaccine to protect the public against a pandemic forecasted by the World Health Organization (WHO) to be already within the making resulting from the 'H' series of viruses which were in the process of spreading across the Far East and into the Middle East as well as Europe causing illnesses which if mutated as forecasted to likely occur would provide for human-to-human transfer of illness resulting in a pandemic of greater proportion than the Pandemic of 1918 which killed between 50 and 70 million persons around the World including 15 million Americans.

Notably, the World population in 1918 approximated one-third of the current population.

WHO has continued to characterize its forecast for a pandemic to be one viral mutation away from allowing its transfer to be from human to human. However, although the speed of transfer would be increased by human-to-human transfer as caused by air or saliva and other forms of direct transfer the potential scope of the pandemic absent of human-to-human transfer excepting speed likely would remain constant.

Still more notably, in 2009-2010 a pandemic here in the United States occurred from a viral source which according to WHO sickened 60 million persons and caused 12,000 deaths in a matter of 12 months.

7. Under current protocol as sponsored by the US-FDA, in-shell chicken eggs if pasteurized to a 5-log level using Se as the measure for *salmonella* contamination may display the term 'PASTEURIZED' and may discontinue the display of the language described on chicken egg cartons under the heading of 'Safe Handling Instructions' which forewarn that chicken eggs may be harmful to one's health if less than hard-cooked.

Since 45% of the population of the United States is categorized to be within a high risk group which contracts illnesses with greater frequency and with greater severity, it is now evident that a 5-log level of inactivation of Se is at best a significant risk to that 45% of the population and remains to be a risk to the other 55% of the population. It is obvious that a significant health risk from contaminated chicken eggs exists and that risk is not being conveyed commensurately to the public at large.

As one example of minimizing the continuing risk described above the US-FSIS, a division of the USDA, in 2005 claimed that only 1 egg in 277,000 eggs contained a risk of causing illness from *salmonella* contamination. That claim was found to be unsubstantiated by the USDA Legal Department.

In 2009 the US-FDA within its Egg Safety Rule raised the log level of pasteurization of liquid egg products from 4 to 5 as measured by Se and notably concurrently allowed known-to-be and so-marked to be highly-contaminated chicken eggs to be co-mingled into liquid egg product bearing the label as 'PASTEURIZED' when no statistical support existed that a 5-log level of inactivation of Se would succeed in providing reliable safety to the public at large including those risks to food safety as encountered by interrupted refrigeration frequently occurring between farm to table.

8. The USDA Office of Inspector General in a Report dated November 2012 reconfirmed the statistic originally generated by the USDA that one in-shell chicken egg in 20,000 carries with it *salmonella* contamination to a level giving cause to illness. That Report reconfirmed the frequency of potential illnesses and deaths to the same level reported to be present throughout the 1990's. Significantly, neither the referenced reports from the USDA Office of Inspector General nor the US-FDA-sponsored Egg Safety Rule of 2009 addressed the seldom disclosed practice of including a statistical average of 2.16 highly-contaminated Grade B eggs being included within each dozen of so-marked Grade A or Grade AA eggs as reported and confirmed by the National Egg Regulatory Officials (NERO) in their report to the US-FDA which was authored prior to and provided to the US-FDA before their Rule of 2009. Nonetheless the US-FDA went forward under their Rule in allowing a continuation of co-mingling Grade B eggs with Grade A eggs whether in liquid egg product or whether within pasteurized in-shell egg cartons as well as within raw egg cartons. Notably, when pasteurized to 5-logs the Grade B eggs were not inactivated from their *salmonella* contamination. Similarly, when the mentioned Grade B eggs were co-mingled with Grade A eggs within egg cartons the risk to the public health was both disguised and significant. Further, when co-mingled into liquid egg product a 5-log level of inactivation of Se had no hope for the consuming public to be out of harm's way of illnesses.

9. For further emphasis to the public risks described above the frequency of illnesses caused by Grade B eggs co-mingled with Grade A and Grade AA eggs, so labeled, as provided to the public at large which includes 45% of the population as being members of high risk groups is a separate and distinct source of illnesses caused by *salmonella* levels as found within chicken eggs which are not inactivated reliably by anything less than a 10-log level of inactivation as measured by the strain of *salmonella* identified as Se and as designated by the US-FDA as the strain of measure to be employed. When consumed without the benefits of pasteurization the risks described to the mentioned risk group magnify.

10. Notably and significantly, were only one of the two plus Grade B eggs contained in each dozen of the estimated 20 dozen consumed annually per person to cause an illness three times annually to each person in the United States consisting of 320.0 million persons at an average cost of $20,000. per illness as per Government reports on costs per illness the resulting potential annual cost savings would be $19.2 trillion.

11. Although no exact figure has been published, it reasonably would be assumed that that specific high risk group of 150.0 million persons consuming under pasteurized liquid egg product at an equivalency of six one-egg servings annually taken from an annual per person average of 20 dozen eggs consumed would create an avoidable cost of illness per annum for the 150.0 million persons in that group equating to $18.0 trillion.

12. The total of the avoidable cost referenced in numbers 10 and 11 above equates to $37.2 trillion annually.

13. According to the United Egg Producer's report on the quantity of chicken eggs produced for market, 7.260 billion dozen were produced for year 2014. The public cost for providing 100% pasteurization benefits to 100% of the quantity of the eggs recited at full retail is projected to be $2.614 billion.

14. Not only did the 5-log level of inactivation of known to be highly *salmonella* contaminated and co-mingled chicken eggs continue to be provided to the public under the authorization provided by the US-FDA but also the US-FDA sponsored Rule of 2009 through to the present notably and specifically included the addition of known to be highly contaminated eggs whose contamination levels well exceeded any pasteurization protocol in practice which rarely if ever were totally inactivated by a 6-log level of pasteurization even were such to be employed as at that time was recommended to the US-FDA by the US-FSIS. It is important to note that pasteurization even at 6-logs minimum was 4-logs shy of providing reliable inactivation.

The current and reliable standard for *salmonella* inactivation requires a minimum of 10-logs which will inactivate all current and forecasted strains of *salmonella* together with the levels of contamination existing within the subject egg being processed for pasteurization which includes known to be highly contaminated eggs so identified by the US-FDA and known to be Grade B eggs representing 18% of each dozen which too are both inferior in quality and contain high levels of *salmonella* contamination.

The above recitation provides for an understanding of the current inadequacies of both Government oversight of chicken eggs from processing to consumption as particularly noted in detail within the USDA Office of Inspector General report of 2012 as complemented by a group of experts known as the National Egg Regulatory Officials (NERO) which in a report more fully discussed herein below confirmed numerous abuses within the egg industry placing the public in harm's way that most particularly impacts upon the 45% of the public that are members of risk groups which gives cause for greater severity and frequency of illnesses from a contamination source which is typical of that found within chicken eggs through *salmonella* together with new threats from viral contamination.

Significantly, within the referenced NERO report the practices of repackaging eggs with stale dates altered to reflect a more current date as well as the practice of including within a dozen Grade A or Grade AA eggs to include Grade B eggs of up to 18% is confirmed to exist and more notably is undisclosed to the consuming public at large. Notably, the NERO report further states that Grade B eggs are older and may contain materially higher levels of contamination. More generally NERO reports that the inclusion of Grade B eggs co-mingled with Grade A or Grade AA eggs should be discontinued for reasons of their low quality and high health risks to the public. No information researched as of 2015 confirms a change in the policies recommended by NERO as having been performed by either the USDA and its associated agencies or the US-FDA Were such Grade B eggs to carry a pathogen consisting of either *salmonella* or a virus the cell counts frequently would exceed a 5-log inactivation of Se thus causing massive quantities of illnesses to a highly vulnerable population that includes approximately 150.0 million persons within the compromised immune system category.

Some reliance upon processing or pasteurization occurring within four days of lay has been discussed as an off-set to the need for pasteurization to protect against illnesses. Unfortunately, that nature of reliance upon an industry that is so diverse in its nature of handling eggs from farm to table together with its demonstrated track record of delivering over a span of decades substandard product makes moot any reliance upon the industry being self-governing and equally makes moot reliance upon Government agencies to provide reliable oversight.

Notably and materially under the new inventiveness the effective inactivation of new and deadly virus strains as may be found or come to be found within chicken eggs is enabled. Such inactivation includes but is not limited to current viral strains identified as the H5N1, H7N9 and the H7N7 along with additional strains which in part find their genesis from the mentioned H5N1 or are the result of independent virus strains not yet fully identified. Successor virus strains evolving independently or through mutations according to science are expected to give cause for even greater risks to public health through their new abilities to spread from one living thing to another. Potential successor strains may be the result of new strains stemming from two separate viral groupings. One grouping is highly pathogenic while the other grouping is of lower pathogenic risk. Said referenced strains and their groupings individually and historically may co-mingle to form strains which are not identical to prior strains but may flourish independently or post co-mingling as currently reported by the scientific community through its publications. Accordingly the nature of the characteristics of the subject viral strains confirm the continuing evolution of viruses. As examples of what either is occurring or has been determined to likely occur along with described countermeasures to protect against chicken eggs contributing to a forecasted pandemic caused by the evolution of the virus strains reported to either already exist and to contaminate chicken eggs resulting from on-going evolutions such is expected to enable human-to-human transfer of an Avian Influenza strain through continued evolutions or independent creations of new strains. The common denominator for both viral and bacterial inactivations when present within or upon chicken eggs has been proven to be the application of heat to a level and duration which inactivates the targeted pathogen.

Although water is the preferred heat transfer medium when employed within the art contained herein which includes spray alternatives for heat generation and conduits are available to be employed in concert with the conveying medium to achieve log reductions necessary to inactivate targeted pathogens requiring log reductions greater than all current art enables without damage to the raw characteristics of the subject eggs together with maintaining their nutritional benefits. Those alternate sources of heat generation may include but are not limited to heated water in any form which may be supplemented by each or all of microwave applications, reverse osmosis, ultraviolet light beams including other beamed energy sources passing through air but will usually include purified water as the preferred base-conveying medium of energy sources as known within the scientific community to be effective in creating and transferring heat through an evenly applied source of energy without damage to the subject food being processed while maintaining the aesthetic and functional characteristics of the subject eggs being pasteurized.

The targeted pathogenic microorganisms may differ in their heat tolerance. However, the new technology as devised and described herein contains a unique feature which provides for an increase to the range of inactivation or destruction of the targeted contaminants through a unique protocol involving both the application of and the denial of heat in a manner which employs both levels of heat application and levels of heat denial in a unique manner which enables total inactivation of the targeted pathogens with minimal impact upon the nutritional, aesthetic and functional qualities of the treated chicken eggs as compared to those of raw chicken eggs. The application of heat and its denial is performed on a gradual basis initially but may be accelerated for improved results. The initial gradual heating and cooling before acceleration provides protection against certain eggshells which are more fragile in their composition from cracking as may be caused by temperature changes of the eggs including their composition which both expands and contracts to a greater extent when temperatures provided to it are abrupt.

Notably and significantly the application of heat to contaminated chicken eggs is not inventive unto itself. It has long been known that hard cooking chicken eggs eliminates risk of illness stemming from either or both bacterial and viral contamination. More recently the art of utilizing heat through a medium including but not limited to water has been employed to perform pasteurization of both liquid egg product and in-shell chicken eggs. Those attempts were successful in performing a level of pasteurization targeting bacteria as found within chicken eggs but failed to achieve total inactivation of all strains of *salmonella* and any strain of viruses without giving cause for the loss of functionality as found in raw chicken eggs as well as the aesthetic loss of their raw characteristics.

What is novel in the instant case of this Application is that the level of pasteurization required to inactivate all strains of both viruses that may come to be found within chicken eggs together with *salmonella* bacteria as currently found within chicken eggs and particularly those eggs that have had time within either a commercial or noncommercial environment as may occur from farm to table to multiply their counts of either of the mentioned pathogens when present to reach either a lethal level of contamination or an illness-causing level of contamination whether from *salmonella* or viral sources requiring materially higher than a 5-log pasteurization protocol as applied to either *salmonella* or viruses to be effective in providing the necessary levels of inactivation of both mentioned contaminants when present either separately or concurrently to assure public safety has been fully achieved i.e. total inactivation without either the necessity of hard-cooking or the need for extremely prompt and uninterrupted deep chilling continuing from lay through consumption. Such is consistent with the spirit, intent and language provided by the US-FDA in a document entitled 'Egg Product Inspection Act' dated May 20, 2009, which in pertinent part states: "*The term "pasteurize" means the subjecting of each particle of egg products to heat or other treatments to destroy harmful viable micro-organisms by such processes as may be prescribed by regulations of the Secretary*". Notably, the Egg Safety Final Rule dated Jul. 9, 2009, allowed for so-identified and known to be highly contaminated chicken eggs to be pasteurized to a 5-log level of Se-inactivation and to be so labeled as 'PASTEURIZED' while at the same time eliminating on egg cartons or liquid egg product containers the required display of 'Safe Handling Instructions' which forewarned the reportedly estimated 150.0 million persons who were likely egg consumers having compromised immune systems that unless eggs were hard-cooked such could cause either illness or death. Notably and pertinently no reliable hope or scientific evidence either existed or currently exists that *salmonella* in all of its strains as found within chicken eggs including those eggs which are known to be highly contaminated can be inactivated and stay inactivated from farm to table when a 5-log inactivation of Se is used as the pasteurization standard employed. Still more notably the USDA Research Laboratory located in Athens, Ga., is the source of studies which include and confirm that the level of inactivation required of *salmonella*-contaminated chicken eggs is successful when the quantity of exposure to heat provides for total inactivation. The USDA studies confirm that absent of uninterrupted deep chilling from time of lay through consumption in a matter of 31 days of exposure to generally ambient temperatures the cell count of *salmonella* if present at time of lay in an original quantity of 3 cells can multiply to a cell count exceeding 1 billion cells. When the above statistic is applied to reliance upon very prompt and deep chilling of the subject chicken eggs from farm to table whether raw or partially pasteurized it is obvious that the reliance upon deep chilling to restrict multiplication of either or both bacteria and viruses to a level that does not give cause to illness when consumed at less than hard-cooked is a futile effort which represents serious consequences to an unsuspecting public that contains approximately 45% of the population as being within the category identified as the 'high risk group'. The above-described collective deficiencies in providing the public with a safe egg whether in-shell or in liquid form further is notably and significantly compounded by the allowance of dangerous and ineffective practices involving deceptions in the labeling of eggs which place the public at still greater risk of illness caused specifically by allowing known to be contaminated, cracked or dented eggs to be sold to the consumer although such can be avoided and allowing Grade B eggs at a certain ratio specifically allowed to be up to 18% to be co-mingled with Grade A and Grade AA eggs within cartons so-marked to be passed on to an unsuspecting consumer. Those matters among others of long practice are discussed in greater detail within a document whose excerpts are recited herein directly below.

In a current report NERO confirmed that eggs passing through the current system from date of lay through date of consumption frequently achieved a 60-day age which included an allowed repackaging of stale eggs which when practiced allowed for an additional 60 days as discussed by NERO in its report concerning the need for new regulations to eliminate that practice which has not occurred. On those occasions the age of the eggs prior to packaging frequently would equate to 60 days or greater. The quantity of *salmonella* cells enabled to be present at minimum required a 10-log reduction for inactivation. Independent sources including scientists attached to the USDA confirm that eggs contaminated with influenza strains require still greater levels of inactivation than do *salmonella* strains. For decades public information provided through a variety of authorized Government agencies of jurisdiction have reported that *salmonella*-contaminated chicken eggs is the leading source of foodborne illnesses. The problem of providing food safety for the public is compounded by misleading practices within the egg industry which include the labeling of the 'Best By' or 'Sell By' dates, hereinafter referred to as 'Best By', to start at the date of packaging. The 'Best By' date not only runs from the date of packaging and not the date of lay but also has been extended from what used to be a range between 14 days and 21 days post-packaging in most cases as state jurisdictions provided to now allow for 30 days from date of packaging.

As the report from NERO confirms, the current practice employed allows for Grade B eggs to be co-mingled with Grade A and Grade AA unpasteurized shell eggs. Not only is the described practice of blending Grade B eggs with Grade A or Grade AA eggs on its face inconsistent with the purpose of grading but also that practice creates a vehicle for providing the public with false representation as to the quality of the eggs together with their potential level of dangerous contamination based upon their preconditions at origin and age. Further and equally notably stale eggs are allowed to be repackaged and re-dated without any notice to the consumer that such has occurred. Still more notably the NERO report confirms that food service eggs are not subject to any date requirement whatsoever as such relates to either date of lay or 'Best By' as guidelines to the enterprise serving an unsuspecting public which on its face includes nearly one-half the population categorized as being part of a high risk group having reduced immune systems giving cause for greater risk of illness from consumption of pathogenic foods. Significantly, it is common knowledge throughout Government and the egg industry that each year chicken eggs are acknowledged to be the leading source of illness among all food groups. That common knowledge as NERO points out in its report is flaunted by practices performed by agencies of jurisdiction.

The above-described shortcomings regarding a 5-log level of inactivation of Se as being ineffective in inactivating *salmonella* cell quantities which frequently are present as enabled through the mentioned Rule and as particularly applied to the mentioned vulnerable 150.0 million egg consumers with compromised immune systems now are resolvable.

The statistical confusions over the frequency of *salmonella* contamination of chicken eggs, together with confusion over their sources of contamination, for at least three decades remain unresolved. However, the subject eggs continue to be represented as being safe for consumption for the public when less than hard-cooked as is assured by agencies of jurisdiction providing that the eggs have been pasteurized to a 5-log level of inactivation of the *salmonella* strain identified as Se. Separately and significantly after achieving only a 5-log level of inactivation of *salmonella* as measured by the strain Se which is not the most heat-resilient strain the agencies of jurisdiction have allowed for their inclusion both within in-shell egg cartons or within liquid egg product labeled as 'PASTEURIZED' when nonesuch achievement has been performed under the 5-log protocol employed. In part the confusion referenced primarily pertains to whether the *salmonella*-causing illness stems from contaminated eggshells or the ovaries of the chicken. Although the source may be a matter of contention as to the quantity or the frequency of contaminated eggs the health of the chicken has had little attention as to its vulnerability to illness including its becoming a *salmonella* carrier. Separately, it is common knowledge that the eggshell is exposed to hen manure and environmental contamination flowing into the egg post-lay through its shell pores as the internal egg contracts through exposure post lay to its new and cooler environment. The ability to provide the public with a pasteurized egg which overcomes the risk of airborne recontamination post pasteurization as now provided by Davidson within this application together with the challenge to provide a clinically proven safe egg when consumed less than hard-cooked has become a broader problem than just the vehicle of pasteurization employed since the very level of pasteurization established by the Government knowingly has been inadequate to provide the public with the safety it deserved without the necessity of their reliance upon incomplete information placing their health, wealth and lives at serious risk. For clarity and at risk of redundancy pasteurization of liquid egg product began with a 10-log inactivation of *salmonella* as found within chicken eggs or upon their shells. When coagulation occurred during processing employing heat the 10-log level of inactivation through the application of heat was relaxed to 4 logs. No substitute for the missing 6-log reduction was provided to replace the reduction in the level of safety of the end product as applied to the new level of risk being passed through to the public. As a result salmonellosis from chicken eggs became the single most source of food-borne illness each year over the past three decades. Part of the unsaid within that well-publicized statistic was the statistical presence of illnesses from liquid egg product which had a long-standing reputation for being created from cracked, dirty, misshapen, stale, un-refrigerated and known to be both highly contaminated and recirculated old eggs co-mingled and blended into various types of liquid egg products which rarely gained the benefits from prompt, deep and sustained refrigeration. That product consistently has represented nearly one-third of the in-shell chicken egg industry currently approximating more than 2.25 billion dozen annually by itself. Since the relaxation of the log level required for pasteurization of liquid egg product from 10 logs to 4 logs which accommodated the inability to pasteurize to the level of safety achieved at 10 logs without coagulation of the end product it is notable that the industry repeatedly has claimed not one illness from *salmonella*-contaminated liquid egg product has been traced back to that source. It is pertinent that during the 1990's to the present chicken eggs have remained the leading cause of foodborne illness. Since as mentioned approximately one-third of all chicken eggs are converted into liquid egg product and that product being pasteurized occurred during that same timeframe going back to the 1990's it can be concluded that the quantity of illnesses would have reduced in their ratio to the total production of eggs. No such reduction has occurred. What actually has occurred is that the number of illnesses remains to be at a ratio of 1 egg in 20,000 eggs being contaminated from a *salmonella* source either present within or upon the subject eggs separate and apart from those co-mingled to provide for liquid egg products. The ratio is stagnant although production over the years has doubled. In summary, none of the claims of improvements to public health from eggs have occurred, and eggs remain to be the single most source of foodborne illness each year as so over the prior twenty years as repeatedly has been confirmed by the Government itself in reports published. Separately and clearly the co-mingling of known to be highly contaminated chicken eggs frequently resulting from rejected eggs, unsold eggs of stale dates, returned eggs of unknown dates together with common abuses to eggs ending up within liquid egg products co-mingled and pasteurized to a level of inactivation of 5 logs using Se as the measure holds little hope of not causing illness at least to the 45% of the national population representing 150.0 million persons identified as being of impaired health and having high risk of compromised immune systems causing both more intense illnesses at greater frequency as well as disproportionately higher costs per illness. That minimal frequency of illnesses as applied to members of the high-risk group only but using a reduced cost per illness as published by the US-FDA applicable to persons of good health i.e. $20,000. per illness projects into an avoidable public cost for only the members of the high risk group equating to $18.0 trillion annually.

In summary to the above, the following applies to inadequately-pasteurized liquid egg product containing co-mingled eggs carrying *salmonella* at a variety of levels of contamination along with a variety of strains of *salmonella* all as known to exist and allowed to be consumed by the public by regulation as monitored by agencies of jurisdiction. Irrespective of the level of contamination of the subject chicken eggs being converted into liquid egg product, the subject eggs are pasteurized to a 5-log level of inactivation of Se in conformance with the Government agency standard employed regardless of the source, age, strains of *salmonella* and the individual conditions surrounding the history of the subject eggs. The following comments contain a caveat that a 5-log level of pasteurization targeting Se for inactivation of the quantity of *salmonella* as found within co-mingled and contaminated liquid egg product is inadequate to inactivate the described levels of *salmonella* frequently present. Further to the above, the cost of illnesses for persons of compromised immune systems a/k/a high-risk groups for these purposes has been modified downward to $20,000 per illness to equate to the cost per illness carried by the US-FSIS for persons of ordinary health. This illustration employs levels of consumption per capita as applied to solely members of the 150.0 million persons which represent all of those who have compromised immune systems as identified by the Government. For these illustration purposes and with the intention to provide a collection of statistics that are either those of the Government or modified only to be ultraconservative the following calculations and conclusions are provided. The calculations employ statistics authored by Government agencies with only one added assumption which is found within the frequency of individual risk group members consuming liquid egg product prepared in a manner resembling a breakfast serving each composed of a 1 egg equivalent at an average frequency per person equating to 6 servings each 12 months. The frequency of consumption knowingly and deliberately is understated to be below what statistics confirm to be a higher per capita quantity of consumption of liquid egg product. The underlying reason for the mentioned understatement is to avoid any risk that the quantity of illnesses generated by inadequately pasteurized chicken eggs employing a 5-log level of inactivation of Se has been overstated i.e. if the quantity of consumption were to be increased to more expected actual levels the frequency and the costs of illnesses may become too great for general understanding and more likely would become suspect. For further clarity of the above annual modified per capita quantity of consumption of liquid egg product recited the per capita consumption of chicken eggs in the United States exceeds 20 dozen per annum per person. Using an average of six 1 egg servings each 12 months per person containing the equivalency of 1 egg per serving as provided from already prepared liquid egg product pasteurized to a 5-log level of inactivation containing Se as the targeted pathogen the annual number of servings whether in whole egg dishes or egg dishes containing no yolk to consuming persons of compromised immune systems would equate to 900 million servings. As is demonstrated through official scientific studies by agencies of jurisdiction a 5-log level of inactivation of Se as the *salmonella* strain selected to be most representative is blatantly unreliable to provide the public with a safe end product when using the mentioned level of inactivation of 5-logs as measured by Se. Therefore co-mingled liquid egg product enabling chicken eggs containing known to be high levels of contamination which usually is *salmonella* to be not only co-mingled into liquid egg product but also to be pasteurized to a level of a 5-log inactivation as measured specifically by Se clinically is known to be inadequate to provide the public with safety for consumption if less than hard-cooked. In summary, 150.0 million persons consuming an average of six one-egg liquid egg product servings each twelve months pasteurized to the Government requirement of a 5-log level of inactivation of *salmonella* (Se) likely would create a public illness cost of $18.0 trillion per annum just for that portion of the population and that portion of eggs consumed.

In a report authored by the legal department of the USDA dated November 2012, the frequency of *salmonella* contamination of chicken eggs was reconfirmed to be 1 egg in 20,000. That statistic conformed to the frequency of illnesses as being 1 egg in 20,000 as published by the USDA in the 1990's. In the 1970's, the USDA established a standard for pasteurization to rid chicken eggs from *salmonella* contamination employing a 10-log reduction of *salmonella* without specification of the *salmonella* strain. The US-FSIS in the mentioned 2005 Summary recommended a 6-log reduction for the elimination of Se within liquid egg product. In 2009 the US-FDA in its Egg Safety Rule changed the level of pasteurization for liquid egg product from 4 logs to 5 logs as measured by Se. Such applied to both in-shell eggs and liquid egg product which placed the level of pasteurization as measured in logs to be the same for each grouping of eggs i.e. in-shell eggs and liquid egg product. The notable difference between the two is that liquid egg product requires pasteurization albeit inadequate and in-shell chicken egg pasteurization is voluntary but too is inadequate on its face. Notably the reduction of the requirement for liquid egg products to be pasteurized at a 10-log level to inactivate *salmonella* to a 4-log level of *salmonella* inactivation without public knowledge preceded the mentioned Rule of 2009 within which the change for liquid egg products from 4 logs to 5 logs occurred.

The genesis of the 5-log reduction of Se for in-shell eggs occurred in 1997 when Davidson approached the US-FDA seeking a level of pasteurization for in-shell chicken eggs. The US-FDA promptly and officially advised Davidson that a 5-log inactivation of Se would qualify the eggs to be labeled 'PASTEURIZED' and would not be required to display a public safety statement referred to as 'Safe Handling Instructions' on each pasteurized egg carton which otherwise advised the public on raw egg cartons that eggs should be hard-cooked to avoid illness. The US-FDA in concert with the US-FSIS made a public statement in the late 1990's stating that their target was to eliminate *salmonella* within chicken eggs within ten years and to eliminate there being cause for chicken eggs to continue to be the largest single cause of foodborne illness in the Country. That ten-year deadline as promised by the US-FDA resulted in the 2009 Egg Safety Final Rule. Such was preceded by the US-FSIS, a division of the USDA, announcing in 2005 that Se-contamination of chicken eggs had been reduced to be 1 in 277,000 from 1 in 20,000 which subsequently was dismissed as being inaccurate by the legal section of the USDA in their above-referenced report which reconfirmed that the frequency of *salmonella* contamination remained to be 1 egg in 20,000 eggs.

Through the new art to be employed, which includes new protocol that provides for the total inactivation of both viral and bacterial contaminants while at the same time preserving the raw characteristics of the subject eggs, a new art form for public safety without precedence has occurred.

Notably, in its evolution the above-referenced current 5-log inactivation of *salmonella* as found within chicken eggs was specifically intended to be inclusive of all strains of *salmonella* and was to be solely employed in liquid egg product which had been adjusted from a 10-log level of inactivation in its origin of regulations regarding pasteurization as is confirmed within the contents of the Egg Products Inspection Act of 1970 which was reduced from a 10-log level of inactivation of *salmonella* to 4 logs of Se subsequently. Such accommodated the industry's problems encountered with coagulation. That reduced level of inactivation more recently raised from 4 logs to 5 logs as measured by Se but still representing only one-half of the original 10-log level of inactivation is now claimed by the industry and the agencies of jurisdiction to provide eggs that are safe for consumption only if the end product from time of lay of the subject eggs to point of consumption are held at temperatures just above freezing excepting for the time-frame utilized for both collection and prompt pasteurization i.e. 4 days or less in practice. In the first instance the 5-log level of Se pasteurization is risky to rely upon for public safety without hard-cooking but also it has been found that a 5-log level of inactivation of Se does not inactivate either all strains of *salmonella* or viral strains now found to be both present and anticipated to become prevalent within chicken eggs. There is ample evidence as discussed herein before that it is common practice to provide chicken eggs to the public that are old, mislabeled in grade, stale and repackaged and to include high levels of contamination within raw egg cartons as well as co-mingled within liquid egg product. The inadequacies mentioned are compounded by the risks caused from lack of maintenance of deep chilling of eggs traveling across the country experiencing interruptions to chilling caused by natural disasters, breakdowns and flaws in the protocol which in the end at best can only provide interrupted deep chilling from farm to table. Further to the above it is common practice within the industry to utilize chicken eggs having stale dates of lay and known high-count levels of *salmonella* which are beyond the effectiveness of pasteurization inactivation of that found within less than 10 logs when pasteurized. Notably it has been determined that the 'Best By' date now at 30 days from date of packaging and not date of lay as enabled by the Rule of 2009 now includes known to be highly contaminated eggs that by regulation are so identified but nonetheless may be co-mingled into liquid egg product pasteurized at 5 logs using Se as the measure or allowed to be included within in-shell eggs summarily pasteurized in their shells when no chance exists that such eggs when contaminated either with viruses or *salmonella* have any statistical support to not be the cause of public illnesses particularly as applied to the 150.0 million persons currently within the US population who are identified as high risk groups resulting from compromised immune systems. Further to the above, and as previously discussed early in this section, both prior and current practice continues to allow repackaged raw in-shell chicken eggs of stale dates to carry new dates while still being presented to the public as being Grade A or Grade AA. Still further, as previously discussed, each dozen of Grade A or Grade AA continues to have available a minimum of two Grade B eggs in each dozen so marks Grade A or Grade AA which obviously creates part of the answer to the obvious question as to why chicken eggs both remain to be the highest source of foodborne illness and on a pro-rated basis over three decades has not shown improvement, while at the same time, both the US-FSIS and the U.S.-F.D.A. have claimed victory for having reduced illnesses caused by the same eggs. The shame of it all includes the avoidable misery inflicted upon the public together with avoidable annual costs which in the span of one year would eliminate the National Debt, provide free healthcare for the total population and improve our military preparedness to protect ourselves from outside dangers along with many more benefits which would include higher education and infrastructure improvements.

Significantly, when either or both liquid egg product or in-shell chicken eggs are pasteurized to 5 logs they currently are qualified to be labeled as 'PASTEURIZED' but most notably are enabled by regulation not to display the 'Safe Handling Instructions' as required on raw egg cartons which provides those with compromised immune systems with appropriate and important notice that eggs must be hard-cooked to avoid illness. Upon further study results it has been determined that viral contamination requires greater heat inactivation for pasteurization than does *salmonella*. Both pathogens unless totally inactivated require very prompt and continuous deep chilling from farm to table. Unlike milk, which requires pasteurization with the sole exception of the State of California, the effects of pasteurization can be monitored through testing before being passed on to the public for consumption. Shell eggs contaminated with either viral or bacterial contaminants cannot be tested in any practical form. Equally certainty of deep refrigeration promptly applied post-lay through consumption which may be weeks apart from date of lay cannot be assured to be effective for numerous practical reasons i.e. equipment breakdowns, storms, public ignorance, power outages, date of collection versus date of lay and numerous other factors which include but are not limited to lack of labeling for foodservice and mislabeling of egg grades.

To aid in clarity the sequence of events influencing the effectiveness of pasteurization caused by changes to the standards established which were impacted by failure of protocols employed is recited in part again to provide for both an understanding of what occurred and an understanding of the long term negative consequences to public health that have stemmed from those changes made for improved cost efficiencies of product as opposed to improved benefits to public health.

In 1970, a standard for pasteurization of shell eggs converted into liquid egg product became needed for public safety for reason that various egg producers were converting substandard eggs either unsold or unsaleable into liquid egg product which was performed under crude and unsanitary conditions. As a result of those conditions and the need for farmers to appropriately convert selected eggs into liquid egg product to satisfy a market that existed the USDA created regulations and standards pertaining to the mentioned liquid egg product. Those initial USDA standards called for a 10-log reduction of *salmonella* as found within chicken eggs dedicated to be pasteurized and converted into liquid egg products.

Soon after the new standards were officiated, liquid egg product producers employing heated tubing to produce pasteurized liquid egg product on a commercial scale experienced significant difficulty in achieving a 10-log level of inactivation of *salmonella* as found within chicken eggs without coagulating the end product rendering it to be unmarketable.

Without public notice of any nature, the 10-log level of inactivation of *salmonella* was reduced to 4 logs. That status continued to be practiced through to 2009 when the US-FDA sponsored Rule required both liquid egg product and in-shell chicken eggs to be pasteurized to a minimum log level for *salmonella* inactivation of 5 logs. The requirement for a 5-log level of inactivation identifying Se as the targeted strain of *salmonella* resulted from L. John Davidson in 1997 seeking a pasteurization requirement for in-shell chicken eggs from the US-FDA as caused by his success in developing art which enabled pasteurization to occur without consequential loss of either aesthetics or functional qualities as compared to a raw in-shell chicken egg. The US-FDA at that time set the level of pasteurization for in-shell chicken eggs to be 5 logs as measured by Se. At that time, Davidson was unaware that liquid egg product was being processed at a 4-log level of inactivation of Se. In or around 2000 Davidson and his resulting company marketed pasteurized in-shell chicken eggs which had achieved a 5-log level of inactivation of Se. The US-FDA concurrently allowed the subject eggs to display the term 'PASTEURIZED' while at the same time as the term 'PASTEURIZED' was allowed to be displayed the requirement to display the 'Safe Handling Instructions' on pasteurized in-shell egg cartons was terminated. Also at that time through to the present pasteurization of chicken eggs to a 5-log level of inactivation of *salmonella* qualified the USDA shield to be displayed on egg cartons.

It since has been learned that with a certain degree of uncertainty a 5-log level of pasteurization performed very promptly post-lay may inactivate all Se present but not all strains of *salmonella* which may be present since other strains as commonly found within chicken eggs are more heat-resistant than Se. Concurrently the virus identified as the H3N1 was considered to be as dangerous to public health as was Se. Notably, the USDA required that any chicken flock containing *salmonella* or Avian Influenza identified as the H3N1 virus would require destruction of the flock, cleansing of the henhouse and destruction of the eggs unless pasteurized to a 5-log level as measured by Se. What had been missed for decades at an unknown cost to public health was that the 'H' series of viruses required still greater log reduction through pasteurization than does any strain of *salmonella* as measured by the Se strain. Notably, since the US-FDA sponsored Rule of 2009 references to viral contamination identified as the H3N1 have been eliminated from claims of causing risk when in fact concurrently publications confirm that the US-FDA together with the US-FSIS were aware that viral contamination of chicken eggs required greater applications of heat than did *salmonella* strains. The mentioned Rule retained the requirement for a 5-log inactivation of *salmonella* using Se as the measure for all strains of *salmonella* albeit the knowledge then existed that a 5-log inactivation of Se unless performed with urgency post-lay for all eggs being processed and so labeled even when pasteurized would remain to be contaminated. Notably were pasteurization not to be performed promptly post-lay the *salmonella*-contaminated chicken eggs together with those contaminated with the H3N1 virus required approximately 10 logs to inactivate viral strains which equated to 12 logs for bacterial strains as confirmed by various studies which include but are not limited to the USDA Research Laboratory in Athens, Ga.

To prevent raw in-shell chicken eggs containing *salmonella* from becoming lethal to a consumer when less than hard-cooked, the US-FDA in cooperation with the USDA and individual state jurisdictions, have set requirements for refrigeration of in-shell chicken eggs in order to materially reduce the multiplication of *salmonella* into lethal quantities at time of consumption. As discussed in greater detail herein below, the uncertainties of maintaining deep refrigeration from lay to table which is impacted by interruptions to prompt processing, prompt shipping and frequent interruptions to refrigeration, warmer temperatures at point of sale, interruptions to power sources for refrigeration and the like considered together make reliance upon continuous deep refrigeration for public safety to be a false reliance. Such is supported by the presence of *salmonella* and its high rate of multiplication unless under deep and uninterrupted refrigeration. In the absence of uninterrupted deep refrigeration and within approximately the same time span as is provided under a 'Best By' date the *salmonella* present along with the H3N1 virus if present can multiply into hundreds of millions of cells which materially contribute to why chicken eggs historically have been confirmed to be the single most cause of illnesses from a food source regardless of some 25% of the production being pasteurized and the ratio of 1 egg in 20,000 eggs being contaminated continues. Those commonly occurring circumstances are magnified by the exaggerations provided by the false representations made to the public under the use of 'Best By' dates or their equals which lead an unsuspecting public into consuming eggs potentially lethal most particularly to 45% of the population which are within a high risk category of susceptibility to illnesses from bad foods.

The above recited policy and oversight failures together with providing the public with knowingly false information is compounded by the previously described practices of mislabeling product which makes obvious why no progress whatsoever has occurred to improve the continuing statistic that chicken eggs whether pasteurized or raw remain to be the leading cause of illness in the United States.

Because of its size and nature of composition the approximate number of persons composing what is commonly referenced to be 'high risk groups' warrants benefit from further details. The number of persons belonging to the mentioned high-risk groups approximates 150.0 million persons or about 45% of the total population. Those people include all persons of 65 years or older, those with heart issues, persons that have contracted AIDS, diabetics, children, post-operative persons and a myriad of others afflicted with less common illnesses all of which in the end place the collective group at high risk and the need for costly and continuing care whether enabled from individual policies, employers or Government subsidies.

Various studies and references within patents issued reconfirm the presence of *salmonella* giving cause to illnesses stemming from chicken eggs to be 1 in 20,000. For decades, *salmonella*-contaminated chicken eggs have been reported to be the single most cause of illnesses in the United States. Equally, frequent confirmation exists that a 5-log inactivation of *salmonella* does not totally inactivate Se since the cell count level of egg contamination often exceeds the effectiveness of a 5-log level of inactivation through pasteurization, nor does a 5-log level inactivate all sub-strains of Se. Also a 5-log level of inactivation of Se does not inactivate all other strains of *salmonella* as found within chicken eggs because they are known to require greater heat than 5-logs for their inactivation. One such confirmation is recited within this section and is referenced as a patent filed and issued as "Use of $CO_2$ Cooling in Treatment of Poultry Eggs" as issued Oct. 19, 2005, identifying Kevin Keener as the lead scientist within a group. When read the referenced patent of Keener et. al. confirms the level of inactivation of certain *salmonella* strains associated with chicken eggs as requiring 9 logs which substantially is consistent with the initial 10-log requirement set by the USDA in 1970 under its sponsored Egg Products Inspection Act as referenced above. Notably, the original level of inactivation set by USDA was 10-logs and was non-specific to it being *S. enteriditis*. Other studies and reports described herein throughout reconfirm the requirement of a 10-log level of inactivation of *salmonella* as found within chicken eggs as being the level of inactivation required to ensure public safety. Such is confirmed in part through the above referenced findings of Keener et. al. concerning the required level of inactivation of all strains of *salmonella* as may be found within chicken eggs. The rate of multiplication of *salmonella* as found within contaminated chicken eggs may contain high count levels when being processed or as little as one cell if contaminated at all. The rate of multiplication as indicated by the USDA Research Laboratory in Athens, Ga., confirms that the contamination count present at time of lay may double daily post lay particularly when exposed to ambient conditions which occur for a number of reasons but with noticeable high frequency from farm to table as discussed herein before. As an example and as stated earlier in this section the multiplication of *salmonella* cells present at time of lay if as few as 3 cells in a single egg in a matter of 31 days post lay which most often precedes the 30 day 'Best By' date displayed on the egg carton will multiply into a *salmonella* cell count exceeding 1 billion cells without the co-mingling of eggs. Notably, as mentioned earlier, employing Grade B eggs co-mingled with Grade A eggs and repackaging of stale eggs into new cartons containing new 'Best By' dates together with knowingly including two Grade B eggs in dozens marked Grade A or Grade AA further discredits the US-FDA reliance upon a 5-log level of inactivation of a known count of *salmonella* as being effective which would apply to the whole time frame that the public has been exposed to pasteurized liquid egg product which would equate to at least 20 years. For still further understanding of the high public cost from illnesses caused by contaminated chicken eggs consumed by risk groups representing 45% of the current population a study authored by the US-CDC confirms that "One contaminated egg can contaminate an entire batch of pooled eggs. Everyone who eats eggs from that batch is at risk of illness." As further reinforcement to the risks to public health recited the USDA Office of Inspector General in a report dated November 2012 reconfirms the implication provided by the recited report from the US-CDC. The Inspector General's report referenced reconfirms that "1 egg in 20,000 shell eggs or 1 in 3,600 depending on the egg laying environment would have some level of Se Contamination."

Recent reports provided by Government agencies take the position that Se as found within the ovaries of a chicken is the significantly most predominate source of *salmonella* contamination of consequence. Such defies numerous other studies which confirm that surface-mounted *salmonella* to the chicken eggshells whether from prior fecal contamination since removed or still residually present as may be found regularly within a carton of eggs at retail makes obvious that the contamination level of the rinse water employed before packaging is a source of cross-contamination which demonstrates not only its ineffectiveness but also confirms the increased risk to public health caused by not only contaminated rinse water but also caused by that same rinse water washing away the natural sealant of the chicken egg which protects the otherwise open eggshell pores from environmental contamination i.e. dirty wash water as one illustration. Such confirms that the continuous use of the same rinse water applied to the eggshells is the source of broad contamination of the subject eggs. That practice allows for contaminants to flow into the eggs through the external pores of the eggshells which contradicts the current popular position by agencies of jurisdiction that the vast majority of *salmonella* contamination of chicken eggs stems from contaminated chicken ovaries. Still greater protection against recontamination of raw chicken eggs as well as pasteurized chicken eggs is made available from farm to table through the use of a sealed food-grade egg carton containing an antibacterial agent activated to cleanse the air within the sealed carton. The preferred choice within the pasteurization protocol selected and described herein in order to ensure against the results of incomplete pasteurization and stray contaminants from being enabled to multiply during the timeframe between pasteurization and consumption which most frequently contains gaps in the continuity of refrigeration. A bio-plastic carton derived from a corn base is the preferred product for environmental reasons. The bio-plastic carton post disposal self-destructs whereas petroleum-based plastic cartons have become a major environmental problem due to their enormous quantities ending up post disposal in landfills which are overcome by their quantities as well as those same quantities having now proliferated into oceans and lakes causing both aesthetic problems and environmental problems particularly to wildlife. Whether so or not the confirmed arrival of Avian Influenza contaminating both the chicken and its eggs makes moot the questionable position of Government agencies regarding *salmonella* in chicken eggs because the level of inactivation of the H5N1 virus requires a minimum of two (2) additional logs than that of *salmonella* as the minimum standard for that group's inactivation according to the USDA researchers located in Athens, Ga. The new art form reported herein accommodates that requirement without consequential deterioration to the aesthetic and functional characteristics to that of a raw chicken egg.

Notably, prior science has acknowledged the presence of viral contamination of chicken eggs by a strain identified as the H3N1 virus. When found it was treated similarly to that of Se in the protocol employed i.e. a 4-log inactivation as measured by Se. The US Government-authorized protocol employed included the destruction of the flock of producing hens together with the cleansing of equipment and the henhouses. The eggs laid by the subject chickens whether H3N1- or Se-contaminated were either destroyed or pasteurized to 4 logs as measured by Se. That changed under the new Rule of 2009 which altered the level of pasteurization of liquid egg product to become 5 logs as opposed to the mentioned 4 logs employing Se as the strain of bacteria as the base source of measure. No mention within the Rule of 2009 regarding the level of inactivation of the H3N1 virus was provided although all prior references to liquid egg product pasteurization treated the H3N1 virus in the same manner as Se i.e. destruction of chickens, eggs and cleansing of facilities or subjecting the produced chicken eggs to pasteurization to 4 logs as measured by Se.

The USDA Research Facility in Athens, Ga., for years prior to the US-FDA Rule of 2009 performed studies on both the progress of the 'H' series of viruses which in particular included the H5N1. Notably the H5N1 as reported by the scientific community is more likely to carry with it the potential to enable human-to-human transfer than other virus strains being monitored. Currently the H5N1 has been the cause of concern by the scientific community that it is the strain which is most likely to gain the ability to spread disease between humans which also in the end would give cause to a pandemic. Notably the referenced studies regarding the public health threat from the 'H' series of viruses also confirm that their inactivation requires the equivalency of more or less 40% more inactivation than does Se as measured in logarithms (logs) for its inactivation. By interpretation the implication of the new studies would be that the prior acknowledged presence of the H3N1 as found within chicken eggs previous to the year 2000 was considered to be edible with safety were the eggs to be pasteurized to a 4-log level of inactivation of Se. That level of inactivation notably was measured by Se which was not the most heat-resistant strain of *salmonella*, nor was *salmonella* equally heat-resistant to that of viruses. No statistics exist as to what portions and at what frequency the public was sickened from the H3N1 virus as found within chicken eggs or chicken egg products.

In summary, Se wrongfully was identified by Government agencies of jurisdiction as being representative of not only the most virulent strain but also by implication the most heat-resistant and most commonly occurring strain of *salmonella* as found within chicken eggs. Those analyses of Se were in error. Other known strains of *salmonella* as found within chicken eggs frequently are acknowledged to contain greater resistance to heat than does Se. Those more heat resistant strains include but are not limited to *Salmonella* Senftemberg, Heidelberg, *Typhimurium*, Newport and Javiana. Such would provide support to a conclusion that a pasteurization level targeted to inactivate Se does not inactivate more heat-resistant strains of *salmonella* which include certain of those already listed and others not listed whose frequency of presence is materially similar and comparable to that of Se. In conclusion a 5-log level of inactivation of Se on its face neither does inactivate all Se cells present, nor does it inactivate all *salmonella* strains present. Further, a 5-log inactivation of Se does not inactivate the virus commonly found within chicken eggs identified as the H3N1 although historically for decades that virus was treated for inactivation similarly by Government agencies of jurisdiction in its heat tolerance to Se which was an error potentially of great magnitude to the health of the consuming public at large. An acknowledgement of the magnitude of the issue raised concerning the H3N1 being treated as having the same tolerance to heat as that of Se which in itself was understated is now found to be confirmed through the engagement of a division of a French firm known as Sanofi Pasteur to find a vaccine for Avian Influenza whose source is the same virus series as the H3N1. Reportedly the US Government executed a contract amounting to $150.0 million to develop a vaccine for protection against the 'H' series of viruses anticipated to cause a pandemic resulting from viruses giving cause to illnesses which are generally referred to as Avian Influenza.

The above-cited ineffectiveness of a 5-log level of inactivation of *salmonella* strains was set as the standard for co-mingled chicken eggs into liquid egg product which included the specific *salmonella* strain identified as Se whose genesis is alleged to predominantly stem from a source internal to the eggs and not external to the eggs or their shells. Prior art determined that Se-contamination was passed from the ovaries of the afflicted chickens into the embryos of the eggs and remained there through time of lay. Current studies confirm that Se and other strains of *salmonella* contaminate chicken eggs through external sources as well. Those external sources are aided in their frequency of contamination through the manner of washing the eggshells improperly before grading and packaging. Further external contamination occurs when pasteurization of in-shell chicken eggs creates a mass of airborne contaminants resulting from *salmonella* cells internal to the eggs being forced into the environment of the air through the eggshell pores as a result of the heat applied during pasteurization causing the internal egg to expand and to force *salmonella* cells surviving the application of heat to exit the eggs and to relocate within the air surrounding the pasteurization medium employed even when a negative atmosphere is employed. Notably an environment containing a negative atmosphere as previously employed even if materially improved would be ineffective to rely upon to dismiss and to disburse the quantity of *salmonella* cells having become airborne as has been confirmed through prior experience. What actually occurred in production was that the concurrent internal contraction of thousands of chicken eggs beginning to cool post pasteurization created a current of air which carried with it the return of the airborne *salmonella* cells which had survived the heat of pasteurization by escaping through the chicken eggshell pores into the atmosphere surrounding the processing. Post pasteurization the collection of the subject eggs began concurrent contraction which gave cause to the creation of an air current flowing into the eggs through the exposed shell pores which had lost their natural sealant from the rinse water previously employed. The loss of the natural sealant which protected the subject eggs from external contamination provided for a multitude of open shell pores on each of the subject eggs. The combination of the internal contraction of the eggs while ambient or induced chilling occurred post pasteurization together with having created avenues for contaminate reentry through the exposed eggshell pores provided an opportunity not only to nullify the benefits of pasteurization of contaminated eggs which according to Government statistics is 1 egg in 20,000 eggs but instead the described phenomenon exposed all of the eggs to contamination through the current created from the concentration of pasteurized eggs effectively sucking in contaminated air through their exposed eggshell pores resulting from the described current created from their en masse cooling and contraction. The new art described herein below successfully eliminates the described risks of recontamination while achieving even greater log levels of inactivation which clinically can be claimed to provide total inactivation and importantly preserves the raw characteristics and nutritional values of the subject in-shell chicken eggs. Similar sources of contamination occur within liquid egg product. In the case of liquid egg product under the Rule of 2009 it specifically enables liquid egg product to utilize known to be and so identified to be already highly contaminated eggs to be co-mingled and to be labeled as 'PASTEURIZED' after receiving a 5-log inactivation employing Se as the measure. Statistics flowing from USDA studies confirm that a moderately contaminated chicken egg containing as few as 3 Se cells at time of lay can multiply into a *salmonella* cell count exceeding 1 billion cells in a matter of 31 days as has been discussed herein above. As will be discussed herein later numerous violations concerning the age and condition of chicken eggs as packaged for food service and retail commonly occur with full knowledge by both industry and agencies of jurisdiction. Such includes co-mingling of grades without disclosure and repacking stale eggs to carry more current dates for use. Also included is disclosure of rinsing protocols which in lieu of cleansing eggshells spread contamination. With some 150.0 million persons officially identified as being at high risk of illness the inclusion of what obviously are highly dangerous contaminated eggs pasteurized to an inadequate level to provide safety is a matter warranting immediate attention particularly for both the risk groups as compounded by the new and magnified threat of still more dangerous illnesses derived from viruses which remain to be a major threat to public health when contained within chicken eggs over that of *salmonella*. That viral threat will be magnified were a strain enabling human-to-human transfer to occur. Reports as recently as in 2015 confirm that various virus strains are evolving and locating themselves around the globe giving cause for tens of millions of chickens to be destroyed while concurrently selected cases of human-to-human transfer also have been recorded.

The USDA Research Laboratory located in Athens, Ga., confirms that a 6- to 7-log inactivation of Se equates to a 5-log inactivation of viruses as contained within the 'H' series. That statistic only applies to the ratio of heat tolerance between bacteria and viruses as is or may become found within chicken eggs. That ratio has nothing to do with the count as measured in logarithms (logs) regarding levels needed for inactivation i.e. total inactivation. Therefore, for at least 25 years the H3N1 virus mistakenly has been treated as having the same 5-log level of inactivation through pasteurization as that of the strain of *salmonella* identified as Se. Further, as stated, the success of inactivation of *salmonella* in general has been materially overstated as a result of employing a 5-log inactivation to be effective against all strains of *salmonella* at all levels of concentration as may be found within a known to be highly contaminated in-shell chicken egg or within known to be highly contaminated liquid egg products. Of importance to be and of material significance the same USDA Research Laboratory identified other strains of *salmonella* common to chicken eggs as being more heat-resistant than Se which when considered from a public safety vantage point those strains would require a 1-log or greater level of pasteurization to provide the equivalency of inactivation gained from the protocol using Se as the model strain of bacteria targeted and to be inactivated through a protocol employing 5-logs as the target for Se. Simultaneously recent science reconfirms the findings of prior science that all strains *salmonella* as found within chicken eggs are inactivated at approximately 10 logs. Such contradicts what has been practiced for decades regarding *salmonella* inactivation when found within chicken eggs. The practice employed for decades included an inactivation of *salmonella* as represented by Se which called for an inactivation level of 4 logs initially and more recently 5 logs as found within the US-FDA Rule of 2009. Curiously the US-FSIS in 2005 alleged that a 6-log level of inactivation of *salmonella* as found within chicken eggs would be appropriate for public safety when used as the level of inactivation of *salmonella*.

The above recitation concerning inadequate pasteurization and associated risks raise issues whose results clearly place the public health at risk from the consequences of consuming contaminated chicken eggs when less than hard-cooked. A restatement of selected points raised herein before is offered to make clear the inadequacies of current pasteurization as providing public safety for a variety of health risks which agency oversights have discounted or concluded not to be significant enough to either repair or to condemn from use for the public good. Such includes:

1. In the first instance the inadequacies of a 5-log Se level of pasteurization whether for in-shell chicken eggs or liquid egg product places the public at risk of consuming egg dishes which are contaminated as caused by inadequate pasteurization unless hard-cooked.

2. The Government has failed to protect egg consumers by allowing the discontinuation of the public warning entitled 'Safe Handling Instructions' on shell egg cartons if the subject eggs had been pasteurized to a 5-log level of Se inactivation. Notably the Government continuously has been aware since the inception of pasteurization as applied first to liquid egg product that a 5-log level of inactivation of all strains of *salmonella* when present within a contaminated chicken egg is inadequate to provide the public with safety from food poisoning unless the subject eggs have been hard-cooked. That knowing and deliberate elimination of the mentioned 'Safe Handling Instructions' from in-shell egg cartons pasteurized to a 5-log level of inactivation of *salmonella* as measured by Se created a public risk caused by reliance upon pasteurization being safe when actually the level of pasteurization at 5-logs was unsafe. The replacement of the 'Safe Handling Instructions' with the term 'PASTEURIZED' provided the public with false confidence in the safety of the product. The presence of the USDA shield along with the term 'PASTEURIZED' contributed to the falsely placed confidence in the qualities of safety to be found within the chicken eggs being provided whether pasteurized to 5-logs or raw as found within in-shell eggs so marked as Grade A or Grade AA. Public confidence in the Grade mark together with the USDA Shield displayed likely stemmed from their experiences with milk within which when the term 'PASTEURIZED' was employed the public was provided comfort that through long experience the product was safe for consumption. That nature of misinformation was reinforced further by the conspicuous absence of the otherwise continuing presence on raw egg cartons of the message contained within the referenced 'Safe Handling Instructions'.

3. With the advent of Avian Influenza as found within chicken eggs together with its forecasted potential ability to transfer illness from human to human, which is reported to include a 40% mortality rate, the certainty of egg pasteurization being effective becomes critical to the consuming public.

4. In the absence of total inactivation of targeted pathogens through pasteurization of in-shell chicken eggs, the use of protocols to improve public safety have been employed to reduce the quantity of illnesses as caused by *salmonella* contaminated chicken eggs. One of those protocols includes a mandate which contains a requirement that prompt and deep refrigeration of in-shell chicken eggs be employed from farm to table in order to reduce the acknowledged risk of illnesses from increased levels of *salmonella* contamination of eggs unless hard-cooked. On its face that statement confirms that a 5-log pasteurization of *salmonella* contaminated chicken eggs is unreliable to provide the public with safety from illnesses stemming from *salmonella* contaminated chicken eggs employing 5-logs in combination with chilling. Uninterrupted deep refrigeration from farm to table likely is rare rather than reliable.

5. The inadequacies of a 5-log inactivation of *salmonella* are further compounded by the US-FDA sponsored Rule of 2009 which specifically allowed for known to be highly *salmonella* contaminated chicken eggs to be included within liquid egg product and separately enabled the inclusion of similarly contaminated eggs to be provided to the public as pasteurized in-shell eggs which in each case enabled the survival of *salmonella* post having received a 5-log level of inactivation which was and remains to be the minimum allowed level of pasteurization as authorized by the US-FDA.

Notably no known science exists which supports a claim that known to be highly *salmonella* contaminated chicken eggs can have their *salmonella* count inactivated through use of a 5-log protocol of inactivation employing pasteurization targeting Se.

The described inadequacy of a 5-log level of inactivation of a *salmonella* contaminated chicken egg which allowably includes known to be highly contaminated eggs is further magnified by co-mingling within in-shell egg cartons carrying Grade A or Grade AA marks when actually under current regulations such may include a ratio of up to two (2) eggs per dozen more or less as applied to in-shell eggs which in fact are Grade B. As commonly known by both Government and industry Grade B eggs frequently contain count levels of *salmonella* which not only exceed 5-logs for their inactivation through pasteurization but also likely require up to 10 logs for that inactivation.

In summary to the above, the reduction by Government agencies from employing the original 10-log inactivation for *salmonella* to that of a 5-log level of inactivation as applied to *salmonella* in all strains as may be present within chicken eggs requires aid to achieve a result which makes the subject eggs safe for public consumption unless hard-cooked. The new art discussed herein provides for a protocol for pasteurization of chicken eggs which enables the achievement of total inactivation of the targeted pathogen without consequential forfeiting of either raw characteristics or nutritional benefits. That protocol essentially provides for the achievement of *salmonella* inactivation initially identified and set to be the standard for public safety in the early 1990's by the USDA.

6. Notably, all shell egg cartons carrying pasteurized shell eggs are allowed not to carry 'Safe Handling Instructions' which cautioned the public when displayed on raw egg cartons that eggs when consumed less than hard-cooked may cause illnesses.

Although the 'Safe Handling Instructions' have been displayed on in-shell egg cartons for more than approximately 15 years excepting egg cartons containing in-shell eggs pasteurized to a 5-log level of inactivation for *salmonella* as measured by Se the frequency of 1 egg in 20,000 eggs being *salmonella* contaminated has not reduced and with the growth in consumption the number of contaminated eggs together with the number of illnesses have increased proportionately and at the same frequency as if no improvement through either pasteurization or the Hazard Analysis Critical Control Points plan (HACCP), discussed below, ever has occurred. Notably one item only of pertinency has survived. The cost per illness initially carried at $20,000. over the past two decades has resisted inflation and remains to be at $20,000. per illness.

Further to the above, in a recent report dated November 2012, the USDA through its Inspector General, reconfirmed that the rate of *salmonella* contamination of chicken eggs remains to be 1 egg in 20,000 eggs. Notably and of possibly greater consequence the quantity of chicken eggs produced within the United States without diversion to liquid egg product has risen over the past dozen years from 3 billion dozen in-shell chicken eggs per annum to 5.5 billion dozen. That increase, by itself, nearly doubles the in-fact frequency of illnesses caused by *salmonella*. Still more notably the same referenced report from the USDA together with a report from another responsible agency identified as NERO not only confirms the frequency of illnesses but reconfirms various practices performed within the egg industry as known by Government agencies that on their face are unethical and approach criminality in practice as related to knowingly delivering unhealthy product to the public and knowingly mislabeling that same product which in the end undeniably sickens and kills an unsuspecting public. The irregularities referenced include but are not limited to repacking of stale eggs, falsely labeling the grade of eggs, using the USDA shield implying inspection and safety when frequently such has not occurred to mention only a few of numerous long-standing and continuing violations of the public trust.

In contradiction to the confirmed recitations provided above concerning the questionable practices recited within the egg industry and their knowledge to agencies of jurisdiction, certain agencies continue to claim dramatic progress has been made in the reduction of illnesses caused from contaminated chicken eggs. Those announced reductions coincide with the self-imposed deadlines for material improvements in the reduction of illnesses from chicken eggs which traditionally have been and continue to be the highest source of illnesses as found within the food group. New reports based upon old studies reconfirmed the frequency of contaminations was altered to support new conclusions to satisfy a self-imposed deadline to reduce the inordinate quantity of illnesses as caused by *salmonella* contained within chicken eggs. That misinformation is contradicted by a report authored by the United States Department of Agriculture Office of Inspector General. The referenced report of recent date reconfirms the frequency of *salmonella* contamination of chicken eggs to be 1 egg in 20,000 eggs. That reconfirmation of the frequency of contamination is material because the consumption of in-shell chicken eggs per annum within the United States in or around the year 2000 approximated 3 billion dozen which according to current statistics has increased to be nearly two-fold i.e. 5.5 billion dozen per annum as of 2014 production. Of particular added note current reports confirm that not only do high risk persons carry with them a greater risk of illness from contaminated food but also each illness occurring within the mentioned group includes a cost significantly greater on average than those costs experienced by persons of ordinary health.

Risk groups have come to rely upon the clearly implied safety provided by pasteurization enabling consumption of eggs when less than hard-cooked and presumed to carry no risk of illness as is enabled through thorough pasteurization. Such reliance upon pasteurization has been further enhanced by egg cartons, whether liquid or in-shell, qualifying the product to display the term 'PASTEURIZED' and not to display the 'Safe Handling Instructions' as required to be displayed on all unpasteurized egg cartons. Those Instructions warn the public that unless eggs are hard cooked they may cause illness particularly to the more susceptible members of the mentioned risk groups. Through 2015 those Instructions have been continued to be carried although it has long since been known that reliance upon prompt, continuous and un-interrupted deep refrigeration from farm to table is not only impossible in practice but potentially lethal to the consumer who has no reason to be aware of the inadequacies and the limitations of the pasteurization protocol employed. Notably deep refrigeration never has provided any form of inactivation of the strains of *salmonella* that not only may be present but also may be impacted by flaws in the distribution system which allow for lethal multiplication of *salmonella* and other pathogens when present to occur. In the absence of an ineffective level of inactivation of targeted pathogens through pasteurization as combined with false reliance upon interruptible deep chilling an inordinate multiplication of pathogens present will continue to occur. In the end the cumulative multiplication of pathogens occurring benefiting from multiple interruptions of deep chilling from farm to table provides an unsuspecting consumer with contaminated eggs which historically reconfirms the long-standing statistic that contaminated chicken eggs are the leading cause of foodborne illnesses amongst all food groups in the United States as is reconfirmed by published statistics each year for at least the past four decades.

Notably, as discussed, the inventiveness contained within the new art developed enables total inactivation of all strains of *salmonella* as may be found within chicken eggs. Further, those new discoveries when implemented enable the faulty protocols described hereinabove to be both replaced and allows for the end product to be cured of deficiencies. Such will provide for the public safety from *salmonella*-contaminated chicken eggs it deserves. Separately and notably the mentioned new discoveries not only provide a unique ability to eliminate *salmonella* as found within chicken eggs while retaining the nutritional benefits of the subject eggs together with the preservation of their raw characteristics but also the same new art can provide equivalent results to chicken eggs contaminated by strains of viruses which in the end produces Avian Influenza.

New discoveries described herein now protect against new and far more serious threats provided by viral contamination over those of *salmonella*. The new art resolves the need for greater levels of inactivation of all strains of *salmonella* as found within chicken eggs as opposed to prior art which targeted *salmonella* as mistakenly represented by Se and mistakenly determined that the employment of a 5-log protocol to inactivate Se would be effective in inactivating all strains and levels of *salmonella* contamination which may be present within a contaminated chicken egg. Separate from the mentioned faulty targeting of 5 logs for the successful inactivation of Se it was learned that the recited level of inactivation of Se was both inadequate to inactivate Se due to excessive cell count levels which may be present at time of pasteurization as further compounded by Se not being the most heat-resistant strain of *salmonella* as found within chicken eggs. The problem of eliminating *salmonella* in chicken eggs as a public health risk was compounded further by reliance upon dangerously flawed protocols. The mentioned flawed protocols stemmed from the reliance upon very prompt chilling of the subject eggs occurring at the farm level and continuing through table without consequential interruptions.

The above-described protocol was and continues to be impossible to perform for a variety of reasons. It misleads the public into believing that the eggs are fresh when that assumption is based upon misinformation.

As USDA Research Laboratory studies confirm the level of *salmonella* contamination when present before application of deep chilling in a matter of five days or so multiply into a few hundred cells. If interrupted from continuous and deep chilling while being shipped throughout the United States as such applies to protocol for distribution occurring from farm to table each egg individually if contaminated or pooled together as in liquid egg product will result in the *salmonella* cells present multiplying into quantities readily approaching or exceeding 1 billion *salmonella* cells in a matter of 31 days. The above recitation of risks materially are compounded by practices more fully discussed herein elsewhere within this section which allow for agencies of jurisdiction employing oversight to processing facilities to allow stale or returned eggs usually carrying with them materially interrupted refrigeration to be repackaged into new cartons contain a new 'Best By' date. Notably, as also discussed elsewhere above, those repackaged eggs already may contain on average two (2) eggs or slightly more per dozen being Grade B eggs although the carton is allowed to carry marks indicating either Grade A or Grade AA which provide no indication that approximately 18% of its contents are officially allowed to be Grade B eggs which are capable of causing both illness or deaths to unsuspecting recipients who rely upon the markings of the grade of the eggs, the 'Best By' dates, the grade indicated and the integrity of the USDA Shield. Still more notably all of the repackaged eggs if containing *salmonella* to begin with would be free to gain a level of *salmonella* contamination which would exceed the ability of a 5-log level of inactivation as currently allowed under the mentioned Rule of 2009 to be termed as 'PASTEURIZED'. At the least during the timeframe of lay to a second round of packaging containing a future 'Best By' date the increased amount of bacterial multiplication creates new and still higher risks of illnesses that are passed onto an unsuspecting public for consumption including particularly those persons known to be within risk groups as identified by the Government itself to consist of about 45% of the population which equates to 150.0 million persons. In further support of the risks to public health outlined above there are added risks which in part stem from weather patterns and distribution systems combined with flawed statistics treating collected, stored, stacked and refrigerated eggs without due consideration to multiple interruptions and lag times impacting upon the needed continuous deep refrigeration occurring from farm to table. The above-described reliance upon uninterrupted deep refrigeration from farm to table not only is impossible but also is knowingly misleading for reason that in the first instance the public is not aware that the 'sell-by' date is based upon the packing date which has nothing to do with the date of lay or the age of the eggs when collected or stored. The public is further misled by having no knowledge as to whether the subject eggs were continuously and deeply refrigerated or, more significantly, were not. Further, the public generally is unaware of the 'Safe Handling Instructions' which deliberately contains a selected print size which avoids notice.

Further to the inadequacies recited above, the USDA official Shield is employed by the industry to provide the public with a false sense of security which is not the intended purpose of the Shield's presence. All of the above recited risks to the public health and its wellbeing are resolvable under the new art through its areas of inventiveness which provide for total and permanent inactivation of bacterial contaminants as well as viral contaminants now known to be contaminating chicken eggs through the environment of the henhouse itself, through the water the chicken drinks along with the food it eats and through the water in which the egg is rinsed during processing together with the contamination invading the eggs externally from its compromised cleanliness as created from the pollution from and within the henhouse including the air within and ending with the frequency of employing contaminated rinse water prior to grading and packaging.

The new art described and disclosed herein contains new and unique protocols which result in the ability to materially expand when needed the pasteurization protocol employed to achieve higher log levels of destruction of targeted pathogens which include not only bacteria but also viral contaminants both existing currently and as forecasted by agencies of responsibility to give cause for a pandemic resulting from viral sources. The described level of inactivation of targeted pathogens to be achieved is complete.

In order to accommodate the inactivation of higher levels of viruses as forecasted to become present within chicken eggs, the new art as described in greater detail elsewhere herein employs both the repeated intermittent application of heat along with a repeated intermittent application of induced chilling which when programmed in their applications cumulatively provide for levels of pasteurization of all particles of an egg that satisfy the need to inactivate viruses which require greater heat inactivation as measured in applicable logs than prior art was able to accomplish through a 5-log level of inactivation of *salmonella* bacteria. Of equal importance, the art described preserves all of the nutritional benefits contained within the subject eggs without forfeiture of the eggs' raw characteristics. For further clarity and emphasis the novel elements described and employed within the new art as more completely detailed herein below protects all portions of the egg and most particularly the outer albumen from losing raw egg aesthetic and functional characteristics post-exposure to the new and unique higher levels of pasteurization which in the end provide certainty that both viral and *salmonella* contaminants have been inactivated totally which by definition carries with it the unique feature of totality.

Of notable and significant discovery, the benefits from the increased heat sensitivity of the outer albumen are enhanced by the location of the outer albumen being nearest to the heat source. The transfer of heat from external sources through the outer albumen into the inner body of the subject egg in order to avoid heat damage through coagulation of the outer albumen requires separate treatment. Under the new inventiveness described herein the separate treatment of the outer albumen for protection against coagulation is achieved by controlling the heat source through intermittent cooling whether induced or through natural ambient cooling only after equilibrium has been reached between the initial pasteurization medium temperature setting and the internal temperature of the egg in all of its separate elements has occurred. The described intermittent cooling is performed in a manner that takes advantage of the more rapid rate of heat gain and heat loss of the outer albumen. Through that described outer albumen temperature control, a similar protocol using the same principles discovered can be varied to accommodate necessary modifications for the other elements of the eggs which through their varying densities require different exposures to heat or its absence as related to the outer albumen from which the variables of heat exposures and denials as contained within the differing elements of the subject eggs are converted into the formula to be employed. Notably under the new art those elements never are allowed to reduce their respective temperatures to be below the minimum temperature for pasteurization of 128° F. excepting for the outer albumen which benefits from avoiding coagulation by intermittent temperature reductions below 128° F., as per the protocol employed within the new art. For better understanding, such is accomplished by the recognition of the proximity of the outer and thinner albumen being closest to the external heat source being applied which includes the denial of heat to the outer albumen from that same source. The preferred management of the denial of heat includes induced chilling of the subject eggs through reducing the temperature of the water employed in any form which may include just air containing either a normal range of water content or an increased water content contacting the eggshells which provides for both more exact log management and lower overall processing time which converts into lower cost of product. The heat application source preferred is the use of a water shower which within its embodiment provides flexibility which can be altered into a mist or even a fine spray of water containing in all options a food-grade antibacterial agent or even air similarly purified and containing minimal moisture all of which aid in the inactivation of pathogens, the speedier and improved precision of temperature control and the more thorough exposure of all elements of the eggshells to the temperatures programmed. The water itself whether in the form of a mist or a denser spray or even to the extent as found within air for health safety concerns is warmer than the internal temperature of the subject eggs which are subjected to continuous purification through applications of heat which carry a food-grade antibacterial agent that is continuously monitored and supplied. That protocol provides for expansion of the internal eggs through the controlled intermittent application of heat which blocks the intrusion of pathogens attempting entry through the exposed eggshell pores while at the same time the application of the heat inactivates pathogens previously residing within the contents of the eggshell. Survivors to the heat being applied to the internal egg are forced to exit through the eggshell pores due to the expansion of the internal egg. As the pathogens escape through the eggshell pores as caused by the expansion of the internal egg contents reacting to the heat being applied the pathogens become exposed to the external application of heat through the selected medium being employed carrying with it a food-grade antibacterial agent which enables the total inactivation of the targeted pathogens to occur.

Under the new protocol employed the outer albumen uniquely is allowed to fluctuate in its temperature to prevent against heat damage as enabled by programmed changes of the temperatures employed through intermittent applications of heat or its denial which in the end may be provided in the form of spray or even air whether moisturized or otherwise applied to the exposed eggshells. All of the above is performed while the subject eggs are within an environment which is safe from residual contamination from the pasteurization protocol being employed and safe from environmental contamination which has been the plague of prior art. The protocol ingredients are formulated in a manner which never allows for the pasteurization of the inner albumen, the vitelline membrane and the yolk to not receive the level of heat i.e. 128° F. or greater as applied intermittently to the eggshells from the selected source which includes sanitized water as the preferred source in the form of a spray or a mist along with an option to employ sanitized air together with support from such cleansers already included within the protocol described containing ultraviolet as one example of an additional agent supporting each of the mentioned options employed for heat transfer and its denial in accordance with the new time and temperature protocol parameters described as enabling total inactivation of the targeted pathogens. The formulated application of heat and its denial through the medium selected allows for both the absence of heat and induced chilling to occur at pre-selected intervals and equally allows for the application of heat also at pre-selected intervals. In principle the controlled application of heat and its denial throughout the uniquely secured environment of the medium employing the application selected to apply such to the exposed chicken eggshells enables the manipulation of the durations of exposure to the subject temperatures employed to each element whose properties contained in their composition dictate the rate of heat gain as well as the rate of heat loss. The outer albumen as being the first element to react to heat and its absence becomes the dominant element dictating the ingredients of a new formula which employs a unique program pre-prepared for each batch of eggs addressing their specific and individual characteristics that through adjustments enable the achievement of targeted logs to a unique level of inactivation. Through the mentioned adjustment to the referenced formula for pasteurization of the subject in-shell chicken eggs a total inactivation of targeted pathogens is available through the specific formula created to satisfy the targeted total inactivation of pathogens while preserving the raw characteristics of the subject eggs. Such is accomplished through the application of a formulated intermittent application of heat and its denial which in the end provides for not only total inactivation of targeted pathogens but also preserves the raw characteristics of the chicken egg by protecting the outer albumen from heat damage through the inclusion of pre-planned intervals of intermittent cooling that reduces only the temperature of the outer albumen to fall below 128° F. but allows for the continuation of pasteurization to progress for each of the other elements at varying rates reflective of their differing compositions enabling their temperatures to remain above 128° F. The resulting total inactivation of targeted pathogens is accomplished by providing heat and its denial intermittently to the subject eggs on a customized basis which is pre-formulated. The duration of those applications are egg specific as to their characteristics i.e. size, targeted logs, water content and other factors as known to the art. In the end the intermittent application of heat and its denial protects the outer albumen from coagulation and allows for each of the differing internal elements to achieve approximately the same log reduction of targeted pathogens at approximately the same time lengths of exposures to the temperatures applied while preserving the raw characteristics of each element as enabled by the flexibilities provided by each element as measured by their densities and rates of heat transfer which by nature have been arranged within the egg in an order of both location and densities of substance that enables the application of heat applied to or denied from the eggshell to be transferred to the differing elements within the egg in a manner which in the end provides for a level of inactivation of targeted pathogens that has flexibility enough between elements to enable total inactivation and to retain in each case the basic characteristics of a raw chicken egg. Hence, the outer albumen and its unique characteristics both dominate and enable the protocol employed under the new art discovered and formulated. These new discoveries when formulated into a pre-programmed protocol addressing specific characteristics of the subject eggs by groupings enables the ability to perform pasteurization of in-shell chicken eggs absent of any risk of illness when consumed by the public within food servings of all recipes characteristic of chicken eggs being an ingredient.

A sense of urgency exists to create a new and materially higher level of pasteurization without causing damage to the subject eggs over that achieved by prior art. The mentioned urgency is confirmed by a need for a level of pasteurization of chicken eggs to counteract the risks created as described within new reports published during 2014 confirming that still newer virus mutations involving birds have occurred in Germany, The Netherlands and Southeast Asia as well as China including but not limited to the H7N9 virus along with other strains of equal notability which in some cases stem from the H5N1 virus that may become able to successfully achieve human-to-human transfer and in still other cases that risk is potentially available from other viruses through separate generation or mutations.

Of significant relevance to the above-described threat to public health in June 2013 the United States news reports confirmed that the H7N7 virus had been found within chickens marketed by Tyson Foods who is a leading supplier of edible chicken to the United States public. Further to the above on May 2, 2014, news releases within the United States reported that a death had occurred from a virus strain similar to the strain of the above-mentioned virus previously found to be present within chicken meat produced by Tyson Foods. Read together the foreign reports of virus strains and the same strains as reported in Europe together with a deviation of those mentioned strains now occurring within chicken meat in the United States reasonably give cause for concern that WHO correctly has forecasted a pandemic as derived from Avian Influenza in the near term as needing only time to blossom.

Of even greater significance to the urgent need to provide the public with a safe egg as a needed food source clearly is illustrated and confirmed by a pandemic already reported to have occurred within the United States between April 2009 and April 2010. Although the specifics concerning the viral source never have been identified clearly the scope of the pandemic speaks for itself as does the lack of warning before its arrival. Within a span of 12 months the mentioned pandemic inflected upon the United States public 60 million illnesses and was reported to have caused 12,000 deaths.

The new inventiveness claimed herein does not intend to be the sole solution to solve a pandemic. However, the new inventiveness if employed prior to the pandemic occurring will provide not only safety from eggs contributing to the quantity of people initially stricken but also will provide for the preservation of a basic and needed food source which is safe for consumption when safe food would be in short supply.

The above-referenced H5N1 virus together with derivatives stemming from that virus or viruses which may not be directly related each to the other but already reported to exist and representing separate risks to the public on their own collectively create a recognized and scientifically-confirmed forecast that a real and present threat of a pandemic is in the making. The pandemic materially is enabled by the current viral strains referenced together with their direct or indirect derivatives having the ability to enable human-to-human transfer of illness.

Notably and with consistency to the forecasts of a pandemic occurring in the near term the above-described events not only confirmed those forecast but also reinforced by the somewhat veiled newscast occurring in May 2015 which confirmed that 50 million laying chickens had been destroyed because the flocks were infected with Avian Influenza.

According to scientists at the USDA Research Laboratory were Se to be inactivated through the application of heat by 2 logs greater than the targeted log reduction of the H5N1 virus that ratio can be employed in protocols targeting the destruction of the H5N1 virus as may require adjustment caused by mutations and defense mechanisms created by the virus which commonly occur in the evolution of viruses. In that regard the new art enabling higher and ultimate levels of inactivation of both viral and *salmonella* strains as found within chicken eggs has been adjusted in its capacity to provide for total inactivation of the known to be greater heat resistance of viral strains over *salmonella* strains as now enabled by and through the employment of the new and unique protocol claimed herein which accomplishes the mentioned inactivation while maintaining the raw characteristics of the chicken egg.

Further considerations to utilizing new protocols to destroy all threats from both viral or bacterial contamination as found within chicken eggs through employing one rigid formula for all circumstances creates a risk of failure along with a public health risk when such practice of employing a 5-log protocol of destruction of *salmonella* bacteria as sponsored by the US-FDA in 2009 is used.

Notably and materially in addition to the above-described inadequacies of a 5-log inactivation of *salmonella* the US-FDA under its Rule of 2009 allowed for the inclusion of highly contaminated eggs within which *salmonella* counts exceeded the ability of a 5-log level of inactivation of Se through pasteurization to be effective. Notably those eggs resulting from the above-described inadequate pasteurization were qualified to display the term 'PASTEURIZED', display the USDA shield and to discontinue the display of 'Safe Handling Instructions' which was a notice to the public concerning the risks carried within chicken eggs unless consumed when hard-cooked.

Notably and with materiality to the above recitation regarding violations of the public trust through faulty labeling of unsafe products such is further supported by the specific allowance and practice enabled by the US-FDA sponsored Rule of 2009 within which the inclusion of known to be highly *salmonella*-contaminated chicken eggs so-marked are allowed to be included in liquid egg product resulting from co-mingled eggs which include the so mentioned, highly contaminated eggs. Further to the above current practice allows for repackaging of a carton of eggs containing a stale date to one of a current date which carries with it a new 'Best By' date which displays 'Safe Handling Instructions' on the carton. Considered together the above-described abuses to the public trust represent Government-sanctioned fraud whether inadvertently or otherwise. Further, as discussed herein above, in a report by NERO whose title carries the credentials of that organization within its formal name i.e. National Egg Regulatory Officials the shortcomings of egg grading and labeling are discussed. Those recited shortcomings include but are not limited to the long-standing use of labeling Grade A and Grade AA eggs with new 'Best By' or equivalent language dates when in fact the eggs may have been returned eggs which had not sold at retail and were relabeled and repackaged to carry a new 'Best By' date in obvious fraud to the consuming public. Significantly, persons representing 45% of the population i.e. 150 million are identified as being members of groups with compromised immune systems. Further to the above the stale eggs which allowably included highly contaminated eggs from the original time of packaging likely would require a 10-log pasteurization level for inactivation of *salmonella* if converted into liquid egg product. As previously discussed if not converted into liquid egg product NERO also reconfirmed that the chicken eggs packaged within Grade A and Grade AA cartons under common practice allowed up to 18% of Grade B eggs to be included without causing change of grade labeling from the Grade A and Grade AA categories. Notably Grade B eggs even if pasteurized to 5 logs carry with them little or no hope of successful *salmonella* inactivation due to the inherent risk of those eggs having an age and condition stemming from an environment enabling levels of *salmonella* contamination requiring far in excess of 5 logs as measured by Se for total inactivation as intended or represented by Government agencies of jurisdiction. Such results in millions of Se cells being present by the time of consumption regardless of levels of deep chilling employed as an option but which in actual practice is ineffective in providing reliable protection unless hard-cooked or pasteurized to a materially higher log level reduction as is provided under new art described herein which unto itself achieves total inactivation which eliminates the risks from failures of imperfect farm-to-table deep refrigeration along with the risks recited herein before regarding both mishandling of products and mislabeling of products to an unsuspecting consumer recipient even when current levels of pasteurization of chicken eggs are employed.

The new inventiveness claimed herein is broad enough in its scope and abilities to be utilized in a protocol which enables the level of destruction to have the flexibility to accommodate the total inactivation of either the mentioned bacterial or viral contaminations concurrently or separately as they may exist or as they may evolve.

The scientific community acknowledges that through the end of 2015 the virus anticipated to give cause for a pandemic still is evolving and in the end may carry with it Avian Influenza which could include a strain which provides for the spread of human-to-human illness which as so far experienced causes a death rate approximating up to 40 percent of those afflicted. Without certainty as to the end result of that evolution the H5N1 virus or its derivatives is considered to be the likely base source of the virus. Until the evolution is complete a countermeasure likened to Tamiflu or a vaccine is unavailable. Published reports indicate that both the US-FDA and the US Department of Health and Human Services separately are dealing with both Canadian and French firms to research and to develop a vaccine which addresses the level of inactivation required to inactivate the still evolving H5N1 virus. Under the new art described herein the ratio between bacteria and viruses for their relative inactivations uses the time and temperature formula created in the 1970's for *salmonella* inactivation as the base standard employed. That base standard has been utilized to create a ratio for inactivation between *salmonella* as measured by Se and viruses as may come to be found within chicken eggs. Various elements of the scientific community have engaged in studies involving the relative inactivation levels between bacteria and viruses after the employment of heat using Se as the baseline measure. Those studies included a report that a ratio of a 5- to 7-log inactivation of Se is required to equate to a 5-log inactivation of the H5N1 virus which is performed through the employment of heat. Notably the referenced report as is further confirmed through other studies of record provides a ratio of inactivation between the virus and the strain of *salmonella* but does not address total inactivation of either. That determination is not static. As found with either or both viral and *salmonella* contamination when present absent of prompt and deep chilling from lay to table such provides for lethal multiplication levels to occur in a period of time which matches in substantial part the timeframes commonly existing between date of lay and human consumption if adhered to in practice. If not, the health risk already present is materially magnified. Without the benefits of prompt, continuous and uninterrupted deep refrigeration which is known to be not reliably available the statistical multiplication of either of the mentioned pathogens containing levels of contamination both allowed or resulting from mishandling is such that the multiplication result within a contaminated egg may reach hundreds of millions of cells during the timeframe most consumers would expect the subject eggs to be safe for consumption.

Notably and significantly the mentioned elevated levels of cells as derived from both *salmonella* bacteria and now potentially from viral contamination are most lethal to risk group members of compromised health which represent a significant portion of the population whose number as published by US Government sources as stated above in this section approximates 150.0 million persons. The cost per illness for citizens of ordinary health as carried by the US-FSIS is $20,000. per illness which is substantially lower than the costs per illness as experienced by many portions of the members within the so-mentioned risk group representing 45% of the total population. Using the Government statistic of 150.0 million persons as being within the high risk groups and using an average of 20 dozen eggs consumed per person annually of which only six individual eggs converted into six liquid egg servings pasteurized to a 5-log level of inactivation the likely end result would be six illnesses to 150.0 million persons within the Risk Group category at an average cost per illness as carried by the US-FSIS to be $20,000 per illness for persons of ordinary health in the end would equate to an avoidable public cost of $18.0 trillion which as of year end 2015 equates to the National Debt.

Those described illnesses and their frequency both are understated knowingly in order to retain the focus on the availability of the enormity of avoidable public costs created for decades primarily from either failures in Government oversight or misinformation passed through to the public at large.

The new art described and claimed herein succeeds in providing effectively total inactivation of viruses through a 10-log level of inactivation which automatically inactivates the less heat-tolerant *salmonella* strains as may be present within chicken eggs while at the same time preserving both a capacity to achieve higher logs to accommodate further mutations requiring greater heat resistance by the viruses as they continue their self-protecting evolution. Under the new art the preservation of the functional characteristics of a raw chicken egg post-pasteurization is retained as is the preservation of the nutritional benefits contained within an uncontaminated fresh chicken egg.

Notably, the average per capita consumption of chicken eggs in the United States actually exceeds 20 dozen per annum which is understated hereinabove for conservative purposes to be 20 dozen per annum. The statistical illustration provided for the public health cost stemming from contaminated liquid egg product using a minimal frequency of six (6) 1-egg liquid servings provided to risk group members annually currently pasteurized to a minimum of a 5-log level of *salmonella* inactivation as measured by Se creates the public cost carried above of $18.0 trillion. The frequency of consumption is understated deliberately to avoid disagreement over the quantity of consumption and to allow focus upon the most important issue of the illnesses caused by contaminated liquid egg product together with their associated costs to the public. In support of the above representation that the illustrated numbers employed are conservative *salmonella*-contaminated chicken eggs for decades have been reported by Government agencies through to the present as being the largest single cause of foodborne illnesses.

Used only as one illustration new viral strains such as the H5N1 require materially greater log reduction for their inactivation than do strains of bacteria in order to provide the public with statistically complete safety which is a primary subject and accomplishment of the new inventiveness as identified, explained and claimed within this Application. Such is accomplished through a new ability to inactivate viruses which over time may further increase their heat tolerance and require still greater log reduction for inactivation which also is enabled under the mentioned new inventiveness. The above-referenced art uniquely performs the levels of pasteurization required as measured in logs well in excess of current art without damage to the chicken eggs in terms of loss of either their raw aesthetic characteristics or functional characteristics while at the same time providing total inactivation of the targeted viral contaminates. The inactivation of viruses as measured by log reductions carries with it a higher inactivation of bacteria due to the greater heat sensitivity of the bacteria as found within chicken eggs over that of viruses as found within chicken eggs as confirmed by USDA researchers.

For clarity and emphasis the new art described and claimed herein elsewhere in greater detail provides for levels of heat inactivation of the targeted pathogens found within chicken eggs by sequentially increasing and decreasing the temperature of the heat transfer source to avoid cooking of any element found within the chicken eggs while achieving targeted log levels of inactivation of the mentioned pathogens which are complete. Concurrently to the described purposes being performed the controlled fluctuation of temperature as applied to each egg within its shell is adjusted in terms of temperature and duration of exposure of the contents of the subject egg. That adjustment provides for the cumulative but not continuous application of heat to protect against cooking of any of the four basic elements within the chicken egg by taking advantage primarily of the speed of heat transfer of the outer albumen and taking advantage of the level of heat tolerance found within the vitelline membrane and the yolk to not coagulate from modest overexposures to the heat being applied.

Curiously but notably prior to the effective date of the US-FDA Rule of July, 2009, the US Department of Health and Human Services in September, 2005, executed a contract with the American branch of a French firm located in Swiftwater, Pa., which reportedly contained a deposit of $91 million to develop a vaccine to counteract the potential virus identified as the H5N1 which was considered to be the likely cause of a pandemic feared to be in the making. The total anticipated cost for that work was confirmed to be $150 million. More or less concurrently the US-FSIS in a communication to the US-FDA entitled Draft Risk Assessment dated October, 2005, recommended that a 6-log inactivation of Se through pasteurization should be included within the proposed US-FDA Rule which would represent the log level required to inactivate *salmonella* contamination as found within chicken eggs as co-mingled into liquid products. In 2009 the US-FDA published the Egg Safety Final Rule which specified that known-to-be highly-contaminated chicken eggs could be co-mingled into liquid egg product and be labeled as 'PASTEURIZED' subject to a 5-log level of inactivation of Se. The above recitation raises obvious questions as to why and how both of the mentioned agencies persisted in claiming that an adequacy of safety existed under either or both pasteurization levels mentioned as applied to Se when both agencies clearly understood that stale eggs were being repackaged with current dates and levels of *salmonella* contamination obviously failed at 5 logs to inactivate the subject chicken eggs as provided to the public at large even when the eggs were relatively fresh and pasteurized to 5 logs which targeted Se as the strain. Further to the above in-shell eggs packed for foodservice bore no "Best by" dates but were allowed to include slightly more than two (2) eggs per dozen being of Grade B quality. Similarly in-shell chicken eggs packed for retail consumption were allowed to include two (2) Grade B eggs in each dozen bearing a USDA Shield and so-marked as either Grade A or Grade AA. It is common knowledge within the industry and the scientific community that Grade B eggs at great frequency are inferior in many regards but also most frequently are *salmonella* contaminated. The inclusion of Grade B eggs without notice to the public offers one of multiple reasons why statistically the frequency of illnesses from chicken eggs has not been reduced for decades from the original ratio of 1 egg in 20,000 eggs being contaminated although over the same span of time the consumption of chicken eggs has risen from 3 billion dozen per annum to recent reports published in 2015 carrying in excess of 7 billion dozen being consumed annually in the United States. Still more notably all of the above-recited abuses reflecting upon the integrity of the agencies of jurisdiction together with the significant increases in public consumption confirm in the first instance why contaminated chicken eggs remain to be each year for more than 20 years the leading cause of foodborne illness which because of increased consumption over the past two or more decades has given cause to a statistical increase in illnesses approaching threefold. Notably, in the second instance the elimination of that source of public expense together with its associated hardships would equate to the elimination of the National Debt in one year. The subsequent use of those proceeds at the least would provide for improved public education across the whole nation, free health care across the nation together with research and development for our military together with significantly improved resources for homeland defenses.

A significant feature of the new art contained within the herein claimed and described new inventiveness is that the elements of inventiveness employed do not target solely the strain of *salmonella* identified as Se as does the US-FDA, but the new inventiveness described and claimed herein targets other strains of *salmonella* as found within chicken eggs which are more heat-resistant than Se. The new inventiveness without compromising the maintenance of the aesthetic and functional characteristics of a raw chicken egg successfully destroys those viral and *salmonella* contaminants requiring materially greater heat application for their destruction than does the present 5-log level of destruction of Se as enabled through the quantity of heat employed under current art as is used for both in-shell chicken eggs or liquid egg products. The described materially improved level of destruction provides for total inactivation of the targeted pathogens whether bacterial or viral as enabled by unique but controlled intermittent applications of heat together with the intermittent denial of certain levels of heat. Said protocol which is a part of the new discoveries reported herein through its application of heat when targeting individual strains or sub-strains of *salmonella* not limited to Se provides for optional levels of heat application which can be employed through computerized programs employed to meet the needs at hand. Those needs may manifest themselves through requiring even still greater log reductions of the targeted pathogen which may be either bacterial or viral or a combined presence of both. Under the circumstances of both being present such may require expansion of the protocol employed as is uniquely enabled by the new inventiveness described and claimed herein. That enablement of the protocol employed is both new and unique. By comparison prior art has materially lesser ability to utilize the mentioned options of inactivating *salmonella* only or viruses only or utilizing one protocol through its capabilities to achieve the necessary level of destruction of both *salmonella* and the more difficult inactivation of viruses while at the same time retaining the nutritional integrity of the eggs together with the retention of their aesthetic and raw characteristics. The new art provides through its availability of options contained within the described unique features of the protocol employed the enablement of the destruction and inactivation of additional strains of *salmonella* which are more virulent and heat resistant than Se while at the same time providing the ability to totally inactivate viral contamination which requires still greater exposure to heat than does *salmonella*. Not only under the new art are the needed levels of inactivation mentioned available but also an additional unique ingredient contained within the protocol of the new art is the attention provided from the medium employed for pasteurization which is unique unto itself in providing layers of security against both recontamination as well as the assurance of total inactivation of targeted pathogens occurring within the protocol employed. Notably, no prior art justly can claim total inactivation of all strains of *salmonella* as found within chicken eggs, nor is there any evidence that any prior art can justly claim success in the inactivation of viral contaminants currently evolving as identified above without damage to the raw characteristics of the subject chicken eggs.

Importantly, prior art targets only Se and only employs a 5-log reduction to whatever level of Se contamination may exist. The one exception involved the H3N1 virus which for decades mistakenly was considered to have the same level of heat inactivation as that of Se. That error exposed millions of people to illnesses resulting from the mistake of treating the H3N1 virus as having the same level of inactivation as Se when co-mingled into liquid egg product. The new inventiveness provides for materially greater safety benefits over the mentioned prior 5-log level of destruction of Se as set by the US-FDA which does not specify the inclusion of substrains of Se requiring greater heat exposure for inactivation. However, under the new art a minimum of the doubling of the destruction of Se which fully inactivates all

*salmonella* which may be present including more heat-resistant strains of both *salmonella* and those still greater heat-resistant strains as found in virus strains are totally inactivated.

Notably and materially were either the viruses or the bacteria through further mutations to come to require higher levels of inactivation the new inventiveness provides for expansion of the protocol employed that is unique from all prior art and accommodates the need for greater capacity to perform the level of inactivation required. That described expansion of the destruction capabilities of the targeted contaminate as enabled under the new art provides for total protection against continued gains in heat resistance which occur within both bacteria and viruses as their protective measure for survival. The new art provides for a level of total safety to be maintained even were new and more heat-resilient strains of either or both viruses and *salmonella* to evolve. Protection from loss of nutritional, aesthetic or functional characteristics as compared to raw chicken eggs is preserved. Notably, the collection of benefits available under the new art were not available under prior art.

In summary, the new inventiveness described and claimed herein for the first time enables the public to be provided with a safe egg suitable for consumption under all recipes and by all risk groups through the achievement of statistically total inactivation of both viruses and bacteria which currently exist or are forecasted to soon come to exist giving cause to illnesses inordinately magnified by their ability to succeed in human-to-human transfer. The new art not only inactivates levels of contamination as found within chicken eggs stemming from traditional levels of *salmonella* when in chicken eggs but also provides for the inactivation of anticipated strains of viruses and their expected requirements for inactivation. Notably and of great importance the new art allows for the current abuses of mislabeling of products and the understatement of the risks present within current chicken egg products to be eliminated through the achievement of doubling at minimum the level of pasteurization while preserving all of the qualities found within a raw chicken egg. Such is accomplished through the new art containing in part a unique ability pertaining to the application of heat at greater levels which statistically inactivates all viral and bacterial contamination that either currently exist or may come to exist at higher levels as forecasted by the scientific community. Notably the new art achieves the described inactivations while at the same time preserving the raw characteristics of a chicken egg together with its nutritional values. As discussed in significant detail hereinbefore the new art relies upon a unique protocol whose ingredients stem from the rate of heat transfer and denial as applied to the outer albumen and converts that knowledge into a new formula which protects the outer albumen from heat damage but allows for uninterrupted and continuing pasteurization to occur through a unique protocol which provides for the intermittent application of heat and its denial that includes all elements of the subject eggs on a continuous but programmed basis as to levels of intensity which is novel.

As further background to the above recitation concerning the current status of pathogenic development through continuing evolution together with countermeasures made available through the above-outlined protocol employed as contained within new inventiveness attention is drawn to the US-FSIS which provided input to the US-FDA for what became the Egg Safety Final Rule of 2009. Notably, the US-FSIS in part confirmed in its October, 2005, Risk Assessment that a deficiency exists within the US-FDA-sponsored Rule of 2009 which supported the need for more destructive levels of *salmonella* bacteria separate and apart from the now present even greater need for materially increased log levels of destruction to inactivate still more heat-resistant viruses which are now the predicted source of a pandemic as confirmed by members of the scientific community located around the globe.

The US-FDA sponsored Rule as enacted in 2009 addresses only *salmonella* bacteria contamination as limited to Se and its destruction made available under a 5-log pasteurization protocol. Not only is that singular item important and pertinent to an overall underlying problem from which the public at large is at risk of consuming illness-causing shell eggs or egg products but also the referenced observation by the US-FSIS that a 5-log level of destruction of Se through its inadequacy to inactivate all *salmonella* which may be present opens the door for the discussion of added public peril from chicken eggs or egg products inadequately pasteurized to provide the public with proper safety. Specifically, the US-FSIS in its advisory role to the US-FDA as provider of the statistical ingredients contained within the mentioned Rule recommended that the minimum pasteurization level for destruction of Se as measured in logs be changed by the US-FDA from 5 logs to 6 logs because of demonstrated inadequacies to inactivate all *salmonella* which may be present albeit that the US-FSIS mentioned 6 logs in the end too is inadequate for public safety.

Materially and notably in pertinent part the US-FDA in its Rule rejected the US-FSIS recommendation that the log level of destruction for Se as found within liquid egg product be raised to a 6-log level of inactivation. Notably co-mingled liquid egg product had enjoyed for more than a 20-year span a *salmonella* log reduction of only 4 as measured by Se. During that timeframe the liquid egg product industry claimed that not one *salmonella*-caused illness had been traced back to a liquid egg source. Notably, the mentioned US-FSIS recommendation of a 6-log protocol was targeted directly at liquid egg products, but through the US-FDA Rule in its final form the same log level of destruction for co-mingled liquid egg product and in-shell eggs was established to be 5 logs for both. What was unsaid is that this measure required the subject eggs being pasteurized and deeply refrigerated promptly post-lay and required uninterrupted and deep refrigeration to be present through to consumption. None of those ingredients in practice is either feasible or reliable for the trust being asked from the consuming public. The rejection by the US-FDA to the recommendation of the US-FSIS regarding the described increase of the level of inactivation of Se when found within chicken eggs to 6 logs was compounded as an error by an action taken by the US-FDA within the subsequent language of the referenced Rule of 2009. The error within the Rule enables so-marked, highly Se-contaminated chicken eggs to be co-mingled with other chicken eggs and to be converted into liquid egg product pasteurized to a 5-log level of inactivation of Se as the *salmonella* strain of measure. Notably the above-described co-mingling of highly Se-contaminated chicken eggs pasteurized to a level only of 5 logs as measured by Se created and continues to create a major risk to public health which not only sickens millions of persons annually but also of notable consequence gives cause to avoidable medical costs which annually equates to the current National Debt or more as mentioned earlier. Of particular added note the mentioned costs would be magnified were viruses to create greater numbers of illnesses over those currently caused by *salmonella*. The Pandemic of 1918 carried with it a viral source which killed an estimated 50 million when the world population approximated 1.5 billion i.e. one-fourth of its current size. In the United States alone an estimated 15 million people perished. Notably in a 12-month span running from 2009-2010 a pandemic carrying with it very little publicity occurred within the United States only. The pathogen was viral, but the source remained uncertain. The number of illnesses having occurred in the mentioned 12-month span equated to 60 million. An additional 12,000 persons died. Notably, the quantity and speed in which that pandemic occurred gained next to no publicity, and what little did occur was reported only after the crisis passed. Under the exposures previously described that threat may only be a forewarning, but the ability to reduce the risk finally of chicken eggs giving cause to a still greater pandemic or being protected as a source of food when needed during a pandemic makes obvious the benefits of the elimination of both a viral and bacterial source of illness when such is available. The savings previously referenced not only can be put to good use as also referenced but could include the development of science which magnifies the protection of other food sources as well.

The above-recited events and differing positions by agencies as pertaining to chicken egg product safety are found to be further confounding when considered together with the common knowledge throughout Government agencies as confirmed by published papers generated by USDA scientists more than four years earlier describing the threats from Avian Influenza as already existing together with a requirement that the subject influenza strains required two (2) extra logs over all *salmonella* strains as found within chicken eggs for their inactivation. Certain studies were performed by Drs. Richard Gast and David Swayne of the USDA, Athens, Ga., Research Laboratory.

Since the enactment of the US-FDA-sponsored Final Rule of 2009 no material modification to the pasteurization requirements or modifications of labeling of egg products and shell egg cartons has occurred. Notably not only have the inadequacies for pasteurization continued to mislead the public through either wrongful labeling or non-labeling of both pasteurized shell egg cartons and liquid egg product cartons but also no acknowledgement has been sponsored or discussed publicly concerning the now known to be serious threat of a pandemic as may be caused in material part by chickens and their eggs that may be contaminated by Avian Influenza strains requiring materially greater heat exposure for their inactivation than do *salmonella* bacteria strains of which Se is among those that require less heat for inactivation than do viral strains. Of even greater concern, the public is unaware that a 5-log level of pasteurization of Se inadequately pasteurizes either or both in-shell chicken eggs or liquid egg products. The inadequate pasteurization results in the continuing presence of *salmonella* whose cell count presumably has been reduced to a level which when deeply chilled can be provided to a consumer at times later as most often include weeks to consume without risk of illness. That determination by the US agencies of jurisdiction is flawed for a variety of reasons which include but are not limited to the allowance of highly contaminated eggs as enabled under the US-FDA Rule of 2009 to be co-mingled into liquid egg product which when pasteurized to 5 logs remains to be a high risk to public health unless hard-cooked. No recommendation is provided to the public that liquid egg product requires hard-cooking. Further, the reliance upon uninterrupted deep chilling from lay to table defies logic as being safe for reasons that interruptions to deep chilling are frequent which is compounded by the frequency of the time span from time of lay to deep chilling being applied promptly to avoid inordinate multiplication of either bacteria or viruses to inordinate levels which only can be inactivated through hard cooking of eggs or the effective doubling of the number of logs currently being employed to perform pasteurization. Such is compounded by the practice of repacking unsold and stale eggs to be sold as fresh eggs. That practice creates inordinate additional risks of illnesses. Further to the above the practice of co-mingling Grade B eggs with Grade A or Grade AA eggs on its face should be a criminal offense. The date of lay should be made clear to foodservice users which currently is not practiced. The described present inadequacies of current pasteurization focusing its target nearly exclusively upon Se as found within chicken eggs is an error which is compounded by new threats which result from the need to expand the application of heat required for inactivation of Se in order to create safety from viral contamination. More notably a chronic error has persisted regarding the level of inactivation provided for Se in that a 5-log level of inactivation has been employed when long-standing science has required a 10-log level of inactivation. By relaxing the 10 logs to the current 5-log level such only can be justified were the speed within which the pasteurization to occur to be accelerated to a point in time that is so prompt post-lay that the whole egg industry would need to be changed from all current practices regarding egg processing together with their distribution. Notably the abuses occurring in storage, washing with dirty rinse water, mislabeling of egg grades, co-mingling of known-to-be inferior eggs with higher grade eggs and allowing for inadequate pasteurization to cite only a few of the chronic abuses all require remedies which only can be found in a practical sense that would be abided by were pasteurization to be provided at a level which science can demonstrate to provide for total inactivation of the targeted pathogen. For these purposes the new art discussed herein targets a 10-log inactivation for viruses and a 12-log inactivation for bacteria which can be expanded were new strains of either pathogen to require such.

As only one illustration of the public health risk enabled by delays in consumption of Se-contaminated chicken eggs from farm to table, a serving of the equivalent of 1.5 co-mingled eggs less than hard-cooked may contain approximately 570 *salmonella* cells from time of lay to processing. In the absence of deep refrigeration in a span of 33 days from date of lay the multiplication of Se will achieve in excess of 1 billion *salmonella* cells under average ambient temperatures which nullifies the intended benefits derived from a 5-log inactivation of Se. Not only have the described inadequacies concerning inactivation of pathogens not been conveyed to the public but also the term 'PASTEURIZED' continues to be employed on in-shell egg cartons and upon liquid egg product cartons which magnify the already high risks of illnesses to unsuspecting consumers since the consumers are unaware of the inadequacy of a 5-log pasteurization protocol to provide safe eggs for consumption when less than hard-cooked. Significantly, through the long-established knowledge of pasteurization of milk providing for public safety, the misuse of the term 'PASTEURIZED' resulting from a 5-log level of inactivation only of Se in chicken eggs represents a blatant misrepresentation to the public's well-being. Since it is unlikely that chicken eggs will receive prompt, deep and uninterrupted refrigeration from farm to table the vast majority of the in-shell chicken eggs produced annually for consumption either as in-shell eggs or as liquid egg product exceeding 7 billion dozen will travel from date-of-lay through date-of-consumption with interruptions to their deep refrigeration causing frequent levels of *salmonella* multiplication to an extent which is lethal or sickening to the majority of the population. In support of the needs for improvements within egg safety as in part discussed Government scientists have been forecasting the potential of a pandemic caused by influenza sources for years prior to the Rule of 2009 and have long since reported that the inactivation of a virus as found within a chicken egg requires greater levels of inactivation employing heat than do those for the various strains of *salmonella*. The US-FDA Rule of 2009 makes no mention of those important matters. Notably and curiously the agencies of jurisdiction concurrently with the new Rule engaged in contracts with independent purveyors to provide research and development for a vaccine to be employed were Avian Influenza to become a threat to public health as already had been forecasted by the World Health Organization and was already under study by the USDA Research Laboratory located in Athens, Ga. Notably the research and development for a vaccine may be years away from completion which rightfully may cause an element of risk to the population at large resulting from the forecast by WHO that the makings of a pandemic identified as the Avian Influenza are being experienced globally. Accordingly WHO repeated has stated that a pandemic from avian causes is inevitable and already is in the making. That forecast by WHO is reconfirmed by the already-recited above pandemic which occurred within the United States bracketing the years 2009-2010 which was costly, sudden and unpredicted.

Significantly through the employment of a new and unique protocol which preserves the raw characteristics of the subject eggs together with their nutritional benefits and performs such through doubling the existing 5-log level of destruction which provides for the total inactivation of not only the H5N1 virus but also other viral strains already reported to be evolving. The new art as herein disclosed enables successful protection through elevated pasteurization levels provided by the employment of the new inventiveness claimed herein. That inventiveness employs new art which contains protocols enabling the total inactivation of both highly contaminated chicken eggs containing *salmonella* as well as the more heat-resistant viral strains either presently threatening public health or anticipated to do so. Under the new art the total inactivation of both viral strains and *salmonella* strains whether present or evolving is achieved while preserving the nutritional, aesthetic and raw characteristics of a chicken egg.

To avoid confusion the current protocol continues the custom of the US-FDA to use Se as the baseline targeted pathogen together with references to logs resulting from pasteurization as applied to Se. The new protocol enabling materially improved levels of pasteurization abandons the 5-log level of inactivation of *salmonella* only for reasons of its inadequacy to destroy all pathogens present and of at least equal importance provide the consuming public with a false sense of safety. The mentioned '5' Se logs is endorsed and approved by the US-FDA to provide safety to the consuming public. That 5-log level is replaced under the new art described herein with a pasteurization art which achieves a 12-log level of inactivation of *salmonella* which equates to a 10-log level of inactivation of virus strains anticipated to become present within chicken eggs. The need for a 12-log inactivation of *salmonella* stems from the original studies formed by scientists for the USDA in or around 1990 which demonstrated that a 10-log level of inactivation of all strains of *salmonella* as found within chicken eggs was required to provide farm-to-table safety to the public. When the protocol employed for liquid egg product pasteurization failed to preserve raw characteristic a compromise to satisfy the egg industry occurred. Without public notice the pasteurization level was reduced to 4 logs to preserve raw characteristic. What was missed was that eggs contaminated with *salmonella* only have a 4-day grace period before rapid multiplication occurs. In practice the eggs being pasteurized included the worst of the worst which had no hope of being co-mingled and be safe for consumption by the general public unless either hard-cooked or abandoned from being provided. The target of 10 logs as made available for new viruses under the new art contained herein as confirmed through science equates to 12 logs as applied to *salmonella* strains Additionally, were the 10-log level of destruction of the H5N1 virus to be found to be inadequate for assured public safety from eggs prepared in all fashions notably and uniquely the new invention through its existing feature of flexibility as enabled by both heat exposure and heat denial to the targeted chicken eggs through implementation of its protocol described enables the pre-selection of the targeted log level of inactivation of the targeted pathogen to be automatically programmed in advance which in this illustration would be at a setting in excess of 10 logs as applied to viruses. Those protocols not only would be understood by one reasonably skilled in the art but also contain unique refinements over all prior art which equally would be understood and includes impact from such items as egg sizes, water content and adjustments to the protocol employed which reflect the log level targeted for the total inactivation of the pathogens selected not only as applied to viruses as a group and *salmonella* as a group but also the individual pathogen strains and their substrains together with their differing resistance to heat. The details of the described art are discussed within the section entitled 'Detailed Description of the Invention' as found herein below.

The following represents a brief summary of critical points regarding reported levels of contamination of chicken eggs together with commentaries on reports which demonstrate interagency errors and contradictions as to both the quantity and frequency of chicken egg contamination together with the quantity and frequency of illnesses stemming from those sources.

One important purpose of the recitation below is to provide a sense of urgency based upon the mentioned prior history of Government agencies failing to find a common resolution of the topic surrounding illnesses stemming from chicken eggs contaminated by *salmonella* and to avoid a similar occurrence concerning viral contamination which inherently carries with it a highly-magnified public health risk. It is acknowledged that US Government agencies already have engaged the services of independent scientists to prepare a vaccine to protect the public against a strain of influenza which may result in a pandemic. As learned from studies of *salmonella* strains and frequently on an annual basis as is experienced with strains of influenza vaccines it is common knowledge that both viruses and bacteria evolve in a manner to protect themselves. The one common denominator which may be less costly and more effective or at the least provides added protection to a vaccine can be found in pasteurization performed at levels of inactivation which result in the total elimination of the targeted pathogens when performed within an environment which through design and protocol prevents both inadequate pasteurization to achieve total inactivation of pathogens targeted and simultaneously provides for protection against recontamination of the subject chicken eggs through less than total inactivation of the targeted pathogens. Uniquely and notably those standards for total inactivation of both of the mentioned pathogens are achieved by the protocol contained within the new inventiveness claimed herein.

Secondarily, a solution to and in preparedness for reliable public protection from viral contamination resulting into expanded numbers of illnesses which may include pandemic proportions enabled by Avian Influenza in part can be avoided through the methodology now available and disclosed herein which eliminates chicken eggs as a contributing source of illnesses. Such warrants a sense of urgency for agencies of jurisdiction to initiate steps to protect the public not only from the inadequacies of current public policy concerning chicken eggs but also requires those same agencies to pay heed to experts within the field of public health including but not limited to WHO that a pandemic caused from Avian Influenza is either imminent or already through its beginnings is upon us and countermeasures to protect the public and the food supply require prompt attention in advance as such is available in part as applied to chicken eggs. The technology described herein below enables protection of one element of the food supply and denies that same element giving cause for increased numbers of illnesses. Even were that protection not to occur in the magnitude of a pandemic the inadequacies of current pasteurization requirements concerning *salmonella* and existing but threatening strains of viruses impacting upon chicken eggs would result in placing the public in greater harm's way unnecessarily which otherwise would be avoidable. The increased risks are avoided through the new protocol disclosed and described in greater detail herein below under 'Detailed Description of the Invention'.

Further to the above even were viral contamination of chicken eggs not to occur but were current levels of *salmonella*-causing illnesses from contaminated chicken eggs to continue at present levels along with the allowed for inclusion of only 1 of 2 contaminated Grade B eggs to be included within each dozen of so marked Grade A eggs each causing 1 additional illness to that which is caused otherwise such would add by itself $80.0 trillion to the cost of illnesses from either previously contaminated or improperly marketed chicken eggs.

Were the pandemic as forecasted to occur as caused by viral contamination the cost in lives would be enormous. Through providing safety to the egg portion of the food supply chain a material reduction in human suffering and monetary costs would occur. As an additional benefit derived through the new inventiveness described herein the chicken eggs once pasteurized under the new protocol change from being a source cause of illness to a needed source for safe and nutritious food. Herefollows a list of issues and facts which aid in understanding the historical inadequacies of responsible agencies to provide adequate information for protection against *salmonella*-caused food poisoning as found within chicken eggs which in part could be the result of inadequate science. Such is provided to enable the distinguishing differences and inadequacies of prior art as compared with the new art which contains the ability to provide the public with the deserved protection available that materially will contribute to its survival through reducing the quantity of illnesses while at the same time preserving a major element within the basic food supply.

1. The US-FDA-sponsored Rule of 2009 provided for the co-mingling of known-to-be highly Se-contaminated chicken eggs with other eggs and their conversion into liquid egg products if pasteurized to a 5-log level of inactivation of Se before being provided to the public with a clearly implied representation of safety which made the subject eggs more attractive to be consumed by all risk groups within all recipes absent of hard cooking.

2. The authorized label of 'PASTEURIZED' without Safe Handling Instructions of any nature concerning limitations to preparation regarding health risks unless hard-cooked has continued to be found on egg cartons containing in-shell pasteurized eggs which require a 5-log level of pasteurization of *salmonella* if present.

3. The US-FSIS has gone on record as stating that a minimum of 6 logs is required to inactivate Se as a threat to public health when found within chicken eggs. As noted above the US-FDA subsequent to the US-FSIS recommendation allowed the lesser 5-log level of Se inactivation to be employed as applied to both liquid egg product and in-shell chicken eggs. Notably and pertinently current science breaks down not only *salmonella* into various identified strains but also provides a breakdown of the Se strain into various sub-strains which include a more virulent and heat-resistant presence within the mentioned substrains. Confirmation of such can be found in various scientific writings one of which is authored by Dr. Richard Gast of the USDA Research Laboratory as published in 2011. Of particular and pertinent note to the mentioned Se substrains is that their very existence adds to the confusion as to why Se and not its substrains is selected to receive a targeted 5-log level of inactivation when its own substrain requires a higher level of inactivation.

4. As recently as April, 2014, egg cartons within the New England area displayed a 'Best By' date of 30 days while at the same time in materially smaller print under the heading of 'Safe Handling Instructions' the public is provided with a notice that unless hard-cooked eggs may be harmful to one's health. Further, 5-log pasteurized liquid egg products and in-shell chicken eggs have no 'Safe Handling Instructions' on their containers, but along with US agency authorization for improved public understanding do display the term 'PASTEURIZED' in a large font size without the otherwise required 'Safe Handling Instructions'.

5. When packaged for retail the date employed for either 'Best By' or other comparable language displayed upon retail egg cartons is provided for the public to understand the relative timeline of freshness and implied safety as determined by the noted language. Materially the date employed most often utilizes a beginning point of when the eggs are packaged and not the date of lay. That described distinguishing difference is material to the level of pathogenic contamination being present because an already contaminated egg does not become decontaminated with refrigeration. In a matter of a 30-day period of time whether interrupted or otherwise in the absence of deep refrigeration those eggs if contaminated by either viral or *salmonella* sources will multiply into lethal quantities as applied to risk groups unless hard-cooked. Notably the mentioned risk groups represent nearly 45% of the population within the United States which equates to a number approaching 150 million persons which is increasing annually due to an aging population.

6. As has been recited earlier recent enactments by state and Federal agencies provide for still greater risks of illnesses caused by chicken eggs through extending the 'Best By' date to that of 30 days from date of packaging and notably not date of lay when concurrently it is obviously known as already stated on the egg cartons that the eggs should be hard cooked to be safe.

7. Notably, if a pathogen i.e. virus or bacteria is totally inactivated through pasteurization the subject eggs do not risk a level of recontamination occurring which would be lethal to consumers even were interrupted deep refrigeration to occur.

8. The Federal Government passed a regulation in the 1990's to aid in providing improvements to food processing for public protection. It created a plan that was enacted into law which was intended to identify hazards existing within food processing and to provide for their avoidance. That plan included a requirement to identify risks which in the end was intended to improve food safety through attention provided to those identified risks. The name of that regulation and the resulting plan was the Hazard Analysis Critical Control Points which generally is referred to as HACCP. Pertinently, historically chicken eggs have been ranked as the single most cause of foodborne illness both from the present back to at least the 1970's. Egg producers reportedly have conformed to the requirements of adopting and filing a HACCP plan. Notably and materially to the claims contained in this document the HACCP requirements are not only violated in substantial part through delayed collection and packing of eggs prior to deep chilling but also in part are impossible to perform for reason that the systems employed create obstacles which block responsible practices to be employed which result from circumstances that create opportunities for contamination instead of an environment which provides protection against contamination. That results in avenues from which the current ease for Se multiplications into lethal quantities occur in the timeframe as exists between farm to table. That environmental enablement to create high levels of contamination is further compounded by the failure to achieve immediate and continuous deep chilling from lay through point of consumption. Those mentioned flaws in the system stemming from the environment of the farm to the product arriving at the consumer table places the public at serious risk through its misplaced reliance upon the implied protection provided by the USDA Shield as compounded by the false information conveyed through the 'Best By' date displayed upon the subject carton whether in-shell or liquid product.

9. The above factors when combined with reliance upon uninterrupted deep refrigeration applied immediately after lay through consumption does not take into account the obvious risks of refrigeration interruptions caused by transportation breakdowns, power interruptions caused by floods, tornadoes, snowstorms and the like whose frequencies give cause for the agency of jurisdiction to provide an altogether different notice for the public safety than that which is currently employed as referenced and described above.

10. No known study provides support whether statistically based or scientifically based resulting from actual experiments involving already *Salmonella*-contaminated chicken eggs which would support newer claims made by the US-FSIS as contained within its Draft Risk Assessment of October, 2005, as provided to the US-FDA which states by either implication or as an actual fact that even though 1 egg in 20,000 eggs at time of lay may be *salmonella* contaminated only one egg in 277,000 eggs is contaminated with Se to a level which gives cause to illness.

11. The US-FSIS statistical information as recited above is misleading. In part, by using a reference only to Se as found within the chicken eggs and by further limiting its source as stemming from the chicken ovaries without recognizing any other source of *salmonella* contamination to the chicken eggs i.e. Se external to the shells, non-Se strains of *salmonella* external to the shells, *salmonella* and Se accessing through exposed pores of the eggshells, contaminated rinse water or airborne contamination to provide external contamination flowing into the body of the subject eggs through the shell pores are commonly understood by pertinent members of the scientific community and those within the egg industry who possess knowledge pertinent to contamination occurring within chicken eggs. Hence, the conclusions reached by the US-FSIS that a reduction of inordinate proportions has occurred in the frequency of illnesses specific to Se as found only within the egg at time of lay which currently converts into a 12-fold or greater reduction in illnesses is not only materially incorrect but also has no scientific support of record. Taken on its face the US-FSIS conclusion reached would result from no presence of external contaminants being within the subject eggs excepting Se as found to occur within the ovaries of the chicken before lay. No statistical evidence to support such exists.

Contrary to the above scientific studies indicate opposite findings from those recited US-FSIS findings which is that Se together with other strains of *salmonella* as well as additional contaminants flow from external sources into the subject chicken eggs through the pores of the shells regularly and such is commonly understood by the scientific community which includes independent scientific sources as well as the USDA Research Laboratory writings. Although the rinse water employed to all chicken eggs before either breaking or packaging is expected to be of higher temperature than the internal eggs' temperatures to avoid transfer of pathogens into the eggs through their exposed shell pores that practice frequently is violated as reported by USDA publications which results in all of the exposed eggshell pores receiving contaminated water which migrate into the body of each egg. Thus, internal contamination of the chicken egg frequently occurs to all eggs whereas contamination stemming from ovaries is measured in frequency as being one egg in 20,000. The source of the described frequency is from the US-FSIS. From those referenced sources more sophisticated information is provided which in part includes reports on substrains of Se which require still higher levels of inactivation than does Se. No reports confirming a materially lessened threat from Se, its derivatives and other strains of *salmonella* are known to be provided in support of what may well be misinformation resulting from a scientific error generated by the US-FSIS in its published Report of 2005. In the end those questionable new conclusions place the public at greater health risks from chicken eggs than before the referenced US-FSIS report. As a further confounding matter the US-FSIS report does not challenge the long-standing generally accepted statistic that 1 egg in 20,000 chicken eggs is *salmonella*-contaminated.

12. Notably, in a report dated November, 2012, as authored by the USDA Office of Inspector General reconfirmation of the frequency of *salmonella* contamination as found within chicken eggs at a ratio of 1 egg in 20,000 eggs was provided. It is noteworthy that the US-FSIS is a division within the USDA and previously in a report carrying a date of 2005 had reported that the frequency of *salmonella* as found within chicken eggs had been reduced to 1 egg in 277,000 eggs.

13. Reference is made to prior discussions within this document which concern various questionable practices employed by the industry also as known to exist by agencies of jurisdiction that are identified and discussed in greater detail herein above. Those referenced practices place the public in harm's way from misinformation and mislabeling practices employed as such relate to freshness and quantities of contamination as found within chicken eggs being provided to the public which contain fraudulent labeling practices generally known by the industry and Government agencies but generally unknown to the consuming public. More specifically those referenced practices include placing new dates on previously unsold eggs by changing cartons and mislabeling stale and contaminated Grade B eggs through their inclusion within Grade A and Grade AA cartons.

Notably, as stated herein before, Government agencies have contracted separate firms to create a vaccine for protection of the public from the invasion of influenza which would impact upon chicken eggs. However, since the Government is well advised as to what science is being performed in the subject areas one must conclude that pasteurization of eggs would be part of a countermeasure to Avian Influenza since the art now, with the disclosure herein, exists to totally inactivate both viral contamination and bacterial contamination as found within chicken eggs. Such would provide for a contribution to lower the impact upon the public from influenza and to eliminate chicken eggs as a source to spread a deadly virus in lieu of retaining those eggs as a food source at a time of need.

Notably and materially and in contradiction to the implications of its own prior reports regarding the infrequency of *salmonella*-contaminated chicken eggs the US-FSIS published a document dated April, 2011, within which the Agency described the passageway through which an egg is laid and reported on the high frequency of manure attached to eggshells at point of purchase by the public. Such not only discredits the sanitization rinse allegedly provided by all producers to in-shell chicken eggs before packaging but also raises questions about eggshell conditions prior to conversion into liquid egg product. It is through specific experience the author of this Application has observed it to be common practice that the rinse water employed at an egg processing facility commonly is not changed except for at the end of a shift. The antibacterial agent contained within the rinse water is provided at the beginning of each shift in many cases. Usually the shelf life of the agent employed is less than 20 minutes and most often can be 12 minutes or less. Thus, the rinse water at ambient temperature frequently is applied to unwashed and only sometimes refrigerated in-shell eggs which warm from the rinse water being applied. That warming provides for the internal egg to contract which allows for the contaminated rinse water to flow into the subject chicken egg through what have become the exposed eggshell pores which became exposed through the loss of their natural sealant resulting from the rinse water applied. It is common knowledge within the scientific community and the egg industry that hen manure contains Se. The chain of events described raises the question as to whether the Se-contaminated hen manure flows through the exposed eggshell pores into the body of the egg carrying with it Se which at some point finds its way through the membranes found below the eggshell and ends up within the body of the egg. Current thinking has it that the Se contamination predominately occurs within the egg beginning with the occasionally infected ovaries which only intermittently contaminate the egg. The question as to why a hen with *salmonella*-infected ovaries only occasionally lays an infected egg may be answered by tracking the Se-contaminated manure being washed and entering the subject egg through its exposed pores which upon certain occasions penetrates the membranes and infects the body of the chicken egg. Either way external contamination is confirmed to exist by both logic that manure would be in contact with the eggshell when laid and would be washed into the exposed pores when dirty wash water is employed. The new inventiveness described herein eliminates the risk but does not answer the question. Separately but notably, that chain of events if practiced at all i.e. the presence of manure on eggshells at retail stores not being uncommon may well be an additional but material source of contamination at the restaurant or household level for reason that the exposed manure obviously attached to an unwashed egg confirms that time enough has passed for its original liquid presence to penetrate the eggshell pores and to provide contamination of the internal egg particularly when cracked open. Notably, were the egg carton to contain both a sealed environment and an antibacterial agent fully housed within the carton servicing its internal environment a material reduction of both viral and *salmonella* contamination of the subject eggs would occur and public health particularly as found within risk groups would be the beneficiaries. The inclusion of an antibacterial agent to be housed within the contents of the egg carton is to be a subsidiary claim as disclosed in this document.

In all egg processing plants to display the USDA Shield on the egg carton requires an on-site inspector. The subject eggs carrying manure attached to the shells obviously were either not inspected or overlooked. However, the consistency of that nature of contaminated eggshells indicates that something concerning inspection protocol policy may be involved through which substandard products have become commonplace and not simply overlooked.

COMMENTS AND CONCLUSIONS

A substandard environment common to modern day henhouses likely is the primary source of human illnesses resulting from the impaired health of the chicken as the vehicle for transfer of contaminants including bacteria as one example.

All of the issues surrounding the continuous struggle to provide for a chicken egg absent of contamination from either viruses or bacteria likely would be made easier and more effective were the conditions within the henhouse to be materially improved. If improvements to the henhouse and its environment were to occur such would produce a healthier hen which in an improved environment would have less stress and less collateral contaminants to their eggs. In the end the public health would be the beneficiary of what reason dictates to be an appropriate environment for a hen destined in captivity to produce eggs safe for consumption while under current conditions that same hen is being abused daily. The good health of the chicken would materially aid in the reduction of the frequency of contamination of chicken eggs by *salmonella* and likely viruses as well. Unfortunately, as sensible and humane as the mentioned environmental improvements may be in the end what already has been done has not been enough to ensure public health from the perils of *salmonella*-contaminated and/or virally-contaminated chicken eggs to continue to be a public health threat. Fortunately the above references to new inventiveness resolve the open issues of how to provide a statistically safe chicken egg while maintaining its desirable raw characteristics at reasonably low cost. The details regarding such are found below under the heading of 'Detailed Description of the Invention'.

SUMMARY OF THE INVENTION

This invention provides for the total inactivation of all *salmonella* strains as found within chicken eggs. Notably and significantly this invention includes a unique addition of a protocol which contains flexibilities that enable optional expansions of a base formula which unto itself contains new art carried within a unique formula for pasteurization of in-shell chicken eggs resulting in both the total inactivation of the targeted pathogens whether bacterial or viral as may currently exist or come to exist without damage of consequence to the raw characteristics of the subject in-shell chicken eggs in all of their sizes and all of their pre-existing levels of contamination. Separately and of equal novel significance and importance to the art described is the medium within which pasteurization is performed. When employed together pasteurization to levels never before achieved is accomplished. Total inactivation of targeted pathogens enabling the safe consumption of undercooked eggs uniquely is accomplished under an umbrella of safety. Risks against recontamination never before achieved also are accomplished. Through such the public at an affordable cost is protected from illnesses. The magnitude of public savings as measured in dollars is substantial. That flexibility within the protocol employed to inactivate viruses and their continuing evolution requiring a greater level of heat for their inactivation always exceeds the level of inactivation required for bacteria i.e. *salmonella* in all strains as found within chicken eggs. That new capability is useful when both pathogens may be present. When not present the same protocol can be reduced in length of application as measured in cycles containing heat gain and denial to inactivate *salmonella* bacteria were the current threat from viral contamination to pass.

Thus the new inventiveness described herein satisfies both the new and additional needs for higher levels of pasteurization to accommodate the greater heat resistance of viruses over that of bacteria. Such has been accomplished through the application of features contained within the new art identified and claimed herein whose target when initiated was to inactivate *salmonella* to a level which was total. During that research and development process the targeted pathogen of *salmonella* was modified to include viruses which science confirms require greater log levels for their inactivation than do all strains of *salmonella*. That change was caused by multiple new reports which contained new information on public health threats from viral contamination as may come to be found within chicken eggs. Those threats already had manifested themselves by causing illnesses and deaths across the globe which causes came to be identified as Avian Influenza. Those new threats to public health as carried by viruses gave reason for the development of the new inventiveness as described herein before which uniquely inactivates both *salmonella* and viral strains when present within chicken eggs without negative impact upon the subject chicken eggs in terms of compromising their raw characteristics, nutritional values and aesthetic similarity to those of raw unpasteurized chicken eggs as well as those chicken eggs previously pasteurized to reduce their *salmonella* content albeit inadequately. The application of greater quantities of heat to perform the needed added achievements of total inactivation of *salmonella* through an improved pasteurization protocol has lead to discoveries which enable the total inactivation of viruses as now are described herein and are claimed as new art. Such new art for improved pasteurization for *salmonella* bacteria now includes the addition of the ability to inactivate viruses which results from a protocol that is both unique and effective to perform such without consequential negative impact upon the aesthetics, functionality and nutritional benefits of the subject chicken eggs as compared to those same characteristics as found within raw chicken eggs. Now the public has available at a time within which a virally caused pandemic known to be associated with birds so referenced as being Avian Influenza not only is forecasted but also has shown its potential to kill humans in multiple locations around the globe which sets the foundation for its magnification into a pandemic as already forecasted by scientific experts located around the globe. The required levels of inactivation to achieve totality as applied to both bacteria and viral contamination of chicken eggs requires at minimum a doubling of the inactivation currently employed for *salmonella* bacteria as found within chicken eggs in order to provide the public with safety for consumption of chicken eggs when less than hard-cooked. The scientific community confirms that a minimum of an additional 2-logs of inactivation of *salmonella* is required to inactivate viral contamination of chicken eggs. Experience has taught that even when inactivation has been attempted recontamination persists to be a still greater threat to the public. Currently the science for neither total inactivation of *salmonella* nor viruses together with their potential conversions as found or may come to be found within chicken eggs is available to provide the urgently needed total inactivation of the pathogens cited. Such now may be accomplished through the expandable features of the new protocol described which provide for expansion of the pasteurization treatment employed to accommodate the inactivation of more heat-resilient strains of viruses as they may evolve and require still greater heat inactivation which is now available under the new art claimed herein. Such is accomplished through the unique features contained within the new art which enables expansion of the quantity of heat applied to the subject chicken eggs in a unique manner while preserving both the benefits derived from raw characteristics and the nutritional qualities as found within chicken eggs while achieving total inactivation of the targeted pathogens whether viral or bacterial. The application of heat as employed under the new art contains the novel and unique protocol of the intermittent application of heat and its denial which blocks coagulation or overcooking of any one element of a chicken egg. Specifically, the new art through both the repetition of the application of heat and the preprogrammed denial of heat enable the achievement of higher logs of inactivation. The benefits of higher log levels not only provide for the necessary improvements to the inadequacies of the current protocol employed for pasteurization of both in-shell chicken eggs and liquid egg products but also enables the important need for the protection of the public health from the millions of illnesses caused annually from contaminated chicken eggs. Of significant further benefits the new art enables its own expandable feature through the flexibility of the protocol employed which not only allows the achievement of total inactivation of current targeted strains of *salmonella* and viruses but also contains the flexibility to overcome and to inactivate the results of continued evolution of the targeted pathogens which through such continue in an on-going manner to protect themselves through mutations.

Recent viral presence found within birds including migrating birds and domestic chickens have given cause for the scientific community to forecast a pandemic stemming from Avian Influenza which include more threatening virus strains than presently exists. That presence magnifies the opportunity for human-to-human transfer which would add to the chaos created from a pandemic.

For clarity and better understanding of both the risks to the public which currently exist from avoidable magnification of the results of a pandemic from avian causes the following two illustrations are provided. First. the most significant pandemic in modern times occurred in 1918 when the world population approximated one-third of that of today. Estimates of mortality from the 1918 pandemic whose source was viral contamination are in the 70 million death range. Second, a pandemic carrying little publicity occurred within the United States only within a two-year span of 2009-2010 for a duration of twelve months within which a virus was reported to be the cause. Resulting reports confirmed that some 60 million people became ill and 12,000 deaths occurred.

The new inventiveness to be described in detail herein below includes two areas of primary inventiveness:

The first area of primary inventiveness includes a novel protocol for chicken egg pasteurization utilizing the intermittent application of heat and the denial of heat in a unique manner which achieves levels of pasteurization of chicken eggs as measured in logs which inactivates *salmonella* in all strains as well as viruses in all strains that currently exist or may come to exist within chicken eggs as confirmed by the scientific community through research results. The following details concerning both of the two areas of primary inventiveness discussed below are further clarified within the section following entitled: 'Detailed Description of the Invention'. When read separately the contents of each apply.

The above introduction introduces the ingredients of new art which enables pasteurization of targeted pathogens as found within chicken eggs while within their shells to be pasteurized to levels which are accomplished through the cyclical application of heat and its denial which provides for cumulative pasteurization to levels as measured in logs never previously available without damage to the raw characteristics of the subject eggs while still providing to the public an egg for consumption that is safe regardless of the nature of its preparation whether as a raw ingredient or partially cooked. The art enabling such utilizes interruptions to the base temperature settings for pasteurization for measured time intervals to accommodate the egg characteristics being processed. Those characteristics include size as measured in weight, water content and other features peculiar to the subject eggs being processed which impact upon the temperatures employed along with their durations required to achieve pasteurization to the targeted level of inactivation programmed. All of the above factors are converted into a formula for pasteurization involving multiple times and temperatures reflective of the egg ingredients referenced together with other pertinent characteristics which aid in refining the protocol employed to provide for total inactivation of the targeted pathogens without consequential damage to the subject eggs involving qualities of raw characteristics, aesthetics and nutritional benefits. The durations of the intervals utilized for applications of heat along with the durations of programmed interruptions to the applications of heat together with the applications of induced chilling at preprogrammed levels and frequencies create variables to the interrupted employment of the targeted pasteurization temperature to avoid coagulation of the fragile outer albumen. Those interruptions provide protection to the fragile composition of the outer albumen through promptly reducing its temperature from the pasteurization temperature setting being employed to one which is below that which causes the continuation of coagulation as is found in temperatures below 128° F. However while the outer albumen is being protected by the lower temperatures referenced the other elements of the chicken egg more specifically identified as the inner albumen, vitelline membrane and the yolk will continue pasteurization during the timeframe within which the outer albumen is being protected from heat damage through residing at temperatures below 128° F. albeit that the other elements will continue with uninterrupted pasteurization but at a lower pace. That described process at times is referred to as cyclical in nature because the temperature applied to the subject eggs has been elevated, leveled off and held for a prescribed time at the targeted pasteurization temperature which for these illustration purposes is selected to be 132.5° F. and subsequent to achieving the target log level for partial pasteurization and to avoid coagulation of the contents of the subject eggs the eggs are reduced in their temperature resulting from pre-programming of the timing and duration of the application of heat, its denial and replacement with induced chilling as measured in time to reflect the characteristics pertinent to that specific batch of eggs which provides for the protection of the outer albumen from heat damage by exposing and holding the outer albumen at temperatures below 128° F. which when the outer albumen has achieved the proper interruption to heat being applied causing coagulation the induced chilling is discontinued, controlled heated and purified water is reapplied and the pasteurization cycle commences again.

Notably and of significant importance to the new art is the discovery of the unique characteristics of the outer albumen as such may be employed successfully to create the ability to perform pasteurization of in-shell chicken eggs at levels of pasteurization which in the end through the protocol derived from that new knowledge enables inactivation of targeted pathogens to occur for the first time while preserving both the raw characteristics and nutritional benefits of the subject in-shell chicken eggs regardless of the level of contamination and the differing internal characteristics together with the outer albumen's unique composition and location within the subject chicken eggs giving cause to it having a higher risk of damage from over exposure to heat.

Most notably, the success of the cyclical nature of the pasteurization protocol employed is dependant upon the outer albumen remaining free from heat damage which under all prior art gave cause to unwanted coagulation of the outer albumen in all applications of the protocols employed even when those applications never reached reliable inactivation of either all *salmonella* strains or levels of *salmonella* contamination as commonly occurring within chicken eggs and requiring inactivation levels up to 10-logs. The discovery of the role of the outer albumen as influenced by its limitations to heat tolerance is the key ingredient discovered to enable a protocol to occur which in the end enables pasteurization of chicken eggs to provide for total inactivation of targeted pathogens without loss of the raw characteristics as found within a raw chicken egg. That discovery creates the foundation for the described cyclical application of heat together with its denial which provides for the protection of the outer albumen against heat damage which enables the new and unique ability to perform the level of pasteurization which successfully inactivates targeted pathogens customarily found or expected to become found within chicken eggs.

Notably, within the formula employed the timed duration of the reduction of heat from the targeted pasteurization temperature selected is based upon the heat tolerance of the outer albumen. Once that protection is secured the cycle of the application of heat and its denial up to and reduced from the targeted pasteurization temperature employed is resumed and repeated until the targeted log reduction of the targeted pathogen has been achieved. The described typical application of heat and its denial protects each element of the egg and most particularly the outer albumen from coagulation. However, notably and significantly, that extra step of intermittent application of heat and its denial uniquely allows for log levels of targeted pathogens providing for total inactivation of all targeted pathogens to occur. At that point the subject eggs optionally may be provided with a final application consisting of a food-grade antibacterial agent which is applied to the eggshells and their exposed pores. The continued contraction of the internal egg draws the mentioned food-grade antibacterial agent into the subject eggs through its exposed pores which provides for an extra level of certainty that any stray pathogen surviving is inactivated. The application of the food-grade antibacterial agent to the exposed eggshells and its pores applied while the eggs continue to contract internally is followed by the application of a food-grade sealant to the exposed eggshells along with their exposed pores which by preference can be either a food-grade wax or a food-grade plastic. Such is applied while the eggs are continuing to contract internally which provides for a more perfect seal and protection from outside risks which unless the eggs are physically damaged will continue to protect against recontamination from their exit from the medium through to the point of consumption.

In essence all of the above steps and the ingredients outlined in combination represent a unique protocol which includes the employment of unique features to be performed within an equally unique medium which provides for pasteurized eggs to exit from the protection provided within the pasteurization medium having achieved total inactivation of targeted pathogens without risk of recontamination from point of pasteurization to table excepting for mishandling or unavoidable damage.

A second primary claim within Claim 1 refers to a new and unique vehicle for pasteurization of in-shell chicken eggs that is referred to as the pasteurization medium which periodically may be referred to as the medium.

The second area of primary inventiveness includes a new and unique medium as referenced above within which pasteurization of chicken eggs is performed under secured conditions which protect the subject eggs from both contamination occurring from internal sources within the medium and separately from recontamination occurring post exit from the medium.

The medium which is new to the art of pasteurization as described herein is self-secured and contains a combination of features which result in a new and separate art that enables the previously described pasteurization protocol containing its cyclical applications of heat and their denials to be employed. Once the new art has been employed within the security of the medium which protects against recontamination of the pasteurized eggs from time of entry into the medium through to their exit carrying with them at exit the benefits of the achievement of inactivation of targeted pathogens resulting from the hereinbefore described protocol employed the subject eggs are provided with a final rinse of an approved antibacterial agent exposed pores of the eggshells. That rinse contains only a food-grade antibacterial agent which is drawn into the contracting eggs through their exposed eggshell pores while still ambiently cooling within the protective environment of the medium. That step is followed by the application of a food-grade protective sealant which provides protection against recontamination from point of exit from the medium through to consumption. Importantly the mentioned self-secured features of the pasteurization medium are both unique and enable full protection from risks of airborne contamination present or attempting entry into the secured environment of the medium where pasteurization is occurring. Both the mentioned airborne contaminants combined with manure and other impurities frequently attached to the chicken eggshells post rinsing prior to pasteurization under prior art provided for sources of continuing contamination of the eggshells post pasteurization resulting from the transfer of pathogens through the exposed eggshell pores into the internally contracting chicken egg while cooling post rinsing. Under prior art the residual contamination carried upon the unclean eggshell not only found a source of entry into the subject chicken egg through the shell pores but also added to the level of contamination present within the subject egg which separately or in combination in large part survived pasteurization for two primary reasons. First, a 5-log level of inactivation of Se as approved by the US-FDA as the agency of jurisdiction as manifested through its sponsored Egg Safety Rule of 2009 continues to be inadequate to satisfy the needs of total inactivation of either *salmonella* in all strains or viruses in all strains existing or anticipated to come to exist. Secondly, as the eggs expanded through the heat being applied during pasteurization the contamination present within the eggs prior to pasteurization as well as the contamination attached to the eggshells having flowed into the eggs when rinsed externally usually at the producing farm level created a large concentration of pathogens present within the pores of the shells, inside the shells as well as between the two inner membranes contained within chicken eggs. Under prior art as the in-shell eggs internally expanded during the pasteurization process massive quantities of contamination containing *salmonella* cells already located within the eggs themselves as described were released by force of expansion of the inner contents of the chicken eggs into the atmosphere through using the eggshell pores as their means of exit. Experience gained confirms that even were an increased level of a negative atmosphere to be employed within the presence of the open environment of the pasteurization process employed such would be inadequate to provide absolute and permanent discharge into the atmosphere of all of the pathogens effectively being exhaled from the quantity of eggs undergoing pasteurization concurrently. That phenomenon once uncovered gave urgent cause to provide all of the subject eggs whether contaminated or recontaminated with *salmonella* to be inactivated before ambient or induced cooling occurred for reason that when ambient cooling occurred the mass of eggs through concurrent internal contraction of the large quantities of eggs created a current which attracted inordinate airborne quantities of *salmonella* cells to relocate themselves onto the eggshell pores. That combination of events gave cause to potentially all of the eggs to be contaminated. That level of risk of recontamination was traced back to a brief timeframe which occurred from the time lapse occurring between the eggs exiting the pasteurization medium and being sprayed within a matter of three minutes with an antibacterial agent to avoid the recontamination which in the end occurred.

Notably and significantly it was learned that no practical quantity of a negative atmosphere within the facility where pasteurization was occurring could be relied upon to avoid recontamination. Thus, the protocol employed not only utilized the now known inadequacies of a pasteurization protocol employing a 5-log level of inactivation of *salmonella* as measured by Se but also failed to inactivate *salmonella* present which exposed the eggs subjected to pasteurization to recontamination. Eventually that problem became compounded by the discovery that the industry by practice rarely cleansed eggshells properly and rarely provided deep chilling promptly and continuously without consequential interruptions from farm to table. The crowing blow to the unfortunate chain of events described was the discovery that the 5-log level of inactivation of Se as set by the US-FDA at the request for a standard to be set by this inventor, Davidson, in 1997 was in error in that he was advised that a 5-log inactivation of Se would qualify for the elimination of the 'Safe Handling Instructions' required on raw egg cartons which would be replaced with the display of the term 'PASTEURIZED' It was only after Davidson went to market with his product in 2001 that he learned that without publicity of any nature the requirement for pasteurization of liquid egg product had been lowered from 10-logs as established in the 1990's by the USDA to 4-logs as measured by *salmonella* in the strain of Se for reason that the form of processing employed could not provide for that level of inactivation of *salmonella* without coagulating the liquid egg product being processed. That requirement was changed under the US-FDA sponsored Rule of 2009 to match the 5-log level of inactivation required for in-shell eggs. Notably, a 5-log level of inactivation of *salmonella* bacteria occasionally but not reliably can be accomplished at 5-logs providing that the eggs are fresh and are provided with a 5-log level of inactivation within four days of lay. Significantly and of great importance to public health the US-FDA authored and sponsored the Egg Safety Rule of 2009 within which it specifically identified known to be and so marked to be highly-*salmonella* contaminated chicken eggs to be allowed to be pasteurized to a 5-log level of inactivation and to be included through co-mingling into liquid egg product which also allowed for a claim of pasteurization along with no indication to the public that a health risk existed through lack of hard-cooking. Similarly the 'Safe Handling Instructions' were eliminated from in-shell pasteurized egg cartons and the term 'PASTEURIZED' was approved for those egg cartons.

The obviousness of the accommodations to the liquid egg product industry to allow known to be and so-marked to be highly contaminated chicken eggs to be included within liquid egg product without notice to the public that the subject eggs when consumed must be hard-cooked clearly has cost tens of billions of dollars and untold amounts of avoidable misery to the consuming public throughout the time since the 4-log level of *salmonella* inactivation of liquid egg product was initiated.

The above issues concerning the public's health and pocketbook are compounded both separately in statistics and costs by more flagrant abuses both long practiced and continuing.

As recited under the above section entitled 'Background to the Invention' for illustration purposes only the cost of limited consumption i.e. six-one egg servings annually consumed in a liquid form by risk group members when less than hard-cooked will cause an equal amount of illnesses. Using the reduced cost per illness for persons of ordinary health as reported by the US-FDA and the US-FSIS as being $20,000. per illness and using the published number of persons contained within high risk groups as being 150.0 million persons the associated annual cost for the described population consuming a small fraction of the eggs annually contained within co-mingled liquid egg product would provide for an avoidable annual public cost of $18.0 trillion. A separate and distinctly different statistic reported by a group of experts whose organization is entitled NERO reports that slightly more than two Grade B eggs are allowed to be co-mingled into in-shell chicken egg cartons containing labels of being Grade A or Grade AA. Grade B eggs are known throughout the industry to be of inferior quality and most frequently older age and include eggs from flocks carrying *salmonella*. These generally inferior eggs at a level of approximately 18% per dozen are allowed to be passed through to the public at large under the label Grade A and Grade AA together with 'Best By' dates carrying 30 days from the date of packaging although repackaging is also allowed. As discussed under the above section entitled 'Background to the Invention' using the equivalency of one of the two eggs allowed in each dozen to be Grade B eggs as causing illnesses when consumed as infrequently as three separate servings annually by the general population that one egg of two eggs allowed to be mis-marked in each dozen consumed on average once every four months by the general population in less than hard-cooked form likely would cause illnesses costing on average $20,000. each totaling $19.2 trillion annually.

Significantly, using only the annual costs of the two referenced sources of illnesses from chicken eggs absent of several additional illustrations available such would provide for an avoidable public cost of $37.2 trillion annually which looking at it from one perspective only is adequate to retire the national debt, pay for national healthcare together with major medical for all members of the population, fund over a two year span the unfunded debt held by the country and double the military budget for homeland security needs as well as gaining preparedness for homeland defense through increases regarding same not only to the military budget but also to provide protection against such other risks likened to and including cyber warfare.

As an analog to the above the level of pasteurization required for the inactivation of viruses is materially greater than that of *salmonella* as found within the Se strain. Consequently the level of inactivation achievable under the new art of pasteurization described herein is accomplished through the novel method of intermittent applications of heat and its denial enabling total inactivation of the targeted pathogens together with performing such within a uniquely secured environment remaining pure from the initiation of pasteurization through to its completion which result is achieved under the novel art claimed herein. Those features are new and unique to the art being described, and their use in combination with each other is equally unique. When employed together those two primary areas of inventiveness as applied to in-shell chicken eggs provide for a total inactivation of the targeted pathogens regardless of whether the level of inactivation is higher or lower than that required for current pathogens which may over time become more heat resistant and require still greater levels of heat for their inactivation whether bacterial or viral.

The isolated environment for pasteurization provided by the new medium contains specifically designed features which in combination enable the unique achievement and maintenance of a level of protection which is total. That totality is provided by the isolation of the subject eggs from all external exposures to contamination or recontamination from commencement through conclusion of pasteurization containing the new art which enables total inactivation of targeted pathogens. That achievement together with the induced ambient cooling of the subject eggs post having received a protective sealant while still within the protective environment as provided by the unique design of the medium provides for a new protocol that uniquely eliminates well in excess of 1.0 million illnesses annually through the inactivation of the pathogens both historically and forecasted to continue to cause those illnesses at either the chronic level experienced or in a magnified level stemming from a pandemic.

For further clarity the subject eggs during pasteurization are placed within a medium containing unique features which include the elimination of all risks of preexisting contamination and all risks of recontamination for reason that the pasteurization process both commences and terminates within a uniquely-designed medium that provides for certainty that the integrity of the sealed and controlled environment which through automation is continuously cleansed and remains secure from inception of pasteurization through to completion. The protocol employed from conception to completion of pasteurization is performed within an isolated environment that is not breached until the eggs are fully pasteurized and fully protected against recontamination through application of a food-grade sealant to their shells and only then are the subject eggs allowed to be exited from the described secured environment.

No known reliable resolution to the issues of total inactivation of *salmonella* in all strains and viruses in all of their strains as may be or come to be found within chicken eggs except through hard-cooking the subject eggs or cooking at the least to a level which included material losses of natural flavor and raw characteristics i.e. functionality and aesthetics excepting for the new art described and claimed herein is known to exist.

The new art claimed herein not only provides for full inactivation of both *salmonella* as a pathogen and viruses also as a pathogen but also uniquely provides for a level of inactivation which is statistically qualified to be considered complete. Through the new discoveries described herein which include both the medium for pasteurization and the uniquely high levels of pasteurization the ability to achieve complete inactivation of targeted pathogens is of particular importance to the 150.0 million persons identified as having compromised immune systems.

Further to the above under the new art and separately from the pasteurization protocol referenced above as being and integral part of the new art but of equal novelty and importance the environment of the pasteurization medium has been isolated as new art and together with the benefits of new and innovative protocols employed provides for the risks of recontamination to be eliminated.

The referenced areas of new inventiveness described and claimed herein fulfill the need to destroy viral contamination as currently found or may continue to evolve and to become found within chicken eggs. The threat to public health from viral contamination of chicken eggs is confirmed by the scientific community as being real, present and already to have occurred in the years spanning 2009 and 2010 which in the United States caused 12,000 deaths and infected more than 60 million people. Further threats of a pandemic are confirmed by test results from studies identifying certain virus strains having evolved into more deadly strains which enable or carry with them strains of Avian Influenza that have the ability to be transferred from human-to-human either by direct contact or through the air. Those mentioned abilities of the new virus strains to transfer illnesses from human-to-human have laid the foundation for a pandemic to spread more rapidly and widely due to their ability to transfer from human-to-human, but in the absence of such ease of transfer nonetheless will impact upon the health of millions.

Through current reports delivered by the scientific community within 2013 a collection of scientists concluded that the evolution of viral strains enabling human-to-human transfer of the influenza virus capable of causing a pandemic already has occurred and is continuing to evolve into a form with increased deadliness stemming from the H5N1 virus as one of several viral sources which in the case of the H5N1 already is responsible for international deaths ranging from Europe to the Far East. The forecast that the evolution into still more deadly strains containing even greater ability to be transferred from human to human are confirmed by on-going studies resulting in forecasts from the international scientific community which opines that it is only a matter of time that viruses will continue to adapt in a manner which will expand their current ability already only intermittently achieved to transfer illness from human to human which if continued to progress will give cause for the already forecasted pandemic to occur. The World Health Organization (WHO) is monitoring the surrounding circumstances and has confirmed that the mentioned Avian Influenza-caused pandemic in a materially greater proportion will occur, and it is only a matter of time as to its arrival. That forecast has been reinforced by viral contamination of chicken flocks within the United States during the spring of 2015 giving cause for the slaughter of tens of millions of chickens carrying viral contamination whose source is related to the H5N1 virus.

The scientific community agrees that the migration of humans as well as the migration of birds will enable rapid transfer of the virus which also will enable the speed of the spread of illness to be massive and global in scope.

No record has been uncovered which confirms the quantity of illness numbers caused by the use of cool, dirty or contaminated rinse water used on eggshells produced for either liquid product or in-shell egg end uses although the science teaching the benefits of the use of warmer water for rinse has long been known and recommended. Notably when lower temperatures are employed for rinse water as used within the United States to cleanse chicken eggshells having a warmer internal egg content the cooler water employed will aid in causing contamination to enter co-mingled, recirculated or repackaged eggs than when the rinse water temperature is warmer than the internal egg temperature when applied. In furtherance to the above contamination is both magnified and spread within the contents of a chicken egg when the quality of the eggs is poorer as caused by extended age and increased levels of contamination as may be aided in the proliferation and spread of contaminants from the contaminated wash water employed. Notably, at least within the United States it is common practice to allow known-to-be contaminated chicken eggs stemming from an environment of uncertainty of age and the temperature at which the subject eggs were stored to be co-mingled with fresh eggs whether in-shell or liquid egg product in their end use and if pasteurized at all the allowable level to claim pasteurization is 5 logs as measured by Se. Globally scientists have confirmed that a 5-log level of inactivation of Se as contained within a chicken egg exceeding more or less 5 days from date of lay will multiply into levels of contamination requiring far greater levels of inactivation than that which a 5-log inactivation level provides.

With notable pertinencey the original science contained a 10-log level of inactivation of *salmonella* as found within chicken eggs which was relaxed to accommodate the economics of egg producers over the health benefits to the public.

Since the year 2013 the US-FDA and the US Department of Health and Human Services have been working with foreign companies located in Canada and France in testing vaccines which are intended to be useful in protecting the public from the H5N1 virus which is recognized to be the leading potential source of a pandemic associated with Avian Influenza. However, since the H5N1 virus continues to evolve the vaccine development too is evolving and is being stored for potential need was such to occur prior to the research being in its final form. The lack of a final determination of the strain or substrain of the virus requiring a vaccine adds to the benefits to be derived from a pasteurization protocol for chicken eggs which eliminates the viral pathogens giving cause to the vaccine development as such relates to the portion contributed by contaminated chicken eggs which for 40 years or more annually have been recognized to be the leading source of illness from a food source.

It is known that viruses are more heat-resistant than are bacteria. The new inventiveness described and claimed herein addresses the vulnerability to heat as a vehicle for inactivation of both bacteria and the more heat-resistant strains of viruses which exist or may come to exist within the described threat to public health resulting from their evolution which in the end gives cause for the already forecasted pandemic to occur.

In regard to the inactivation of viral strains as may be found within chicken eggs which would give cause to a pandemic as potentially enhanced by human-to-human transfer resulting from instances already of record the new art contained within the inventiveness described provides for the inactivation of the more heat-resistant viruses over that of *salmonella* strains as found within chicken eggs through employment of new formulas enabling inactivation which enable the application of heat without consequential damage to any one of the primary ingredients of a chicken egg. Those elements are identified as the outer albumen which consists of the thinnest substance in its composition. The second element consists of the inner albumen which has a more dense substance than the outer albumin and is visually identified when an egg has been opened by being the second most inward of two concentric circles and as having a greater depth than the abutting outer albumen. Flowing inward from the inner albumen toward the yolk and abutting the yolk is the third element of the three albumens associated with the chicken egg. It is identified as the vitelline membrane. The vitelline membrane is attached to the egg yolk which has a fatter composition and when the egg is opened it visually is seen to be elevated above the other two mentioned forms of albumen.

The rate of heat transfer and heat loss follows the order and the distinguishing physical elements within an egg as described above which also provides for differing rates of heat gain and heat loss consistent with each element in that same order. Since the outer albumen contains the thinnest substance and is located closest to the eggshell and the heat transfer employed for pasteurization or preheating as employed prior to pasteurization is applied first to the eggshell, the heat supplied whether through a water bath which is not preferred or a spray or a mist of water directly to the exposed eggshell which is preferred may include purified air as an equal alternative to a spray of water in all of its forms which can be preheated and enhanced by enhancing agents such as ultraviolet or other enhancing agents approved by agencies of jurisdiction for food-grade uses as a precaution against contamination or recontamination as applied to the exterior of the eggshell in a manner which enables all of the exposed shell to receive effectively equal exposure to the described water or air in any referenced form which may include air separately from water in combination with supplemental purification agents previously noted. Those protocols are followed by programmed temperature changes both promptly and totally provided to all of the exposed eggshells. The water temperature changes are programmed to be at a temperature setting above 128° F. for pasteurization to occur. The temperature setting for the purposes of this illustration may be 132.5° F. which is subject to various modifications as is recited in greater detail under the 'Detailed Description of the Invention'. Excepting the outer albumen the total pasteurization cycle provides for all elements of the egg to maintain a temperature at 128° F. or above throughout the pasteurization cycle as enabled by their rates of heat transfer and heat loss which are not the same but do contain a tolerance level of differentiation which provides for similarity of exposure to heat and its denial without damage to any singular element of the egg. The one exception recited is found to be within the application of heat and its denial as applied to the outer albumen which is the least dense element of the egg in its substance and is also the speediest in responsiveness to heat gain and loss. As a result of the analysis and discovery of the varying characteristics found between the different elements contained within a chicken egg as to their distinguishing differences it has been learned that those distinguishing differences create variables between the elements as such relate to differing rates of heat transfer, heat loss, heat tolerance and potential coagulation. The new art takes advantage of the above-described distinguishing differences between the mentioned elements of the egg and converts that new knowledge into a vehicle for providing egg safety through pasteurization at levels of inactivation of targeted pathogens which may be new, unique and provide equal levels of statistically total safety from both *salmonella* and viruses to the consuming public and most particularly the nearly 45% of the population which is identified by the Government as having compromised immune systems a/k/a members of the sometimes-identified High Risk Group. All of the above is provided without consequential loss of the functional characteristics of a raw egg as well as substantially maintaining the aesthetics of a raw egg. Notably, the nutritional values of the subject eggs are retained which is in direct contradiction to all alternative processes which employ in part or in whole sterilization.

A significant element within the new discoveries is the important discovery concerning how to convert the composition of the outer albumen together with its location being nearest to the exterior of the egg into beneficial use with regard to controlling heat transfer that would enable higher levels of pasteurization to be achieved without material coagulation of any one element of the chicken egg. It was discovered that the rates of heat gain and heat loss as being more rapid within the outer albumen was convertible into becoming the control point of when heat application could be terminated to avoid coagulation of the outer albumen. The discovery of the application of heat being controlled at multiple temperatures within time frames dictated specifically and singularly by the characteristics of the outer albumen is a critical element for achievement of successful pasteurization which totally inactivates targeted pathogens that previously never has been available without damage to the raw characteristics of a chicken egg. The discovery described regarding the outer albumen enabled the other elements contained within the egg i.e. inner albumen, vitelline membrane and yolk to continue pasteurization without damage to their raw characteristics because of their respectively lower rates of heat transfer due to their denser compositions and more remote locations to the heat source than that of the outer albumen. Those discoveries enabled a formula to be created that was adaptable to log levels targeted and adjusted to accommodate such things as the impact of the egg size among other factors known to those skilled in the art which include but are not limited to seasonal changes in egg water content, effects of altitude to the subject eggs together with other influences upon the chickens' environment which collectively or separately influence the duration of heat application to perform pasteurization to a selected log level which provides for total inactivation of the targeted pathogens without damage to the raw characteristics of the subject chicken eggs. All of such has been made available by the discovery of the use of the outer albumen together with its unique differences in its speed in reacting to heat gain and heat loss as measured by its relative comparison to all other elements within the chicken eggs being slower but differing from each other in those same areas which include speeds of heat loss and heat gain. The studies of the uniqueness described of the outer albumen as related to the speed of heat loss and heat gain enabled the creation of a new and unique formula containing variables which accommodate the differing characteristics of each element recited as being within a chicken egg and to employ that new knowledge into the creation of a new formula for pasteurization which resulted in the inactivation of the targeted pathogens whether bacterial or viral uniquely absent of damage to the raw characteristics of any element of the chicken egg. Thus the discoveries contained within the new art include the control of the application of heat and its denial as taught by the discovery of the uniquely different sensitivity levels to heat as found within the outer albumen and the management of that new knowledge through applied practice levels of pasteurization performed through the applications of heat together with intermittent denials of heat to the subject chicken eggs which also provides for the avoidance of coagulation of the outer albumen which enables the achievement of a minimum of a 10-log inactivation of targeted pathogens that includes all strains of *salmonella* as commonly found within chicken eggs together with the inactivation of viruses which currently are evolving and providing a threat of a pandemic conveyed in part through the viral contamination of chickens and their eggs. The preferred form of the described art includes induced chilling to lower the temperature of the outer albumen more rapidly when the intermittent chilling is programmed. Such provides for tighter controls over the variables occurring between the different elements contained within a chicken egg during pasteurization which in the end can be tailored to produce efficient timeframes that convert into lower cost of product for the public to benefit from along with the benefits of avoidance of large quantities of costly illnesses. By doing such in the manner outlined under the 'Detailed Description of the Invention' section the protocol provides for levels of pasteurization as measured in pertinent logs to the targeted pathogen to achieve total inactivation of the targeted pathogen selected. Notably, the achievement of inactivation of targeted viruses automatically inactivates all strains of *salmonella* known to be present within chicken eggs. Although each element described to be found within the chicken egg is not identical in heat tolerance enough flexibility exists within each element to allow for the targeted log reduction to occur without damage of consequence to any one element giving cause for its loss of raw characteristics were overshooting of a targeted log reduction to a modest extent to occur involving any particular element containing a need for additional exposure to the heat applied for targeted inactivation. For further clarity the new art demonstrably has a flexibility through adaptation of adjustments to its heat and cooling cycles to expand its capabilities to accommodate the inactivation of new strains of either viruses or bacteria which would require additional logs over those logs currently required for inactivation of either or both those named pathogens and their current derivatives. As described in detail above the outer albumen is the one exception. However, due to the outer albumen's unique characteristics of having accelerated rates of heat gain and heat loss over all other elements of the egg and using those unique characteristics collectively as the point of control of the protocol employed tests confirm that targeted log reductions providing for the total inactivation of virus strains as found to be present within chicken eggs are available even were such targets to exceed 10 logs as measured by viruses. The new art contains an important discovery of how to avoid damage to the fragile and heat-sensitive outer albumen as caused by heat. Such is accomplished through the use of the intermittent applications and denials of heat which provides for the benefit needed to avoid damage to the outer albumen while at the same time providing for continuous and uninterrupted pasteurization of each of the other elements contained within the chicken egg as made available through their slower reaction times to the application of heat and its denial as provided by their greater densities. Such programmed applications and denials of heat continue until the targeted log level for the inactivation of the targeted pathogen has been achieved. Notably as applied to both *salmonella* and viral contaminations the US-FDA originally set a log level of '4' for inactivation of Se as found within chicken eggs which under the Rule of 2009 became a 5-log inactivation of Se for both liquid egg product and in-shell chicken eggs.

For further clarity under all of the described applications whose details are further discussed under the 'Detailed Description of the Invention' section that section addresses such matters as exposure times at different temperatures and most significantly addresses security from recontamination which has never been achieved on a reliable basis under all prior art.

Notably as discussed earlier but worthy of repetition the new art contains two separate primary discoveries. When employed in tandem they provide for the achievement of total inactivation of targeted pathogens which for the first time includes viral contamination as found within chicken eggs as described above as well as notably and uniquely containing a protocol which effectively provides for the total protection against recontamination. The one exception to the above regarding the presence of a virus within chicken eggs relates to the H3N1 which when present within a chicken egg gave cause for protective actions to be performed which were the same as those performed when *salmonella* was found to be present within chicken eggs. What occurred was that the flock would be destroyed, the eggs would be diverted into pasteurized liquid egg product and the hen house together with all associated equipment would be cleansed before use by a new flock. Notably the H3N1 virus was treated in the same fashion as *salmonella* if employed within liquid egg product i.e. for decades co-mingled and pasteurized to a 4-log level using *salmonella* as the measure when in fact the virus long has had greater resiliency to heat than does *salmonella*. That issue was compounded as a threat to public health by the inadequacy of the 4-log pasteurization of liquid egg product employing Se as the targeted pathogen which was neither the most heat-resistant strain of *salmonella* nor was it inactivated at 5 logs when cell counts frequently exceeded the capabilities of inactivation employing a 5-log protocol for reasons discussed in greater detail herein before. Significantly, under the Rule of 2009 the log level for *salmonella* pasteurization was raised to '5', and official references to the H3N1 virus disappeared.

Through success of the mentioned inactivation of the pathogens as found within chicken eggs such will provide one major avenue for the speed and spread of the pandemic to be blocked by the new inventiveness discussed herein which effectively enables the total inactivation of the targeted viruses or bacteria through the employment of heat while at the same time preserving the chicken egg as a needed food source. Such is enabled by the application of heat to the targeted chicken egg to a level never before achieved which provides clinical levels of safety while at the same time retaining the nutritional and raw characteristics of a chicken egg and preserving its continued use as a food ingredient at a time of necessity when food that is safe is in short supply.

Notably and significantly within the United States alone the preservation of chicken eggs as a reliable and safe source of food would provide for a supply of 7.260 billion dozen eggs produced annually as a source of both highly nutritional and safe food once processed under the new art provided for pasteurization of in-shell eggs which in part can be diverted post-pasteurization to satisfy the need for liquid egg products in their various elements i.e. whole eggs, whites only, etc. Separately the new art which enables total inactivation of pathogens through pasteurization within liquid egg product and in-shell chicken eggs at 5 logs as measured by Se enables 2.1 billion dozen of 7.260 billion dozen to be diverted into liquid egg products which already will have been inactivated at twice the level of what currently is required by the US-FDA under the Egg Safety Rule of 2009. Such would eliminate the costly risks to public health caused by the current level of inadequate pasteurization of liquid egg products being provided to an unsuspecting public.

In the course of destroying viral contamination which requires materially greater heat to provide inactivation than does *salmonella* bacteria which also is found to be a contaminate within chicken eggs the herein described and claimed new inventiveness effectively inactivates *salmonella* which has materially less resistance to heat than do viruses as currently found or may come to be found within chicken eggs.

Were the transfers of illnesses from human to human to occur through viruses whose new deviations already have been confirmed to exist as reported by the scientific community and reconfirmed through many scientific reports of record generated by the international scientific community agreement exists regarding a forecast that the foundation for a pandemic must be treated as already being present. Such validates the forecast as provided by WHO as recited herein before.

Notably the new inventiveness claimed herein not only provides for the total inactivation of *salmonella* as found within chicken eggs through greater applications of heat than previously considered practicable but also provides for the inactivation of viral contaminates found to be materially greater in their heat resistance when compared to *salmonella*. The fulfillment of the elimination of the cited risks notably includes the important elimination of the risk of illnesses and the spread of illnesses from human to human as may be caused by virally-contaminated chicken eggs when such eggs are consumed less than hard cooked unless pasteurized to a minimum of a 10-log level of inactivation as applied to viral strains. Although most viral strains which may be found within chicken eggs are known not to transfer illness from human to human the risk of a pandemic caused by the potential of new and already existing viral strains enabling human-to-human transfer of illnesses more aggressively require pasteurization to succeed in the inactivation and destruction of viral contamination with certainty. Since the scientific community has confirmed both the presence and the risk of a pandemic as stemming from Avian Influenza prudence dictates that instead of waiting for a more substantial pandemic to occur over that of the recited one of 2009-2010 an appropriate step would be to block in advance a major avenue of its spread by providing pasteurization to chicken eggs which under new art completely eliminates risk of illness from both viruses and *salmonella* while at the same time preserving the purity of the eggs together with their raw characteristics and nutritional values. The new art also is flexible within its protocol. Such enables consumer protection from mutations of existing pathogens whether viral or bacterial and new strains of both groups continuing to develop which would provide for their ability to materially increase the required heat to provide for their inactivation while at the same time preserving both the nutritional and raw characteristics of the subject eggs. All of the above additionally provides for the preservation of public health through protection of a basic food source as enabled by the new and unique technology described and claimed herein. Notably, the new technology uniquely provides for prevention from recontamination or new contamination as may occur from the unprotected environment found to be present post-pasteurization through to consumption.

From the above-discussed ability to inactivate viruses as found within chicken eggs it should be noted that in the absence of that ability the transfer of illnesses from human to human increases the threat to the public of a pandemic as conveyed in material part by the contamination carried through the presence of viruses within chicken eggs. That threat which is global in part can be eliminated through the statistical inactivation of the viruses as found or may come to be found within chicken eggs through the employment of totally destructive quantities of heat to rid the targeted eggs of viral contamination which at the same time inactivates all strains of *salmonella* which prior art has failed to accomplish on a commercial scale. Whether or not another pandemic occurs which may be more massive in its scope as was the case in 1918 the scope of illness as found from consumption of contaminated chicken eggs even on its current level as found through bacterial contamination together with the current new threat from viral contamination whether transferable from human to human or not warrants the benefit of safety for a public within which nearly 45% belong to a high risk group.

The described destruction or inactivation of the less heat-sensitive viruses targeted requiring materially greater heat for their inactivation than is required for the inactivation of all strains of *salmonella* as may be found within chicken eggs is enabled through new inventiveness providing for the methodology to manage the quantity and speed of heat transfer as determined from the teachings learned from the characteristics now determined to be unique to the outer albumen. Those discoveries concerning the thinner composition of the outer albumen as compared to the denser inner albumen and still denser vitelline membrane and yolk have provided teachings resulting in important new inventiveness based upon the knowledge gained regarding the differentials in heat transfer to and from the four mentioned elements as taught by the rate of heat transfer differentials and applying that new knowledge into a formula which enables an overall greater exposure of the total egg to heat than previously believed to be available without loss of the raw characteristics of the targeted eggs while at the same time achieving levels of destruction of viruses as measured in quantities of logs applicable to viruses necessary to enable their total inactivation. Since no strains of *salmonella* as found within chicken eggs require the quantity and duration of heat for their destruction as do virus strains the total inactivation of *salmonella* in all of its strains as found within chicken eggs automatically occurs through the protocol employed to inactivate any targeted virus strain which may be present.

The differential in heat tolerances as measured in logs as applied to both the H3N1 and the H5N1 viruses as compared to all strains of *salmonella* are confirmed by the USDA's own laboratory. Under the new protocol based upon the mentioned discoveries concerning the availability of greater application of heat a 12-log level of destruction of bacteria (*salmonella*) as found within chicken eggs is available to be utilized instead of the prior protocols employing more or less 5 logs which were marginally useful in the destruction of certain strains of *salmonella* as found within chicken eggs but notably not all strains nor all levels of contamination likely to be found to exist in part or in whole from date-of-lay through date-of-consumption. To those reasonably skilled in the art including those within Government agencies of jurisdiction it is common knowledge that no commercial enterprise previously has successfully managed to process *salmonella*-contaminated or virally-contaminated subject chicken eggs containing the H3N1 virus to a log level as measured by Se materially greater than 5 logs without negatively impacting upon the functionality and the aesthetics of the chicken egg while retaining its nutritional benefits together with its raw egg functional characteristics. Notably the mentioned 12-log level of Se inactivation is adequate to provide total inactivation of Se including the more heat-resilient strains of *salmonella* as found within chicken eggs as previously neither was used nor was recognized in the calculations employed. Were viruses to continue to evolve and to gain more heat resistance than 10-logs as applied to viral contamination the new protocol enables through its ability to apply heat intermittently and with pre-selected quantities of repetitions to inactivate materially higher log counts of virus cells as necessary to achieve total inactivation. The disparity for the inactivation between viruses and bacteria as found within chicken eggs is confirmed by the USDA through its Research Laboratory which has been using for study purposes up to a 2-log level of differential for inactivation of the H5N1 virus to equate to the less heat-resistant strain of Se. Example: A 5-log level of inactivation of the H5N1 virus equates to up to a 7-log level of inactivation of Se as per Dr. David Swayne of the USDA Research Laboratory located in Athens, Ga.

Notably the new inventiveness through its features also includes the cyclical and intermittent application of heat which includes a correspondingly cyclical denial of heat as its most critical features to enable the protection against coagulation of the outer albumen while at the same time enabling the continuing pasteurization of the denser inner albumen and still denser yolk to achieve the initial 10-log targeted inactivation of viruses when present. The mentioned cyclical feature of applying intermittent heat to the more heat-sensitive outer albumen as previously explained enables not only the achievement of the mentioned targeted 10-log inactivation of viruses but also provides for the ability to expand the inactivation of those viruses to higher log levels which satisfy the need to inactivate still more heat-resistant strains of viruses were such needs to occur. The cyclical feature of the new art provides for and relies upon the repetition of the application and denial of heat to the outer albumen. That feature enables the more heat-sensitive outer albumen to avoid damage by taking advantage of its more rapid heat transfer through the speed in which it benefits from heat discharge to avoid damage through cooking and loss of its raw egg characteristics as well as its nutritional values. Through fluctuation of the application of heat and the intermittent denial of heat to the outer albumen within a predetermined range and frequency the outer albumen only will be exposed to the heat providing intermittent pasteurization while the other denser elements of the egg can be programmed to benefit from continuous pasteurization as provided from staying within the temperature range within which pasteurization occurs i.e. 128° F. and higher.

For improved understanding of this feature of new inventiveness while carrying out the mentioned repetition in the application of heat providing for the protection of the outer albumen from heat damage it is necessary to control through the use of intermittent transfer of heat the quantity of heat being received by the outer albumen. That control is achieved by the intermittent denial and application of heat which benefits from the least dense composition of the outer albumen which provides for more rapid heat transfer than do other ingredients of the egg more specifically identified as the inner albumen, vitelline membrane and the yolk. The intermittent denial of heat usually can be performed more efficiently for both control purposes and improved economic purposes by use of induced chilling as well as overshooting when heat is applied.

Inherent to the processing of chicken eggs as anyone reasonably skilled in the art would know adjustments will be required to the length and intensity of heat exposure from the pasteurization protocol employed as is influenced by differing egg sizes, seasonal changes in water content, increases in levels of contamination caused by material differences in time lapses from date-of-lay to processing together with other elements which give cause to refinements to the art employed as caused by local conditions when employed. Those identified variables once learned will be included into a formula which automatically programs the number of cycles of time and variable temperatures required for a specific batch of chicken eggs to be pasteurized to a specific log level plus the duration of each element of the cycles described to achieve the beneficial results of total inactivation of the targeted pathogens without consequential negative impact to the raw characteristics of the subject chicken eggs. The described protocol provides for statistically total inactivation of all current and anticipated pathogens that may come to exist within chicken eggs which already have and will continue to place the public health at high risk of illnesses. That described high risk to the public is the result of pathogens in the current forms of viruses and bacteria continuing to evolve in the course of self-protection which in the end requires higher levels of pasteurization for their inactivation. Such is further complicated by the results of misinformation caused by human error as is demonstrated by underestimating the level of pasteurization required to totally inactivate *salmonella* within chicken eggs as followed by an equally flawed reliance upon prompt, deep and continuous refrigeration from farm-to-table as being both practicable and effective in the first instance. In the second instance the reliance upon deep refrigeration primarily was the result of the failure to achieve the mentioned 10-logs of inactivation of *salmonella* through pasteurization without damaging the raw characteristics of the liquid egg product. That resulted in a reduction of the level of pasteurization as measured in logs to 4 logs which practice was continued through 2009 at which time the US-FDA altered it from 4 logs to 5 logs which is where it has remained through the present.

Further to the above if the base level of inactivation of *salmonella* is flawed at the 5-log level and as previously explained the ratio between inactivation of *salmonella* as measured by Se and the current inactivation level of viruses as now found to exist within chicken eggs carries with it a 2-log differential the whole premise of what level is to be targeted to inactivate either or both *salmonella* and viruses using *salmonella* inactivation as the measure becomes uncertain and opens the door for greater risk of illnesses for the consuming public through the uncertainty that the targeted pathogens in fact have been inactivated. That uncertainty is answered within the original level of inactivation of *salmonella* provided under the Egg Products Inspection Act of 1970 within which the inactivation of *salmonella* as found to be present within chicken eggs was determined to require up to a 10-log level of inactivation to enable co-mingled liquid egg product to be free from *salmonella* contamination.

In 2013 unpasteurized egg cartons changed their 'Best By' dates materially and changed that date to be thirty days. With only interrupted refrigeration available from farm to table in actual practice a more than adequate timeframe is provided for a lethal contamination count to occur within the subject chicken eggs capable of causing illness or death to the consumer particularly if that consumer belongs to one of the high risk health groups. Such is supported by studies which confirm the rate of multiplication of the referenced pathogens to achieve quantities present within a single egg whose numbers reach hundreds of millions of cells in a matter of days using only a base contamination level of 3 *salmonella* cells at time of lay. Notably the referenced number of days enabling multiplication of *salmonella* cells into counts measured in millions are materially less in number than the quantity of days found between the date-of-lay through the published date identified as 'Best By' as currently displayed on egg cartons. That seemingly available and modest misrepresentation as to the 'Best By" date provides for an equivalency of anywhere from one week to six weeks added to the age of the eggs before consumption. The timeframe from lay to consumption as applied to either interrupted deep chilling, high levels of *salmonella* contamination present at time of processing, resulting from repacking with new dates as currently allowed in combination or separately are not cured by deep chilling which at best if continuous without interruption retains the initial level of contamination which already may be lethal. Hence, pasteurization claims employing less than 10 logs as applied to Se for either liquid egg product or in-shell chicken eggs whether pasteurized or raw misleads the public into a clear path of illness and even death from *salmonella*-caused illnesses. The above problems recited are further compounded by the content of reports provided by the Legal Department of the USDA carrying a date of November 2012 within which the frequency of contamination reported by the US-FSIS as being one egg in 277,000 was corrected and reconfirmed to be one egg in 20,000 as being contaminated. The US-FSIS also through prior studies treated the mentioned one egg in 20,000 not only as being contaminated by *salmonella* but also as giving cause to an equivalent number of illnesses. Notably and separately, a study of experts identified as NERO recently published a troubling report which included the currently-allowed uses of between three (3) to four (4) Grade B eggs to be included in a dozen of so-mark Grade A chicken eggs. Also according to NERO the mentioned Grade B eggs were not only substandard to the extent that they should have been taken off the market but also may have been carrying with them a level of *salmonella* contamination which exceeded the capabilities of current arts of pasteurization targeting 5 logs of Se as the level at which undercooked eggs were safe to consume whether in liquid form or within a shell. In separate reports Grade B eggs are defined as containing high levels of *salmonella* contamination. Further, studies confirm that the practice of collecting unsold eggs which may or may not have had the benefit of prompt, deep and uninterrupted refrigeration continues to be allowed to be repackaged and to receive a new 'Best By' date which when contaminated to begin with may by the time of consumption enable a contamination level exceeding one hundred million cells of *salmonella* to be present in each egg.

Notably and of significant importance under the protocol of the new art described and claimed herein the management of the exposures to temperatures and their duration as applied to each of the internal elements of a chicken egg during pasteurization utilizes the differential in densities of the outer albumen with those of the inner albumen, vitelline membrane and yolk in order to take advantage of the differential in the rate of heat transfer within which each element differs. The newly-discovered beneficial uses of those differentials in the speed of heat transfer to and from the named elements as arranged in their natural order within which the inner egg is composed and its application into a beneficial formula never before reported as utilized enables the achievement of higher levels of pasteurization as measured in logs without damage to the subject eggs in terms of aesthetics, functionality and nutritional benefits. That new and novel achievement provides for complete statistical public safety from illnesses caused by contamination of chicken eggs through either or both viral and bacterial sources. Such is accomplished in material part by using the time lag between the vitelline membrane and the yolk as compared to the time lag required for heat transfer as found within the inner albumen and to a greater extent the outer albumen which consists of substances that vary in their density giving cause to the need to apply or deny heat in temperatures and durations at rates tailored to those preexisting conditions. Notably the denser substances require extra time over the thinner outer albumen to gain or to lose temperature depending upon whether heat is being applied or denied. Because the vitelline membrane and yolk respond materially slower to heat change than does the outer albumen the outer albumen which consists of the least dense substance of all elements contained within an egg reacts with greater speed to heat or its absence than do those mentioned denser elements which respond more slowly to the application of heat and its denial albeit at differing rates consistent with their mentioned natural order. Notably most prior art if not all when attempting pasteurization is limited in the log achievement to the level of inactivation of Se through the need to avoid coagulation of the outer albumen as may be followed by each of the other elements recited. Thus, the new art uniquely employs within its protocol the outer albumen as the basis of control for the amount and duration of heat applied for pasteurization through the novel benefits provided from intermittent application. Under the new art the variances involving heat loss and heat gain are computed and converted into a formula to satisfy the differing requirements for total inactivation of pathogens through adjustments of the variables outlined and discussed concerning the elements contained within the composition of chicken eggs and the impact upon the subject eggs caused by those variables during any pasteurization protocol employed in order to achieve the new and unique levels of inactivation of pathogens while at the same time preserving the raw benefits of the targeted chicken eggs. The referenced variables include the physical characteristics of the subject chicken eggs, their environment and their targeted level of pasteurization together with the specifics of pathogens targeted as such relate to heat transfer.

The new art provides for expansion and contraction of the base protocol employed to accommodate not only the peculiar needs through heat inactivation of different pathogens without damage to the raw characteristics of the subject chicken eggs but also incorporates flexibilities within the base protocol to allow for natural features impacting upon the time and temperature regimes employed as would be known to those skilled in the art and as further influenced by material differences in egg water content, altitude as affecting heat transfer requirements, egg size and in the end the targeted log reduction through the employment of formulated time and temperature exposures. For emphasis and certainty of clarity the outer albumen is the first in terms of time lapsed to react to heat gain or loss. The composition densities as contained within the vitelline membrane and yolk gives cause for them to be the slowest in terms of time lapsed to react to heat gain or loss. The understanding of the natural order of the mentioned separate elements within the subject eggs together with the understanding of their composition and relative rates of heat transfer together with their differing speeds of reaction to temperature changes as now understood under the new inventiveness described herein has been converted into a practical formula targeting the inactivation of pathogens as opposed to the inadequacies of prior art to provide such results. The new protocol which uniquely provides for absolute inactivation of targeted pathogens as found within chicken eggs is better understood through the collection of facts only learned and applied under the new art as now recited in detail for clarity of understanding.

Under prior art the achievement of a 5-log inactivation of Se was set by the US-FDA in 1997 at the request of this inventor. Achievement of that level of pasteurization as set by the US-FDA enabled a claim to be provided to the public that the product was 'PASTEURIZED' which in turn clearly implied safety. It since has been learned and confirmed by agencies of jurisdiction that the mentioned 5-log level of pasteurization frequently has been inadequate to inactivate not only *salmonella* strains but also viral strains which since have become a substantial new threat to public health.

The current art claimed herein uniquely succeeds in protecting the raw features as found within the outer albumen of a chicken egg to provide protection of that substance from coagulation which otherwise would not be useful as applied to uses typical of raw eggs.

Notably, the new art for the above-cited reasons employs the outer albumen as the control point whereas prior art utilized the yolk as the point of measure to prove that the targeted 5-log inactivation of Se had occurred. In the absence of protecting the outer albumen from coagulation through mentoring and controlling its heat gain and loss within pre-determined temperature parameters as impacted by both the nature of the source of the heat applied and the measured impact upon each element described within the composition of the subject chicken eggs together with adjustments appropriate to accommodate local conditions no improved log levels of destruction or inactivation of record is known to be available before the discoveries of such as reported and claimed herein. Absent of the now-described new art no prior art existed which was capable of protecting the public from the more heat-resistant viral contamination while maintaining the raw characteristics of a chicken egg and its safety to be consumed as a basic food source when less than hard-cooked. Those benefits from the new art discussed and disclosed herein reduce the severity of the chaos expected and forecasted by the scientific community to occur in the near term in the form of a pandemic caused by Avian Influenza a/k/a the 'Bird Flu'. Even in the absence of a pandemic viral contamination together with its capability for human-to-human transfer already established as a matter of fact as having occurred in 2009-2010 in the United States is here to stay.

Under the above-described circumstances a dependency of relying upon deep chilling of the chicken eggs only to retard the pace of multiplication of *salmonella* into lethal quantities estimated to be 2 weeks in an ambient environment became relied upon. That reliance was misplaced because the achievement of immediate and continuous deep chilling particularly at times of natural disasters as compounded by frequent and forecastable numerous interruptions to the distribution system occurring at any point in time from farm to table is unavoidable in practice.

The above-recited issues not only create risks to an uninformed public but also create additional risks when misinformation from official sources goes unattended. That misinformation is not limited to but includes two primary examples among others. In the first instance cartons containing non-pasteurized egg carry a statement entitled 'Safe Handling Instructions' which in size of print and language employed leaves the vast majority of the public uninformed as to its existence. That referenced 'Safe Handling Instructions' by authorization of the US-FDA is not required to be displayed on cartons carrying pasteurized eggs. In the second instance were eggs to be pasteurized at 5 logs the term 'PASTEURIZED' can be displayed as allowed by the US-FDA. Notably, it has been common knowledge that no strains of *salmonella* as found within chicken eggs are reliably and fully inactivated at 5 logs which prior to the enactment of the Rule of 2009 the art practiced for liquid egg product allowed for a 4-log reduction of Se to display the term 'PASTEURIZED' on liquid egg product although the record confirms that long prior to 2009 the inactivation of *salmonella* in multiple strains commonly found within chicken eggs as used in liquid egg product required a 10-log inactivation as required by the agency of jurisdiction. Historically, the initial unpublished reduction from 10 logs to 4 logs for liquid egg product carried with it the authorization to label the product as 'PASTEURIZED' From a public consumer perspective that term implied safety which stemmed from a long history concerning milk. Nonetheless the mentioned Rule of 2009 raised the pasteurization level from the mentioned 4 logs for liquid egg product to only 5 logs. That new level of pasteurization represents the most recent requirement as measured in Se logs in the evolution of pasteurization of chicken eggs as overseen by the agency of jurisdiction. The new Rule of 2009 specifically provides for the inclusion i.e. co-mingling of so-labeled and separately identified highly contaminated chicken eggs with ordinary run-of-the-mill eggs to be utilized within liquid egg product. The mentioned enablement of allowing known-to-be highly-contaminated chicken eggs to be co-mingled into liquid egg product by reasonable extension or interpretation of the mentioned Rule also would enable eggs similar in their level of contamination to remain in their shells and to be pasteurized to 5 logs and sold as pasteurized in-shell eggs. That practice would wreak havoc upon the public's health and more particularly members of risk groups approximating 150.0 million persons having compromised immune systems which according to the US-FDA are at high risk of contracting illnesses from less than hard-cooked chicken eggs. That risk is further elevated by the new risk of contamination of chicken eggs from viral sources. Such remains to be the current status of the pasteurization of chicken eggs as provided to the public and its reliance upon its Government oversight.

Significantly, as a result of the above-cited information it is notable that although no change in policy has occurred regarding the continued omission of the display of 'Safe Handling Instructions' on cartons of pasteurized eggs the US-FSIS has confirmed that a 5-log pasteurization protocol of Se does not succeed in the inactivation of all *salmonella* as may be present within a contaminated chicken egg. The achievement of a 5-log inactivation of Se as set by the US-FDA continues to qualify the egg cartons to be labeled as 'PASTEURIZED', to display a USDA Shield indicating appropriate inspection has occurred and concurrently allows for the elimination of the copy on raw in-shell egg cartons entitled 'Safe Handling Instructions'. Curiously the same 5-log inactivation of Se has since been discredited by the Centers for Disease Control and Prevention (CDC), the US-FSIS, the scientific community and the USDA Research Laboratory as being both unreliable as applied to safety and inadequate to provide total inactivation of all strains of *salmonella* as may be found within chicken eggs. Further concerns of the inadequacy of a 5-log inactivation of Se result from studies conducted within the scientific community which confirms that Se is not the most heat-resistant strain of *salmonella* as found within chicken eggs nor is Se as found within chicken eggs primarily the result of ovarian contamination. Notably non-pasteurized in-shell chicken eggs have continued to be required to display the mentioned 'Safe Handling Instructions' which reference risks of bacterial contamination although all agencies whether domestic or international continue to be both aware and alarmed that the real and present threat of materially greater magnitude is not bacterial contamination of chicken eggs alone but now includes aggressive and more threatening changes within viral groups which currently are found in ever-growing numbers within chicken eggs including the year 2015 reports as being present within domestic flocks in the United States. Such has given cause for egg prices to rise by approximately 50% per dozen and gives cause as well to the destruction of tens of thousands of laying hens contaminated with viruses akin to the H5N1.

The new risk of a pandemic has a prior history. As an important and timely anecdote the inadequacies of the above-described regulatory issues became critical to the United States public's health in 2009-2010 when a pandemic sickening some 60 million persons and killing some 12,000 persons occurred in the Untied States resulting from a deviation from the H1N1 virus which remains non-specific as to the original host virus. That experience confirmed the presence of the health risk to humans caused by viral contamination to birds and their eggs as previously forecasted and continued to be forecasted by both the scientific community and the World Health Organization (WHO). The contribution provided under the new art described herein for public safety is timely and contains negligible added cost to the public.

Separate but resulting from the above-reported pandemic of 2009-2010 the Health and Human Services agency (HHS) has endorsed and provided a commitment for some $150 million in funding to an independent firm to provide for the research and development of a vaccine which is intended to provide the public with protection from the potential arrival of the influenza described as the Bird Flu. In the end, as mentioned herein before, the scientific community finds consensus that the current threat of Avian Influenza will again blossom into a pandemic through the primary vehicle of birds migrating and spreading viral contamination to other birds which include chickens and their eggs.

With the oncoming threat caused by new and more heat-resistant viral strains over bacterial strains as found only until recently to be the sole contaminant to chicken eggs with the exception of the H3N1 virus the inadequacy of all prior art to consequentially exceed a 5-log inactivation of the bacteria identified as Se without loss of the raw characteristics of the subject eggs has become critical not only to both the egg product industry and to the in-shell egg industry but also to the public which already has been forewarned of the potential for a global pandemic stemming from Avian Influenza and has just finished experiencing a pandemic ending in 2010 caused from avian sources which include both chickens and their eggs as well as the arrival of the H5N1 virus in chicken flocks within the United States.

Under the new inventiveness described herein an answer to the inactivation of all forms of *salmonella* at all levels of contamination together with separate or concurrent inactivation of more heat-resistant viral strains without loss of either functionality or nutritional values uniquely is enabled. That enablement is performed under the new and claimed art described which not only provides for higher log levels of inactivation without negative impact upon the aesthetic and functional characteristics of the egg as compared to those of a raw egg but also provides for the inactivation of all pathogens which may be present. It has been determined that the new art readily achieves a 12-log level of Se inactivation which converts into a minimum of a 10-log inactivation of the viral strains containing greater heat resistance than *salmonella* strains. Notably, the new art due to its unique cyclical application of heat at predetermined programmed intervals and the denial of heat at coordinating intervals adjusted to provide total inactivation of targeted pathogens and the characteristics peculiar to the batch of eggs being processed reliably enable the effective total inactivation of both viral and bacterial contamination of chicken eggs which is both new and unique to the egg industry. Such provides the public for the very first time with clinically safe eggs which can be consumed by risk groups and the general population in all traditional egg preparations without risk of illnesses.

Notably and of material importance the new art not only achieves the mentioned 10-log inactivation of aggressive and dangerous pathogenic viral strains which are becoming increasingly present within chicken eggs but also contains within its protocol which is unique to the new art the ability to materially expand that protocol through repetition of the individually tailored elements within the protocol employed to accommodate the differing characteristics of the subject eggs being processed along with the targeted level of inactivation required to provide certainty that inactivation of the targeted pathogens is total. That novel level of flexibility as provided under the new art described above allows for needed adjustment of the protocol to accommodate differences between egg batches. Those differences give cause to adjustments within the base formula employed which include accommodation for differing egg characteristics such as size and water content as two examples but also includes the characteristics and differing levels of heat resistance as found within targeted pathogens. That knowledge provides for adjustments to a base computerized formula programmed-to-be readily adjusted to accommodate the needs for successful performance of the described protocol. The described protocol employed to provide pasteurization to a level of inactivation of pathogens present within chicken eggs is performed within an equally novel medium to the pasteurization protocol described above which as described herein below provides for pasteurization from inception through completion to be performed without risk of surviving contaminants post-pasteurization or recontamination before any exposure occurs from a potentially contaminated environment as found external to the medium.

The new art further protects against pathogenic recontamination whether viral or bacterial which has occurred under all prior art either through inadequate pasteurization or faulty protocols preventing against recontamination which frequently but not exclusively have been found to be enabled by concentrations of airborne contaminants resulting from pasteurization of large quantities of chicken eggs within their shells effectively exhaling pathogenic viruses and bacteria in sufficient quantities to overcome negative atmospheric precautions through protocols employed during pasteurization. That phenomenon enables recontamination of the subject eggs when internal contraction of the subject eggs en masse occurs during ambient cooling. The cooling creates contraction of the internal egg which draws in air through its exposed shell pores. The resulting air current provides a suitable avenue for the airborne contaminants to flow into the eggs through their exposed eggshell pores which gives cause for recontamination of eggs previously contaminated but more significantly gives cause for eggs to become contaminated when nonesuch contamination previously existed. Under the new art those risks of recontamination have been resolved through the creation of a new and unique pasteurization medium containing numerous unique features and protocols which provide for a secured environment as well as protection against exposure to recontamination as enabled by the inactivation of pathogens when present while blocking and treating all avenues for the entrance of new pathogens from the external environment surrounding the secured environment of the new and unique medium for pasteurization of the subject eggs as described in greater detail herein under the section entitled 'Detailed Description of the Invention'.

In Summary: Under the new inventiveness claimed herein the pasteurization temperature selected is applied to the shells of the subject eggs in the preferred form of a spray of water. The spray of water readily can be converted into different densities which include a mist and in all cases will contain a food-grade antibacterial agent as the preferred method over that of a water bath which is viable under certain new controlled conditions as discussed herein but is not preferred. The mentioned preference of a water spray to perform the transfer of heat and its denial while performing pasteurization of in-shell chicken eggs results from the recognition of its superior adaptability to fluctuations in temperature as called for from protocol employed using equipment and controls which enable prompt changes in water temperatures which conform with the precision required to satisfy the need for changes in water temperatures, improved control over rates of heat transfer and rates of heat denial for predetermined durations which also include the needs for and the benefits from both the prompt and consistent application of heat transfer whether added in its employment or denied in its employment as called for within the unique protocol for pasteurization described. Those improved controls are particularly important to avoid even the slightest risk of over cooking any element of the subject eggs being pasteurized since the level of inactivation achieved never has been performed before and a lack of either reasonable precision and consistency of the characteristics of a raw chicken egg particularly as applied to the sensitivity of the outer albumen to heat causing coagulation can occur on very short notice or only from what may seem to be a modest deviation of the protocol employed. The predetermined durations of the elements within the cyclical applications of heat and its denials conform to the inventiveness under discussion which allows for the applications of heat and the denials of heat to be customized into a programmed protocol which provides for specific durations of heat applications and their denials to the shells of the eggs during pasteurization. The interruptions to the applications of heat and their denials are adjusted in their durations to reflect the needs for protection of in-shell eggs against heat damage.

To aid in the understanding of the uniqueness of the protocol employed together with its equally unique achievements to inactivate targeted pathogens without damage to the raw characteristics of the subject eggs which contain a variety of variations the protocol employed within the new art as programmed and described and claimed herein accomplishes such through a preprogrammed application of heat and its denial specific to the characteristics of the batch of eggs being processed for pasteurization. Each variation of the protocols employed includes the cycling of the application and denial of heat to the subject chicken eggs through employing a unique process which consists of the raising of the temperature of the subject eggs to the targeted pasteurization temperature and holding them there for a preprogrammed duration which is followed by lowering the temperature of the subject eggs back to the original temperature of the subject eggs at the time of the beginning of the described process. The timeframes for all elements of the described protocol are characterized for these descriptive purposes to be cyclical in nature. Each cycle is tailored to provide relief from sustained heat being applied to the outer albumen through preprogramming the application of heat as followed by the application of chilling in greater intensities of each of such for the outer albumen than the other elements of the subject chicken eggs. Such is done in a manner and to an extent which enables the outer albumen to have limited durations of exposures to heat during the heating cycles while at the same time allowing all other elements not requiring the same relief from heat causing damage to their raw characteristics to continue to receive heat from uninterrupted pasteurization albeit the pasteurization temperatures applied will be fluctuated to accommodate the level of pasteurization targeted to accommodate the specific characteristics of the individual elements of the subject eggs being processed without giving cause to damage from excessive heat to any one element contained within the subject eggs. Throughout the pasteurization protocol employed during the times equilibrium has been reached between the yolk and the water spray temperature or its optional counterparts when employed a holding time providing for approximately 1 log or slightly more occurs before the temperature is reduced. That protocol is repeated until the targeted logs for total inactivation of the targeted pathogens has been completed.

As discussed earlier the outer albumen through its accelerated rates of heat gain and heat loss dictates the temperatures employed along with the duration of a cycle as well as the number of cycles to be employed to achieve the targeted level of inactivation as measured in logs specific to the targeted pathogen. Such is the result of a discovery that the composition of the outer albumen provides for more rapid transfer of heat and more rapid results from heat being denied.

That knowledge under the new art is applied in a unique manner which confirms that such can be used constructively within a protocol for pasteurization of chicken eggs as is now contained within the new art as described and claimed herein. The new art enables the use of protocols which succeed in providing for the total inactivation of both bacterial and viral contaminants when found to be present within chicken eggs. The art employed to inactivate targeted pathogens is both unique and effective in achieving log levels never before achievable without damage to the raw characteristics of the ingredients contained within a raw chicken egg and most particularly the outer albumen. Those discoveries enable higher log levels of inactivation of targeted pathogens to be achieved by formularizing the critical control points of coagulation of the outer albumen and applying that formula into a protocol which through preprogrammed applications of heat and its denial reflecting the differing characteristics found within a given batch of chicken eggs allows for the outer albumen to escape heat damage through applications of induced chilling on a programmed basis which enables the outer albumen to be protected against heat damage while at the same time all of the other denser substances as found within chicken eggs similarly being heated or cooled are allowed to continue pasteurization without interruption by their internal temperatures being preprogrammed to remain above 128° F. In the end the protocol employed allows repetition to the described applications and denials of heat which provide for the achievement of the targeted log level required for the inactivation of the targeted pathogens. The number of cycles required to achieve the targeted pathogen inactivation are the result of the tolerance levels of the outer albumens' tolerance to heat as dictated by the characteristics of the specific batch of chicken eggs. Notably, each batch processed contains eggs of similar size as measured by weight. Their relatively common size dictates their common level of tolerance to heat which enables pasteurization under the new art to be achieved without reduction of the raw characteristics of the subject eggs. Such allows for the conversion of the application of heat and its denial into a preprogrammed protocol which includes the new art of applications of cycles which apply controlled amounts of heat and controlled amounts of cooling to the subject eggs to the extent dictated by the previously described specifications of the eggs being processed at pre-selected temperatures and durations which are programmed to achieve total inactivation of targeted pathogens while protecting both the raw characteristics and nutritional benefits of the subject eggs. Those cycles cumulatively will equate to the achievement of the targeted log level of the outer albumen while the denser elements of the subject eggs in their natural order as found within a chicken egg will achieve the same targeted log level of pathogenic inactivation without falling below 128° F. Heat damage to the denser substances is avoided by lowering the temperatures but only to an extent that does not interrupt the pasteurization occurring. In the end the targeted log level is achieve for all elements including the outer albumen which has escaped damage from heat exposure by programmed retreats to temperatures below 128° F. The denser elements of the subject chicken eggs will not be chilled below 128° F. because of the protection against heat damage provided from their varying higher densities which allow for the continuation of pasteurization at differing rates due to their differing densities which in each case is slower than that of the outer albumen to achieve the pasteurization level as measured in applicable logs. Although the denser elements carry with them differing rates of heat transfer in the end their margins of differences are not enough to warrant altering the applications of heat employed to the specific characteristics of the subject batch of eggs being subjected to high log counts of pasteurization enabling total inactivation of the targeted pathogens. Such is confirmed through test results which have taught that once the targeted log level at an applied temperature for pasteurization has been achieved the various elements continue to have a tolerance for heat beyond the targeted log level. That additional tolerance for heat allows for a level of flexibility which enables a modest overshooting of the targeted log level to be employed for each element contained within the chicken egg to achieve the targeted log level for the inactivation of targeted pathogens.

Notably, the outer albumen temperature is impacted by its higher rates of heat gain and heat loss which give cause for the art employed to provide the outer albumen with obtaining protection from heat damage through finding refuge provided from the intermittent applications of heat and its denial as interrupted by induced chilling which together provide for a haven within which the outer albumen is protected from heat damage by providing solely it with periodic temperatures below 128° F. The described outer albumen protocol employed for its protection results from the discovery that the natural order contained within the composition of the subject eggs parallels the changes in the densities of those same substances. Hence the applications and the denials of heat follow an order which in the end achieves the targeted result of pasteurization with only minor differences in the logs achieved to each of the denser elements as nature has provided that order to be i.e. least dense as found within the outer albumen resulting in the most rapid transfer of heat gain or heat loss, followed by the inner albumen, followed by the vitelline membrane and in the end the yolk. The yolk being the most remote and the densest element within a chicken egg can tolerate the heat being applied outside the shell being received last and can tolerate it being the last to lose its heat. That natural order of heat gain and its disbursement from outside the shell inwards and its transitioning between each of the elements once completed is reversed through applying a selected form of chilling which may be induced or ambient that when completed carries with it the outer albumen being below 128° F. and each of the other elements within the subject chicken eggs continuing pasteurization and carrying with them temperatures at 128° F. or above. Once the outer albumen has reduced its temperature to the targeted temperature below 128° F. the cycle for pasteurization is reinitiated. To avoid heat damage to any one element the cycles are repeated for predetermined intervals which end with the achievement of the targeted log reduction without damage to any one element as found within the chicken eggs because the inventiveness has been taught by the order provided by nature that the transfer of heat inwards will follow the order created by differing composition densities of each of the ingredients found within chicken eggs. That discovery combined with the further discovery that the outer albumen composition providing for materially greater rates of heat transfer both as measured in gain or loss enabled the new and unique protocol to be formulated as adjusted to accommodate already discussed variations within eggs and the variations required to inactivate pathogens providing that the special characteristics as found within the outer albumen are allowed to govern the protocol employed which in the end provides for a new and unique vehicle to achieve inactivation levels of targeted pathogens which effectively are total as applied to those found within chicken eggs while at the same time preserving the nutritional and physical characteristics of a raw in-shell chicken egg.

Through the novelty of the discovery of how to use the vulnerability to heat damage of the outer albumen to an advantage focus was made upon the results of experiments performed upon the rate of heat transfer contained within the outer albumen which lead to new knowledge as to its rates of heat gain and heat loss. The knowledge gained lead to the association of the mentioned speed of transfer as influenced by the location of the outer albumen as compared to other elements within the chicken egg consisting of denser substances identified as the inner albumen, vitelline membrane and the yolk. It further was discovered that those other named elements shared two common characteristics. They were more remote from the heat source than was the outer albumen which was surrounded by the eggshell to which the application of heat for pasteurization was applied in the first instance. In the second instance the composition of each of the other elements contained varying higher densities in their composition and carried with them a location within the egg which followed an order of least dense to most dense. That sequence in the same order accepted heat being applied and discharged heat when cooling in reverse of that order. Briefly stated and summarized the fragility of the outer albumen caused by its thinner composition resulted in a higher rate of heat transfer both in gain and loss which in each case is reflected by a greater rate of speed in changes of temperature than all other elements contained within the egg. Those more rapid transfer characteristics of the outer albumen whether through temperature gain or through temperature loss are enhanced by its closest proximity to the heat source which also serves as the vehicle for disbursement of heat during periods of heat loss which under the new protocol employed enabled the intermittent application of both heat and its loss to occur on a programmed basis to avoid damage to the outer albumen during pasteurization under the new art which increases materially the quantity of heat applied to perform its improvements to public safety through achieving the total inactivation of pathogens found within chicken eggs. The described programmed applications of heat together with the programmed denials of heat providing for total inactivation of targeted pathogens through materially higher levels of pasteurization resulted in the discoveries employed which included the unique enabling protocol of the cyclical application of heat and its denial that has become the basis of a new and unique program for pasteurization enabling the benefits derived from total inactivation of targeted pathogens. That program avoids damage to the outer albumen through the mentioned cyclical application of heat and its denial which provides a new and unique capability to perform pasteurization without damaging the contents of the subject egg to any consequential level while at the same time and for the first time has enabled total inactivation of viruses and bacteria which now give cause for the public for the first time ever to be free from illnesses caused by less than hard-cooked chicken eggs. The achievement of not only the total inactivation of all strains of *salmonella* as found within chicken eggs but also through the same art containing the unique ability to be expanded through the ability to extend the repetition of the application of the protocol employed which includes the application of heat to the chicken eggshell and the denial of heat to those same shells at preprogrammed intervals for preprogrammed durations resulting from calculations derived from science performed regarding heat transfer rates, egg size variables, logs targeted as measured by the targeted pathogen for its total inactivation, induced chilling for efficiency purposes as well as measured overshooting of the targeted pasteurization temperature for efficiency purposes collectively form the basis from which the time and temperature protocol containing essentially fluctuating temperatures are derived which in the end accomplish the inactivation of the targeted pathogen while preserving the raw characteristics of the subject eggs along with their functional and aesthetic resemblances to those of raw chicken eggs. The duration of the application of heat to the eggshells, the intermittent reduction in temperatures applied to the subject eggshells to preserve the raw characteristics of the internal egg and the reinitiation of the targeted pasteurization through both the water temperature and the internal egg temperature reaching equilibrium with the pasteurization temperature selected are influenced by certain variable conditions discussed herein before that include the different elements of the subject eggs' which contain differing rates of heat transfer. Once equilibrium has been reached by and between the targeted pasteurization temperature to be employed with all elements of the subject eggs the protocol for pasteurization to a pre-selected log level of inactivation commences. For illustration purposes the selected targeted pasteurization temperature utilized may vary within a range of six degrees or more, but for these illustration purposes the temperature will be 132.5° F. The variations as referenced reflect the results of extraneous influences upon the time required to achieve the targeted log reduction of the targeted pathogen selected which is influenced by such factors as egg size, chicken diet, water content, altitude impacts upon temperatures employed for pasteurization and other factors commonly known to those reasonably skilled in the art separate and apart from the characteristics contained within the targeted pathogens. After equilibrium has been reached between the targeted temperature of 132.5° F. and all elements of the subject chicken eggs the subject eggs are held at that temperature until an additional 1-log level more or less of pasteurization has occurred in addition to the portion of a log that occurs from the internal egg temperature rising from 128° F. to the mentioned selected targeted pasteurization temperature which is followed by water in the form of a spray or other recited means to employ heat transfer to the subject eggs as recited herein before which may cause temperatures employed to vary but in principle the key features of the art form for pasteurization under the new art i.e. the cyclical application of heat and its denial together with a new and unique medium within which security is provided to achieve unadulterated pasteurization will be employed. Those variances range from a rinse temperature which is below 128° F. but above the ambient temperature of the subject eggs. The rinse temperature first affects the outer albumen because of the combination of its location as being nearest to the shell which provides total exposure to the temperature of the medium i.e. in this preferred selection the temperature of the preferred spray of treated water and the composition of the outer albumen being the thinnest in substance of all the substances contained within a chicken egg carry with it the most rapid rates of heat loss and gain. It is important to note that the cumulation of logs towards the targeted log reduction not only includes the cumulative logs resulting from the holding times of the temperatures for pasteurization when equilibrium is reached between the internal temperature of the subject egg and the targeted pasteurization temperature i.e. as used here to be 132.5° F. but also includes the cumulative logs achieved during the times where temperature is rising and declining to and from the targeted pasteurization temperature. Those cumulative log reductions achieved from the combination of both the temperatures increasing and decreasing to and from the targeted pasteurization setting of 132.5° F. become a material part of the total targeted log reduction achieved through to the time frame required for pasteurization. That time frame can be shortened in consequential part by the employment of overshooting a pasteurization temperature while going upwards and employing induced chilling while the temperature is going downwards. The net result when employed aids in increasing production while lowering overall costs. In the absence of employing a conventional heat source to the preferred spray water employed applied at predetermined temperatures, in a predetermined sequence and under conditions referenced as above for the durations described the source of the heat applied directly to the subject eggs can be provided in various form which include but are not limited to a stream of a fluidized substance, microwaves traveling through the air as well as the use of other sources of energy as is illustrated by ultraviolet or the employment of heat lamps which also provide heat to the air to which the subject eggs are exposed. Such provides for a substitute to water with air as the preferred medium which may also include focused sunlight that create concentrations of heat conveyed through a secondary medium or directly to the subject chicken egg recipients. For the purposes of this document and the art contained herein the selection of a water spray in its various forms which include a mist or shower are the preferred options to be employed for the transfer of heat and the reduction of heat into the subject chicken eggs. The described protocol is dependent upon refinements in the field resulting from a variety of factors likely understood by those skilled in the art with knowledge concerning chicken eggs which would include but not be limited to such things as egg size, water content and other extraneous matters which are more fully discussed elsewhere in this section.

The discovery of how to use those differences in a novel manner to provide an urgently needed broader spectrum of pasteurization has been enabled by the flexibility of the protocol employed which satisfies the requirements described concerning the adjustments to the application of heat and its denial without causing consequential damage to the raw characteristics of the subject egg while at the same time providing for full and reliable protection against pathogens which already are present or may come to be present within chicken eggs.

As an illustration of the differing rates of heat transfer as found within different elements contained within chicken eggs research results confirm that the relative acceleration of heat transfer which is characteristic of the outer albumen over that of the denser substances found within the eggs consisting of the inner albumen, vitelline membrane and yolk reveal that a spray water temperature of 137.5° F. applied to eggshells for five (5) minutes generates an outer albumen temperature of 131.1° F. and a yolk temperature of 115.2° F. which confirms the differing impacts of heat upon the outer albumen as being both pertinent and confirmatory to the conclusions reached within the new art as such relates to the heat transfer characteristics contained within the outer albumen. The ingredients of the above comparative analysis of heat transfer to other elements within an egg confirms that the increased sensitivity to higher heat and heat denial as being characteristic to the outer albumen over those of other elements contained within the chicken egg. Upon further research that pattern was reconfirmed and equilibrium between the named elements occurred shortly thereafter.

Further experiments now indicate and confirm that a similar rate of heat loss occurs when either ambient cooling or induced chilling is applied. Those observations and their confirmations lead to using the fragility of the outer albumen as applied to heat gain and heat loss to be employed in a constructive manner which lead to the intermittent applications of heat and its denial through which achievement of greater log levels of inactivation were enabled to totally inactivate targeted pathogens while preserving both nutritional and raw characteristics of the subject in-shell chicken eggs.

For further clarity to better understand the novel protocol discussed above the art employs a repetitive protocol for the application and denial of heat which is described as being cyclical in nature as is confirmed from records demonstrating the difference in the time spans between the least dense element as represented by the outer albumen and the most dense element as represented by the yolk when heat is equally applied to those elements for the same duration. What was learned was that the outer albumen in a matter of five (5) minutes achieved a temperature differential with that of the yolk approximating 15° F. which reconfirms the foundation of facts necessary for the ability to achieve log levels for the inactivation of targeted pathogens as found within chicken eggs through intermittently fluctuating the application of heat and its replacement with induced chilling in a manner which primarily interrupts the quantity of heat being applied to the outer albumen which otherwise would give cause for its coagulation and loss of raw characteristics.

In summary, studies performed during the research of this portion of the new art confirm that the slower rates of heat gain and loss as found within the denser inner albumen, vitelline membrane and yolk can be used to advantage through proper management of heat gain and loss as applied to the thinner outer albumen through utilizing its more rapid speed in heat transfer as expressed through both heat gain and heat loss as enabled by its inherently thinner composition. The discoveries described and claimed herein contain new and unique phenomena which use the greater speed of heat gain and heat loss of the outer albumen of a chicken egg to a significant advantage which results from its conversion into a formula that enables the unique ability to achieve the targeted goal of higher log levels which totally inactivate viruses which already exist and continue to evolve and to provide for a major threat to public health when consumed in any form of an egg food ingredient that has been prepared for consumption when less than hard-cooked.

The above-described advantages are enabled by the new ability contained within the new inventiveness to achieve log levels of inactivation of materially more heat-resistant viruses than as found to exist within *salmonella* bacteria. Such now provides certainty that public safety is available from inactivation of both viral- and *salmonella*-contaminated eggs which prior art statistically never achieved without damaging the raw characteristics of the subject eggs.

Additional to the above-described protocol benefits the following uniquely enables the total inactivation of viruses currently found or expected to become found within chicken eggs through achievement of new levels of pasteurization specifically targeting the inactivation of viruses which require higher levels of inactivation through exposure to heat for their inactivation than do bacterial contaminants as found within chicken eggs. That achievement not only succeeds in the total inactivation of *salmonella* as commonly found to be at high count levels within chicken eggs which were not previously achievable in their inactivation under prior art employing a 5-log level of inactivation but also under the new art raises the bar of pasteurization to include the inactivation of viruses through the achievement of total inactivation of all targeted pathogens which prior art neither accomplished as pertaining to *salmonella* nor attempted as pertaining to viral contamination for reason that prior art could not reach the log levels required for inactivation of either the pertinent strains of *salmonella* or viruses without loss of the raw characteristics of the subject chicken eggs targeted for pasteurization. Those described inadequacies under prior art gave cause for a substitute for inadequate pasteurization to be provided from deep refrigeration which as anyone skilled in the art would know is dangerously flawed and places at risk inordinate quantities of the public to become sickened. Notably the new art not only provides for the described safety required from pasteurization but also preserves the nutritional values of the chicken eggs which would be lost were sterilization to be used as a substitute for pasteurization. Were less than total inactivation to be employed against any of the mentioned targeted pathogens as provided through all prior protocol for pasteurization current science confirms that the rate of multiplication of those pathogens surviving will overcome any claim of safety provided under any level of pasteurization currently practiced. The ability to inactivate both high counts of *salmonella* when present within chicken eggs along with new and more heat-resistant strains of viruses now invading chicken eggs as confirmed by their new-found presence contain common features for their inactivation which are provided by the new pasteurization art described herein. Those unique features provide for the inactivation of the targeted pathogens through the achievement of high log levels as enabled by and contained within the described new art that results in public safety as provided by what effectively is the total inactivation of pathogens consisting of both viruses and bacterial strains as may be found within chicken eggs. The above unique benefits of the new art preserve the raw characteristics of the chicken eggs which include their raw aesthetics, raw functionality capabilities and nutritional benefits. All of the elements of the described new protocol provide for unique benefits to public health which are enabled by the described equally unique intermittent application of and denial of heat to the outer albumen which results in the statistical total inactivation of the targeted pathogens that includes all of the viruses and bacteria as are currently known or may come to be known to occur within or upon chicken eggs. The new and unique protocol described is complemented by separate and equally new inventiveness as discussed herein below which preserves the benefits of pasteurization through avoidance of recontamination which by experience under prior art authored by this same inventor enabled recontamination to occur from impure air carrying contaminated *salmonella* bacteria post-pasteurization back to the chicken eggshells and surviving reentry into the subject eggs although the eggshells post-pasteurization promptly were sprayed with a food-grade antibacterial agent. The attraction to the exposed eggshells of the airborne *salmonella* bacteria cells resulted from their escape en masse from the internally expanding chicken eggs during pasteurization. Upon completion of pasteurization albeit to inadequate levels of inactivation the internal eggs simultaneously contracted which created a current that drew the escaped *salmonella* cells back into the eggshells through their exposed pores. The timing of that phenomenon together with the quantity of the cells involved overcame the preventive steps employed to both improve the negative atmosphere of the pasteurization medium where the eggs were being pasteurized and to drench the eggshells post-pasteurization with a food-grade antibacterial agent. Those phenomena gave cause for all of the eggs even those which in the beginning had no contamination to become contaminated. The critical public health risks caused by both the shortcomings of the level of inactivation allowable for *salmonella* and the quantity of recontamination enabled by airborne contaminants have been addressed and cured under the new art described herein which also carries with it a request for protection. Those issues now resolved and addressed as described above under the new art claimed herein represent significant new areas of primary inventiveness which enable a unique and never-previously-achieved level of protection against pathogens present to be inactivated.

The above-described inactivation is ensured to be permanent and complete in its inactivation of targeted pathogens because of its unique features which include a new and fully secured medium for pasteurization which prevents invasion of its environment through a combination of internal security and ingredients uniquely contained within the medium which enable total inactivation of targeted pathogens to the subject chicken eggs through the provision of a cleansed environment within which the described protocol is employed from the inception of pasteurization through its completion. Those features as contained within the uniquely protected environment of the referenced medium are unique and critical to the above-described elements of the protocol employed for pasteurization as discussed previously herein above within which all pathogens are inactivated to a level which is total. Notably, under prior art no pathogen reliably was inactivated totally under the protocol employed whether such was for liquid egg product end use or in-shell chicken egg end uses. The problem of inadequate pasteurization continues to give cause for *salmonella*-contaminated chicken eggs whether pasteurized to 5 log levels of inactivation or not pasteurized at all to be inadequate to such an extent that the consuming public is placed in harm's way. Those frequencies of inadequacy to pasteurization are the result of limitations to the art employed which now has been materially changed under the new art described herein enabling the reliable and total inactivation of the targeted pathogens to occur. The new art claimed herein provides for a level of reliability which includes the total inactivation of the more heat-resistant pathogens as found within viruses. Those new benefits are timely for two reasons. In the first instance $18.0 trillion annually are being wasted through the consumption of unsafe chicken eggs as provided to an unsuspecting public which consists of 150 million persons officially considered to be members of high risk groups that by definition have higher risk of illness from all sources including chicken eggs. The mentioned $18.0 trillion per annum is for illustration purposes to better understand the need for reform. That estimate is based upon facts which are treated as both those of the Government in their origin and are reduced in their quantity as applied to their application to that of risk groups only. On or about 2010 risk groups were reported to contain 150 million persons. All of those persons have compromised immune systems. Some illnesses run into hundreds of thousands of dollars per illness per annum. The Government carries the average cost of illness from chicken eggs to be $20,000. That number is carried in this calculation although it would be obvious to be understated because the cost for care of risk group members frequently involves costs that contain multiple levels over non-risk group illness costs. The Government also carries 1 egg in 20,000 eggs as being *salmonella* contaminated. The Government knowingly allows for highly *salmonella* contaminated chicken eggs to be provided to the public when pasteurized to a 5-log level of Se. The Government is aware that 5 logs does not cure an egg from being highly contaminated as such applies to either *salmonella* or viruses. In part such is confirmed by the Government continuing to report that *salmonella*-contaminated chicken eggs are the leading cause of foodborne illnesses in the United States. That statistic has been persistent annually for a minimum of 20 years. There are approximately 8.7 billion dozen eggs consumed annually in the United States. This calculation of illnesses from liquid egg product as applied only to risk groups employs each member of the risk group consuming 6 breakfast-type egg dishes per annum consisting of 1 egg each taken from an average annual US per capita consumption of 20 dozen. In the second instance the public is lead into believing that current levels of pasteurization provide safety to less than hard-cooked chicken eggs for consumption while concurrently enabling a variety of violations which defy logic as to the claimed safety available through pasteurization or as more generally provided by unpasteurized Grade A chicken eggs. In part, certain illustrations support the existence of those inconsistencies which are both clear and dangerous to an unsuspecting consumer group of which nearly half carry with them impaired health. As stated herein before a few illustrations of blatant improprieties continue to occur which include the re-dating and repackaging of stale eggs, the co-mingling of Grade B eggs to be included in cartons marked as containing either Grade A or Grade AA eggs and the enabling of the co-mingling of known-to-be and so-marked to be highly *salmonella*-contaminated chicken eggs into liquid egg product which when pasteurized to 5 logs as measured by Se carries with it no hope whatsoever of consumer safety.

Certain of the matters involved in reaching the new achievements of total inactivation of both viral and bacterial contaminants without exposure of the subject in-shell chicken eggs to recontamination as provided through the application of the protocol contained within the new art includes but are not limited to two primary subject areas as discussed below.

Background: Bacterial strains as known to contaminate chicken eggs have greater vulnerability to heat than do viruses. Since viruses are less heat-sensitive than are bacteria the level of heat as measured in logs to inactivate viral contamination automatically will inactivate any *salmonella* bacteria strains present because of their materially lower tolerance to heat. Notably, prior art employed pasteurization of chicken eggs as measured by the inactivation of *salmonella* only which employed a level of inactivation as measured in logarithms (logs) employing a 5-log level which since has been shown to be inadequate for total inactivation and materially inadequate to inactivate new threats acknowledged to exist from viral contamination of chicken eggs which require materially higher levels of inactivation than does bacterial contamination.

The pasteurization achievements described herein before were enhanced by still an equally important additional area of new inventiveness which was made available through the discoveries provided by a pasteurization medium that overcame risks to public health caused by inadequate pasteurization and at the same time provided protection against recontamination.

Notably the above-described art must be employed within the framework of a fully and reliably protected environment. As discussed in greater detail under the section of this application entitled 'Detailed Description of the Invention' a unique and secured facility has been designed to provide pasteurization of in-shell chicken eggs to a level which provides the public with a level of statistical inactivation which is complete while maintaining the substantially raw characteristics of an in-shell chicken egg. That level of pasteurization is made available through the pasteurization protocol summaries provided hereinabove and described more fully under the section entitled 'Detailed Description of the Invention'.

Description of the Medium: As a primary and unique new area of inventiveness which complements an additional description of an area of new and distinctly different inventiveness involving a unique pasteurization art which utilizes the intermittent application of heat to the chicken eggs enabling new and materially higher levels of pasteurization to occur as measured in logs is found within an equally unique and distinctly separate inventive protocol to be employed within a secured medium which through its novel features protects the subject eggs from recontamination during and post-pasteurization including protection against airborne or contact risks through the eggs enabling recontamination when exiting the medium post-pasteurization to table. Such is enabled by new art which ensures the preservation of a clean and contaminant-free environment from inception of the pasteurization protocol through its completion which includes the time at which the eggs have received a protective sealant post-pasteurization but prior to their exit from the secured environment of the new and unique medium which now includes the performance of pasteurization to a level achieving statistical inactivation of the targeted pathogens through employment of the protocol described earlier herein which provides for the achievement of inactivation without egg damage to its raw characteristics through preprogrammed interruptions of heat and its denial. From inception through completion of the pasteurization process the environment of the pasteurization medium is isolated and controlled to provide safety from recontamination. Only after the selected level of pasteurization has occurred and the eggs have received protection from environmental sources of contamination external to the medium that protection is preserved through the application of a food-grade sealant to the eggshells. Only after that eggshell protection is provided do the subject eggs exit the medium into the unprotected environment outside the medium. From that point forward and through consumption the subject eggs benefit from the total inactivation of the targeted pathogens and are protected from recontamination by the sealant affixed to the shells. As a subsidiary discovery and for further security from processing through table a preferred egg carton produced from self-destructive bio-plastic as made from corn will be employed carrying with it a sealed environment which contains a continuous application of an antibacterial agent built into the confines of the secured environment as provided by the carton.

Notably no art for pasteurization of either liquid egg product or in-shell eggs currently provides to the public pasteurized eggs in-shell or in liquid egg product form which provide for the total inactivation of the targeted pathogens whether all strains of *salmonella* and both existing and anticipated strains of viruses while maintaining substantially the raw characteristics and the nutritional qualities of a raw chicken egg.

Because chicken eggs when laid contain either visible signs of manure on their shells or in most cases contain traces of manure on their shells which may not be clearly visible and that manure carries with it known contaminants which likely include *salmonella* and viruses the subject eggs by natural circumstance are unclean at time of lay. Studies provided by competent agencies clearly confirm that Se frequently is on the shells of the eggs as carried by manure at time of lay as are other strains of *salmonella*. Such matters as contaminated feed, rodent droppings within the feed, unhealthy air, artificial lighting and stress remain a constant plague to the health of the laying hens. Most reports indicate that *salmonella* and more particularly Se is found primarily within the ovaries of the chicken and is intermittently present within the egg post lay. Regardless of the frequency of Se being present within the ovaries of the laying hen the contamination of the chicken eggshell at time of lay without question always is exposed to and is contaminated by manure. Therefore, prior to treatment of the eggs through the pasteurization protocol described herein together with a unique medium to perform same the subject eggs to be processed require special treatment prior to commencement of pasteurization. The special treatment responds to the need of the subject chicken egg shells in most cases having lost their natural sealant i.e. the cuticle which protects the newly-laid chicken eggs from external contamination which is most evidenced by but not limited to hen manure. Within the art it is common knowledge that the natural sealant has a limited lifespan of only a few days. Once the sealant has been lost or reduced all of the subject chicken eggs are exposed to a variety of sources which have caused *salmonella* contamination to an extent which has made less than hard-cooked chicken eggs to be the leading cause of food-borne illnesses. With the advent of new threats from viral sources the described problem of chicken egg contamination is magnified together with the quantity of health risks associated with such magnification.

The employment of an optional external shower containing an antibacterial agent together with an elevated temperature of the water is employed and applied through a spray and is made a part of the preferred protocol to be employed for selected circumstances. The mentioned elevated temperature of the spray is below 128° F. and once elevated is not to be lowered for reason that the internal egg will contract and attract the entrance of still greater numbers of contaminants. Such rinsing combined with the rinse water which includes a food-grade antibacterial agent is particularly useful to rid chicken eggs of their external contaminants which frequently contain visible signs of manure. Such provides a solution to the inadequacies provided under current practice to employ infrequent changes of the rinse water together with infrequent replenishment of the antibacterial agent within the mentioned rinse water. Since the rinse water rapidly collects contaminants carried by the shells of the subject eggs and the life of the antibacterial agent contained within the water has a shelf life frequently measured to be less than 12 minutes post-co-mingling with the water one reasonably skilled in the art would correctly conclude that the rinse water itself when exceeding 12 minutes without change as frequently is the case is a major source of contamination of all of the eggs being processed and exposed to the mentioned water. Such risk of contamination of all of the eggs exposed to the rinse water is compounded by the natural sealants of the shell pores at time of lay being washed away by the mentioned rinse water which in the end creates a conduit through the exposed pores of each shell of each egg to receive the contaminants contained within the rinse water which may be more numerous than the *salmonella* found within the ovaries of chickens at a frequency confirmed and currently reconfirmed to be 1 egg in 20,000 eggs. The presence of manure and other contaminants as reported by the US-FSIS is not infrequent and does contain a public health risk in its frequency and ability to spread disease within foods and within kitchens which frequently involves the inclusion of either or both chicken eggs and liquid egg products.

Of significant importance to the topic of egg safety each of the following two primary claims of inventiveness stand on their own as may be useful under certain circumstances but when utilized together enable inactivation of pathogens to a level never before achieved including the absence of consequential damage to the raw characteristics of the subject chicken eggs.

Within the above-referenced two primary claims when employed together they enable the performance of pasteurization to levels as measured in applicable logs which without additives as currently used within liquid egg product achieve a level of total inactivation of targeted pathogens without consequential loss of the raw characteristics of the subject chicken eggs including but not limited to their nutritional benefits as well as their raw egg functional characteristics.

1. The first of the two primary claims of inventiveness for all in-shell chicken eggs subjected to pasteurization is found within a unique pasteurization protocol that employs the intermittent application of heat to the subject in-shell chicken eggs as generated through the previously-identified sources of heat generation. For these purposes the preferred use of a spray or a mist of water at predetermined temperatures for predetermined durations in part or in whole may be utilized to provide pasteurization to the subject eggs in their separate elements or as a combination of elements concurrently exposed as determined by the source of heat selected. As an added but necessary feature to the pasteurization protocol selected the spray or mist employed will contain a food-grade antibacterial agent which will preserve the inactivation of targeted pathogens occurring throughout the pasteurization protocol employed. Herein the use of the term 'spray' will be considered to be interchangeable with the term 'mist'.

The reference to the application of heat as described above also is described occasionally within this document to be cyclical in its application. That cyclical application of heat and its denial is unique to the art described herein. At the peak of the application of heat achieving a targeted temperature for pasteurization that temperature is maintained throughout the time equilibrium between all elements of the shell egg and the water being applied has occurred and a selected log level of inactivation of the targeted pathogen has occurred. That initial level of inactivation is dependant upon extraneous factors impacting upon the contents of the egg. Once that phase has been completed the preferred spray water temperature is lowered to below 128° F. and held there until such time as the other portions of the in-shell chicken egg have reduced their temperatures to approximately 130° F. at which time the application of heat through the preferred water spray is resumed and all elements of the chicken egg commence with temperatures rising to the initial 132.5° F. as selected to be the preferred temperature for pasteurization for purposes of this illustration. After all elements of the chicken egg have risen to that selected temperature level the temperature is maintained at that level until a predetermined additional level of pasteurization has occurred. For purposes of this illustration which is subject to variables caused by the chicken eggs themselves the log level achieved at each interval where equilibrium is achieved with the pasteurization temperature selected i.e. 132.5° F. in this illustration the anticipated holding time at each cycle occurring will approximate an inactivation of the targeted pathogen by 1 log which may reach 1.5 logs under selected circumstances.

For purposes of clarity of understanding the selected pasteurization temperature together with the duration of application of that temperature to the in-shell chicken eggs is not only influenced by the chicken egg characteristics which are general and as previously recited reflect differences in size, water content and altitude as applied to temperature ranges as illustrations to be considered when adjusting protocol for pasteurization. Also and of significant importance such includes the new dynamics of the outer albumen characteristics as found within its composition that provides for more rapid heat gain and heat loss than each of the other elements contained within the chicken egg as compounded by its exterior location within the egg as related to the eggshell providing for far greater exposure to external temperatures than do the more inward elements of the subject eggs. Once the term of exposure is terminated as will be learned later in this document the temperature of the preferred water spray is lowered primarily to protect the integrity of the functionality of the outer albumen which is performed to an extent that provides for other elements within the egg to continue to be pasteurized i.e. above a temperature of 128° F. at the end point of its decline giving cause for the use of the term 'cyclical'. The above illustration depicts the application of heat regardless of its source through a unique conveying medium into and throughout the subject eggs which are composed of substances containing differing densities and differing heat sensitivities giving cause for the heat to be applied intermittently to avoid coagulation of any one element within the chicken egg while at the same time recognizing and honoring the different densities and rates of heat transfer present within each element of the subject eggs. In the end that new and unique protocol enables the benefits of total destruction of pathogens without compromise to the raw characteristics of any one element contained within the subject chicken eggs.

Under the described new inventiveness enabling a range of inactivation upward from 10 logs as applied to viral contamination and 12 logs as applied to *salmonella* bacteria contamination when found within chicken eggs it is further noted that the novel method of achieving not only the logs mentioned for both the inactivation of viral and bacterial contamination as enabled through the cyclical application of heat and its denial to avoid heat damage through coagulation of any one element the new art is expandable to still greater levels of inactivation were such to be warranted through the arrival of new and greater heat resistant strains of either of the pathogen groups referenced. For emphasis and clarity it should be noted that the log levels recited represent effectively total inactivation of the targeted pathogens as is confirmed through published studies provided by the scientific community. Notably, the stated level of total viral inactivation as well as total inactivation of *salmonella* bacteria never have been achieved by prior art absent of sterilization or coagulation unless altered by additives.

With regard to the already discussed cyclical application of heat and its stated novel benefits the new art provides for the preservation of the raw characteristics of the outer albumen through interruptions of the otherwise constant application of heat during pasteurization. That new art which sometimes is described as the cyclical application of heat as applied to all elements of the eggs achieves log levels qualifying a claim of total inactivation of all pathogens which may be present whether viral or bacterial. Those benefits are made available through the intermittent or cyclical application of heat to the subject intact chicken eggs whether their end use is to provide for traditional servings customary to in-shell chicken eggs or whether their end use is for conversion into liquid egg product and uses customary to that product. Since the current level of pasteurization for liquid egg product may be as little as 5 logs as applied to Se bacteria and under the Rule of 2009 so-identified eggs containing high levels of *salmonella* contamination requiring greater log levels to be inactivated those same eggs are allowed to be co-mingled and processed into liquid egg product employing the mentioned 5-log protocol for Se which enables the public to be sickened from the consumption of the mentioned contaminated eggs and more particularly those members of the public representing risk groups whose number equates to 150.0 million persons. An obvious benefit to public safety would result from the liquid egg industry either displaying the 'Safe Handling Instructions' on liquid egg product as required for non-pasteurized in-shell chicken eggs or converting in-shell chicken eggs processed to a level of pasteurization achieving total inactivation of all strains of *salmonella* and all strains of viruses as enabled by the new protocol described herein into liquid egg product. As applied to use in liquid egg product the pasteurization of the mentioned chicken eggs before conversion into liquid egg product would require an equivalent facility which provides for a secured environment comparable to that found within the medium described herein before for in-shell eggs that will enable conversion of the already pasteurized in-shell eggs into liquid egg product while benefiting from the materially improved safety gained from total inactivation of targeted pathogens.

As described earlier under the new protocol the internal egg temperatures will be brought to equilibrium with the heated water in whichever form the water to be employed is selected. The cyclical application and denial of heat notably and specifically employs intermittent applications of heat to the subject eggs through the temperature of the spray water employed as the preferred option to those others previously identified as options which are not preferred. Such is performed with intermittent denial of heat together with the intermittent application of selectively controlled and treated colder water which enables a unique achievement of higher log levels of inactivation of targeted pathogens never before achieved along with the benefits to public health provided from total inactivation of targeted pathogens present while at the same time preserving both the aesthetic and raw characteristics of the subject chicken eggs.

The mentioned cyclical nature of the application of heat and its denial within the preferred embodiment of the art will be enhanced by controlled induced chilling which will accelerate pre-selected changes in temperatures of the spray water employed for pasteurization to be applied intermittently at prescribed times and for prescribed interval durations as adjusted to conform with the characteristics of the egg and its environment in order to accelerate the total pasteurization time to be lesser and more affordable as another feature of benefit derived from the improved safety achieved from the protocol described. Additional efficiency of time which converts into lower public cost of product is achieved by overshooting the targeted pasteurization temperature and discontinuing said overshooting when all of the content of the subject chicken eggs reach equilibrium with the targeted pasteurization temperature selected to be employed.

Under the new art described herein public safety from *salmonella* illnesses derived from chicken eggs is provided through the achievement of the scientifically-confirmed levels of pasteurization for all strains of *salmonella* bacteria as may come to be found within chicken eggs. Notably and materially the same art through its expansion capabilities a/k/a cyclical heat protocol enables the ability to inactivate virus strains requiring materially greater heat for their inactivation as measured in logs than do even the most heat-resistant strains of *salmonella*. The referenced viral strains are currently known to be present within chicken eggs and also are known to be evolving within or co-mingling amongst strains while forming new and more deadly virus strains which are expected to cause greater quantities of deadlier forms of illnesses to humans together with a new ability to transfer illness between humans which all other strains as found within chicken eggs to date have been incapable of doing. This phenomenon aptly has been named by the scientific community as the Bird Flu which in part is generated and transmitted by migratory birds that also spread the virus to humans through consumption of polluted water which may cause a separate vehicle for contamination of in-shell chicken eggs. Notably the already-present and still-evolving strain identified as the H5N1 carries with it a human death rate of 40% more or less among those who have contracted illness from that virus which also has shown a capability to transfer illness from human to human. Current reports confirm that deaths from the H5N1 virus have occurred from Europe to Australia and various other areas located within the Far East. In further support to the statistics recited in 2009-2010 the United States experienced a pandemic resulting from a derivative of the H3N1 virus which for decades had mistakenly been identified as a virus which when commonly occurring within chicken eggs required a 4-log inactivation to be included within liquid egg product. That corresponded with the downward adjustment of Se to 4 logs to avoid coagulation of the pasteurized product. That same virus was the source of the mentioned pandemic in its derivative form. Notably the U.S.-F.D.A. has omitted references to the H3N1 virus while at the same time has increased the log level of inactivation of Se from 4 logs to 5 logs through the current approval of pasteurization as contained within their Rule of 2009.

2. The second of the two primary claims of inventiveness described and claimed herein consists of a highly secured environment to protect the subject chicken eggs from exposure to pathogenic contamination once the protocol selected for pasteurization has been employed. That protection continues until not only the completion of pasteurization enabling total inactivation of targeted pathogens has been completed but also provides security from recontamination through the subject eggs receiving protection from environmental recontamination post-exit from the secured environment of the mentioned medium regardless of the art of pasteurization selected and employed i.e. use of treated water or other means of pathogenic inactivation as recited hereinbefore to be available for the protocol selected. Such is enabled through the unique design of a medium within which pasteurization is conducted.

The unique design of the secured environment of the pasteurization medium includes equally unique and separate features whose collective ingredients provide for an isolated and protected environment within which continuous cleansing occurs which includes the air and the water as well as the secured environment provided by the medium. The pasteurization medium includes pasteurization medium air that fills the space of the secured environment, even in the absence of eggs to be pasteurized. That secured environment is not violated from the arrival of the subject chicken eggs through to and including their exit as being pasteurized to a targeted log level that totally inactivates pathogens which may be present whether bacterial or viral and a protective sealant against recontamination has been provided to each egg prior to exit from the secured environment provided by the medium. The cleansing process within the medium employs features which include but are not limited to ultraviolet to protect the isolated air within the medium from stray contaminants were such to be present. Also within the described medium the preferred protocol includes the use of shower heads appropriately designed and strategically located which employ either a spray or a mist of treated water as needed for the protocol employed which may contain a food-grade antibacterial agent which may be applied within the water or separately to the subject eggs as called for within the protocol. The application of the controlled duration and programmed heated water begins with a drenching of stacked eggs placed within specially-designed flats dedicated for use to ensure that an even and controlled drenching of each egg being subjected to the new and unique pasteurization protocol has occurred. Excepting the end of the pasteurization protocol employed the water spray will include a food-grade antibacterial agent. Such is performed within the protection provided from the uniquely secured environment specifically designed and created for the pasteurization medium. The alternate choices of inactivation of pathogens through that of the use of heated water either wholly or in part will benefit from the secured environment provided regardless of the vehicle for the generation and disbursement of heat to the targeted chicken eggs. As an alternate to the preferred strategically located shower heads provided within the unique and secured medium described above is a bath which is not preferred due to its containing a greater risk of accumulating contamination together with its reduced potential to promptly change temperatures as efficiently as found within a water spray or a mist as serviced by the continuous cleansing process featured within the protected environment of the referenced medium. For those reasons the bath remains open as an option but is not preferred.

Notably, eggs grown off-site most often will contain contamination on their shells and also the subject eggs may not have benefited from immediate, continuous and deep chilling. Those same eggs may also carry with them dates of lay which have provided for the known-to-be rapid multiplication of not only *salmonella* but also viruses which give cause for a greater need for cleansing the shells and to promptly attend to their pasteurization to log levels not previously anticipated or required by the US-FDA Rule of 2009 enabling a level of pasteurization of 5 logs of Se to qualify for use of the term 'PASTEURIZED' when such a 5-log level of pasteurization of Se is known to be inadequate to inactivate all strains of *salmonella* which may be present at all levels of contamination.

Although the presence of viral contaminants was known to exist prior to 2009 and also known to require still greater levels of inactivation than *salmonella* as found within chicken eggs the Rule of 2009 nonetheless allows for a 5-log inactivation of Se to qualify eggs to display the term 'PASTEURIZED' and to abandon the display of 'Safe Handling Instructions' as required on non-pasteurized eggs or their resulting products.

Further to the above and as recited earlier in the section entitled 'Background to the Invention' in a report authored by NERO confirmation of current practices of long prior standing were addressed which included but were not limited to recommendations that the practice of changing egg cartons containing unsold eggs into new cartons containing new 'Best By' dates be discontinued. Separately the co-mingling of Grade B eggs which frequently contain high counts of *salmonella* contamination well beyond a 5-log pasteurization protocol's capability to inactivate was recommended to be discontinued from being co-mingled into Grade A cartons at a ratio of three (3) to (4) four eggs per dozen carrying the higher grade mark. Separately the US-FDA in its Rule of 2009 not only maintained a 5-log inactivation of known-to be and so marked to be highly *salmonella*-contaminated chicken eggs to be co-mingled into liquid egg product with the only caveat being they be pasteurized to 5 logs using the Se strain of *salmonella* as the measure which is not the most heat-resistant strain of *salmonella* as found within chicken eggs. Further to the above the USDA through its Inspector General's Office published a report in November 2012 within which it reconfirmed that one egg in 20,000 chicken eggs is contaminated with *salmonella* when as recently as in 2005 another division of the USDA identified as the US-FSIS claimed victory over *salmonella* as found within chicken eggs by reporting that current studies confirmed that the frequency of illnesses from *salmonella* in chicken eggs had diminished from one egg in 20,000 to one egg in 277,000. Subsequent to the USDA Attorney General's Report of 2012 which contained criticism of agencies within the USDA for what essentially contained a lack of job performance the US-FSIS Division withdrew their claim that new studies confirmed the reduction in *salmonella*-caused illnesses from chicken eggs to be the mentioned one egg in 277,000. Separately current publications on the same subject matter carrying dates of 2015 reconfirm that *salmonella*-caused illnesses stemming from contaminated chicken eggs continue to be the largest single cause of foodborne illnesses within the United States.

All of the above confirms the need for the public good that a reliably safe chicken egg be made available to a public whose taste for such has grown from 4 billion dozen consumed in year 2000 to a number pushing 10 billion dozen consumed currently.

For certainty of clarity of the uniqueness of the new discoveries reported the current levels for inactivation of pathogens require pasteurization to levels as measured in logs which never before could be accomplished without coagulation of the subject chicken eggs. The new art resolves the issue of total inactivation of both viral and bacterial contamination within chicken eggs while preserving both its nutritional and functional raw characteristics including aesthetics. The utilization of a shower over that of a bath is the preferred medium for pasteurization under the new art to perform the described protocol for reasons that the control of a sanitized environment is more readily available through the use of a shower over that of a bath and the flexibilities of temperature, precision of length of exposure to temperatures and employment of ingredients are more readily available to provide consistency of safety and functional qualities to the end product. Through use of programmed temperature changes of the spray water set initially at the highest water temperature to be employed whether targeting all of the subject chicken egg contents or separate elements within the subject chicken eggs the subject water preferably is applied in the form of a spray or a mist which in either case will contain an approved food-grade antibacterial agent. The temperature of the water spray is raised and lowered at frequent and prescribed intervals which are determined by their impact upon the outer albumen. The accelerated rate of pasteurization provided by the preferred initial water spray temperature is reestablished when the mentioned outer albumen receives additional heat derived from the temperature of the water in whatever form it is applied to the eggshells providing that it is within a temperature range of 128° F. or above and continues to increase in its temperature until reaching the preferred pasteurization temperature of 132.5° F. as used for these purposes of illustration. The water contained within the spray will contain a food-grade antibacterial agent except at the end of the pasteurization protocol employed. At the end of the pasteurization protocol employed a final rinse of the subject eggs will be provided utilizing solely the food-grade antibacterial agent selected. For purposes of consistency of the end product each batch of eggs being pasteurized will receive water temperatures controlled by preprogrammed protocols which enable consistency of end product in terms of success in log levels of inactivation achieved as well as assurance gained through automation that the end product has been both fully pasteurized but damage to the raw characteristics of the subject eggs has been minimized. The mentioned water temperature changes result from controlled fluctuations of the initial egg temperature achieved for the commencement of pasteurization as followed by the lowering of the temperature as preferably enabled through the use of a shower or a mist containing a temperature which is no lower than 128° F. for all internal elements of the chicken egg excepting the outer albumen which is programmed to fall to a temperature between 123 to 127° F.

As described hereinbefore the duration of pasteurization at each temperature setting is determined by such factors as size of eggs, altitude of the facility, chicken diet, variables in chicken water consumption among other considerations as would reasonably be known to those skilled in the art of chicken egg production and processing.

Notably, overshooting of temperatures to reduce the total time required for pasteurization can be performed but should be performed with care to ensure that the benefits of total inactivation have occurred without damage to the raw characteristics of the subject eggs.

Separately but importantly the outer albumen is being provided protection from heat damage through lowering its temperature intermittently from the initial water spray temperature setting which for these descriptive purposes is programmed to be 132.5° F. The new and unique protocol provides for continuous pasteurization of all elements of the chicken eggs excepting the outer albumen which in pertinent parts consists of the inner albumen, vitelline membrane and the yolk. The intermittent application of heat enables continuous pasteurization to occur for all of the denser elements identified which allows for the outer albumen singularly to receive special treatment. That special treatment to the mentioned outer albumen is the key element within the pasteurization protocol under the new art described herein which through new discoveries of how to utilize the outer albumen characteristics to enable the achievement of higher log inactivation of pathogens never before achieved without damage to the raw characteristics of the chicken eggs and more particularly the outer albumen.

For clarity, post equilibrium between the water spray temperature setting and the eggs' internal temperatures having been reached and their equating to the preferred pasteurization temperature of 132.5° F. used as an illustration for these purposes the subject eggs dwell at that equilibrium temperature for a selected time which becomes part of the cumulative time of the pasteurization process selected which in the end provides for the generation of the needed log reduction of the targeted pathogen. In the interest of clarity the subject eggs are exposed to pasteurization at any time any element pertaining to the egg body within the shell achieves a temperature of 128° F. or higher. The quantity of heat transfer as measured in time to achieve logs will differ for each element of the egg. Therefore as each egg in terms of temperature and in terms of each ingredient within each egg travels from 128° F. to the pasteurization temperature selected i.e. for these illustrative purposes 132.5° F. through the use of employing a spray for its application log reductions will occur to each of the recited elements of each egg at different rates and in differing quantities. The art form herein integrates the rates of heat transfer of each element found within a chicken egg. What has been learned is that each element has different levels of tolerance to heat. Those differing levels of tolerance enable non-exact levels of heat to be applied to certain elements while using the least flexible element as the base from which deviations may stem. As a pertinent example the outer albumen has the least flexibility in heat tolerance as compared to other elements i.e. the inner albumen, the vitelline membrane and the yolk. Those referenced ingredients qualify the outer albumen to be used as the vehicle of choice as such relates to overshooting the heat application and the resulting log achievements for itself and the vitelline membrane as well as the yolk since each of those can accept additional heat as measured in logs more readily than does the outer albumen. Notably, that novel information provides the flexibility required for the outer albumen to be the baseline for the targeted log selected to achieve inactivation of the targeted pathogen. For the benefits derived through further explanation a given virus may require a 10-log inactivation. That is accomplished by the application and denial of heat giving cause to the outer albumen to only achieve pasteurization when at 128° F. or above as measured by logs. The denser inner albumen is slower to react to heat change and slower to be damaged by heat than the mentioned outer albumen. Therefore the new protocol provides for the outer albumen only to go below 128° F. at predetermined intervals and for predetermined timeframes which are below the minimum temperature that pasteurization occurs with reliable measurability. The inner albumen is allowed to fluctuate down to but not below the mentioned 128° F. because its density is greater. That greater density gives cause to the inner albumen taking longer for it to achieve the targeted log level than does the outer albumen. Hence the characteristics of the inner albumen give cause for it to continue to be within the temperature range for active pasteurization to occur. However, the inner albumen benefits from achieving pasteurization without coagulation at higher temperature levels for programmed durations than previously achieved through the use of the intermittent or cyclical application of heat and heat denial described and dictated by the differentiations of transfer rates as measured in time between each of the elements contained within the egg. Although the heat transfer rates of the elements composing an egg differ in the end each of the mentioned elements of the egg when exposed to the new art protocol will achieve the targeted log reduction of the selected log destruction targeted. Enough heat tolerance exists within each element of the subject egg to allow for overshooting the selected log reduction to accommodate the needs of the denser elements to reach a level of inactivation which is complete as applied to the targeted pathogen selected. Such is made available through a combination of adjustments to the cycle length representing the time taken to reach the equilibrium temperature for pasteurization, its holding time at that temperature together with the time of denial of heat including induced chilling which creates a full cycle. For clarity the shortening of the time of the described cycle and the lowering of the preferred pasteurization temperature in a manner related to needs identified by the characteristics of the batch of eggs being pasteurized will provide efficiencies to the length of times taken for completing a cycle of pasteurization including the avoidance of heat damage to any element of the subject eggs. By extending the cycles to reflect a portion of the impact gained by lowering the pasteurization temperature log levels can be increased to provide for either or both higher levels of pasteurization as measured in logs as well as enabling a lower risk of coagulation of the albumens as would be caused from a greater intensity of heat.

In principle the vitelline membrane and the yolk also in graduated form have more tolerance to the rate of heat gain and heat loss which manifest themselves through a slower rate of change as caused by the inherent greater densities of those substances along with their more remote locations from the heat source as provided through the application of water and not directly at the yolk which is a discussed alternate option for a different form of heat transfer. Notably, the preferred protocol includes a water spray employing temperature changes as well as continuous purification together with an additive containing a food-grade antibacterial agent. All of the described ingredients are located and performed within the uninterrupted and protected environment of the new and unique pasteurization medium. In the end depending upon the very batch of eggs being processed in principle a formula is created which employs the results from preliminary test analyses of the relationships between the targeted log levels and the egg characteristics which include the outer albumen as the baseline. For better understanding in prior protocols it was learned that a size large chicken egg to achieve a 5-log pasteurization level on average took 2 minutes less than did a size extra large. In principle that nature of test runs can be performed to provide guidance to create a formularized program which provides for the frequency and quantity of heat transfer in terms of loss or gain to achieve log levels targeted to inactivate specific pathogens as derived from the basics described within the cyclical program of heat application and its denial as claimed.

It is worth noting for better understanding that the above-described foundation facts concerning egg ingredients contain a natural order within their location within the shell. That natural order of ingredients includes differing densities which correspond to differing rates of heat transfer according to the density of the subject substance and transfers heat gain or heat loss at differing rates. As an example the yolk is impacted by heat and transfers heat at a slower rate than does the outer albumen. The new art applies that knowledge in a manner which protects the outer albumen from heat damage while at the same time allowing for the next most heat-sensitive inner albumen to receive heat. The inner albumen by virtue of its location and greater body density within its substance than the outer albumen is provided protection from damage caused by rates and quantities of temperature changes whose resulting damages are lesser than those of the outer albumen. While those applications are occurring a cyclical effect is created which includes the application of heat and its denial to all elements within the subject egg unless the heat applied targets the yolk initially. An element of that cycle results from the vitelline membrane and the yolk continuing to receive heat which may exceed the targeted log level but when such occurs it is modest enough in its excess to not cause heat damage to those denser but graduated elements.

In conclusion and as one illustration to the above the yolk composition allows for modest overshooting of the targeted log while at the same time the inner albumen does not have a composition which provides for the same degree of flexibility before damage. In such an example the inner albumen may receive 12 logs while at the same time the yolk may receive 12.3 logs under the same protocol employed. What has been learned is that in practice the highest degree of inflexibility to heat damage is found within the elements of the egg which contain the least dense substances in their compositions i.e. the outer albumen and the inner albumen. Therefore the outer albumen needs periodic sanctuary from the heat as is provided from intermittent cooling through the protocol employed which provides for lapses in heat from the preprogrammed water spray temperature settings which allow for the outer albumen to quickly become protected from heat damage by cooling to levels below 128° F. and returning intermittently as the heat through the program employed which is referred to as being cyclical is increased. The inner albumen needs the same nature of treatment but does not need the added protection provided from temperatures below 128° F. because its rate of heat transfer is slower than that of the outer albumen. It has been discovered that both the vitelline membrane and the yolk which contain the densest substances can use those denser substances to an advantage enabling higher log levels of inactivation of targeted pathogens because of their denser substance and less vulnerability to modest overshooting as compared to their less dense counterparts as found within the two mentioned albumens. Those described egg ingredient characteristics once recognized opened the door to discoveries which were incorporated into a formula that enable materially higher levels of pasteurization of chicken eggs than all prior art could accomplish which in the end enabled the required levels of inactivations of all strains of bacteria and further for the first time enabled log levels of inactivation of viruses never before accomplished without damaging the raw characteristics of the subject eggs.

As previously discussed when heat is applied directly to the denser yolk through use of such sources which include microwave, ultraviolet, heat lamps, concentrated solar energy as well as radio waves adjustments to the heat levels provided by the intermittent use of heated water preferably in the form of a spray or a mist will be employed to provide protection of the vitelline membrane and the two forms of albumen discussed in order to avoid either inadequate pasteurization or damage to those substances through excess heat applied. The alternate identified vehicles for heat transfer directly to the egg yolks although desirable to increase the speed at which pasteurization occurs carries with it risks that pasteurization to a targeted level directed to the yolk may succeed but may carry with it uncertainties that comparable pasteurization as measured in logs may occur without damage to the more sensitive and differing densities of the three albumen groups contained within the same egg in three different locations i.e. outer albumen, inner albumen and vitelline membrane. Since the new art effectively doubles the pasteurization protocol as measured through logs in order to satisfy requirements that all pathogens which may be present within the subject eggs have been inactivated the preferred art which is more manageable for both measure and control are best achieved through the use of water as applied by employing abrupt changes in temperature for varying preprogrammed durations together with a food-grade approved antibacterial agent either co-mingled within the spray water or applied separately which eliminate the uncertainties caused from utilizing two different protocols to provide the combination of one result to the whole egg i.e. pasteurizing the yolk to the targeted log level through one means and pasteurizing the differing densities as found within the albumen through separate means. Intermittent application of induced chilling to the outer albumen is preferred over ambient cooling.

In recognition of jurisdictions which do not allow for the use of water to be applied to eggshells an alternate and equally unique protocol can be employed which consists of a combination of heat and ultraviolet as one area of several areas of options available which do not employ a liquid fluid as the vehicle for in-shell chicken egg pasteurization while achieving log levels of inactivation of targeted pathogens which as discussed herein throughout enables total inactivation of the targeted pathogens to occur without consequential damage to the raw characteristics of the subject eggs. Once the protocol described has been applied the then sanitized foreign and potentially contaminated matters attached to the eggshells and upon the pores can be wiped clean which enables the benefits from the pasteurization provided to be retained while at the same time the appearance of the subject eggs generally will be free from unsightly signs of contamination. Post the completion of the protocol described the then pasteurized in-shell chicken eggs receive protection against recontamination through the application of a food-grade sealant whose base can be wax or a plastic preferably through a form of application which provides protection from external contamination post departure from the pasteurization medium through to point of consumption.

Separately but notably the benefit from induced chilling when limited to the outer albumen as intermittently applied throughout the pasteurization process selected for specific egg types and for specific pathogens targeted uniquely reduces the outer albumen's exposure to heat which makes available benefits that include the ability to provide levels of pasteurization never before available without damage to the raw characteristics of the chicken eggs. Those additional benefits not only open the door for the needed higher log levels to provide for consumer safety but also shorten the overall time for pasteurization to achieve the selected targeted log level from which the efficiency gained from induced chilling also reduces the end product cost. Notably, the protection to the outer albumen as provided by induced chilling enables log levels of inactivation of targeted pathogens to occur which is an essential achievement to provide for assured public safety and is unique to this described art of new inventiveness. The employment of intermittent induced chilling only will occur within the secured environment of the pasteurization medium whose designed security against invasion of pathogens provides protection against recontamination which otherwise would be enabled to occur because the mentioned chilling gives cause to the internal egg contracting which brings in unwanted pathogens that are blocked or inactivated through the described cleansing features contained and provided on a continuing basis as found within the unique and secured environment within the pasteurization medium. In support of the above during contraction which occurs post-application of heat for pasteurization when within an impure environment as provided under all prior art impurities gain entrance into a chicken egg through its shell pores which is aided by the suction created from the contraction of the internal elements of the subject eggs post-pasteurization.

Summary: For clarity and better understanding the pasteurization medium receives eggs which optionally may be pre-rinsed and sanitized before commencement of pasteurization. That optional protocol includes the employment of a rinsing process of the in-shell chicken eggs to be performed outside of the pasteurization medium in order to materially reduce entry of contaminants located on the eggshells from gaining entry into the eggs through their exposed pores. That described external application of heated water containing a food-grade antibacterial agent is useful to reduce risks of unwanted entry of contaminants located on the shells of the eggs to be subsequently subjected to pasteurization. The blockage from entry of externally located contaminants including those which may be located on the eggshells is accomplished by applying heated water at temperatures below 128° F. but higher than the internal temperatures of the eggs subjected to the shell rinsing. That protocol enables the expansion of the internal eggs which blocks entry of externally located contaminants passing into the subject eggs through exposed shell pores. The subject eggs after the described optional external treatment are transferred into the isolated and secured environment of a new and unique pasteurization medium within which they initially receive a separate heated water spray containing a food-grade antibacterial agent as part of the pasteurization protocol employed.

Under all variables of the pasteurization protocols available to be employed each includes a protocol that provides for heating the subject eggs during pasteurization to an extent that gives cause for the air sacks located at the blunt ends of the chicken eggs to reduce in size due to the expansion of the internal contents of the eggs as caused by the mentioned application of heat. During pasteurization the heat employed causes the internal bodies of the eggs to expand into the voided space previously occupied by the air sacks. Under the new protocol the environment created within the unique security provided by the pasteurization medium allows for the protected use of sanitized water including food-grade chemical additives utilized for pre-scribed limited durations, the intermittent applications of heat as well as the intermittent applications of induced chilling, utilization of sanitized air provided by but not limited to combinations of ultraviolet light, filtration and reverse osmosis which in combination or separately if employed with continuity enables total inactivation without risk of pathogenic survivors or recontamination of the subject eggs. Notably, that protocol not only provides for total inactivation of targeted pathogens but also provides for a fundamentally raw egg in both its characteristics and nutritional benefits.

For emphasis and further clarity the subject eggs post their optional treatment performed externally to their entry into the secured environment of the pasteurization medium are subjected to an increase of temperature to achieve the preferred initial internal targeted pasteurization temperature of 132.5° F. which is used only as an illustration of the targeted pasteurization temperature to be employed for these descriptive purposes. Once the subject eggs begin receiving heat post entry into the pasteurization medium the internal contents of the eggs begin their expansion. That expansion blocks entry of any stray pathogens which at the end of the protocol employed within the security provided by the medium will inactivate stray pathogens along with all pathogens present within the medium as well as those within the subject eggs. If stray pathogens remain alive and have not been forced to escape through the eggshell pores resulting from the expansion caused by heat of the internal egg contents at termination of pasteurization and while the subject eggs are ambiently cooling which provides for the internal egg to contract a final application of a food-grade antibacterial agent is applied to each of the exposed eggshells and through the combination of internal contraction and exposed eggshell pores the mentioned agent is drawn inwards.

That final application of the described agent ensures the inactivation of any stray pathogens. The described final step of applying an antibacterial agent to the subject eggshells to ensure the inactivation of stray pathogens is followed by the application of a sealant which enables the mentioned agent whose life may run a few days to continue its purpose in the inactivation of the mentioned stray pathogens if present. Post the described protocol having been performed further contamination is blocked through the protected environment provided by the medium within which post pasteurization and pre-exit the eggs are sealed through the use of the application of the mentioned food-grade sealants. Under the new art described and claimed herein new and unique benefits are made available through using a cyclical application of heat and chilling to perform pasteurization of in-shell chicken eggs in a manner which provides certainty that a total inactivation of targeted pathogens has occurred without consequential damage to the raw characteristics and nutritional benefits of a raw chicken egg. No prior pasteurization protocol of record can claim reliable inactivation of either or both excessive *salmonella* counts frequently present within a contaminated in-shell chicken egg and viral counts when summarily present within in-shell chicken eggs.

The protocols for the employment of new inventiveness enabling the statistically complete inactivation of more aggressive and heat-resistant viral pathogens over those of bacteria create the need satisfied by the unique features of the new art which provides for a selection of options from which the processor may select. The following describes a selection which is not the preferred selection but will be useful under certain circumstances peculiar to needs.

In recognition of jurisdictions which do not allow for the use of water to be applied to eggshells an alternate and equally effective new protocol has been discovered which succeeds in providing total inactivation of targeted pathogens without use of water. Under the mentioned discovery water employed for pasteurization is substituted by purified air that is applied according to the art described herein which uniquely employs intermittent applications of heat interrupted by programmed chilling of the subject eggs on a programmed basis which in the end provides for levels of pasteurization as measured in logarithms (logs) which achieve both total inactivation of targeted pathogens while retaining the raw characteristics and nutritional benefits of a raw in-shell chicken egg. The mentioned interruptions allow for pasteurization of the subject in-shell eggs to occur at higher levels than all prior commercial art has provided without damage to the raw characteristics of the subject eggs and particularly the most sensitive element to heat as taught to be the outer albumen. The heat transfer whether through air or water is performed through the use of nozzles which enable differing densities of heated or chilled water to be sprayed on a pre-programmed basis directly unto the eggshells. The temperature interruptions created by the temperature changes caused by alternating heated water with chilled water as now adapted to include air avoids heat damage to the highly sensitive outer albumen. That protocol as more fully described herein before employs water as its base ingredient which under this section of the new art is substituted by air which when employed contains times of exposure to specific temperature settings that can be modified by parties reasonably skilled in the art to accommodate the modest differentials in heat transfer found to occur between the use of water and the use of air whether to accommodate a heat gain or a reduction of temperature resulting from the change of temperatures within the protocol employed. In the end whether through the use of a water base or an air base the described art achieves log levels of inactivation of the targeted pathogens which are total and are unique to the art described and claimed herein. For clarity, the new art in the form now outlined and claimed herein includes the ability to substitute water employed for in-shell chicken egg pasteurization with purified air. The employment of purified air utilizing the applicable elements of the ingredients of the new protocol for pasteurization employing water as is also claimed herein can be performed interchangeably within its key elements. Once the protocol described has been applied the then-sanitized foreign and potentially contaminated matters attached to the eggshells and upon its pores can be wiped or blown clean. The new art enables the totality of food safety benefits derived from the pasteurization provided to be retained while at the same time the appearance of the subject eggs generally will be free from unsightly signs of potential contaminants. Through the discovery described herein regarding new and unique protocol contained within the new art regarding the application and denial of heat as delivered by air as qualified to be a substitute for water such enables delivery of an end product of a chicken egg that is pasteurized to levels never before accomplished which provides for the total inactivation of targeted pathogens.

Under the new art prior to exit from the secured environment of the pasteurization medium the application of a shell sealant is provided to protect against recontamination from time of exit from the medium through to consumption. Notably, current reports indicate that unwashed and un-refrigerated chicken eggs carry with them lower frequency of *salmonella* contamination. Such observations also include the distribution of in-shell chicken eggs from farm to table to be performed at ambient temperatures although shorter shelf life is acknowledged. One of the underlying considerations includes the acknowledgement that those same jurisdictions frequently are supplied by smaller producers than are commonly found in the United States. The protocol reported and claimed herein ends with the application of a food-grade shell sealant to be applied prior to the already pasteurized eggs exiting from the protected environment of the pasteurization medium. The food-grade sealant can be of a wax base or a food-grade plastic base either of which provide protection against recontamination from processing through to preparation for consumption. That protocol provides for an option to allow the contaminants external to the eggshells to be subjected to total inactivation of pathogens present as provided under the new art. Hence, the application of a protected sealant which has many benefits to public safety can be applied to the subject eggshells post removal of debris carried with the subject eggs as may be attached to their shells which would be a singular step involving blown air to discharge cleansed but unwanted substances as supplemented by automated brushing or wiping as the situation may dictate. Since the subject eggs would benefit from a food-grade sealant post pasteurization air blowing debris already cleansed as followed by the food-grade sealant may become a preferred option.

The above-described new inventiveness provides for public consumption of chicken eggs whether in-shell or converted into liquid egg products which allows for human consumption in all recipes without need of hard-cooking to avoid risk of illnesses. Such is the result of the new art described herein providing total inactivation of pathogens currently found or anticipated to become found within chicken eggs. Notably the inactivation of pathogens includes all strains of *salmonella* at all levels experienced to exist within in-shell eggs as well as the more heat resistant strains of viruses which require still greater levels of inactivation than does *salmonella* bacteria.

For certainty of clarity in the first instance viruses are targeted to be inactivated because the inactivation of viruses enables the automatic inclusion and destruction of undesired bacteria resulting from their having a lower tolerance to heat than do viruses. In the second instance viruses in their current form are forecasted to be converting into new strains which already show signs of enabling human to human transfer which in the end already has been forecasted to give cause to a pandemic.

Although the forecast of a pandemic from viruses as found within chickens and their eggs is worldwide in its sources and confirmation exists that the US through its Health and Human Service Agency having funded $150.0 million to perform research on a vaccine no protection against the pandemic risk through pasteurization of chicken eggs has been performed or even mentioned as being helpful particularly were such to be expandable above current levels of 5 logs as applied to Se in order to successfully inactivate all strains of *salmonella* at all levels of contamination commonly existing but also all strains of viruses.

In summary the preferred option substitutes the described waterbath located within the protected environment of the medium with a drenching shower, drenching mist or as otherwise preferred may include purified air at controlled temperatures and be applied in the same manner as would be available through water in the form of a mist. Each of the choices referenced includes an additive of an antibacterial agent which provides for each of the eggs to receive exposure that equates to the same level of inactivation of pathogens targeted as would have been targeted within the other options which include the less preferred waterbath and the otherwise preferred use of a spray of water which might include its application in spray and mist forms. Both protocols whether a shower or a bath in the end would use antibacterial agents of food-grade quality within the water of the medium selected but also would employ intermittent applications of heat and its denial to perform targeted levels of pasteurization more fully discussed within this section as well as within the 'Detailed Description of the Invention' section. The intermittent application of heat is of significant importance to the discoveries cited herein which enable the total inactivation of targeted pathogens while preserving the fresh and raw characteristics of chicken eggs. Because the previously-described preference over a waterbath is the use of a water spray or mist that preference is further enhanced by the benefits derived from both the ease and the speed of converting a heated spray into a chilling spray to protect the heat-sensitive outer albumen from heat damage i.e. coagulation. The described efficiency over the control of water temperatures provides the further benefit of reducing the public cost of the end product through the cost savings gained from a shorter pasteurization cycle. Further to the above a spray is more certain to provide continuously clean water blended with an antibacterial agent than is a water bath.

Of equal merit to the preferred use of a spray or a mist to transfer heat, the results of its denial or the applications of induced chilling to the subject eggs through even applications to the exposed eggshells has been found to be equally effective through the use of a protocol employing air versus water. That application of controlled air temperatures applied through the air to the subject eggshells in a manner which is direct, even and at a consistent velocity includes the use of food-grade non-liquid anti pathogen additives selected either singularly or in combination from ultraviolet, heat, microwave as well as other cleansers discussed hereinbefore whether applied singularly or in combination as may be required to enable the total inactivation of the pathogens targeted.

Excepting the protocol for pasteurization that does not employ water in any form as part of its overall protocol which as discussed above can be found within cleansed air employed at specific temperatures and velocities when applied as the preferred alternative to water employed in the form of a mist or a spray of treated water applied at differing densities post substantial pasteurization having been completed as measured in logs the eggs are moved from their above-referenced optionally employed shower or immersion located at the entrance to the medium to a separate area within the medium at which point they receive a continuous spray consisting of coarse water optionally converted into a mist of purified water containing a food-grade antibacterial agent which is applied at intermittent and predetermined temperatures. That optional application provides for the optional partial cleansing of the eggshells prior to transfer into a pasteurization medium which reduces the burden of the process employed within the medium. Notably, the optional external rinse is at a temperature which is above the internal temperature of the subject eggs but below the temperature of the medium upon entry. Such temperatures provide for more effective external rinsing which denies further invasion into the subject eggs of unwanted pathogens as carried by both air and foreign matters attached to the subject eggshells.

With regard to the above-described protocol were the specific targeting of the egg yolk to be employed using electronic means as one of the variables to how temperature transfer options hereinbefore described would be applied the shower in any of its optional forms i.e. a coarse spray, a fine spray, mist or otherwise would be adjusted to accommodate specific needs concerning the subject eggs being processed which may include such considerations impacted by changes to the time and temperature formulas to provide for the direct application of heat to the yolks of the subject eggs through the water spray temperature settings selected.

An alternate and preferred choice to the described treated water spray or the treated water spray mist is contained within a direct application of a food-grade antibacterial agent applied directly to the eggshells post-completion of pasteurization and pre-application of the food-grade sealant selected. That application is applied directly to the eggshells whose pores are exposed. As the ambient cooling within the medium occurs the undiluted agent will be drawn inward into the bodies of the eggs through the shell pores which will provide protection against stray contaminants that still may exist within the secured environment of the pasteurization medium. During the described process the internal temperature of the subject eggs continue to gradually diminish and the egg contents continue to contract internally which in both circumstances are characteristic of eggs while cooling. The source of the residual heat available from final ambient cooling is located within the yolk whose density and location gives cause for it to be the last element within the eggs to reach equilibrium with the temperature of the medium during ambient cooling. The internal contraction of the eggs while cooling post pasteurization draws inward the applied antibacterial agent to the eggshells which ensures continuing inactivation of stray pathogens. While contraction of the eggs is occurring within the secured medium post pasteurization and the temperature of the internal eggs is nearing ambient condition with the external environment to the medium a preferred sealant is applied to the eggshells consisting of a food-grade wax or plastic sealant in a preferred manner of application employing a spray which when applied is drawn into the eggs through their exposed shell pores which seals the eggshells from external penetration by pathogens. The eggs have two membranes located between the eggshells and the body of the eggs which contain their contents. Those membranes together with the shell sealant collectively provide additional security from recontamination stemming from external sources utilizing exposed shell pores as their source of entry. Upon completion of the pasteurization protocol the eggs exit the protected environment provided by the medium.

The above-described elements employing treated water in the form of a spray or a mist as preferred over a water bath is applied directly to the chicken eggshells. Under the new art claimed herein that protocol is changed from the use of purified water to the use of purified air. The inclusion of the option of purified air is employed together with the combination of features contained within the new art which primarily consists of but is not limited to a secured medium within which pasteurization is performed. Such enables for the first time total inactivation of targeted pathogens including all strains of *salmonella* and viruses containing all levels of contamination to be eliminated from being the source of risks provided from the transfer of pathogens external to a newly laid chicken egg to be transferred by water into the body of the egg. Nonetheless, that gain in safety continues to carry risks of the natural sealant becoming ineffective over time and allowing for the passage of contaminants to flow into the subject eggs. Those issues have benefited albeit minimally from recommendations for relatively prompt consumption which otherwise opens the door to giving cause to illnesses. In those jurisdictions relying upon the natural features of a chicken egg and the prompt consumption of those eggs at minimum the public may find materially improved safety from what would be a natural inclination to allow eggs to become older than the time when they actually should be consumed in the first instance. In the second instance the obvious solution to provide the public with extended shelf life without health risks from a source not dependent upon refrigeration would be through a water free protocol of pasteurization achieving levels of inactivation of targeted pathogens which is complete. Of equal importance it is common knowledge to the scientific community that viral contamination requires inactivation to avoid illness and likely death to members of risk groups. Employing a natural temperature and a natural condition of in-shell chicken eggs from lay to table to avoid the spread of contaminants through use of water to cleanse eggshells and to rely upon ambient temperatures through to consumption clearly has become an avoidable risk. The increased risks include but are not limited to a growing source stemming from larger production facilities giving cause to shipments at greater distances which in combination increases the average time from lay to consumption. It is common knowledge that one-*salmonella* cell at ambient temperature will multiply into lethal quantities within thirty days of lay. Equally it is common knowledge that a contaminated chicken egg at time of lay frequently contains more than one contaminated cell. The advent of risks already present and confirmed to be evolving as provided from viral contamination makes obvious the need for safety resulting from an un-invasive form of pasteurization of in-shell chicken eggs which provides a threatened public with assurance that total inactivation of targeted pathogens whether present or evolving as found within bacterial and viral contaminants now can be compromised fully without loss of any of the enjoyable features found within a clean and fresh chicken egg. Through the protocol provided under the new art described herein such is made available without compromising the gained benefits through risks of spreading contaminants resulting from the use of water as the cleansing vehicle.

Under the new art the combination of a secured medium to process eggs provides a proven and effective barrier from airborne contaminants to locate upon the matters attached to chicken eggshells post lay as is magnified by the egg contracting internally post lay which creates a mild but significant air current attracting airborne contaminants to join with the contaminants present within the foreign and frequently contaminated substances found upon eggshells at time of lay.

Under the new art an option for continuation of the practice of not washing eggshells is provided without the penalty or risk of allowing subsequent contamination to occur internally to the chicken egg once the natural sealant has either become ineffective from the passage of time or physically compromised from cracks and dents to the eggshells.

Through pasteurization performed without the use of a liquid fluid the concerns of increasing internal contamination of chicken eggs are eliminated. The raw characteristics substantially are preserved along with nutritional benefits. Even under ambient conditions shelf life is extended.

Notably and significantly a further benefit to all of the above now is gained and made available through in-shell chicken egg pasteurization employing new art which achieves inactivation of pathogens to a new level which for the first time provides for the total inactivation of targeted pathogens whether through inactivation of all strains of *salmonella* or through inactivation of all strains of newfound threats from viral contamination which require still greater levels of inactivation than do any and all strains of *salmonella* as found within chicken eggs.

In conclusion, both notably and significantly, the new and materially higher levels of log reductions of pathogens which may be present upon or within chicken eggs are now made available for total inactivation through new and unique art which utilizes a collection and uses of protocols in a novel manner that provide for what effectively is the total inactivation of pathogenic contamination of chicken eggs while at the same time providing for the denial of recontamination or risks of incomplete levels of pasteurization while maintaining the nutritional, aesthetic and functional characteristics of a raw chicken egg. That flexibility which is unique to the new art described enables production of safe eggs to include the additional benefit of having recaptured the natural taste of the egg while at the same time delivering a statistically safe egg for use in all recipes and to provide the benefit of safety to most particularly the 150.0 million persons within the United States identified to be at high risk of illness caused by unsafe foods. In the absence of a forecasted viral threat the same new art of pasteurization can be adapted through adjustments of the length of time of heat application to satisfy the destruction of *salmonella* only through total inactivation requiring a minimum of 10 logs which current art fails to provide without negatively impacting upon either the aesthetics or functionality of the targeted eggs. Said mentioned 10 logs as applied only to the destruction of *salmonella* allows for a safety margin to protect against more heat-resistant strains or deviations within strains which likely will continue to occur. The described separate pasteurization protocols i.e. for viral or bacterial contamination will be useful were the pandemic as caused by viral contamination not to continue to be a threat to public health and were the targeted contaminant to revert back to solely a bacterial source such as *salmonella*. Were the threats of viral contamination of chicken eggs to pass the bacterial contamination will continue to require materially greater inactivation than the current U.S. Government 5-log requirement for the strain of Se provides. The need for bacterial protection from contaminated chicken eggs will continue to require a 10-log protocol to accommodate current risks as derived from levels of contamination of recent record continuing along with a reasonable margin for added safety. That continuation of need to counteract *salmonella* in chicken eggs is the result of the built-in unhealthy environments for caged chickens which are common to the industry which traditionally has been motivated by low-cost, high volume enterprises resulting in uncontrollable unhealthy environments for the hens which translate into inordinate quantities of contaminated eggs primarily caused by unhealthy hens together with a contaminated environment. That chronic problem is compounded by the discussed risks of increased contamination as enabled by distribution from farm-to-table mistakenly relying solely upon nearly immediate and deep chilling promptly post-lay as the only source of protection from known-to-be already contaminated eggs.

The inadequacies of a 5-log inactivation are common knowledge to the scientific community. Also it is common knowledge that the mentioned inadequacy enables the regeneration through multiplication of the *salmonella* cells when exposed to temperatures above those provided by continuous and deep refrigeration which results in the *salmonella* reaching lethal counts in a matter of days whether through absence of deep refrigeration, intermittent refrigeration or co-mingling of highly-contaminated eggs with those of less contamination as allowed under the Final Rule of 2009 which has been common practice for decades.

Further to the above attention is drawn to the already recited practices which exasperate the already significant risks to public health caused by contaminated chicken eggs together with the loss of public dollars potentially measured in trillions resulting from those practices. Those practices include but are not limited to illnesses and deaths caused from repackaging of eggs of stale dates into new packages containing new 'Best By' dates in the first instance. In the second instance the acknowledged practice of including two plus Grade B eggs in 12-egg cartons labeled as either Grade A or Grade AA is both immoral and likely illegal. Such is magnified by agencies of jurisdiction being party to producing public health statistics which confirm that 45% of the population consists of persons with compromised immune systems and mislabeled eggs not only is causing greater numbers of illnesses, and deaths but also when calculated in dollars using any reasonable formula the result is an avoidable public cost measured in trillions of dollars.

BRIEF DESCRIPTION OF THE DRAWINGS

FIG. 1 depicts a typical section of flats containing chicken eggs prepared for pasteurization which in practice will be multiplied in quantity to accommodate production suitable to the location of the pasteurization processing facility.

DETAILED DESCRIPTION OF THE INVENTION

As has been discussed and noted above, there are several different elements contained within the invention. Each element is important unto itself. However, when employed together their combined contents create for the first time the ability to provide a total food safety benefit for the chicken egg consuming public through two new primary achievements. The first new primary achievement is a method that enables the total inactivation of *salmonella*, as well as viruses, which in the case of viruses potentially pose a still greater threat to public health from chicken eggs than does *salmonella* when chicken eggs are consumed less than hard-cooked. As noted above, the total inactivation of targeted pathogens occurs under the new art contained herein through programmed interruptions of heat and its denial, which also is referred to as being cyclical in its nature. That described protocol enables for the first time the ability to inactivate all bacterial or viral contaminants contained within or upon in-shell chicken eggs.

The second new primary area of inventiveness is referenced as being the pasteurization medium. The pasteurization medium is peculiar to the new art claimed herein. The new medium enables total inactivation of *salmonella* as well as viruses to be performed within the medium, whose self-sufficient features provide for a fully secured environment, which includes perpetual cleansing of the chicken eggs during pasteurization. Under prior art no such secured medium existed. As a result of the absence of a secured environment in the prior art, significant airborne recontamination resulted from the difficulties of controlling the purity of the air within the environment within which pasteurization was performed, as well as the contaminated environment into which the subject eggs flowed post pasteurization. Such allowed for subsequent airborne impurities giving cause to inordinate levels of recontamination. The achievement of providing security from recontamination is the result of the mentioned unique medium containing its own internal purification system, which avoids any risk of targeted pathogens surviving the protocol employed. That mentioned internal purification system includes the perpetual use of any one of the US-FDA Food Use approved bactericides, which include but is not limited to chlorine, ozone, hydrogen peroxide and quaternary ammonium. Notably, chlorine will become inactivated when exposed to temperatures customarily employed for in-shell chicken egg pasteurization. At point of exit, the eggs exposed post pasteurization performed under the referenced art within the medium described, not only are pasteurized to a level of inactivation which is total, as applied to the two primary risk areas consisting of bacterial contamination and viral contamination, but also the subject eggs are protected from recontamination by a protective sealant being provided to the eggshells prior to the subject eggs exiting from the sanitized environment provided by the pasteurization medium. Notably, once the subject eggs are conveyed into the secured environment of the pasteurization medium, the protocol for pasteurization, together with the control of the impurity of the environment are sealed and the protocol employed for pasteurization of the subject eggs is both preprogrammed, as is the maintenance of the purity of the environment within the medium. Upon substantial completion of the pasteurization protocol employed, and while the subject eggs are ambiently cooling and still contracting internally, the egg shells are provided with the selected and approved food-grade antibacterial agent without dilution, to further ensure total inactivation of the targeted pathogens has occurred. Post application of the mentioned agent, and prior to exit from the medium after the completion of pasteurization, together with the subject eggs having received a protected sealant, is the security of the environment relaxed to provide for the exit of the pasteurized eggs containing their protective sealant, which except for occasional unavoidable damage to a given egg, will provide the public with a pathogen free egg suitable for consumption by the general public without restriction.

As has been discussed and noted above under the 'Summary of the Invention' the new influenza threat spanning the globe has a viral base source which generally is identified as Avian Influenza that is commonly referred to as the bird flu. In the pasteurization processes described and claimed in the above-noted patent ingredients pasteurization is carried out in optional forms by way of intermittent applications of heat as contained within purified water through application of a spray or a mist as one option. A second option employing the same secured environment of the medium employing a similar protocol as that of the described water is employed by the substitution of the water in all of its forms with purified air. Each of the two preferred applications i.e., water and air as described, are preferred over the selection of a water bath for reasons more fully discussed under the prior section entitled 'Summary of the Invention'. Under the protocol employed within the new art, whether purified water or purified air is employed, the selection is similarly programmed to fluctuate in its temperature, enabling the subject eggs being pasteurized to be protected from heat damage, which if not protected, would give cause for the subject eggs to loose their raw characteristics. The new art as is more completely described herein above by reference is included within this section. More particularly, reference is made to the portion of the new art which both protects the subject eggs from risks of heat damage, while at the same time and for the first time enables the inactivation of targeted pathogens, which include all strains of *salmonella* and all strains of viruses as found or may come to be found within chicken eggs. These described features of the current invention are most important. To achieve the inactivation results of the targeted pathogens referenced, the protocol employed includes the optional uses of treated water or treated air applied to the chicken eggshells employing different temperatures for different durations on a preprogrammed basis, selected to accommodate the specific pasteurization needs to satisfy the inactivation of the pathogens targeted within the variables contained within the subject eggs, and their specific needs, as applied to the total inactivation of pathogens potentially present through the benefits of pasteurization, achieving the level of total inactivation of the targeted pathogen, according to standards set and confirmed by science. To accomplish such, the choices of the fluid employed, whether purified water or purified air at controlled and preprogrammed temperatures for preprogrammed durations, as further tailored to accommodate the specific features of the subject chicken eggs, are the primary considerations for the selections for either heat transfer or chilling transfer to occur. The selection of treated water or the selection of treated air as the transfer vehicle for either heat or induced chilling within the self-sufficient and secured environment of the pasteurization medium is aided and reinforced in either case by added ingredients described previously herein above. That section includes options for sanitization provided through appropriate adaptations of alternate sources available which both are identified and demonstrated through the potential use of steam as a feature of water, microwaves as an option, ultraviolet or its counterparts as a constant within the medium added to the protocol employed as either a substitute for or a supplement to treated and both heated and chilled water or treated and both heated and chilled air utilized for the intermittent transfer of heat and its intermittent denial together with the intermittent application of induced chilling and its intermittent denial to the subject eggs under a programmed protocol attending to the specific characteristics of the subject chicken eggs.

The new and significantly important inventiveness described and claimed herein concerning pasteurization of in-shell chicken eggs also provides for a new and unique total inactivation of pathogens present which enables the conversion of the subject pasteurized in-shell eggs into liquid egg products, which currently give cause to significant health risks to the consuming public resulting from inadequate pasteurization. The inadequate pasteurization as applied to *salmonella* inactivation results from the current protocols employed for pasteurization of liquid egg products, as well as the levels of *salmonella* counts known to be present within chicken eggs being converted into pasteurized liquid egg products, employ a 5-log level of inactivation of *salmonella* although by regulation counts requiring up to a 10-log level of inactivation are needed. That protocol allows for the level of pasteurization used for chicken eggs being converted into liquid egg product to be well below the needs required to inactivate highly *salmonella* contaminated chicken eggs. That existing and significant problem is compounded by the now new and potential presence of viruses, which require still greater levels of inactivation than do *salmonella* strains. Whether from contaminated in-shell chicken eggs or from co-mingled and inadequately pasteurized liquid egg products, the present public health risks as carried by contaminated chicken eggs now can be eliminated through the employment of the protocol described for improved and total inactivation of pathogens contained within chicken eggs through the results of pasteurization, which now provides for inactivation that is total which includes both *salmonella* bacteria as well as viral strains evolving, which prior art as practiced failed to address.

Separately but of distinct importance the new art through all of its elements enables not only the inactivation of pathogens already as found within chicken eggs, which include bacterial strains and viral strains, but also those which may come to be found within derivative strains that evidence confirms likely are to occur. Those new strains may include the need for greater protection from pathogens more resistant to heat. Under prior art protocols employed for pasteurization, inactivation of pathogens possessing new-found resistance to heat is unavailable. Their inactivation now can be satisfied through the new art being discussed, which provides for the achievement of still higher levels of inactivation, as enabled by the art contained within the new pasteurization protocol employed that has been more fully discussed hereinbefore. Under the new protocol enabling the total inactivation of viral strains, the level of heat application to achieve said inactivation of the viruses exceeds the heat application required to inactivate all strains of *salmonella* bacteria as may be found within chicken eggs. The new art herein presented inactivates all *salmonella* strains as may be found within chicken eggs stemming from sources originating from external contamination, as well as those originating from within the chicken and its ovaries. The new discoveries discussed as found within the new art as described hereinabove not only inactivates viruses as now increasingly may be found within or upon chicken eggs but also inactivates all *salmonella* strains which too may be commonly found within or upon chicken eggs. However, it now has been learned from new teachings that an increase in heat tolerance is occurring within the various strains of both *salmonella* and viruses as found or may come to be found within chicken eggs. Those evolutionary changes give cause for needs to provide levels of pasteurization containing the ability to inactivate pathogens that have acquired heat resistance resulting from their evolution to protect themselves, which now require pasteurization levels that are materially higher than a 5-log level of inactivation as measured by *Salmonella enteriditis* (Se) and as approved to be safe by Government agencies. The constant evolution of pathogens gives cause for pasteurization levels employed to contain adequate flexibility, which enables pasteurization technology to provide total inactivation in order to keep pace with the on-going increase in heat resistance occurring within the targeted pathogens. Uniquely and importantly the new art described hereinbefore accommodates the previously mentioned needs to satisfy the inactivation of pathogens which have growing levels of contamination caused by the mentioned evolution of pathogens through use of the unique features contained within the new art described enabling the achievement of log levels required for total inactivation through the use of the cyclical application of heat and its denial which enables the achievement of the targeted log without deterioration of the raw characteristics of the subject eggs.

For further clarity, in practice the new inventiveness through its protocol provides for a level of viral destruction or inactivation of 10-logs or greater as may be needed to accommodate the inactivation of viral strains which require additional log reduction over that of the most prominent and heat-resilient bacterial strains currently causing contamination of chicken eggs. Although Se is not the most heat-resilient strain of *salmonella* commonly found within chicken eggs, it is used by Government agencies as the baseline for measuring *salmonella* inactivation as measured in logs. The USDA Research Laboratory has reported that an inactivation ratio between the H5N1 virus and Se as measured in logs applicable to Se equates to 5.0- to 7.0-logs of the bacteria (Se) to 5.0-logs of the virus. Therefore, concurrent to achieving a 10-log destruction of the more heat-resistant strains of viruses as now is enabled and not exclusively found within the H5N1 strain when compared to the lesser heat-resistant strains of *salmonella* bacteria, the new inventiveness inactivates all *salmonella* contamination commonly found within chicken eggs including the more heat-resistant strains of *salmonella*, which as just two examples are found in S. Senftemberg 775W and S. Heidelberg, for reason that science confirms that the viral contaminants require greater levels of heat exposure for their inactivation than do all other strains of *salmonella* as commonly found within chicken eggs as is known to those within the scientific community who have both reported upon the subject area and are credentialed within the subject field. Experts at the USDA Research Laboratory have reconfirmed that the inactivation differential between viral inactivation and bacterial inactivation as found within strains that may become peculiar to chicken eggs require Se inactivation to be up to 2-log levels greater than the virus log level targeted in order to inactivate the viral contaminant. Example: A 12-log inactivation of the Se bacteria more or less may equate to a 10-log level of inactivation of the H5N1 virus. Although research reports are on-going regarding still newer virus strains becoming the source or a participant source of a forecasted pandemic stemming from avian causes, an antibody does not exist in final form for reasons that a current antibody as of May 2014 still was being tested and also reportedly the H5N1 virus was continuing to evolve as confirmed by various international sources including the World Health Organization (WHO). Notably, the scientific community through its writings confirms that it is a near certainty that more heat-resilient strains of either of the mentioned contaminants or their derivatives will continue to evolve and give cause to increased threats to public health within the forecastable near term. The continued evolution of viruses which includes their gain in resistance to sources of inactivation confirms the need for science to be ahead of the pathogens in their inactivation which is made available by the new art described herein.

Notably, the new art employs pasteurization and not sterilization. In pertinent part, pasteurization preserves nutritional values within the food source targeted, whereas sterilization loses the nutritional values of the food targeted.

In summary, the first of two areas of new and primary inventiveness under the new pasteurization art described herein and claimed as new inventiveness includes the unique ingredients of the protocols employed resulting from new discoveries, which provide the ability to accomplish the inactivation of both viral and bacterial contaminants as enabled through the repeated application of heat and the unique denial of heat intermittently applied to the least dense but most rapid heat transfer element of the various elements contained within chicken eggs, which is found to be characteristic of the outer albumen. That described intermittent application and denial of heat, as controlled and measured by and from the outer albumen, represents the primary control point of the new and unique protocol employed, which enables the achievement of levels of inactivation of targeted pathogens never accomplished previously without loss of the raw characteristics of the chicken eggs. That described new knowledge has led to new discoveries disclosed and claimed herein which now enable the inactivation of both viral and bacterial contaminants as found within chicken eggs or as forecasted to become sources of contamination to chicken eggs through viral mutations of existing strains or from independently evolved new viral strains, which in each instance require materially greater heat exposure to achieve inactivation than does *salmonella* bacteria in all of its forms as may be found to be associated with chicken eggs.

Notably and materially, the present state of the art cannot deliver inactivation of any targeted virus or new threat from any source currently evolving as studied and reported by the scientific community to a level of log destruction as measured by Se without damaging the raw characteristics of chicken eggs whether in-shell or within liquid product form or whether whole or separated into albumen only or yolk only, while at the same time inactivating the new viral strains or species of contaminants known to exist and known to be continuing to evolve into a public threat caused by a virus which is capable of sickening the public through either human-to-human transfer or through an inordinate quantity of illnesses independently encountered by the egg-consuming public. Of equal notability, the Government itself for reasons which remain unclear, reduced the inactivation level of all strains of *salmonella* as found within chicken eggs from 10-logs to 5-logs which only compounds the current problem the public is facing for the need for protection from both *salmonella* and viral sources as found within both liquid egg products and in-shell eggs which Government scientists for decades have confirmed require a 10-log level of inactivation for bacterial strains.

Separately, the details of the new art described herein include the replacement of the prior art risk providing protocol of employing a 5-log level of pasteurization as may be found within a contaminated chicken egg without qualifications provided to the public in advance that the subject eggs frequently may cause illness or even death.

Notably and of primary importance, the new discoveries in material part employ the advantages provided from the significant differences found within both the heat transfer and heat retention of the outer albumen, as compared to each and all of the other elements of the chicken eggs. For clarity of understanding, the outer albumen contains different characteristics and a different density in its composition from those of the inner albumen, vitelline membrane and the yolk. Those differing characteristics most significantly include the lesser density of the outer albumen as compared to the densities contained within the inner albumen and the vitelline membrane as well as the yolk. The differences in the densities of the mentioned substances together with their differing proximities to the heat source, whether those sources are being provided with heat or with an absence of heat or still further have been subjected to induced chilling enable new teachings to occur, when understood and considered together provide for the first primary element of new inventiveness to occur. That new first element is dependant upon the unique use of the composition of the outer albumen in combination with its unique location in relation to the eggshell and proximity to the source of heat or chilling. The outer albumen's composition and location, in combination with its thinnest relative composition provides for the outer albumen to be the key measure of control of heat transfer over all other elements within the subject eggs, as derived from the advantages provided from the outer albumen's higher rates of heat transfer whether from heat gain, heat loss post-heating and induced chilling. That protocol provides for heat damage to the outer albumen to be eliminated, while at the same time the exposures of all other elements of the subject eggs, including their graduated denser compositions as represented by the inner albumen, vitelline membrane and the yolk, benefit from prolonged and interrupted applications of heat, its denial and the inclusion of intermittent induced chilling to achieve the desired higher targeted log reduction selected without loss of the inherent raw characteristics of the subject chicken eggs. The benefits from the discoveries derived from utilizing the different densities of the egg components together with their resulting differing rates of heat transfer enable higher log levels of destruction of targeted pathogens to occur without damage to the raw characteristics of the subject chicken eggs. In the end, this new and particular area of discoveries addressing the differing elements of the eggs and their varying rates of heat absorption and heat discharge are utilized in a unique and positive manner, which enable greater log levels of pathogenic inactivation of targeted pathogens than prior art has achieved without negative impact upon the raw characteristics of the subject chicken eggs. That achievement of inactivation of both viruses and bacteria is enabled through the described new inventiveness, which not only enables new threats from viral contamination to be compromised fully but also concurrently provides for the total inactivation of in-shell chicken eggs contaminated with any and all strains of *salmonella* as may be found within chicken eggs. On the other hand, the prior art never fully achieved this level through the use of an inactivation level of 5 logs, as applied to Se as was established by the US-FDA and employed for both known to be highly *salmonella*-contaminated chicken eggs regardless of whether such eggs would be provided to the public as in-shell chicken eggs or as liquid egg product. Certain defenses to the inadequacies described from not only the reliance upon a 5-Se log level of inactivation have been provided through utilizing prompt pasteurization together with prompt chilling. Neither of the mentioned supplemental treatments of promptness of pasteurization or the employment of deep chilling is reliable to provide food safety. In the first instance, the achievement of a deep chilling temperature for eggs stacked in a commercial environment requires several days to achieve. Were the eggs to be contaminated, the level of contamination increases materially while the chilling is being applied. Secondly, recent Government statistics confirm that the level of chilling frequently is inadequate to eliminate the growth of contamination present. Still further, chilling does not inactivate pathogens present. At best, chilling if totally successful, interrupts pathogenic multiplication. Still further, even post chilling interruptions in shipments and their associated chilling from farm to table are more common than uncommon. Such is the result of inadequate chilling to begin with, vehicle breakdown en route, power outages and a host of other natural but frequently occurring events. In support of inadequate chilling on its face posing a risk to public health, reference is made to a report authored by the USDA Office of Inspector General dated 2012, within which it recites the risks of reliance upon chilling to abort multiplication of pathogens contained within chicken eggs that give cause to *salmonella* contamination at a frequency of 1 egg in 3,600 eggs as containing initial levels of *salmonella* contamination. The issue was further addressed in a report from a publication entitled 'NERO Comments,' as written by that association's experts within the field. The report covers a multitude of ethical and illegal violations, which remain on-going and includes among other on-going public health risks the practice of repackaging eggs of stale date already containing a combination of Grade B eggs co-mingled with Grade A or AA eggs into cartons containing a new 'Best By' date as now extended for an additional time more or less equating to thirty (30) days. Private calculations indicate that three (3) *salmonella* cells exposed to reasonable ambient temperatures for a period of thirty (30) days post lay will achieve in excess of 100 million cells of Se. Separately, in order to achieve targeted log reductions and to avoid the risk of off-tastes as carried within a chicken egg that has absorbed either the aroma of manure or fowl air from the environment within which it was laid, additives to liquid egg products frequently are employed. Those additives generally are unnoticed by an uninformed public, which includes risk groups representing 45% of the population i.e. 150.0 million persons as having compromised immune systems. The additives employed in certain selections provide for a modest increase above 5 logs to inactivate *salmonella*. However, the product remains to be unsafe for consumption once co-mingled with US-FDA-authorized highly *salmonella* contaminated chicken eggs, which in the end require approximately twice the 5-log level of inactivation of *salmonella*, as measured by the Se strain to be safe for consumption unless hard cooked.

Importantly, the new art claimed herein initially targets a pasteurization level for chicken eggs as measured in viral logs to be a 10-log level of inactivation of the H5N1 virus as being representative of the pertinent viral group. At the same time, through the intermittent application of heat and its intermittent denial which is unique to and a fundamental part of the new art, the present inventiveness provides protection against coagulation of the outer albumen that otherwise would give cause to the loss of the raw aesthetic and functional characteristics of the subject eggs. Consequentially, were it to occur that a 10-log level of inactivation of viruses as found within chicken eggs is inadequate to inactivate all viruses present, the new art provides for a programmed continuation of the cyclical application of heat and its denial to be extended employing a preferred option of induced chilling. The present inventiveness enables the total inactivation of the targeted pathogens without giving cause to loss of nutritional benefits or functional benefits of the subject chicken eggs as compared to their raw counterparts.

The new chicken egg pasteurization art employs an initial 12-log inactivation of *salmonella*, which in its end result effectively equates to a 10-log inactivation of viruses. Viruses currently are becoming present in variations that are more deadly to humans and more heat-resistant to pasteurization than all strains of *salmonella* as found within chicken eggs. Further to the above, under the new art, the inactivation of *salmonella* no longer is tied to *Salmonella enteriditis* (Se), which recent science reconfirms is not the most heat-sensitive of *salmonella* strains common to chicken eggs. However, by custom, Government agencies continue to reference Se as the targeted strain of *salmonella*, along with identifying the ovary of the chicken as being the primary source of *salmonella* contamination in the form of the *enteriditis* strain (Se), which is inactivated through a 5-log pasteurization protocol as claimed by the US-FDA. At the least both the 5-log protocol and the source of contamination as being primarily from the ovaries are suspect. Notably and significantly, the new art claimed herein resolves any risks of misinformation by providing the public with what undeniably is a statistically safe egg.

The materially higher levels for total inactivation of both of the mentioned pathogen groups are enabled by a new and unique pasteurization protocol employed within an equally new and unique purified isolated environment to be found within the medium employed. That protocol contains new and unique features which can be employed to either or both of the mentioned pathogen groups separately or concurrently. The present invention includes the application of heat through a purified water source or optionally a source employing purified air, which in either of the options employs heat applied at a predetermined temperature setting of 132.5° F., for these illustration purposes only. That water temperature will be identified and treated as the preferred pasteurization temperature, which is applied in its preferred form through a spray or a mist or in an equally effective form through use of purified air applied directly to the eggshells of the subject eggs at specific temperatures, at specific intervals and for specific durations. These parameters are determined primarily but not solely by influences caused from the environmental characteristics of the location of the processing facility and the source location of the subject eggs, egg characteristics generally and the individual local characteristics of the subject eggs.

From the information discussed herein above, a new art has been generated which is employed through a new and unique formula adaptable to the described conditions precedent, which through its flexibility accommodates pasteurization exposure times of the subject eggs. By doing so, this invention not only to provides a level of pasteurization, as measured in targeted logs, through adjustments to accommodate particular local characteristics influencing the subject eggs together with providing a level of inactivation of the targeted pathogens intended as adjusted in all applications to accommodate not only the differences contained within chicken eggs as to size and contents but also the quantity of inactivation as required for the total inactivation of each pathogen targeted. Such is accomplished through the controlled employment of heat and the denial of heat applied to the shells of chicken eggs, optionally through the use of a spray or a mist of water which also will contain an approved food-grade antibacterial agent. The application of the water in its mentioned forms to the subject eggshells employs different temperatures for different durations which are derived from formulas that accommodate the quantities of heat required to achieve the targeted inactivation of the targeted pathogens, as measured in applicable logs (logarithms), without consequential damage from heat to any one element of the chicken egg. The art in practice utilizes the application of heat and its denial to be prompt through use of consistent temperatures for specific durations programmed to accommodate the egg characteristics present, the log level targeted for inactivation and the adjustments to accommodate exposures necessitated from differing egg characteristics being subjected to the pasteurization protocol being employed. The programmed protocol is adjusted to reflect not only the targeted log level to be achieved for inactivation of the targeted pathogens but also includes modifications of the time and temperature employed to reflect accommodations to the differing individual egg characteristics. Those mentioned considerations are further adjusted to reflect the inactivation of the targeted pathogens as such applies to the duration of the application of heat and its denial as optionally delivered through a fine spray or a mist of water at predetermined temperatures and for predetermined time intervals, which also can contain a food-grade antibacterial agent as applied to the exposed eggshells. A formula which includes the specific characteristics of each element of the chicken eggs being subjected to pasteurization together with their relative differences in heat sensitivity as compared to the outer albumen, including its rate of heat gain and heat loss in terms of time and temperature of exposure to both heat and induced chilling along with the targeted log reduction of the targeted pathogen all are incorporated into the resulting protocol. The protocol delivers the treated water through an optional use of a spray or mist at predetermined intervals along with predetermined durations of intervals containing preprogrammed temperature changes to accommodate the subject egg characteristics. Interruptions of the alternating applications of sanitized and heated water in the form of a selected spray and employment of induced chilled water containing a sanitizer applied at programmed alternating intervals along with the application of the heated water spray, at the end of the term called for achieves the protection of the outer albumen from heat damage while continuous pasteurization is being performed to each of the other elements contained within the subject chicken eggs. Those elements other than the outer albumen include the inner albumen, the vitelline membrane and the yolk, each of which requires different quantities of heat in terms of exposure times to a selected temperature to achieve pasteurization. Through customized formulas to accommodate the individual characteristics of the subject eggs, the use of a unique feature common to all formulas employed, which includes attention to the protection of the outer albumen from heat damage by interrupting the application of heat intermittently through either induce chilled air or water in applications directly to the eggshells. These features provide for the lowering of the temperature of solely the outer albumen to below 128° F. and remaining there for a specific time, which accommodates both the characteristics of the subject eggs and accommodates the protocol employed, which suspends the chilling of the outer albumen when the inner albumen approaches 128° F., at which time the induced chilling is suspended. This suspension can be achieved through use of a fluid consisting of water or air and heat disbursed through the same sources, which is applied to the outer albumen through the shells of the subject eggs to an extent wherein the targeted pasteurization temperature used herein as 132.5° F. is reached. The described art includes deviations in exposure times in all phases to accommodate the characteristics of the batch of eggs being pasteurized, as well as the needs described to protect the outer albumen from heat damage. These needs dictate the time and temperature of exposure of each element contained within a chicken egg to achieve pasteurization of a targeted pathogen at the targeted total inactivation level without loss of aesthetic or loss of functional characteristics as expected to be present within a raw chicken egg. Notably and of equal effectiveness, it has been learned that the use of purified air can be employed interchangeably with purified water to achieve equivalent results through the application of the purified air to the subject chicken eggshells employing the same shower heads readily modified to accept air in lieu of water in its various forms. Further, approved food-grade agents to purify air being disbursed are readily available to provide the same level of sanitation to the subject eggshells as those employed for the alternative use of water. The option provided through the use of air requires modest adjustments easily formulated to accommodate changes in rates of temperature changes, as influenced by the density differences found within air and the selection of the water selected to be employed. The velocity of the air versus the form of water employed is a contributing factor to the formulation of the protocol to be employed. Since both water and air share in being fluids, their characteristics are easily modified to accommodate the impact of their differences upon the transfer equipment employed to accommodate the disbursement of the heat and chilling in both forms whether air or water. Notably, each of those substances can be made more effective in their rate of heat transfer or in their rate of chilling, which preferably will be induced for improved control and cost efficiencies, as called for and enabled under the new art. When utilized properly a targeted log reduction of a targeted pathogen, whether viral or bacterial, can be performed, which uniquely provides for the total inactivation of the targeted pathogen as may be found within a contaminated chicken egg. Thus, using the elevated heat sensitivity of the outer albumen to reflect the benefits from its unique location, as being next to the heat and chilling sources through its being an abutter to the eggshell, a formula reflecting those unique characteristics modified to accommodate the heat transfer characteristics of the differing densities, as found within each of the other elements contained within a chicken egg, along with their differing locations from the heat or chilling sources, in the end provide for a formula enabling the total achievement of inactivation of the targeted pathogens without consequential damage to the internal contents of the chicken eggs.

As determined through the teachings learned through the experiments employed, the exactness of the targeted logs of pasteurization for the targeted pathogens when achieved for each element of the subject eggs will not contain the same targeted log levels of inactivation, but in each case will meet or exceed that targeted level of pasteurization without damage to the element of the eggs receiving more than the minimal level targeted. As an illustration, the densest composition of the egg is found to be within the yolk. That composition combined with its most remote location requires greater exposure to heat in terms of time and temperature to achieve the same targeted log reduction as does the outer albumen as one example. The formulas employed under the new art are dictated by the rates of heat transfer or heat loss as measured by the outer albumen. Therefore, the rates of heat transfer and heat loss together with the rates of chilling as applied to the outer albumen become the control points of the formula for pasteurization under the new art.

All other elements of the eggs require different levels of exposure as measured in time for the same temperature to produce the same result from pasteurization as measured in logs. The time required for each of the different elements is non-exact, but in each case allows for a tolerance level to be accommodated through the new formula employed, which provides for each element to benefit from the targeted log reduction but also to exceed that targeted reduction to an extent that accommodates the other elements to achieve the same targeted level of inactivation through longer exposure to the heat being applied without delivering damage of consequence to any element requiring extra exposure time. In the end that discovered flexibility from each element, as compared each to the other, enables pasteurization to the targeted log level to occur, but in certain specific cases to exceed the targeted level of inactivation through greater exposure to the heat source in terms of time without causing consequential damage to the more heat-sensitive other elements within the subject egg. In summary, the discovery of how to convert the different tolerances to heat as characteristic of each of the primary elements composing the chicken egg i.e. the outer albumen as thinnest in substance and most rapid in heat gain or loss, the inner albumen which is next most rapid in the same characteristics as found within the outer albumen, the vitelline membrane contains within its compositional characteristics a greater density in its substance than does the outer albumen, which results in greater heat tolerance and slower rates of cooling than do both of the mentioned albumens. The most dense substance, which also is the most remote in its location, is the yolk, which requires greater time for heat gain and heat loss as compared to the discussed other elements within the chicken egg. Thus, the achievement of a targeted log under the new art is available, although that targeted log may result in excesses as measured in logs to certain elements as found within the inner albumen and the outer albumen.

The greater densities of the vitelline membrane and the yolk, allow for the yolk to achieve the targeted inactivation, while at the same time giving cause to both the outer and inner albumens to modestly exceed the targeted logs without damage to the raw characteristics of those specific elements. This ability is made available through the new and unique cyclical application of heat and its denial, which is a key element of the new art described and claimed herein. As separately discussed, the broader fluctuations in temperature provided to the outer albumen enable the concurrent protection of the inner albumen and the vitelline membrane. Such is enabled by the discovery that the heat tolerance of each element, once identified, can be converted into a formula which accommodates all of the differing heat tolerance levels through the application of heat and its denial along with the associated cooling. In the end, this heating and cooling creates a common result of a pasteurization level, as measured in logs, which contains enough tolerance through additional heat and recovery from the lack of heat to provide an end result which succeeds in providing a targeted log reduction of a targeted pathogen. This log reduction allows for complete inactivation without damage to any one element of the subject chicken eggs, as enabled through use of interrupted applications of heat and chilling, whose durations fall within the tolerance levels of the egg composition to accept pasteurization without damage to the raw characteristics of the subject eggs beyond those which noticeably alter either the functional, nutritional or aesthetic characteristics as found within raw in-shell chicken eggs.

As the evolution of both viruses and bacteria continues, the formula contained within the new art notably and pertinently is uniquely adaptable to increase the quantity of inactivation, as measured in logs, needed to accommodate the total inactivation of new and more heat-resistant strains of the targeted pathogens. What has been learned is that the described unique method and success of the inactivation of the mentioned viruses not only requires more heat, which under the described new art is applied intermittently to avoid damage to the raw characteristics of each element of the subject chicken eggs through overexposure, but also requires achievement of a log count specific to inactivation of each targeted virus or an adaptation as made available under the new protocol. Thereby, the method provides for adequate protection against differing strains of viruses through employment of one targeted level of log inactivation capable of inactivating each strain of the collective strains that may exist at a given time. This capability is possible, providing that the fundamental area of new inventiveness employing the application of heat and its denial, as controlled by the tolerance levels to both heat and rate of acceptance and denial by the outer albumen, is not violated through the choices of protocol made available for achievement of new levels of pathogenic inactivation.

For certainty of understanding, the features of the new inventiveness and the new inventiveness' unique capacity to provide public safety through total inactivation of pathogens, as found within chicken eggs, to achieve materially greater levels of inactivation as measured in Se logs represents a notable and important part of the new inventiveness. This achievement is provided by features of flexibility to achieve greater or lesser levels of inactivation of targeted pathogens, accomplished through a unique method of employing the described cyclical application and denial of heat to avoid causing material reduction of the raw characteristics of the subject chicken eggs as governed by the limitations and flexibilities of the outer albumen. The number of cycles to the application of heat and its denial both govern and enable the increase of logs or their decrease, depending upon the targeted level of inactivation pursued for consumer safety. The scientific community confirms that a 10-log inactivation of viruses as found within chicken eggs equates to 12 logs of the Se bacteria more or less.

The model employed under the new art claimed herein represents the collective results from research information which confirms that a change in *salmonella* bacteria inactivation log requirement from a log requirement of '5' as authorized by the US-FDA under its Rule of 2009 to '12' would inactivate all viral strains which may be present to their needed '10'-log level while at the same time would be more than adequate to inactivate more heat-resistant strains of *salmonella* than that of Se which customarily has been employed by agencies of jurisdiction to be the targeted strain of *salmonella* as found within chicken eggs as well as other bacterial strains which may be present.

Various agencies have confirmed the need to raise log levels to accommodate the inactivation of more heat-resistant strains of *salmonella* over that of Se, which have not been recognized or addressed by regulation from the US-FDA. As a result of the new knowledge regarding relative heat resistance, 1 log was added to the equation, as described herein, to accommodate the difference between more heat-resistant strains of *salmonella* than Se. Independent science recites specific examples of more heat-resistant strains of *salmonella* as found in S. Senftemberg, S. Heidelberg, S.

*Typhimurium*, S. Newport among others. In the end, an initial 10-log level of inactivation for viruses is carried, which provides for a 12-log inactivation of Se bacteria. The 2-log differential for inactivation of viruses, as compared to *salmonella* bacteria, stems from and is confirmed by studies performed by the USDA Research Laboratory located in Athens, Ga.

The uniqueness of the new art providing for levels of pasteurization of chicken eggs is demonstrated in the first instance by its ability to eliminate risks of illness from viral and bacterial sources through providing total inactivation of the pathogens mentioned when present, which also preserves what may become a needed food source. In the second instance and as a collateral discovery, the new art achieves levels of pasteurization for in-shell chicken eggs which maintain the raw characteristics of a chicken egg while providing statistically complete consumer safety from viral and bacterial contaminants, as found or may come to be found within in-shell chicken eggs, which never before has been achieved. That new food safety achievement is the result of the total inactivation of all *salmonella* and viral contaminates which enables their seamless conversion of safe in-shell eggs into equally safe liquid egg product. Notably and importantly, that new discovery ends the need to limit liquid egg pasteurization to log levels measured by *salmonella*, that are inadequate to provide for the total inactivation of the pathogens present, which rightfully undermines the public confidence in both the agencies of jurisdiction as applied to liquid egg product along with the public confidence in the safety of the product. Once the problem of providing safety to the public through use of safe in-shell chicken eggs has occurred, the public savings through avoidance of illnesses will convert into major reductions in dollar costs, through the illumination of a large quantity of illnesses stemming from chicken egg contamination. As one example, the Government identifies 45% of the population as having high risks of contracting foodborne illnesses. That 45% approximates 150.0 million people. The Government also reports that chicken eggs rank as the single most source of causing foodborne illness. That statistic has been consistently reported for at least two decades and is now compounded by the present and real threats caused by viral contamination. Further to the above, the Government confirms that the average cost per illness to a person of ordinary health sickened by *salmonella*-contaminated chicken eggs is $20,000. Were each of the 150.0 million people identified as being at high risk of illness to consume a breakfast type dish containing pasteurized liquid egg product processed at the current U.S.-F.D.A. standard for pasteurization of *salmonella* as measured by Se to a 5-log level of inactivation or even slightly higher i.e. 6- to 7-logs and such eggs were to be consumed at a frequency equating to six (6) one (1-) egg servings, each twelve months such statistically rightfully would provide for a high probability that each of the six (6) occasions could be forecasted to cause illness. The resulting calculation of illness costs to the high risk group segment of the population, as identified from the Government sources recited together with the minimal annual consumption by risk group members mentioned, would produce an avoidable projected public illness cost stemming from only *salmonella* of $18.0 trillion annually. Such is supported by performing the conversion of chicken eggs into liquid egg product to be made available in its various forms post in-shell egg pasteurization having occurred. Pre-pasteurization of in-shell chicken eggs before conversion into liquid egg product uniquely enables the destruction of the real and present threat of a pandemic caused by virally-contaminated chicken eggs along with the retention of raw characteristics while providing the long-needed statistical inactivation of targeted pathogens that includes all strains of *salmonella* as found within chicken eggs and of significant importance together with the notable benefits from providing chicken eggs free from viral contamination which now is giving cause to forecasts of threats of major quantities of illnesses resulting from viral contamination-causing illnesses from chicken eggs which materially contribute to the spread and scope of illnesses of being pandemic in its proportion. The mentioned liquid egg product improvements through materially increased levels of pasteurization without dependency upon additives as is the current protocol employed within the liquid egg product industry notably provides for the inactivation of both viral and *salmonella* strains which otherwise unless successfully inactivated flourish within the subject eggs particularly when co-mingled in their raw state and subsequently processed into various forms of liquid egg products.

The discovery of the differing relationships between the ingredients of the eggs, together with their densities and differing heat transfer rates, form the basis for the first of two primary areas of discoveries as referenced and described hereinabove. In the first instance, those discoveries include one which takes the mentioned differences between the egg ingredients into consideration when the application of heat is performed. That new and unique application sometimes is described herein as being the cyclical application of heat and its denial. That description is intended to apply to the application and denial of heat at programmed intervals, which create a cycle as measured in the elevation in temperature of the subject eggs to the targeted pasteurization temperature, which for these illustrative purposes is identified to be 132.5° F. Once having achieved the pasteurization temperature and equilibrium having been achieved between all elements of the subject eggs, the subject eggs are held there until they achieve slightly more than 1-log of inactivation of the targeted pathogen, before the temperature applied is reduced preferably by the efficiencies provided from induced chilling. The mentioned 1 plus logs is enhanced on average by 20% of one log throughout the process for each time the temperature is raised to the targeted pasteurization temperature and equally for each time the temperature is lowered from the pasteurization temperature to the point of beginning. After the holding time at the targeted pasteurization temperature of 132.5° F., the outer albumen through the mentioned chilling solely is provided with a temperature of below 128° F. The outer albumen is held at a temperature below 128° F. until such time as the inner albumen nears reaching 128° F. When that occurs, the heating cycle of the subject eggs is reinitiated for all elements to return to the targeted pasteurization temperature, which for these purposes is identified to be 132.5° F., at which point a new cycle begins. That cycle is repeated until the targeted log level has been achieved. The described protocol concerning the outer albumen forms the basis of the new art and enables the unique ability for the art to uniquely achieve total inactivation of targeted pathogens whether bacterial or viral without consequential damage to any portion of the subject eggs.

For certainty of clarity and emphasis, once each element described and found within a chicken egg is exposed to heat from either purified water spray or from chilled purified air and equilibrium with the selected targeted temperature for pasteurization is reached between each element, as found within the subject eggs, the pasteurization to achieve a targeted log reduction for each element within the subject chicken eggs commences. For these illustration purposes, the pasteurization temperature employed is 132.5° F. While the egg is reaching its targeted pasteurization temperature, a portion of a 1-log level of inactivation is achieved. Once equilibrium between all elements contained within the subject eggs occurs with the targeted temperature of 132.5° F., the subject eggs reside at that temperature until an additional 1 log more or less is achieved. To avoid overexposure to the heat provided by the mentioned 132.5° F., the subject eggs then are provided with a prompt reduction in either the water or air temperature, employed to an extent which enables the outer albumen temperature to fall below 128° F. and all other elements to remain at 128° F. or above. Such provides for continuing pasteurization of the other elements mentioned, albeit at different rates due to their differing locations as related to the heat source as well as their differing composition in densities, size or weight characteristics, while at the same time the outer albumen is provided protection from overexposure from continuous heat exposure by programmed interruptions to the applications of heat. This protection is enabled by controlling the temperature being applied to all elements of the eggs, which includes induced chilling to accelerate the reduction time taken by the outer albumen to reach the targeted lower temperature below 128° F. Similarly overshooting to achieve the targeted pasteurization temperature more efficiently is a preferred option. Through its more rapid reaction to both heat and chilling, the outer albumen quickly reacts to temperature changes and benefits from avoiding coagulation through the protection provided by rapid temperature changes, which for these purposes would be from 132.5° F. to one which contains a temperature below 128° F. While the outer albumen finds protection in the described lower temperature range, all other elements of the chicken eggs continue to be exposed to 128° F. or higher, as enabled by their lesser vulnerability to heat giving cause to loss of raw characteristics. That continuity of heat enables pasteurization to be continuous for all elements, excepting the outer albumen. After the outer albumen has reached temperatures below 128° F., the next thinnest substance within the egg identified as the inner albumen will follow the outer albumen in its reduced temperature, but while doing so it will continue with pasteurization. The still denser elements consisting of the vitelline membrane and the yolk will follow the inner albumen and each of those elements at their separate rates will continue to pasteurize. Once the inner albumen reaches the mentioned 128° F., which represents the lowest temperature that pasteurization occurs, the process is reversed to one which begins the application of heat again. Hence, the use of the term 'cyclical' within this Application to cover the elevation of heat applied to a chicken egg, as followed by holding it at that temperature for a predetermined time and reducing the temperature to the same temperature as the beginning and holding it at that temperature for a predetermined time before beginning the elevation of the temperature again. Notably, just as induced chilling aids in providing economic efficiencies to the protocol described through shortening the time taken for pasteurization targeted as measured in logs, the same principle can be employed in overshooting the targeted pasteurization temperature referenced as 132.5° F. for these illustrative purposes. By employing either or both overshooting the targeted pasteurization temperature and the use of induced chilling on a controlled basis to avoid damage to the egg ingredients, efficiencies of time and cost are enabled through shortening the time of the pasteurization cycles which create the mentioned economic benefits. Once equilibrium has been reached throughout each element of the subject eggs at 132.5° F., the subject eggs are held at that temperature to achieve an additional 1-log level more or less of inactivation. Once that additional 1-log level of inactivation has occurred the protocol described repeats itself. Once the targeted log reduction has been achieved through repetition of the protocol described, subject to jurisdictional requirements, the subject eggs are cooled. This cooling occurs preferably through the use of induced chilling either from a purified water spray or the alternative of chilled purified air, and the subject eggs are optionally sprayed a final time with a food-grade antibacterial agent. The antibacterial agent is drawn into the contracting eggs through their exposed pores. These steps are then followed by the application of a shell sealant, which optionally may include a food-grade wax or food-grade plastic sealant or an equivalent that may be applied through various means which include but are not limited to a spray, bath or a roller which provides for a minimum of 95% coverage to the subject eggshells and their exposed pores post pasteurization and prior to exit from the protection of the medium. Upon completion of the above recited steps, post pasteurization, the subject eggs are removed from the protected environment of the pasteurization medium and allowed to proceed with their protected eggshells to their end destinations.

FIG. 1. depicts a typical section of flats containing chicken eggs prepared for pasteurization which in practice will be multiplied in quantity to accommodate production suitable to the location of the pasteurization processing facility.

The various key elements contained within FIG. 1 include:

Reference Numeral 1: in-shell chicken eggs stacked in flats;

Reference Numeral 2: flats of new and unique design providing for 95% more or less exposure of in-shell eggs to receive tempered and purified air or water;

Reference Numeral 3: depicts the employment of strategically located multiple spray heads which service the application of either purified air or purified water in various forms to both pasteurize and chill the subject eggs.

The employment of strategically-located multiple spray heads enables a preprogrammed saturation of treated air or treated water in various forms ranging from a course spray of water to a mist which is applied directly to the exposed chicken eggshells. The application of water, if selected in lieu of purified air, can be programmed to contain varying spray densities through use of automated spray heads, which are adjustable to not only supply water with varying coarseness of the spray of water employed but also to supply either heated or chilled water containing a food-grade antibacterial agent or solely a food-grade antibacterial agent without water as the protocol employed described hereinabove requires. If air is selected in lieu of water, in principle, the same method of application can be employed, which includes the application of purified air containing preprogrammed temperature changes, as discussed previously, in its employment to be comparable to the protocol employed for water with minor obvious adjustments to accommodate the density differences between substances.

The above described protocol is followed by the eggs ambiently cooling within the protection of the medium, during which time those eggs receive a protective sealant, which preferably is a food-grade wax or as an alternative a food-grade plastic, applied post pasteurization and just prior to the internal egg temperatures having achieved equilibrium with the reduced temperature of the medium that generally will equate to the temperature of the environment external to that of the medium. Post pasteurization, the application of a selected sealant is applied to the exposed chicken eggshells, while still within the protected environment of the medium. The residual heat within the eggs post pasteurization and prior to their exit from the medium will be adequate to draw in through the exposed shell pores the protective eggshell sealant, which protects against recontamination during its route from processing to table. Post application of the sealant, the eggs exit the secured and protective environment of the medium and enter the unprotected environment to point of consumption, while benefiting from having been pasteurized on the inside and being protected on the outside from recontamination.

In the end, the new protocol provides the public with statistically total safety from illnesses caused by either or both viral and bacterial contamination of chicken eggs resulting from materially improved pasteurization enabling new log levels of inactivation to be achieved which provide for total inactivation of the targeted pathogens.

Here follows an outline containing pertinent comments regarding the protocol employed under the new art claimed herein, which not only includes a unique pasteurization protocol but also includes the customized equipment which provides for a novel secured environment within which the equally novel pasteurization protocol is performed.

Sequence Outline:

Prior to commencement of pasteurization, the subject eggs are transferred into flats whose custom design includes the ability to be stacked vertically and to receive a flow of water from strategically located shower heads whose spray is unimpeded by the design of the flats which provides for an even application of the water to flow around each egg and to provide each egg with equal exposure to the variable adjustments of the spray water temperature being applied which will contain a food-grade antibacterial agent at all times except only for the exception outlined herein below. The mentioned water applied through the described spray may vary at times between a mist, a fine spray or a coarse spray which can be automatically alternated for time, temperature and duration to suit the protocol being employed which may change to accommodate the non-identical features of batches of eggs being processed as well as the targeted pathogen selected for inactivation together with the associated variables to achieve pathogenic inactivation which is total.

Initially the stacked eggs within the customized flats prior to entrance into the secured environment of the pasteurization medium optionally will receive a spray of water treated with a food-grade antibacterial agent heated to a temperature which must be below 128° F. and can be as low as 123° F. as the preferred range. That spray of water, as enabled by the strategic location of multiple shower heads together with the design features of the custom design of the egg flats, provide for maximized exposure to the free flow of the water together with its food-grade antibacterial additive which together are provided as an option. If opted, such is performed outside the pasteurization medium for a prescribed time which enables the achievement of each egg and all of its particles to reach equilibrium with the elevated temperature of the sanitized spray water. Once equilibrium has been reached between the internal temperature of the egg and the external spray water temperature being applied, the mentioned spray water temperature, which is located outside of the pasteurization medium never is reduced. That feature provides for the expansion of the internal egg from the heat applied. Through the expansion of the internal egg invasion of external contaminates through the eggshell pores substantially is blocked. Pathogens either existing within the body of the eggs or trapped between the outer membranes and the eggshells in material part will either be forced to exit from the pressure caused by the expansion of the internal eggs or be inactivated by the sanitizing agent contained within the mentioned sanitized water applied. Under the above-described option once the shells have been cleansed with the spray from a shower containing a food-grade antibacterial agent and equilibrium of each internal egg has been achieved with the targeted external shower water temperature, the subject eggs promptly are transferred into the secured environment of the pasteurization medium. In each instance the invasion of airborne pathogens materially will be reduced and the concentration of surviving pathogens being carried within the chicken eggs into the secured environment of the pasteurization medium correspondingly will be reduced under this optional pre-pasteurization protocol preparation. The overall benefit achieved from the optional employment of the external shower is to reduce the quantity of pathogens present upon the eggshells stemming from their having multiplied into quantities resulting from the time made available from the date of lay to the date of the rinsing process, which frequently enables multiplication of the targeted pathogens to become excessive. The described shower provides for the benefit of the quantity of contaminants present upon the eggshells being reduced, but notably are not eliminated through the application of the described shower containing a food-grade antibacterial agent. All of the above protocol is optional to aid in reducing the level of contamination frequently existing upon uncleansed eggshells prior to entrance into the secured environment of the pasteurization medium. Notably and further to the above, the treated water employed for the rinsing process can be substituted by the use of similar temperatures applied to the subject eggs employing adjustments to accommodate the use of food-grade purified air in lieu of the referenced food-grade purified water. Such would be followed by pasteurization within the referenced safe environment of the medium.

The second new area of primary inventiveness is found to be within a new and unique pasteurization medium created for pasteurization of in-shell chicken eggs with the specific purpose of providing both housing for the mechanics for pasteurization to be performed within a self-sufficient environment. This medium protects against external contamination and is secure from violation of that security throughout the duration of the equally unique pasteurization protocol being employed as described hereinbefore, which achieves total inactivation of pathogens that may be present at high cell count levels stemming from either or both bacterial or viral sources.

Once within the isolated environment of the pasteurization medium, which contains novel security and continuous purification features that are described in greater detail in this same section hereinabove, the eggs receive continuous and varied protection against contamination or recontamination provided to the subject eggs through the optional use of a shower containing a food-grade antibacterial agent, whose temperature is programmed to vary from a preferred pasteurization temperature of 132.5° F. to temperatures below 128° F., which is below the effective pasteurization temperature range. Such water temperature changes occur at prescribed and programmed intervals. All of the above water applications together with their temperature changes and approved food-grade additives for perpetual purification during processing are replaceable with only modest alterations with purified air. The targeted log levels inactivate the more heat-resistant viral strains over those of *salmonella* strains as may be or come to be found within chicken eggs. In the end, these targeted log levels provide for inactivation of the mentioned pathogens without consequential reduction of the nutritional value of the chicken egg or the loss of or reduction to their raw characteristics whether aesthetic, functional or nutritional benefits. During the described process, the use of different temperatures held for different intervals within the temperature range to and from below 128° F. and 138.5° F. is both programmed and employed to ensure that the targeted log reduction representing total inactivation of the targeted pathogens has been achieved without heat damage to any one element of the subject chicken eggs. For certainty of clarity and understanding, the ability to inactivate targeted pathogens through achieving log level counts never before accomplished, which in the end succeed in achieving their total inactivation without causing heat damage to the subject eggs is made available through the protocol of the new art described. Thus protocol provides protection against heat damage i.e. the beginnings of cooking of any or all elements of the subject eggs through the use of intermittent interruptions of heat and the intermittent interruptions of induced chilling employed at predetermined intervals and durations all of which are performed within a new and unique protocol described and claimed herein. The new protocol recognizes and utilizes not only the natural order of the differing elements within the composition of the eggs, which include from the shell inward the outer albumen, the inner albumen, the vitelline membrane and the yolk. This protocol also employs the new and unique pasteurization formula, which provides for the protocol enabling the total inactivation of targeted pathogens that include numerous strains of *salmonella* as found within chicken eggs and the more current arrival of viruses which continue to threaten both birds and eggs with viral contamination. Science has confirmed as reported herein elsewhere that viral contamination requires greater heat to inactivate than does *salmonella*. Since chicken egg pasteurization has targeted *salmonella* only and has failed to totally inactivate all strains as found within a chicken egg without loss of raw characteristics of the subject chicken eggs, inadequate pasteurization has been practiced for decades primarily upon liquid egg products, which evidence shows over that period of time that practice likely has sickened tens of millions of people. The challenge for a totally effective protocol of pasteurization to resolve the inadequacies of a 5-log protocol of inactivation of *salmonella*, as measured by the Se strain as found within chicken eggs now is magnified by the need to take pasteurization to a still higher level. This higher level is required to inactivate viruses, which require according to science a general need for 2 logs greater than does *salmonella* for effective inactivation. The new art has the flexibility to achieve total inactivation, i.e. 10 logs, as applied to viruses, and 12 logs as applied to bacteria, when being pasteurized at the same time. Were mutations to create a greater need for higher levels of inactivation, the new protocol claimed herein can be expanded to manage the inactivation of new strains requiring such.

The new art reflects the discoveries made concerning the relationships between the individual densities of the elements contained within a chicken egg, as such relate to heat tolerances and rates of heat transfer, as further impacted by their relative location to the eggshells. The eggshells are the first locations of the heat being applied externally to the subject eggs. The internal contents of the subject eggs and their specific locations provide for the basis of a new formula for pasteurization. This formula enables a new ability to utilize the differing densities and the individual locations of the components, as found within the subject eggs containing different levels of heat sensitivity as well as different rates of heat transfer, resulting in new art that satisfies the total inactivation of the targeted pathogens without consequential damage to any one of the mentioned elements contained within the subject chicken eggs.

Once the above-described protocol has been performed and the targeted pathogens to be inactivated has occurred and while the subject eggs are within the protection of the secured environment of the mentioned medium, the shells of the pasteurized eggs are treated with a final spray containing solely a food-grade antibacterial agent. That agent is drawn into the subject eggs through the exposed eggshell pores, post substantial pasteurization having occurred, while the internal egg is continuing to contract due to ambient cooling occurring post pasteurization while still within the protected environment provided by the medium. The contraction of the egg while within the safety and purity of the new and unique medium draws into the eggs through their exposed shell pores the food-grade antibacterial agent which provides a final level of security to the subject egg purity achieved from the total inactivation of pathogens through the new pasteurization protocol employed. If any agency of jurisdiction outside of the United States were to disallow the application of the described antibacterial agent to the eggshells post pasteurization employing either air or water as the medium, that added step of precaution intended to inactivate any stray pathogens either can be replaced with a non-liquid agent or eliminated altogether. While still within the protected environment of the medium and while contraction of the internal egg is still in process due to ambient cooling post substantial pasteurization having occurred, the shells of the subject eggs are provided with a food-grade sealant which can be either a wax or a food-grade plastic sealant applied to the eggshells and their exposed pores. Notably, the residual heat during ambient cooling while within the protected environment of the medium draws the selected sealant as applied to the eggshells into the exposed pores of the eggshells, after which, post reaching ambient temperature with the temperature within the medium, the eggs are exited for packaging and shipment.

As is more fully detailed hereinabove, within the description of the new art, which employs pasteurization protocol options of performing pasteurization through either a water based pasteurization protocol or through an air based pasteurization protocol enabled by modest and straight forward modifications, which incorporate the benefits of the unique features contained within the self sufficient and protected environment of the pasteurization medium as modified to accommodate the fluid selected for pasteurization which in each case will provide for the total inactivation of all pathogens as found or may come to be found within chicken eggs through the employment of the new protocol.

Notably and significantly the above described protocol, together with its performance within the uniquely appointed medium, enables a breakthrough to the art of creating pasteurized liquid egg product currently allowed by regulation to be performed at a known to be inadequate 5-log level of inactivation of *salmonella* as measured by Se. the effectiveness of pasteurization is improved to a level providing for total inactivation of all strains of *salmonella*, as found within chicken eggs, together with the total inactivation of viruses, which are forecasted to likely become found within chicken eggs. Such is accomplished by first pasteurizing the subject chicken eggs within their shells to a level which provides for total inactivation of the mentioned pathogens, which is accomplished while retaining essentially all of the raw characteristics of the subject chicken eggs which post pasteurization under the new art can be converted into liquid egg products containing equal raw characteristics to those liquid egg products currently employing a substandard 5-log level of inactivation of Se.

The above recitation addresses the pasteurization inadequacies of all prior art to inactivate *salmonella*, as found within chicken eggs, which, in the end, confirms the need for termination of avoidable public risk caused by *salmonella*-contaminated chicken eggs, which presently remains to be the single most cause of illness as found within all food groups as reported by US Government agencies. Those reports of illness quantities resulting from the consumption of raw in-shell eggs, whether consumed in their substandard form, which may be the results of mislabeling or untimely distribution together with the inadequacies of a 5-log pasteurization, whether provided to the public through in-shell eggs or their conversion into liquid egg products, in each case represents a serious and costly set of misrepresentations to the public which has spanned decades.

Notably and more dangerously, viruses and their derivatives carry with them more heat-resistant strains of the Avian Influenza virus, which both require greater heat inactivation than do all strains of *salmonella* and are expected to continue their already present indications to achieve the ability en masse to enable human-to-human transfer giving cause for a pandemic to be forecasted as confirmed by both the scientific community and WHO.

The described new art through its novel features provides for what is effectively considered to be total inactivation of viruses through achieving a pasteurization level providing for a 10-log level of inactivation of all strains of viruses likely to be found within a chicken egg which includes the most dominant strain identified as the H5N1. The USDA Research Laboratory in Athens, Ga., confirms that Se inactivation at the same time and temperature exposures as that of the H5N1 virus produces up to a 40% greater inactivation of Se than does the same exposure as applied to the H5N1 virus as measured in Se bacteria logs. Since it requires 10 logs to inactivate the H5N1 virus with scientific certainty, such would produce an equivalent of a 12-log inactivation of Se automatically to occur. Notably, were either viruses or *salmonella* bacteria to evolve into more heat-resilient strains that require greater log reduction than 10 logs as applied to viruses, the details provided concerning the capabilities for expansion of levels of inactivation described under the new art will accommodate those needs. This feature is due to the new art's ability to use the features of the cyclical applications of heat and the applications of induced chilling whether in each case through the interchangeable use of water and air within a protocol, which prevents coagulation of the subject eggs but produces total inactivation of the targeted pathogens through repartition of the above referenced and mentioned cyclical process. Through the mentioned protocol, which describes applications of heat and chilling alternating in what is described as a cyclical manner within the prescribed protocol, employing the application and denial of heat log levels of inactivation of both viruses and bacteria representing their total inactivation are achieved while uniquely preserving the raw characteristics of the subject eggs. Notably, under the new art of improved pasteurization, the subject eggs preserve their raw egg characteristics and retain their nutritional benefits, which can be provided to the public as either a safe in-shell chicken egg retaining its raw and nutritional benefits or be employed in conversion into liquid egg product, enabling that product for the first time in its history to rightfully make a claim of reliable safety. The details of the application of the heat and its denial referenced as cyclical in nature have been more fully described herein before in this same section.

For clarity of understanding, the importance of the discovery of the benefits gained from the novel use of a programmed application of heat and its denial as employed during pasteurization in a manner termed to be cyclical in its nature enables the prevention of heat damage to each element of the internal egg. At the same time, the new art provides for the total inactivation of targeted pathogens to be achieved without material loss of the raw characteristics of the subject eggs while notably achieving log levels of pathogenic inactivation never before available without loss of the raw characteristics of the subject eggs. That accomplishment now is restated for emphasis and clarity.

SUMMARY AND CONCLUSIONS

The US-FDA as preceded by the USDA traditionally allowed eggs contaminated with a virus identified as the H3N1 to be pasteurized to the equivalency of a 4-log level of inactivation using the bacterial strain of Se as the measure when found within chicken eggs that were intended for uses specific to liquid egg product. Under the Egg Safety Final Rule adopted in 2009 the mentioned 4-log inactivation protocol as applied to the bacteria strain Se was increased to 5 logs which was intended to use Se as representing the level of inactivation for all strains of *salmonella* as well as all levels of contamination of *salmonella* as may be found within all chicken eggs which included both liquid egg product and pasteurized in-shell chicken eggs as they may occur. That determination clearly implied that no meaningful level of contamination of a chicken egg occurred beyond that as may be found within the specific strain of *salmonella* identified as Se. The Final Rule did not address viral contamination at all. The inadequacy of a 5 log level of inactivation of Se as the *salmonella* strain of measure to provide safety to a public consuming less than hard-cooked chicken eggs and believing in their safety as generated by the term 'PASTEURIZED' as displayed on the egg cartons together with the USDA shield also displayed on the egg cartons which in both cases were reinforced by the absence of the 'Safe Handling Instructions' to be displayed on all unpasteurized shell egg cartons by requirement now needs the inclusion of viruses to be added to the 'Safe Handling Instructions' to represent a totally new threat to the public health which may grow to be pandemic in its proportion. The justification for the inclusion of viruses within the mentioned Safe Handling Instructions is to provide a continuing recommendation that hard-cooking not only successfully replaces lack of pasteurization but also protects against the inadequacies of current levels of pasteurization to inactivate viruses which represent a recognized threat to the public to be delivered by a pandemic caused from the avian influenza virus.

Notably and significantly the described new inventiveness for the first time enables the total destruction of all known to exist *salmonella* strains as found within chicken eggs which under the new inventiveness renders them statistically inactivated through achievement of log levels never before actually demonstrated to have been achieved and reduced to practice while at the same time materially exceeding the current existing targeted level of a 5-log destruction of *Salmonella enteriditis* as set by the US-FDA as being sufficient for *salmonella* inactivation as carried within the language of the Egg Safety Final Rule of 2009 when none such safety can be assured. Under the new art the improved level of inactivation as measured in logs is available to destroy all of the more heat-resistant strains of bacteria than Se as found within S. Senftemberg 775W, Heidelberg, *Typhimurium*, Newport and Javiana as but a few examples of strains of *salmonella* found within chicken eggs which require more heat than *Salmonella enteriditis* (Se) for their inactivation which within Se itself carries with it sub-strains requiring higher inactivation than does the primary strain identified as Se. Said differently the use of Se as the measure for inactivation of *salmonella* on its face according to science requires materially more than 5-logs as set by the US-FDA under the new Rule of 2009.

Notably and of related importance sterilization of a chicken egg will inactivate pathogens but at the cost of the loss of nutritional values. It is pertinent to note that pasteurization preserves both the nutritional benefits and the raw characteristics of a chicken egg even when pasteurized at 12-logs as is made available under the new art described herein which inactivates all strains of *salmonella* known to be found within chicken eggs as well as those viral strains which have currently been found within chickens and may come to be found within chicken eggs in the future. The forecasted pandemic as provided by experts within the field of viral contamination as of 2015 confirms that such would result from viral strains entering chicken flocks and their resulting eggs which raises the probability of causing massive quantities of illnesses to occur from the natural spread of the virus to humans which materially would be magnified by one mutation enabling the transfer of illness to occur from human-to-human as is confirmed by selective cases already having occurred in separate geographies ranging from Europe through Asia. Even in the absence of a mutation which enables human-to-human transfer the foundation for a pandemic caused by Avian Influenza as may come to be found within chicken eggs remains to be an international public health threat of pandemic proportions as confirmed by world experts including the World Health Organization.

In the instance of new strains of viruses such carry with them a new and unique threat to public health not previously experienced from chicken eggs. As found under the H5N1 virus its potential ability to transfer serious and frequent fatal illnesses occurring from human-to-human has given cause for the scientific community to forecast that through mutations or deviations from the mentioned H5N1 it can be reliably forecasted that such will give cause for either one of or part of a base viral source to convert into an aggressive viral source which will provide for the rapid and broad transfer of illnesses from human-to-human which in the end creates the already confirmed arrival of that virus as being the foundation for a pandemic whether through human-to-human transfer of the virus or whether through the common areas of exposures to the public at large. The described deficiencies of current chicken egg pasteurization protocols employed to inactivate the targeted bacteria selected using Se as the measure employed when combined with the greater levels of inactivation of *salmonella* required to inactivate viral strains once considered together reconfirm the warnings provided by WHO that the public at large is exposed to illnesses from Avian Influenza, and the forecasted pandemic resulting from both the virus continuing to evolve and the vaccine development being incomplete due to the continuing evolution of the virus together give cause for the government agencies of jurisdiction to be delayed from resolving the issues encountered in the process of trying to protect the public health to be likened to that of a moving target. The new art disclosed and described herein contains a unique protocol which eliminates the above mentioned dilemma of a threat to public health as caused by the portion of that threat contributed to by virally and bacterially contaminated chicken eggs. The new health threats from viruses which exceed in their magnitude the health threats of those already existing from bacteria as found within chicken eggs are confirmed through reports provided by the international scientific community which are reconfirmed through forecasts from the World Health Organization that a pandemic containing viruses and labeled as the 'Bird Flu' is within the making as enabled by more heat-resistant viruses now identified to be carried by chickens as illustrated by the presence of the H5N1 virus among other virus strains now confirmed to exist and continuing to evolve. Those viruses together with their deviations may provide for human-to-human transfer of illness. Although viruses are heat-sensitive those associated with chickens and their eggs require greater heat than prior art can deliver to achieve inactivation without loss of raw egg characteristics. The new art claimed herein discloses pasteurization to be available at log levels without damage to the raw characteristics of the subject chicken eggs which provides for inactivation of both *salmonella* bacteria in all strains as known to be found within chicken eggs as well as all strains of viral contamination as may come to be found within chicken eggs as identified and confirmed by the USDA Research Laboratory in published reports on that very subject area. Were a pandemic to occur the new art referenced and claimed herein will enable chicken eggs to be used for a needed safe food source while at the same time eliminating those chicken eggs from becoming carriers of contamination and to further magnify the scope of the pandemic.

As discussed in greater detail within this section hereinbefore, the initial step employed within the pasteurization medium involves the selection of the vehicle to transfer heat or chilling to the subject in-shell eggs being pasteurized. The selections include the use of a water bath treated with a food-grade purifier, which is not the pasteurization medium of preference. The preferred options include uses of a water spray treated with a food-grade purifier, which is equally preferred with the use of air also treated with a food-grade purifier as the medium to transfer air through nozzles similar to those employed for water. In each case, the selected vehicle contains induced heat and induced chilling carried to the subject in-shell chicken eggs through employment of a new and unique protocol. This protocol contains the applications of both heat and chilling at preprogrammed temperatures for preprogrammed intervals and durations applied to the subject in-shell chicken eggs, which deliver at the end of the protocol selected chicken eggs that contain a level of pasteurization which both are free of targeted pathogens and have retained substantially all of their aesthetic and functional raw egg characteristics. The shower containing either sanitized water or sanitized air is performed at prescribed intervals for prescribed temperatures and durations, within the confines of the protected environment provided by the medium. The temperatures initially of the water or air being applied always will be elevated in their initial application to be above the temperature of the subject eggs upon their receipt into the medium. Both options of the referenced showers will contain a food-grade antibacterial agent to ensure that water and air purity are maintained for continuous inactivation of pathogens which may be present. Unlike all forms of water rinses generally practiced in the United States, the water circulated through the mentioned showerheads will be continuously cleansed during recirculation. The mentioned water employed will contain the option to be in the form of a spray or a mist. The precaution of the internal egg temperatures being equal to or slightly lower than the temperature within the medium at time of entrance is required to protect against residual pathogens present from accelerating their multiplication within the new and secured environment provided by the medium.

The protocol recited above, together with the mentioned features concerning perpetually circulating purified water which may be substituted with similarly treated purified air, is provided to the exposed chicken eggshells within the secured and perpetually sanitized environment provided by the pasteurization medium. The protocol is further enhanced in its effectiveness by multiple layers of filtration, heat and ultraviolet treatment, along with a food-grade antibacterial agent continuously applied to the purified water or air throughout the pasteurization processes of each batch of eggs. All of the recited options, protocol employed, features of the medium and the controlled intermittent applications of heat together with induced chilling collectively are unique to the new art, which ensures total inactivation of targeted pathogens, retention of both nutritional and raw characteristics of the subject eggs and the preservation of the benefits of pasteurization achieved from risks of recontamination of the subject eggs from pasteurization through table as enabled and reinsured by the uniquely secured environment of the medium.

The temperature within the shower serviced by purified water or as employed by its air alternative is to be controlled for accuracy of both time and temperature through continuous monitoring of the internal temperatures of the subject chicken eggs, which include the outer albumen, the inner albumen, the vitelline membrane, the yolk and the air sack, to ensure that variations caused by the environment of the subject eggs together with their sizes, i.e. weight, together with differing impacts upon the subject chicken eggs in their receipt of heat or chilling applied in ratios preprogrammed for the art described herein together with adjustments called for by differences found within water or air temperatures and exposure times to those temperatures. These variations satisfy the peculiarities of egg sources that include but are not limited to size, diet, water consumption, altitude and other factors understood by those skilled in the art. As the expansion of the egg content occurs during pasteurization, certain targeted pathogen cells, whether inactivated or not, are forced out from the egg through its pores into the environment of the medium. At this point, continued inactivation is provided through built-in protective provisions contained within the medium, which create the inactivation of targeted pathogens through exposure of the residual pathogens to ultraviolet, dry heat and food-grade anti-pathogenic agents applied directly to the eggshells. Notably and specifically, post the subject eggs having achieved substantial pasteurization through use of either purified water or purified air, depending upon the protocol selected, and only after pasteurization has been substantially completed in achieving the targeted log level for inactivation of the targeted pathogens while remaining within the protected environment of the medium, the subject eggs optionally can be relocated within the medium to a separate area within the medium. In either case, the eggs are provided with a shower of water or air containing the selected food use approved bactericide or alternatives which may be more appropriate for viral contamination. As an option to purified water and of equal merit for the eggs being processed, the use of purified air containing a selected food use approved bactericide can be employed. Under either protocol, the fluid choice selected to be used within water or air may require approval for food-grade use together with the ability to inactivate the targeted pathogens whether bacterial or viral. After the subject eggs have received the mentioned application of the agent selected and are ambiently cooling, the continued contraction of the subject eggs draws the mentioned agent into the eggs through its exposed shell pores, which provides for additional protection of both the pasteurization results and reinforces protection against unexpected anomalies causing recontamination to occur. Post receipt by the eggshells and their exposed pores of the above mentioned agent selected, the subject eggs while continuing to contract internally from residual heat and prior to their exit from the protection provided by the medium, receive a sealant to the eggshells and its pores consisting of either a food-grade wax or a food-grade plastic as the preferred sealants. That described final step of providing the sealant to the subject eggshells, as performed within the medium, protects the subject eggs from a contaminated environment, which always is a factor present for unprotected pasteurized eggs being exposed to environments which commonly are contaminated to an extent which over time would void the benefits of pasteurization.

Notably and materially, the above described protocol provides for equally effective variables within a common protocol to employ either purified water or purified air as the vehicle of choice to provide for both the application of heat and chilling of chicken eggs to achieve the safety provided through levels of pasteurization which in the end are total. Where agencies of jurisdiction are concerned with the employment of water in any form to either cleanse eggshells or to employ a water based pasteurization protocol, air can be optionally utilized together with its purification and ability to carry with it the transfer of heat to both pasteurize and to purify the air from contaminants along with other described agents which too are not water dependent. Cleansed air provides for an end product, which not only extends shelf life to be greater than un-refrigerated, uncleaned eggshells and the results from unwashed and unrefrigerated eggs, but also ensures protection against the natural inclination of the public storing eggs that are unwashed and not fresh longer than is appropriate before consumption. Notably, the new art satisfies the recited concerns over the employment of water in any form associated with chicken eggshells. The new art also provides for superior safety from current bacterial risks, as found to be present on eggshells, and safety from their transfer into both the eggs internally through the passage of time, which is enabled by the deterioration of the natural sealant provided to the eggshell pores, which usually occurs in 10 days or less. In certain jurisdictions a 5-log level of inactivation of bacteria, when present within an egg or upon its shell, has been deemed to be sufficient to provide public safety to consume less than hard-cooked chicken eggs. The bacteria of measure in the United States is *salmonella* in the Se strain. The new art described and claimed herein achieves the true inactivation level of all strains of *salmonella*, as now is known to be found within chicken eggs with the possible but unreliable exception of chicken eggs which are unwashed, un-refrigerated and consumed promptly. The new art described herein initially targeted a 10-log inactivation level of *salmonella* and succeeded in doing so without loss of nutritional, aesthetic or raw functional characteristics, which matched United States Government studies concluded in the 1970's intended for liquid egg product safety. The new art described herein not only provides for protection against recontamination during or post pasteurization but also provides for levels of excessive pasteurization which inactivates viruses. No other solution to chicken egg contamination from either bacterial or viral sources exists, except as found within the new art claimed herein or through hard-cooking. Notably the new art provides an option to employ either water or air in a secured environment to achieve the targeted level of inactivation needed for not only normal levels of contamination of *salmonella* as found within chicken eggs but also materially higher levels commonly found to be present within chicken eggs contaminated by various *salmonella* strains which readily multiply into tens of millions of cells when un-refrigerated in a matter of 30 days. The new found risk from viruses requires generally a 20% greater level of inactivation than does *salmonella*. The new art optionally can be programmed to inactivate both pathogens totally while retaining substantially all of the nutritional, aesthetic and functional characteristics of a fresh and raw chicken egg.

Anecdotally, under prior art, the eggs post pasteurization, as performed within a treated water bath, were transferred out of the bath onto a conveyor belt. The time of transfer averaged approximately 3 minutes. After transfer onto a conveyor belt, the subject eggs promptly were provided with a spray of an antibacterial agent to avoid airborne recontamination. During that mentioned 3 minute period, within which the subject eggs were exposed to an external environment containing a significant negative atmospheric pressure change, most of the eggs became recontaminated from airborne *salmonella* contamination. The scientific community at the time doubted that the source of contamination was airborne, but subsequent testing reconfirmed what was then considered to be an experience which was an anomaly. The secured environment provided under the new art to perform all phases of pasteurization from inception through application of a protective sealant post pasteurization completion under the new art described herein is performed within a uniquely self-sufficient, self-cleansing and secured environment which avoids all avenues of inadequate pasteurization and all areas of potential recontamination. Of particular importance, the inventive features include protection of the pasteurization level achieved from both external contamination post pasteurization and at the same time provides for the performance of pasteurization not only using unique protocols but also using equally unique equipment which includes new flexibilities to the equipment contained within a medium within which the transfer of heat together now with induced chilling is provided.

To better understand the significance of the discovery of the benefits derived from the creation of a new medium for pasteurization containing self-sufficiency, required security and an environment within which the new and unique protocol for pasteurization of in-shell chicken eggs is performed, the following described failures under prior art of this same inventor is provided.

First, the targeted level for pasteurization of in-shell chicken eggs, as provided to this inventor by senior officials at the US-FDA in 1997, was that a 5-log reduction of *Salmonella enteriditis* (Se) as may be found within in-shell chicken eggs. That level of pasteurization as represented to this inventor who eventually performed such in all respects enabled the in-shell egg carton to display the term 'PASTEURIZED' and to abandon the display of the term 'Safe Handling Instructions' together with its language displayed on unpasteurized in-shell egg cartons which advised in specific terms that chicken eggs may cause illness if not hard-cooked and more particularly identified those persons who are members of the high risk groups.

Second, the level of pasteurization originally set for liquid egg product in or 1970 was 10-logs. Sometime subsequent to that date the level of inactivation of *salmonella* within liquid egg products being produced through passage within a heated tube was relaxed to 4-logs to accommodate liquid egg product producers who were having difficulty with coagulation while pasteurizing co-mingled chicken eggs converted into liquid form. That relaxation never was provided to the public nor this inventor even though that relaxed standard was in place for nearly two decades before the above-mentioned request for a level of pasteurization for in-shell eggs was made and provided by the US-FDA to be at the above mentioned 5-log level.

The consequences of the above are reflected within the US-FDA Egg Safety Rule of 2009, which altered liquid egg product inactivation of *salmonella* from the above mentioned 4-logs to 5-logs which equated to that which was provided for in-shell eggs. That level of inactivation continues through the date of this writing.

As noted more fully elsewhere hereinbefore, various practices continue which threaten public health in magnified amounts over that which would occur from inadequate pasteurization at 5-logs of contaminated chicken eggs were such to be practiced in otherwise good faith. Nonesuch good faith practices have occurred.

Specifically, two Grade B eggs are allowed in each dozen of so marked and so displayed with the USDA Shield which confirms that the subject eggs have been as Grade A eggs.

Further to the above, unsold eggs are allowed to be repackaged and to be provided with a Grade A symbol to replace the same symbol on the prior package and are allowed to have a new "Best By' date which generally is represented to be 30 days post packaging. Such enables a minimum of between two and three months from date of lay through to the last day of the 'Best By' date represented.

Still further, the average number of eggs produced within the United States annually exceeds 8 billion dozen of which somewhat more than 2 billion dozen are converted into liquid egg product. The new US-FDA Rule referenced above allows for known to be highly contaminated chicken eggs to be co-mingled into liquid egg product once pasteurized to a 5-log level of inactivation as measured by Se. As mentioned hereinbefore, the original standard for inactivation of *salmonella* was set at 10-logs and no science since has justified a correction to that standard.

Further to the above, new teachings confirm that the quantity and concentration of *salmonella* bacteria which now includes viruses during the application of the heat utilized for pasteurization together with the resulting expansion of the internal egg content give cause to those pathogens to escape from within the subject chicken eggs through the shell pores and to become airborne in significant quantities not previously either known to or expected to occur as has been confirmed by experts within the scientific community. The negative atmosphere common to egg processing facilities frequently has been found to be insufficient to discharge the volume of *salmonella* cells being generated from the commercial scale egg grading and washing section in combination with the pasteurization being performed. Post pasteurization of in-shell chicken eggs, the air contained within the processing environment frequently became overrun by the quantity of *salmonella* cells being discharged from the pasteurization process which gave cause to provide an inability of the negative atmosphere employed within the pasteurization area to successfully discharge the quantity of salmonella cells that had become airborne. Once the mass of pasteurized in-shell chicken eggs began contracting post their heat treatment through, either ambient or induced cooling, their collective contraction created an air current enabling the free floating airborne *salmonella* cells to be attracted to the eggshells along with their exposed pores which in the end gave cause for each and every egg to be at risk of having *salmonella* contamination. That phenomenon now is found to be applicable to viral contamination since the eggs being pasteurized target both *salmonella* and viruses. That new knowledge resulting from Government studies has changed the frequency of risk of *salmonella* contamination currently found within chicken eggs to be from one egg in 3,600 eggs ranging to one egg in 20,000 eggs depending on the level of *salmonella* cells found i.e. one egg in 20,000 eggs representing the least in frequency but having the most serious health consequences. Prior art for pasteurization never has achieved either reliable total inactivation of highly *salmonella* contaminated chicken eggs, nor have protective measures such as reliance upon uninterrupted deep chilling successfully provided public protection. Such directly as well as by indirect references is confirmed by Government studies which recently reconfirm that both *salmonella* caused illnesses from under cooked chicken eggs remains to be the leading cause of food-borne illness in the United States, and reconfirmation from similar Government agencies of standing exists that one egg in 20,000 eggs remains to be contaminated giving cause to illnesses which continue to occur at the same long-standing rate of frequency. Under the prior art employed for pasteurization of in-shell chicken eggs a phenomenon occurred which resulted from in-shell eggs internally expanding as caused by the heat being applied to achieve pasteurization. That expansion caused inordinate quantities of *salmonella* cells present within the subject eggs and upon the subject eggshells to become airborne under the pressure of the expansion of the internal eggs en mass. The quantity of *salmonella* cells airborne were too great for disbursement by negative atmospheres employed even when aided by exhaust systems. The result was and may continue to be that a greater percent of the subject eggs became contaminated from the eggs post-pasteurization collectively contracting internally and creating a current drawing the airborne *salmonella* cells back onto the exposed pores of the eggshells post-pasteurization which created more *salmonella*-contaminated eggs than existed had pasteurization not been provided at all. Under the new art claimed herein, a primary area of inventiveness is found within the medium described, which resolves the unfortunate discovery previously experienced under prior art that airborne recontamination of eggs was inevitable unless new measures of security were to be employed. Specifically those measures to be employed would require addressing of the quantity of airborne bacteria present despite prior countermeasures employed which included negative atmosphere and prompt chilling post-pasteurization. Those issues remained unresolved under prior art as found within the patent issued to this same inventor identified as the U.S. Pat. No. 6,692,784 B2. The problems of recontamination described herein above together with inadequate pasteurization of *salmonella* through an art employing a target of a 5-log level of inactivation as represented by Se is compounded as a public health risk when the pasteurization protocol which currently exists is faced with the need for inactivation of all cells of *salmonella* stemming from all strains of *salmonella* as further compounded by the now present viral strains requiring greater levels of inactivation as measured in logs than do *salmonella* strains for their total inactivation which no present art employed commercially achieves.

The first of the two primary areas of inventiveness is described to be ‘cyclical’ in its nature. That term is applied because it is apt to the new art that provides for the application of heat and its denial in a programmed manner which is unique. Specifically, the new art provides for the application of heat to in-shell chicken eggs which raises each element internal to the subject chicken eggs to a predetermined targeted pasteurization temperature. Depending upon the tolerance level of the outer albumen to the heat applied the subject eggs are held at a predetermined temperature identified as the pasteurization temperature long enough to achieve partial pasteurization but short enough to avoid damage to the outer albumen. Once that time frame has been established to suit the peculiarities of the subject eggs as influenced by size, water content and other considerations discussed herein before the egg temperatures are lowered to protect the outer albumen which contains the greatest heat sensitivity and the greatest rate of heat loss. The outer albumen of each egg gains that protection from temperatures below the minimum pasteurization temperature of 128° F. For reasons discussed in greater detail herein before, the other elements of the chicken eggs due to their locations being more remote on a graduated basis from the heat or cooling sources being applied on a programmed basis do not require the same level of protection from heat damage as does the outer albumen. Notably, when heat is applied to an in-shell egg the outer albumen is the first element achieving an inactivation level involving the targeted pathogens. The other elements of the chicken eggs are slower than the outer albumen to react to both heat and its denial which includes both induced chilling and accelerated heat gain. By applying heat to all elements of the eggs and discontinuing the application of heat once equilibrium between all elements within the chicken eggs and the targeted pasteurization temperature have occurred the chicken eggs are held at that temperature depending upon their individual characteristics for a period of time, most often producing a 1.0- to a 1.75-log reduction of the targeted pathogens which is expected to be a virus requiring a greater number of cycles for their inactivation than those required to inactivate current strains of *salmonella* bacteria which require a lesser level of inactivation than viruses but approximate twice that which currently is being employed and endorsed by regulation. After the inactivation level has been calculated into time required for each cycle mentioned such is divided into the selected log level of inactivation targeted which once employed provides for total inactivation of the targeted pathogen.

The above-described protocol, when employed in the following sequence, creates a description of the novel method employed for pasteurization of in-shell chicken eggs through use of the unique characteristics of the outer albumen to provide for the parameters to be employed through the application of heat and its denial through which from repetition a cycle of events that includes in the order of their occurrence raising the internal temperatures of the subject eggs to a targeted pasteurization temperature and holding that achieved temperature for a prescribed time as governed by the heat tolerance level of the outer albumen which is followed by the lowering of the temperature of the outer albumen to be below 128° F. that in the end produces a result as measured in logs achieved for the inactivation of the targeted pathogen then is repeated until said logs achieved equate to those logs required for that targeted pathogen to be totally inactivated. That protocol creates what is described to be a cyclical event stemming from the repeated application of heat as the beginning point of pasteurization resulting from the internal heat of the subject chicken eggs achieving 128° F. and being elevated to the selected pasteurization temperature as measured by each element within the chicken eggs each achieving temperatures which at minimum are equal to or may slightly exceed the common internal pasteurization temperature targeted for each chicken egg. At the point in time that all elements within the subject chicken eggs having achieved the mentioned pasteurization temperature selected, the subject eggs, depending upon their characteristics, are held at that temperature for a time which more or less achieves 1.0-logs at minimum. Post achievement of the mentioned log level resulting from the holding time at the targeted pasteurization temperature, the subject eggs are cooled through preferably induced chilling to the extent that the outer albumen singularly reaches a temperature below 128° F. more rapidly through the preferred induced chilling. Once that has been achieved the described cycle is resumed and repeated until each element as previously described to be within the subject chicken eggs has achieved the targeted log level which equates to the total inactivation of the targeted pathogen selected. The achievement of the log level targeted through the art employed is enabled by the protection against heat damage of the outer albumen which uniquely is accomplished through the intermittent programmed lowering of the temperature selected for pasteurization being intermittently applied which includes the mentioned induced chilling also being applied intermittently on a pre-programmed basis which enables the outer albumen to fall below 128° F., as programmed to avoid heat damage. That protocol is unique within the art of pasteurization and protects the outer albumen from heat damage while at the same time allows for the denser portions of the subject eggs to continue to receive heat albeit in lesser quantities, which, in the end, provides each element including the outer albumen with a level of inactivation, which is complete, as applied to both bacteria and viruses that may be present while retaining substantially all of the physical and nutritional benefits of a raw egg.

The achievement of the targeted log level by each of the non-identical elements of the subject in-shell chicken eggs is achieved by the continuous pasteurization provided to those elements, excepting that of the outer albumen for reason that, as mentioned earlier, the outer albumen singularly is protected against heat damage causing loss of raw characteristics through programmed lowering and raising of its temperature to below 128° F., which protects it against heat damage. Programmed test results confirm that the achievement of the targeted log level by the densest and most remote element within a chicken egg is found to be the yolk. Through adjusting the holding time of the outer albumen while below 128° F., damage to any one element within the egg in terms of heat causing loss of raw characteristics is avoided by the automatic reduction of the heat to each of the other elements although differing in their quantity and rate due to their differing densities and locations as related to both the outer albumen and the external source of the heat being transferred through the eggshell. Although the targeted log reduction may vary between the least dense outer albumen with those of the more dense other elements contained within the subject in-shell chicken eggs, enough flexibility in heat tolerance has been learned to exist for those elements to allow for the targeted log level of the densest element as found to be the yolk to achieve the same targeted log level of inactivation, while at the same time avoiding damage to the other elements i.e. the inner albumen and the vitelline membrane without consequential loss of their raw characteristics. That cycle on average will produce a log result which as applied to each element of the chicken eggs will in non-exact form produce an expected total single cyclical result of a 1.5-log reduction for each element within the chicken eggs. Therefore, if the log reduction programmed is targeted to inactivate all strains of *salmonella* such would require up to eight cycles to achieve inactivation equating to 10-logs which in the end uniquely provides for the total inactivation of that pathogen. As the characteristics of the egg change and as the heat tolerance of the bacteria or viruses change so do the targeted log levels required for their inactivation, which is provided through the flexibility contained within the new art. This new art is adaptable to accommodate specifically the peculiar and differing needs for inactivation of the targeted pathogens through adjustments to separately or in combination the pasteurization temperature, the speed of each cycle and the duration of the time the subject eggs are held at the pasteurization temperature along with their time held at the lowest temperature which occurs when the outer albumen is below 128° F. The protocol employed is provided through a computerized program, which both computes and manages the specific temperature settings and their durations to be employed along with the number of cycles required to achieve total inactivation of the targeted pathogens without consequential damage to any one element of the subject chicken eggs. At the end of the cycles employed, the targeted log reduction of the chicken eggs will have been achieved by each of its elements but not in identical quantities. What will occur is that each element having different density characteristics within their composition will reflect their differing tolerances to heat through receiving modest excesses to the logs provided within the formula employed to achieve the targeted log level of inactivation of the targeted pathogens. Test results confirm that excesses to individual elements within the chicken egg are inconsequential to giving cause for loss of raw characteristics by any one element exceeding the targeted log reduction from the particular formula variables employed under the specifications contained within the new art. The results achieved provide for total inactivation of the targeted pathogens, whether bacterial or viral, as currently found or may come to be found within or upon chicken eggs, which no other art successfully has achieved through a production dedicated to commercial uses. That new achievement uniquely is provided from the described cyclical application of heat and its denial which enables the total inactivation of targeted pathogens through achievement of required log levels performed in a manner which provides total safety to the consumer without damage to the raw characteristics of the subject eggs or the loss of their nutritional benefits. The two areas of primary inventiveness currently being summarized are described in greater detail earlier within this same section. The same art provides for the elimination of the risk of recontamination of the subject chicken eggs from not only all *salmonella* strains but also viruses which is enabled through the area of primary inventiveness previously discussed and as is further discussed herein below.

The benefits from levels of pasteurization described above, as made available through the cyclical application of heat and its denial, has been identified as the first of two primary areas of inventiveness, which now has been made available through the new art described and claimed herein. That important area of new art is complemented by a second primary area of inventiveness, which includes a new and unique pasteurization medium that is secure from the risks contained within an external environment to which chicken eggs are exposed whether as raw in-shell eggs or as converted into pasteurized in-shell chicken eggs. The problems of initial contamination of chicken eggs, whether the contamination is *salmonella* bacteria or viral, are not limited to caged hens for reason that un-caged hens generally share the same exposures to contaminants as caged hens which if not identical are replaced by the peculiarities of sources unique to each environment.

Within the second element of the two primary areas of inventiveness, as contained within the new art, the previously described new and unique pasteurization medium provides total and continuous security from the external environment, which, in the end, enables the subject eggs to be protected from the perils contained within the unprotected external environment. In the unprotected external environment, the extremely difficult problem exists, caused by airborne recontamination occurring either post pasteurization or if not post pasteurization post lay while the internal eggs are contracting through cooling within a totally unprotected environment until reaching ambient temperature. Certain attempts to sanitize rinse water applied to raw chicken eggshells have been utilized, but that practice is flawed to an extent from which contamination is enhanced and spread more often than reduced.

Exposures to the external environment post pasteurization under all prior art currently employed for in-shell egg pasteurization includes the risk of airborne contaminants whose mass has been proven to be uncontrollable. That phenomenon gives cause for recontamination or increased contamination to pasteurized eggs, resulting from the mass of airborne *salmonella* cells created by the expansion of the subject chicken eggs during pasteurization whose presence eliminates the benefits gained from pasteurization by nullifying the safety levels achieved through pasteurization. The problem described in substantial part stems from the application of an antibacterial agent to the eggshells promptly after pasteurization. In this case, pasteurization becomes nullified by the speed of the airborne pathogens attaching themselves to the exposed eggshells in great quantities within the time frame of the three minutes provided from the time of exit of the eggs from the medium to the time of application of the antibacterial agent. Through the phenomenon described, the safety gained through pasteurization is nullified. Pasteurization experience confirms that even within an environment which employs a negative atmosphere to rid the pasteurization area of airborne contaminants, the quantity of airborne contaminants attracted to the exposed pores of the subject eggshells in a matter of three minutes post pasteurization overcame both the negative atmosphere of the pasteurization area and the protective measures provided by the application of an antibacterial agent to all eggshells and their exposed pores, even when applied in drenching quantities at a lower temperature than that of the internal eggs to ensure their absorption. Such resulted in greater quantities of eggs being contaminated than would have existed had no pasteurization been performed.

All of the above issues are resolved by the second of the two primary areas of inventiveness, which is referred to as the pasteurization medium. The pasteurization medium uniquely contains a secured environment, along with numerous safeguards contained within that environment, to preserve its integrity, which includes total security from the outside environment beginning at the commencement of pasteurization through to its completion. The features of the new medium containing the protected environment within which pasteurization is performed are discussed in greater detail earlier within this same section. The sealed environment of the medium avoids reliance upon a negative atmosphere, where pasteurization is performed as employed under prior art, which failed to provide protection and in fact allowed for recontamination from airborne *salmonella* cells to occur in great quantities all as previously described within this section. At completion of the pasteurization performed under the new art but before exit from the medium, a protective sealant to the exposed eggshells is provided to each egg. Unless damaged during shipment, the sealant provides for the protection needed to maintain the subject chicken eggs to be both free from internal contamination and free from external recontamination, as a result of the combination of the eggs having been pasteurized to be pathogen free to the levels required for such, together with the protection provided to prevent recontamination from the benefits of the environment within which pasteurization was performed, together with the protection provided against recontamination through the proper sealing of the eggshells as described and while still within the protected environment of the medium.

The first of two primary areas of inventiveness as is discussed and claimed hereinabove at the inception of this section includes the cyclical application of heat and its denial to in-shell chicken eggs, which enables the unique ability to inactivate targeted pathogens without loss of the raw characteristics as found within raw in-shell chicken eggs.

The second primary area of inventiveness containing the vehicle described for pasteurization is identified and referred to as the pasteurization medium includes features enabling total inactivation of pathogens which in turn enables the art contained within the previously discussed first of the two primary claims contained herein to occur. Within the novel pasteurization medium its features include a new and unique self-sufficient and clinically safe environment for the pasteurization of in-shell chicken eggs from inception of pasteurization through to its conclusion. The medium contains unique abilities to provide purity to an end product through continuous purification of all elements within its secured environment. To perform the second of the two primary areas of the new inventiveness which includes the ability, more fully discussed hereinbefore, to pasteurize in-shell chicken eggs to materially higher logs than available under prior art as measured by logs applicable to either or both viruses and *salmonella* bacteria. In the end, the medium provides for their total inactivation without risk, from commencement through completion, of the pasteurization protocol employed to be subject to either recontamination or loss of the nutritional benefits and raw characteristics of the subject in-shell chicken eggs resulting from the pasteurization process. Such is accomplished within the new medium which provides for the continuous sanitized protection of the equipment together with the continuous sanitization of the air contained within the secured environment of the medium, as well as the continuous sanitization of the water optionally employed in lieu of air to perform pasteurization. Collectively all of the above-described features contained within the medium provide for an environment which is supported by independent self-servicing capabilities which enable uninterrupted pasteurization processing to occur from commencement of pasteurization through to its conclusion. The new art also provides through its innovative improvements protection against contamination from viral sources, whether internal to the egg before pasteurization or external to the egg post-pasteurization through employment of a protocol which enables total inactivation of all known contaminants to chicken eggs, whether viral or bacterial either existing or anticipated to occur. Such is accomplished through optional levels of pasteurization made available under the new art which utilizes the new knowledge gained from the heat transfer rates of each of the differing elements found within a chicken egg, which is converted into a formula that is applied through use of a repetitive protocol which enables adjustments to achieve differing levels of inactivation as required for a specifically identified targeted pathogen or the strain of that pathogen requiring a specific level of heat exposure for its inactivation.

In summary, there are two new and unique primary areas of inventiveness for pasteurization of in-shell chicken eggs, which when employed together in the manner described herein throughout enable the achievement of total inactivation of targeted pathogens which under all prior art never has been available without either damage to the raw characteristics of the subject eggs or the loss of their nutritional qualities.

The first of those mentioned two primary areas of inventiveness involves a programmed cyclical application of heat and its denial within which adjustments are made to the application durations of the selected temperature of the heat being applied to the subject chicken eggshells together with its denial and its replacement with induced chilling for pre-selected application durations. Such is performed through programs employed, which change from one to another as influenced by the targeted log levels of inactivation required for a specific pathogen, as further influenced by the specific characteristics of the subject chicken eggs. Those targeted results include timings of the protocol employed, which govern the durations of the applications of heat and induced chilling without causing damage to the raw characteristics of the subject eggs. This ability is provided by the flexibilities of time and temperature contained within the protocol employed that enable the total inactivation of targeted pathogens through the flexibility provided from differing exposures to heat as tempered by the ingredients of the new art to be intermittent in its application of heat. a This allows for total inactivation of the most heat resistant pathogens which may be found or come to be found within chicken eggs.

In the preferred embodiment of the pasteurization medium described, which includes the protocol employed for heat gain and loss that target different elements within the composition of the egg, which through the selective management of heat, as applied to those elements, enables the acceptance of higher log levels of inactivation of both viral and bacterial contamination to occur without material reduction of the raw characteristics of the targeted chicken eggs. The cyclical application and denial of heat through induced chilling is accomplished through measuring logs achieved, which result from heat application having been applied throughout the eggs in a manner which addresses the differing locations and densities of each element within the composition of a chicken egg. Those mentioned elements include the yolk, which is the most remote element of the egg and its equally dense vitelline membrane as well as the somewhat less dense inner albumen. Such is accomplished by applying heat to the internal egg intermittently, whose limitations are governed by the quantity of the heat applied to the whole egg as modified and controlled from the higher rates of heat transfer as found within the least dense element of the egg as represented by the outer albumen. For ease of understanding, the lesser density of the outer albumen requires only intermittent application or denial of heat to accomplish targeted temperature changes. By using the outer albumen's highest speed in heat gain or loss over those of the other elements contained within chicken eggs that speed provides for the outer albumen achieving temperature changes together with targeted log achievements more swiftly than do other elements of the chicken egg. Through the use of intermittent but controlled durations of a unique method of the application of heat and denial of heat, the new protocol enables applications of heat in greater total quantities, which in turn enables higher log reduction of targeted pathogens without damage to either the raw characteristics of the chicken eggs or a reduction in their nutritional values. At the same time, the new protocol provides total inactivation never before achieved of viruses and bacteria requiring up to or exceeding 12-logs, as measured by Se, which under current science enables inactivation of all strains of either viruses or *salmonella* bacteria as currently found or likely to become found within chicken eggs.

When performed by one reasonably skilled in the art, the monitoring of the denser vitelline membrane and yolk together with environmental factors which influence pasteurization in general, from impact by such extraneous factors including but not limited to altitude, egg water content and egg size along with the targeted pathogens to be inactivated, produce results which can be factored into an equation employing intermittent applications of heat to the subject eggs in a manner previously referred to as the cyclical application of heat and its denial. Whether pasteurization is performed through a formula employing either purified air or purified water, adjustments to the formula in relation to time and temperature will be required, as applied to their respective rates of flow. These rates of flow will be adjusted to accommodate not only the rates of flow of both water or air, as employed to accommodate their individual densities which impact upon their rates and quantities of heat or chilling transfer due to their differing compositions both separately and comparatively, together with their end impacts upon the rates of heat or chilling transfers due to differing in-shell egg sizes, which in the end collectively enable the specific characteristics of the batch of in-shell chicken eggs being processed to achieve total inactivation of targeted pathogens without inconsistencies of consequence to the end product. In the end, the targeted and never before achieved log levels enabling the destruction or inactivation of both *salmonella* and the more heat-resistant strains of viruses now threatening to cause a pandemic can be totally inactivated without consequential loss of raw egg characteristics by the targeted chicken eggs due to their varying sizes and differing rates of heat and chilling transfer.

The second of the above mentioned two primary areas of inventiveness involves the employment of the pasteurization protocol within a protected environment provided by the pasteurization medium, whose benefits provide security from risks of either incomplete inactivation of pathogens or recontamination which when achieved together provides certainty that no statistical risk of illness of consequence from either viral or bacterial contaminants as found or may come to be found within chicken eggs will occur.

As a result of the two above described areas of primary inventiveness, consisting of the cyclical application of heat and the medium within which it is employed, when employed in tandem such provides the public with the benefits from not only the newfound safety from illnesses traditionally caused by eggs which are reported to be the leading cause of foodborne illnesses but also provides the public with the benefits from the subject eggs retaining nutritional, functional and aesthetic characteristics as found within their pre-pasteurization raw states. Further, the new art not only accomplishes the achievement of the retention of raw egg aesthetics and nutritional features post-pasteurization through employing ingredients of the new art claimed, which includes the use of fluctuating temperatures as applied to the internal ingredients of the subject eggs as is made available through the intermittent and alternating applications of both heat and induced chilling together with the timing of programmed applications and denials as described in greater detail herein before. Said new art also enables the statistical inactivation not only of all deviations of all strains of *salmonella*, as found within chicken eggs, but also enables through its unique ability to provide flexibility to the levels of heat exposures and cooling exposures to provide for the benefits to be gained from total destruction of viruses which require materially greater levels of heat for their destruction than do the most heat-resilient stains of *salmonella* bacteria. Further, the new art in the second of its two parts, as described earlier, provides for a unique pasteurization medium within which the environment is secured from external contamination. Such enables prevention from recontamination and to allow for the total inactivation of pathogens as found within chicken eggs to occur. Those critical benefits are enabled through the flexibility of the cyclical pasteurization protocol employed together with the benefits provided from the achievement of log levels required for the inactivation of the targeted pathogens to be complete and without risk of either residual contaminants being present or inadequate pasteurization to have occurred.

Notably and of significant distinguishing importance over prior art, the new art not only provides for satisfaction of deficiencies to current pasteurization protocols employed, as found within both in-shell chicken eggs and liquid whole egg product, which as acknowledged through Government agency reports, together with interpretations of studies performed by the scientific community, confirm that a 5-log protocol for *Salmonella* inactivation limited to Se is inadequate to provide public health protection against known to be highly *salmonella* contaminated chicken eggs giving cause to illnesses whether from in-shell chicken eggs or from their conversion into liquid product forms. A more appropriate log reduction of all strains of *salmonella*, when considered together, is confirmed through science to be 10-logs to achieve *salmonella* inactivation. Some would argue that a 5-log level of inactivation of *salmonella* as identified to be Se would inactivate reasonable deviations in levels of contamination as found within a contaminated chicken egg for a period of time post lay, which would not negatively impact upon public health. That argument would be furthered by reliance upon deep chilling occurring from time of lay through time of consumption. Unfortunately, the reality of promptly achieving and maintaining deep chilling without interruption from farm-to-table as is practiced in the United States and within selected other countries is dangerous to rely upon to avoid the speed within which *salmonella* multiplies into both sickening or lethal quantities. As one example, one cell in one egg in a non-refrigerated but normal room temperature environment within forty days of lay may achieve a cell count of one trillion cells. At that level which approximates the same timeframe as the date of lay together with the timeframe to packaging and the 'Best By' date displayed on egg cartons combined with the risk from *salmonella* food poisoning to the public at large is significant. Such is enhanced by interrupted refrigeration from farm to table, the known and authorized inclusion of substandard eggs containing high levels of *salmonella* contamination into liquid egg product employing an equally substandard level of pasteurization of 5-logs as measured by Se, the co-mingling of Grade B eggs into Grade A cartons, the repackaging of stale eggs into new cartons containing new 'Best By' dates when considered together create in part the reason why chicken eggs whether pasteurized or not remain to be the leading cause of foodborne illness in the United States. Such result is furthered by the vulnerability of some 150.0 million persons identified by the Government as being members of high risk groups which on average consume a minimum of 15 dozen chicken eggs annually. As discussed herein elsewhere, eggs known-to-be highly contaminated are allowed to be contained within co-mingled liquid egg product as one illustration of reckless oversight. That enablement is provided under the Egg Safety Rule of 2009 as sponsored by the US-FDA. Eggs identified to be of Grade B standard are allowed to be co-mingled with Grade A labeling. Eggs provided to food service do not employ 'Best By' dates. Those recited common practices are only a few of several which together in part provides an answer to why chicken eggs consistently for decades have been the annual single most source of food borne illnesses.

In the instance of new strains of viruses, such carry with them a new and unique public threat not previously experienced from chicken eggs as is found under the H5N1 virus with its potential ability to transfer serious and frequent fatal illnesses from human-to-human or at the least give cause to serious illnesses through consumption of eggs containing the H5N1. Those underlying issues have given cause for the scientific community to forecast that the H5N1 through continuing mutations or deviations is a strain of virus which is most likely to give cause for either one of or part of a base viral source to convert into an aggressive viral source which in the end creates the already confirmed arrival of that virus together with potential deviations creating a foundation for millions of illnesses stemming from less than hard-cooked chicken eggs even without its potential furtherance for human to human transfer. The described deficiencies of current chicken egg pasteurization protocols to successfully inactivate *salmonella* as targeted by Se at a 5-log level of inactivation combined with the greater levels of inactivation over *salmonella* required to inactivate viral contaminations, when considered together, reconfirm the warnings provided by WHO. These warning indicate that the public at large is exposed to illness from Avian Influenza and the forecasted pandemic resulting from both the virus continuing to evolve and the vaccine development being incomplete due to the continuous evolution of the virus giving cause to what essentially can be described as a moving target. The new art disclosed and discussed herein provides for a unique protocol to be employed to eliminate the threat to public health, as currently found to stem from *salmonella* primarily but also as already forecasted by the international scientific community, which continues to report that a new and participating source contributing to the magnitude of a potential pandemic has been confirmed to stem from Avian Influenza as enabled through the more heat-resistant viruses now identified to be carried by chickens as illustrated primarily by the H5N1 virus now present and continuing to evolve. Viruses together with their deviations may come to provide for human-to-human transfer of illnesses. Viruses are heat-sensitive but require greater heat than all prior chicken egg pasteurization art can deliver to achieve total inactivation of viruses, as well as all strains and levels of contamination of chicken eggs by *salmonella* without loss of raw egg characteristics. The new art claimed herein discloses pasteurization to be available against both avian-caused influenza and *salmonella*-caused illnesses while at the same time retaining the raw characteristics of a chicken egg together with enabling those same eggs to provide a safe food source to a public in need of such. The mentioned new art performs pasteurization preferably through substitution of a treated water bath with a spray of either treated air or treated water at varying densities and velocities within a secured environment.

The new art discussed above enables public protection which is timely. The discussed virus strains which in part will be found within chickens and their eggs as deviations from strains already existing will in the end contribute to a global pandemic in a magnitude comparable to that of the 1918 pandemic as has been reconfirmed by current forecast provided by the World Health Origination. That pandemic killed well in excess of 75 million people. In support of an increase in numbers of casualties resulting from a new pandemic over the casualties estimated as having occurred in the mentioned 1918 pandemic such is influenced by both population growth and ease of spread through current public mobility over that of the 1918 timeframe.

Notably and significantly, reports from mid-2015 and prior as authored by the scientific community including WHO discuss the need for development of a vaccine together with the delays occurring for that development as being caused primarily from the continuing evolution of the virus which may enable not only Avian Influenza to occur but also in material part will create massive contamination to chicken eggs that materially will broaden the scope of the pandemic.

As previously discussed, the threat of a pandemic generated by a virus repeatedly is forecasted by the scientific community as being both in the making and inevitable. Potential evidence of the accuracy of that forecast occurred in the United States in 2009-2010 which was reported publicly a year later in 2011. A new strain of virus having certain similarities to prior viruses identified as a category to be within the Swine Flu species occurred in the United States only with notable lack of publicity as to its scope and devastation. The strain of virus was new but resembled characteristics of those found within the Swine Flu which is not limited to swine. Confirmed reports show that within the Unites States in less than a two-year span i.e. twelve months bridging two years more than 60 million people were sickened and 12,000 persons died. The virus was identified as the H1N1.

Recent scientific studies confirm that a 5-log pasteurization protocol for *salmonella* more specifically identified as Se as found within chicken eggs is inadequate to inactivate all strains of *salmonella* as commonly found within chicken eggs. Such inadequacy is confirmed by a host of public health agencies all of which also confirm that *salmonella*-contaminated chicken eggs gives cause to public illnesses in greater quantities than found to be within any other food group. Such is confirmed by reports from both the USDA Office of Inspector General and from reports from the National Egg Regulatory Officials. Anecdotally but pertinent to reports which in the end impact upon health risks to the public, the selected use of Se as the functioning strain of *salmonella* as found within chicken eggs was selected primarily because of its believed and somewhat assumed prevalence to be within but not upon the chicken eggs at time of lay resulting from contamination of the ovaries of the laying hens providing for a long-standing estimate of a frequency of 1 egg in 20,000 eggs being contaminated from Se whose location primarily is reported to be within the ovaries of the laying hens. Significantly, little attention has been paid to the long-standing acknowledgment that the H3N1 virus has been found to be present within chicken flocks for decades. In the case of Se when present within laying flocks the subject flocks must be destroyed and their eggs must be either destroyed or pasteurized to the then level of 4-logs or the more current level of 5-logs as measured by Se. The same protocol traditionally has been employed by the USDA and the US-FDA pertaining to chicken flocks producing eggs containing the H3N1 virus for decades. The new art claimed herein inactivates viral contamination of chicken eggs, which require higher levels of inactivation than do those bacterial strains as found within chicken eggs. Notably, for decades prior to 2009 the US-FDA and other agencies of jurisdiction or of interest allowed H3N1-contaminated eggs as well as *salmonella*-contaminated eggs to be co-mingled or separately converted into liquid egg product and to be provided to the public in liquid egg form while employing a level of pasteurization of 4 logs as specifically measured by Se without regard to higher inactivation levels required by viruses or other more heat resistant strains of *salmonella* than Se. Further, it was known all along that a 5-log level of inactivation of Se was inadequate to inactivate *salmonella* at levels known to be frequently achieved within contaminated chicken eggs employed within and subjected to a 4-log pasteurization of liquid egg product which when changed to 5-logs then included in-shell chicken eggs. Further to the above the 5-log level of inactivation was reconfirmed through the US-FDA sponsored Egg Safety Rule of 2009 which finally omitted references to the H3N1 virus but continued to employ a 5-log inactivation level for all strains of *salmonella* bacteria when numerous specific violations of eggs allowed to be employed for pasteurization had no hope whatsoever of being safe for public consumption unless hard-cooked. Details of those violations already have been stated within this section hereinabove.

Significantly and notably, as a separate area of public misinformation to that of the above-mentioned H3N1 virus being inactivated at 5 logs a similar misrepresentation of reliance upon a 5-log level of inactivation for all *salmonella* strains also has existed. Those dual misrepresentations have been conveyed to the public as providing eggs safe for consumption within all recipes containing chicken eggs if pasteurized to the mentioned 5-log level of Se when none such safety exists. What now seems obvious is that all chickens are exposed to hen manure as well as rodent manure within their feed prior to the eggs being laid. The internal contraction of the eggs post lay draws in external contaminants which may be either airborne as within a hen house, contact with manure from the hen itself or contact with contaminated air carrying *salmonella* bacteria of multiple strains which would include but not be limited to Se. Since common practice within the United States employs rinse water to cleanse the eggshells from manure that protocol carries with it the risk of spreading contamination located on the eggshells practically post loss of the natural protective sealant either from the passage of a few days in time or from the rinse water employed that usually is unclean. Hence, no egg in current circulation can be assured to be safe.

All of the above described issues which have been practiced for decades now can be overcome through the benefits provided from the new art claimed herein which achieves total inactivation of both bacterial and viral contamination as may be present within eggs which may be co-mingled with eggs that have escaped contamination. Such provides a remedy to the lack of notice by agencies of jurisdiction to the simple, obvious and logical fact that at time of lay the subject chicken eggs may be internally warmer than the hen house environment which would give cause for the eggs to contract internally and to draw in contaminated moisture being applied to the eggshells or air which too is likely to be contaminated. The problems of contamination of the eggs through contraction as discussed are similar to the issues experienced by prior art employing pasteurization which gave cause to massive quantities of airborne contamination to occur during a brief period made available from the timeframe of the eggs exiting the pasteurization medium through to the time of application of an antibacterial agent being applied to the exposed pores of the subject eggshells which occurred in a matter of approximately three minutes even when countermeasures of an increased negative atmosphere within the pasteurization setting was employed. The new solution contained herein to provide certainty of safety while preserving the nutritional and natural taste of the subject eggs is pasteurization to a log level which provides the needed certainty of inactivation of all pathogens threatening public safety as performed within a medium that provides the subject eggs with protection against recontamination from point of entrance into the medium through to the point of exit from the medium post pasteurization through to consumption. That art now becomes available through the claims recited herein.

Of notable significance to the new level of safety benefits uniquely provided under the new art discussed and claimed herein in significant contradiction to the new discoveries the US-FDA as recently as in 2009 not only confirmed under The Egg Safety Final Rule that co-mingled and so-labeled highly contaminated chicken eggs could be utilized for public consumption without restriction of any nature if pasteurized to a 5-log level of inactivation of Se. Notably, the end product bearing the term 'PASTEURIZED' and not bearing the contents of the 'Safe Handling Instructions' required on raw egg cartons is misleading although it continues to be employed. It is general knowledge that a 5-log inactivation of Se whether for in-shell chicken eggs or within co-mingled liquid egg product under current practices already described has no hope whatsoever of providing reliable safety to replace the need for hard-cooking. The misinformation provided to the public is particularly more noteworthy for the 150.0 million persons contained within risk groups. Material to the risks and inadequacies of the current pasteurization process enabled under the mentioned Rule the inclusion of known to be highly contaminated chicken eggs containing high counts of *salmonella* already present is allowed. Those already highly contaminated chicken eggs in part result from insufficient or interrupted cold storage, repackaging of unsold product bearing new and more current dates and distribution practices enabling temperature changes which enable inordinate multiplication of *salmonella* to be present at time of public consumption as either in-shell eggs or converted into pasteurized liquid egg product even when the subject eggs having been exposed to an environment pre-pasteurization enabling *salmonella* multiplication prior to processing to achieve frequent count levels reaching one billion cells or more even prior to processing and packaging of the subject eggs or converting a pre-dedicated portion of said eggs into liquid egg product pasteurized to a 5-log level of Se inactivation. The levels of contamination described in the end would require a level of pasteurization of Se as measured in logs equating to a minimum of 10 logs in lieu of the described US-FDA requirement of 5 logs as measured by Se to qualify the subject eggs to be labeled as 'PASTEURIZED' and to be represented to the public as safe for consumption when less than hard-cooked.

Thus, under prior art the mentioned inactivated contaminants post-pasteurization to the 5-log level of Se inactivation were enabled to rapidly multiply in the absence of immediate and continuous induced chilling whose purpose only is to retard the mentioned multiplication that in practice neither inactivates nor destroys the targeted viruses or bacteria. Even were the minimizing of the multiplication rate through prompt chilling to occur the time lag to deep chill stacked eggs provides adequate time for higher levels of pre-contamination to become potentially lethal to high risk groups even were the eggs to achieve uninterrupted deep chilling from the initial application of the chilling through to table. In support of the unreliability of continuous and uninterrupted deep chilling from farm to table the national distribution system for chicken eggs when considered together with interrupted transportation and storage caused by time and distance together with breakdowns and delays from weather conditions collectively contribute to a level of risk of illness not utilized as part of the protocol for safety provided from continuous and prompt deep chilling as performed in a laboratory setting.

The above-described circumstances outline the public health risks caused by the inordinate speed of multiplication by pathogens including *salmonella* with the resulting achievement of becoming lethal through their increased count in a matter of days only. Certain Government agencies have reported that immediate and continuous deep chilling from farm to table will avoid multiplication of *salmonella* into lethal quantities. That described protocol employing refrigeration is disqualified on its face. It is impossible to perform with reliable consistency deep and uninterrupted refrigeration from farm to table as required under a Hazard Analysis Critical Control Point's (HACCP) plan relying upon the described deep refrigeration when nonesuch is feasible or reliable in practice from date of lay through date of consumption. That reliance is known to be false but continues to be allowed through the mislabeling of product which provides for misplaced product confidence at the expense of at minimum 150.0 million persons within the United States identified as having compromised immune systems who have relied upon the implied safety provided by the term 'PASTEURIZED' as found upon liquid egg product cartons and the USDA Shield as provided upon raw in-shell chicken egg cartons which on their face provides implied safety from bad food while at the same time the same agencies of jurisdiction have known full well that chicken eggs rank as the leading cause of illnesses annually over all food groups. That long-lasting statistic considered together with the obviousness that a 5-log level of pasteurization of already highly contaminated chicken eggs co-mingled as allowed with lesser contaminated eggs but labeled to be Grade AA and Grade A or allowed to be repackaged into new cartons containing new dates which are untrue in combination give cause to a public health cost from chicken eggs which when resolved through pasteurization achieving safe levels would provide for a public savings in costs of illnesses equating to the national debt each year i.e. $20.0 trillion annually.

Notably, the arrival of viral contamination within chicken eggs, at best, has been rare and when previously mentioned has been limited to the H3N1 virus. In those references to the H3N1 virus the same level of destruction or inactivation was employed through pasteurization of liquid egg product equating to 4 logs using Se (bacteria) as the baseline of measure until 2009 when the level of inactivation was raised to 5 logs as applied to Se. It is obvious to the scientific community that the inactivation of a virus requires either greater heat as measured in temperature or longer terms of heat at lower temperatures than does *salmonella*. The H3N1 virus for decades erroneously was treated as having the same heat tolerance as Se which in turn was not the most heat-resistant *salmonella* strain found within chicken eggs. The reported error regarding the H3N1 virus and the inadequacies concerning log levels for its inactivation clearly have placed the public health at risk. To compound the problem recited disagreements on inactivation requirements through pasteurization between agencies of jurisdiction have occurred resulting from misinformation concerning risks and differing information concerning the avoidance of risks. No study supports the long-standing position by agencies of authority that the virus identified as the H3N1 was inactivated at the same level as a 5-log inactivation employing Se as the measure when in fact viruses long since have been known to require the earlier-reported ratio which in the end confirms that the H3N1 inactivation of 5 logs required an Se inactivation of 6- to 7-logs. That error has exposed millions of the egg-consuming public to risks of illness from the H3N1 virus that prior to pasteurization of in-shell chicken eggs had no protective measure whatsoever for the consuming public.

In 2014 WHO continued to acknowledge that a pandemic generated from an Avian Influenza viral source since referred to as the Bird Flu was in the making. The only question left open was when such would occur and not whether such would occur.

Notably to the above-referenced forecast by WHO that the contamination of chicken meat by two new virus strains has been reported by a leading United States supplier on two occasions in October of 2013. The press releases disclosed that Tyson Foods, one of the nation's largest chicken meat providers, had destroyed flocks containing the H7N7 virus. Those reports confirmed the very recent arrival of the virus into the chicken food chain. It also confirmed that the same virus only recently had traveled from Asia to the United States. Logic dictates that contaminated chicken eggs and the pandemic as recently forecasted by WHO and referenced as the 'Bird Flu' may be only one mutation away from occurring. Such is confirmed through prior statements discussed hereinabove which report that the U.S. agency identified as the HHS has contracted with a French-based firm to develop a vaccine in anticipation of the so-called 'Bird Flu'. The contract size involves $150 million for the research and development program.

The new art described and claimed herein for chicken egg pasteurization protocol uniquely provides for a secured environment which hereinbefore has been referred to as the medium. The medium prevents recontamination to which all prior art concerning in-shell chicken egg pasteurization failed to accomplish. Under certain protocols contained within prior art the in-shell eggs exited the pasteurization medium and promptly began internal contraction during ambient cooling. Between the time of exit from the prior pasteurization mediums employed to the time that an antibacterial agent was applied to the exposed eggshells post-pasteurization as followed by an insufficient coverage of the eggshell provided by a protective sealant as performed under prior art, the eggs experienced not only recontamination but greater quantities of eggs became contaminated as a result of the process both being incomplete in its level of inactivation of *salmonella* but also through deficiencies of the protocol employed being absent of protection against airborne recontamination. The mentioned airborne recontamination resulted from the inordinate quantity of shell eggs being pasteurized concurrently and effectively exhaling through the shell pores the contamination contained within each contaminated chicken egg. When the subject eggs had been pasteurized to the targeted log level and were exited from the medium i.e. water bath the subject eggs began contracting. That created an air current caused by the en masse contractions which overcame the negative atmosphere provided for the pasteurization facility. The result made inapplicable the long-standing statistic that only 1 egg in an estimated 20,000 eggs was Se-contaminated by infected ovaries prior to pasteurization, but all eggs post-pasteurization were placed at risk of airborne *salmonella* contamination relocating on each eggshell for reason that the current created by the mass of eggs contracting overcame the negative atmosphere of the room within which the pasteurization occurred. Such not only nullified the benefits of pasteurization but also increased the quantity of eggs contaminated.

The new art contains protocol which not only solves the above-recited issues of inadequate pasteurization and recontamination as applied to *salmonella* presence within pasteurized in-shell chicken eggs, but also provides protection against both the more dangerous and virulent influenza strains as well as inactivating *salmonella* at log levels greater than 5 as measured by Se to that of 10 logs, which conforms with the original levels of inactivation of Se for liquid egg product as set by the USDA originally. Further to the above, the new protocol achieves inactivation of viruses, which equates to an additional 1.5 to 2 logs over that which inactivates *salmonella* in strains, which have higher tolerance to heat than does Se also as confirmed by USDA scientists. Such is enabled by the cyclical application of heat and its denial as described in greater detail hereinbefore. With reference to what has been stated before, which more briefly described is that an important and new feature of the new art claimed herein enables for the first time egg pasteurization to achieve total inactivation of all *salmonella* strains, as well as strains of influenza expected to arrive and to contaminate chicken eggs are enabled through the achievement of log levels which limited all prior art to levels of achievement which were inadequate to provide total inactivation without damage to the raw characteristics and nutritional benefits of the subject eggs. The inadequacy essentially was covered up to the public by allowing a 5-log level of inactivation to be endorsed as being effective in the elimination of *salmonella* from chicken eggs which was known or should have been known to be not only false but dangerous to the consuming public. In principle and in practice the cyclical feature of employing heat and its denial as detailed elsewhere herein as being a feature of the new art described and claimed is expandable for higher log level achievements or may be employed for inactivation solely of *salmonella* as the situation present may warrant which in all cases can be performed to not only provide for total inactivation of the targeted pathogen but also enables the retention of both nutritional and raw characteristics.

In conclusion, when the described new art of pasteurization is performed and has achieved total inactivation of pathogens without negating raw egg characteristics, as enabled through utilizing the new protocols made available and performed within the described environmentally-safe medium, the successful achievements of an end product will consist of pasteurized eggs statistically free of both viral and bacterial contaminants while at the same time preserving the nutritional, aesthetic and functional qualities of a raw chicken egg. No prior art for chicken egg pasteurization has met those standards on a commercial scale.

Notably the described features under the new art as recited when performed together enable higher and needed levels of pasteurization to be available for the total inactivation of pathogens, which include but are not limited to viral contaminants and *salmonella* bacteria as may be found to be present or forecasted to become found within chicken eggs. That described total inactivation results from new discoveries which enable the elimination of either or both underpasteurization or recontamination, as found within current pasteurization protocols whether for in-shell chicken eggs or liquid egg products. Such is accomplished through the uniquely interrupted application of heat and the equally unique interruptions of induced chilling both of which are performed within a novel pasteurization medium, whose unique specifications contain features which enable the described secured and sanitary environment for pasteurization. The combined benefits made available through the features of the areas of new inventiveness, each of which contain elements that are unique unto themselves, provide for a statistical certainty of safety to the public from the consumption of contaminated chicken eggs. Such contaminated eggs currently cause *salmonella* food poisoning together with similar safety from new threats to public health caused by viral contamination whose potential for lethal illnesses resulting from its evolution and greater resistance to heat inactivation already has been confirmed by the scientific community at large. The described threats from either or both viruses and *salmonella*, whether in combination or separately, provide for large quantities of illnesses which in the end support the forecast of a pandemic occurring. Unlike prior pasteurization protocols, which place the public health at risk, the new art includes the benefit of certainty against contamination or recontamination of chicken eggs as provided by the secured medium within which the new art enabling total inactivation of targeted pathogens is performed absent of risk or compromise to the purity achieved. Such is enabled by both the safe environment of the mentioned medium and the log levels of inactivation achieved for the targeted pathogens while maintaining the nutritional and functional qualities of a raw chicken egg whether its end use is for in-shell recipes or versions of liquid egg product. The collective art in its preferred form as employed is unique from all known prior protocol and their specifications.

The protocol claimed and described herein provides for options which include but are not limited to in the first instance an option which is not the preferred option that consists of one tank containing a food-grade sanitizer within water which in its utilization provides for rinsing and sanitizing in-shell eggs prior to entering the secured environment of the pasteurization medium. A second option is to replace the external tank containing treated water with an external shower also containing a food-grade antibacterial agent, which performs the same function as described for the first option employing a bath but provides for the application of a heated spray of water containing an antibacterial agent to pre-sanitize the eggshells prior to their transfer from the external application of the mentioned shower into the pasteurization medium. That described spray of water employed prior to the subject eggs being transferred from outside the pasteurization medium into a location within the pasteurization medium is the preferred protocol to be employed. That protocol employing prescribed and sanitized heated water in the form of a spray outside of the pasteurization medium may be substituted with an application of purified air which has been found to be of equal effectiveness to a spray of water when modified accordingly. The employment of the mentioned spray of purified air in lieu of purified water both employing food-grade additives would satisfy jurisdictions restricting the use of water being applied to eggshells in their raw state. Under all circumstances the subject eggs upon entry into the secured environment of the pasteurization medium will receive a spray of sanitized water to provide additional cleansing of the eggshells, as enabled by the sanitized water being heated to a temperature higher than the subject in-shell chicken eggs but below 128 F. which is the temperature recognized to represent commencement of pasteurization. The shower employed may include in its composition either purified water or purified air at controlled temperatures which are preprogrammed to accommodate the specific characteristics of the subject chicken eggs being processed through an automated program adjusted accordingly.

Post receipt of the above-described treatment of the eggs to protect against external and perimeter invasion of pathogens gaining access through potentially exposed eggshell pores together with those pathogens which may be located between the shells and the eggs' outer membranes, the subject eggs upon entry into the pasteurization medium are subjected to an increase of temperature to achieve the preferred initial internal targeted temperature for pasteurization of 132.5° F., which may be adjusted to reflect the needs peculiar to the raw chicken eggs selected as more fully discussed herein before. That targeted temperature is a preferred temperature that also is subject to adjustment based upon a series of factors concerning variances within eggs or the environment within which pasteurization is employed as has been more fully discussed hereinbefore. For better understanding the protocols for the employment of new inventiveness enabling the statistically complete inactivation of more aggressive and heat-resistant viral pathogens over those of *salmonella* bacteria is a unique feature of the new art which provides for a selection of options discussed hereinbefore from which the processor selects.

Once the subject eggs have been transferred within their customized stacked flats post having received the preferred external rinse containing heated water treated with a food-grade antibacterial agent and having been transferred into the protected environment of the pasteurization medium the pasteurization protocol can be commenced within the secured environment of the medium which contains continuous protocol for maintaining the purity of that environment as discussed in this section previously. The pasteurization protocol employed as also discussed within this section earlier provides for applications of heat and its denial which in the end through adjustments automatically programmed enables the total inactivation of targeted pathogens through the described intermittent application of heat, its denial and the intermittent application of induced chilling which in practice is performed repeatedly until the targeted pathogen statistically has been inactivated but in a manner which preserves its raw aesthetic appearance, its nutritional benefits and its functional characteristics as likened to those of a raw in-shell chicken egg.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method of pasteurizing in-shell chicken eggs, wherein the chicken eggs comprise at least an eggshell with pores and internal contents within the eggshell, comprising at least an outer albumen, an inner albumen, a vitelline membrane, and a yolk, and each of the internal contents maintains a raw characteristic throughout said method, said method comprising the steps of:
   (1) identifying a log level required to inactivate a targeted pathogen;
   (2) identifying a pasteurization temperature;
   (3) exposing the in-shell eggs to a first heat source, wherein the first heat source has a higher temperature than the pasteurization temperature;
   (4) maintaining the exposure of the in-shell eggs to the first heat source until the internal contents of the in-shell eggs reach equilibrium with the pasteurization temperature;
   (5) discontinuing exposure of the in-shell eggs to the first heat source;
   (6) exposing the in-shell eggs to a second heat source, wherein the second heat source has a lower temperature than the pasteurization temperature;
   (7) maintaining the exposure of the in-shell eggs to the second heat source until the outer albumen of the in-shell eggs has cooled to a temperature of less than 128° F. and the inner albumen has cooled to a temperature of no less than 128° F.;
   (8) discontinuing the exposure of the in-shell eggs to the second heat source; and
   (9) repeating said steps (3) through (8) until the log level required to inactivate the targeted pathogen is achieved.

2. The method as claimed in claim 1, wherein the targeted pasteurization temperature is between 128° F. and 138.5° F.

3. The method as claimed in claim 2, wherein the targeted pasteurization temperature is 132.5° F.

4. The method as claimed in claim 1, wherein the first heat source has a temperature of no higher than 150° F.

5. The method as claimed in claim 1, wherein the second heat source has a temperature of no lower than 120° F.

6. The method as claimed in claim 1, wherein the first heat source is liquid water.

7. The method as claimed in claim 6, wherein the liquid water is combined with food-grade bactericide.

8. The method as claimed in claim 6, wherein the liquid water is sanitized through at least one of exposure to ultraviolet light, filtration, and reverse osmosis.

9. The method as claimed in claim 1, wherein the first heat source is gaseous air.

10. The method as claimed in claim 9, wherein the gaseous air is combined with food-grade bactericide.

11. The method as claimed in claim 9, wherein the gaseous air is sanitized through at least one of exposure to ultraviolet light, filtration, and reverse osmosis.

12. The method as claimed in claim 1, wherein the first heat source is a combination of liquid water and at least one of a group consisting of microwaves, ultraviolet light, at least one heat lamp, and solar energy.

13. The method as claimed in claim 12, wherein the liquid water is combined with food-grade bactericide.

14. The method as claimed in claim 1, wherein the first heat source is a combination of gaseous air and at least one of a group consisting of microwaves, ultraviolet light, at least one heat lamp, and solar energy.

15. The method as claimed in claim 14, wherein the gaseous air is combined with food-grade bactericide.

16. The method as claimed in claim 1, wherein the second heat source is liquid water.

17. The method as claimed in claim 16, wherein the liquid water is combined with food-grade bactericide.

18. The method as claimed in claim 16, wherein the liquid water is sanitized through at least one of exposure to ultraviolet light, filtration, and reverse osmosis.

19. The method as claimed in claim 1, wherein the second heat source is gaseous air.

20. The method as claimed in claim 19, wherein the gaseous air is combined with food-grade bactericide.

21. The method as claimed in claim 19, wherein the gaseous air is sanitized through at least one of exposure to ultraviolet light, filtration, and reverse osmosis.

22. The method as claimed in claim 1, wherein the second heat source is a combination of liquid water and at least one of a group consisting of microwaves, ultraviolet light, at least one heat lamp, and solar energy.

23. The method as claimed in claim 22, wherein the liquid water is combined with food-grade bactericide.

24. The method as claimed in claim 1, wherein the second heat source is a combination of gaseous air and at least one of a group consisting of microwaves, ultraviolet light, at least one heat lamp, and solar energy.

25. The method as claimed in claim 24, wherein the gaseous air is combined with food-grade bactericide.

26. The method as claimed in claim 1, further comprising the following steps performed after said step (9):
   (10) allowing the in-shell eggs to cool and internally contract; and
   (11) applying to the in-shell eggs an undiluted food-grade bactericide, wherein the food-grade bactericide enters the eggshell through pores of the eggshell and is drawn inward into the internal contents of the in-shell eggs though the internal contraction in said step (10).

27. The method as claimed in claim 26, further comprising the following step performed after said step (11) of applying to the in-shell eggs one of a food-grade wax or a food-grade plastic sealant.

28. The method as claimed in claim 1, wherein the log level required to inactivate a targeted bacteria is at least a 12 log level inactivation.

29. The method as claimed in claim 1, wherein the log level required to inactivate a targeted virus is at least a 10 log level inactivation.

30. The method as claimed in claim 1, further comprising the step performed between said steps (2) and (3) of exposing the in-shell eggs to liquid water combined with food-grade bactericide, wherein the liquid water combined with food-grade bactericide is at a temperature that is less than 128° F.

31. The method as claimed in claim 30, wherein the in-shell eggs are immersed in the liquid water combined with food-grade bactericide.

32. The method as claimed in claim 1, further comprising the step performed between said steps (2) and (3) of placing the in-shell eggs in a pasteurization medium, wherein the pasteurization medium is an isolated, secured, and controlled housing that prevents recontamination of the in-shell eggs from external contamination.

33. The method as claimed in claim 32, wherein the first heat source is a first fluid and the second heat source is a second fluid and further comprising the step of preventing recontamination of the in-shell eggs and external contamination during said steps of said method through the following further steps:
   sanitizing the first and second fluids;

recirculating the sanitized first and second fluids; and sanitizing pasteurization medium air within the pasteurization medium.

34. The method as claimed in claim 32, wherein the first heat source is a combination of a first fluid and at least one of a group consisting of microwaves, ultraviolet light, at least one heat lamp, and solar energy.

35. The method as claimed in claim 32, wherein the second heat source is a combination of a second fluid and at least one of a group consisting of microwaves, ultraviolet light, at least one heat lamp, and solar energy.

36. The method as claimed in claim 34, wherein the first fluid is sanitized through at least one of exposure to ultraviolet light, filtration, and reverse osmosis.

37. The method as claimed in claim 35, wherein the second fluid is sanitized through at least one of exposure to ultraviolet light, filtration, and reverse osmosis.

38. The method as claimed in claim 32, further comprising the step performed between said step (2) and said step of placing the in-shell eggs in the pasteurization medium of exposing the in-shell eggs to liquid water combined with food-grade bactericide, wherein the liquid water combined with food-grade bactericide is at a temperature that is at least 123° F. and less than 128° F.

39. The method as claimed in claim 38, wherein the liquid water combined with food-grade bactericide is sprayed on the in-shell eggs.

40. The method as claimed in claim 38, wherein the in-shell eggs are immersed in the liquid water combined with food-grade bactericide.

41. The method as claimed in claim 1, wherein each of said step (9) of repeating said steps (3) through (8) increases a log level pathogen reduction by between 1.0 and 1.75 logs and the log level required to inactivate the targeted pathogen is attained through an accumulation of the log level pathogen reductions of each of said step (9).

42. The method as claimed in claim 6, wherein the liquid water is applied through spraying.

43. The method as claimed in claim 6, wherein the liquid water is applied through a mist.

44. The method as claimed in claim 1, wherein the first heat source is one of a group consisting of microwaves, ultraviolet light, at least one heat lamp, and solar energy.

45. The method as claimed in claim 1, wherein the second heat source is one of a group consisting of microwaves, ultraviolet light, at least one heat lamp, and solar energy.

46. The method as claimed in claim 1, further comprising the step before said step (2) of determining the pasteurization temperature and an amount of time to perform said step (3) based on considerations comprising at least one of:
   a size of the in-shell eggs as determined by weight;
   water content of the in-shell eggs;
   altitude at which said method is being conducted;
   lapses in time between a date of the lay of the in-shell eggs and a date of said method being conducted; and
   a diet of a chicken that laid the in-shell eggs.

* * * * *